US012254887B2

(12) United States Patent
Kim et al.

(10) Patent No.: US 12,254,887 B2
(45) Date of Patent: Mar. 18, 2025

(54) FAR-FIELD EXTENSION OF DIGITAL ASSISTANT SERVICES FOR PROVIDING A NOTIFICATION OF AN EVENT TO A USER

(71) Applicant: Apple Inc., Cupertino, CA (US)

(72) Inventors: Yoon Kim, Los Altos, CA (US); Charles Srisuwananukorn, Belmont, CA (US); David A. Carson, San Francisco, CA (US); Thomas R. Gruber, Seattle, WA (US); Justin G. Binder, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/543,292

(22) Filed: Dec. 6, 2021

(65) Prior Publication Data

US 2022/0093110 A1 Mar. 24, 2022

Related U.S. Application Data

(63) Continuation of application No. 15/679,108, filed on Aug. 16, 2017, now Pat. No. 11,217,255.
(Continued)

(51) Int. Cl.
*G10L 15/22* (2006.01)
*G10L 15/16* (2006.01)
(Continued)

(52) U.S. Cl.
CPC .............. *G10L 17/22* (2013.01); *G10L 15/16* (2013.01); *G10L 15/22* (2013.01); *G10L 15/30* (2013.01);
(Continued)

(58) Field of Classification Search
CPC ......... G10L 15/22; G10L 15/30; G10L 17/22; G10L 17/24; G10L 15/28; H04M 15/84; H04M 15/848; H04M 15/86
See application file for complete search history.

(56) References Cited

U.S. PATENT DOCUMENTS 5,970,457 A 10/1999 Brant et al.
7,003,463 B1 2/2006 Maes et al.
(Continued)

FOREIGN PATENT DOCUMENTS

AU 2014100581 B4 9/2014
AU 2015203483 A1 7/2015
(Continued)

OTHER PUBLICATIONS

Office Action received for Australian Patent Application No. 2021218193, mailed on Jun. 16, 2022, 2 pages.
(Continued)

*Primary Examiner* — Martin Lerner
(74) *Attorney, Agent, or Firm* — DLA Piper LLP (US)

(57) ABSTRACT

Systems and processes for operating an intelligent automated assistant to provide extension of digital assistant services are provided. An example method includes, at an electronic device having one or more processors, receiving, from a first user, a first speech input representing a user request. The method further includes obtaining an identity of the first user; and in accordance with the user identity, providing a representation of the user request to at least one of a second electronic device or a third electronic device. The method further includes receiving, based on a determination of whether the second electronic device or the third electronic device, or both, is to provide the response to the first electronic device, the response to the user request from the second electronic device or the third electronic device. The method further includes providing a representation of the response to the first user.

50 Claims, 58 Drawing Sheets

Related U.S. Application Data

(60) Provisional application No. 62/507,151, filed on May 16, 2017.

(51) Int. Cl.
*G10L 15/28* (2013.01)
*G10L 15/30* (2013.01)
*G10L 17/22* (2013.01)
*G10L 15/187* (2013.01)
*G10L 15/26* (2006.01)

(52) U.S. Cl.
CPC ...... *G10L 15/187* (2013.01); *G10L 2015/223* (2013.01); *G10L 15/26* (2013.01)

(56) References Cited

U.S. PATENT DOCUMENTS 7,606,712 B1 10/2009 Smith et al.
7,779,069 B2 8/2010 Frid-Nielsen et al.
7,865,817 B2 1/2011 Ryan et al.
7,869,999 B2 1/2011 Amato et al.
7,870,118 B2 1/2011 Jiang et al.
7,870,133 B2 1/2011 Krishnamoorthy et al.
7,873,149 B2 1/2011 Schultz et al.
7,873,519 B2 1/2011 Bennett
7,873,654 B2 1/2011 Bernard
7,877,705 B2 1/2011 Chambers et al.
7,880,730 B2 2/2011 Robinson et al.
7,881,283 B2 2/2011 Cormier et al.
7,881,936 B2 2/2011 Longe et al.
7,885,390 B2 2/2011 Chaudhuri et al.
7,885,844 B1 2/2011 Cohen et al.
7,886,233 B2 2/2011 Rainisto et al.
7,889,101 B2 2/2011 Yokota
7,889,184 B2 2/2011 Blumenberg et al.
7,889,185 B2 2/2011 Blumenberg et al.
7,890,330 B2 2/2011 Ozkaragoz et al.
7,890,652 B2 2/2011 Bull et al.
7,895,039 B2 2/2011 Braho et al.
7,895,531 B2 2/2011 Radtke et al.
7,899,666 B2 3/2011 Varone
7,904,297 B2 3/2011 Mirkovic et al.
7,908,287 B1 3/2011 Katragadda
7,912,289 B2 3/2011 Kansal et al.
7,912,699 B1 3/2011 Saraclar et al.
7,912,702 B2 3/2011 Bennett
7,912,720 B1 3/2011 Hakkani-Tur et al.
7,912,828 B2 3/2011 Bonnet et al.
7,913,185 B1 3/2011 Benson et al.
7,916,979 B2 3/2011 Simmons
7,917,367 B2 3/2011 Di Cristo et al.
7,917,497 B2 3/2011 Harrison et al.
7,920,678 B2 4/2011 Cooper et al.
7,920,682 B2 4/2011 Byrne et al.
7,920,857 B2 4/2011 Lau et al.
7,925,525 B2 4/2011 Chin
7,925,610 B2 4/2011 Elbaz et al.
7,929,805 B2 4/2011 Wang et al.
7,930,168 B2 4/2011 Weng et al.
7,930,183 B2 4/2011 Odell et al.
7,930,197 B2 4/2011 Ozzie et al.
7,936,339 B2 5/2011 Marggraff et al.
7,936,861 B2 5/2011 Knott et al.
7,936,863 B2 5/2011 John et al.
7,937,075 B2 5/2011 Zellner
7,941,009 B2 5/2011 Li et al.
7,945,294 B2 5/2011 Zhang et al.
7,945,470 B1 5/2011 Cohen et al.
7,949,529 B2 5/2011 Weider et al.
7,949,534 B2 5/2011 Davis et al.
7,949,713 B2 5/2011 Naito et al.
7,949,752 B2 5/2011 White et al.
7,953,679 B2 5/2011 Chidlovskii et al.
7,957,975 B2 6/2011 Burns et al.
7,958,136 B1 6/2011 Curtis et al.
7,962,179 B2 6/2011 Huang
7,974,835 B2 7/2011 Balchandran et al.
7,974,844 B2 7/2011 Sumita
7,974,972 B2 7/2011 Cao
7,975,216 B2 7/2011 Woolf et al.
7,983,478 B2 7/2011 Liu et al.
7,983,915 B2 7/2011 Knight et al.
7,983,917 B2 7/2011 Kennewick et al.
7,983,919 B2 7/2011 Conkie
7,983,997 B2 7/2011 Allen et al.
7,984,062 B2 7/2011 Dunning et al.
7,986,431 B2 7/2011 Emori et al.
7,987,151 B2 7/2011 Schott et al.
7,987,244 B1 7/2011 Lewis et al.
7,991,614 B2 8/2011 Washio et al.
7,992,085 B2 8/2011 Wang-Aryattanwanich et al.
7,996,228 B2 8/2011 Miller et al.
7,996,589 B2 8/2011 Schultz et al.
7,996,769 B2 8/2011 Fux et al.
7,996,792 B2 8/2011 Anzures et al.
7,999,669 B2 8/2011 Singh et al.
8,000,453 B2 8/2011 Cooper et al.
8,005,664 B2 8/2011 Hanumanthappa
8,005,679 B2 8/2011 Jordan et al.
8,006,180 B2 8/2011 Tunning et al.
8,014,308 B2 9/2011 Gates, III et al.
8,015,006 B2 9/2011 Kennewick et al.
8,015,011 B2 9/2011 Nagano et al.
8,015,144 B2 9/2011 Zheng et al.
8,018,431 B1 9/2011 Zehr et al.
8,019,271 B1 9/2011 Izdepski
8,020,104 B2 9/2011 Robarts et al.
8,024,195 B2 9/2011 Mozer et al.
8,024,415 B2 9/2011 Horvitz et al.
8,027,836 B2 9/2011 Baker et al.
8,031,943 B2 10/2011 Chen et al.
8,032,383 B1 10/2011 Bhardwaj et al.
8,036,901 B2 10/2011 Mozer
8,037,034 B2 10/2011 Plachta et al.
8,041,557 B2 10/2011 Liu
8,041,570 B2 10/2011 Mirkovic et al.
8,041,611 B2 10/2011 Kleinrock et al.
8,042,053 B2 10/2011 Darwish et al.
8,046,363 B2 10/2011 Cha et al.
8,046,374 B1 10/2011 Bromwich
8,050,500 B1 11/2011 Batty et al.
8,054,180 B1 11/2011 Scofield et al.
8,055,502 B2 11/2011 Clark et al.
8,055,708 B2 11/2011 Chitsaz et al.
8,056,070 B2 11/2011 Goller et al.
8,060,824 B2 11/2011 Brownrigg, Jr. et al.
8,064,753 B2 11/2011 Freeman
8,065,143 B2 11/2011 Yanagihara
8,065,155 B1 11/2011 Gazdzinski
8,065,156 B2 11/2011 Gazdzinski
8,068,604 B2 11/2011 Leeds et al.
8,069,046 B2 11/2011 Kennewick et al.
8,069,422 B2 11/2011 Sheshagiri et al.
8,073,681 B2 12/2011 Baldwin et al.
8,073,695 B1 12/2011 Hendricks et al.
8,077,153 B2 12/2011 Benko et al.
8,078,473 B1 12/2011 Gazdzinski
8,082,153 B2 12/2011 Coffman et al.
8,082,498 B2 12/2011 Salamon et al.
8,090,571 B2 1/2012 Elshishiny et al.
8,095,364 B2 1/2012 Longe et al.
8,099,289 B2 1/2012 Mozer et al.
8,099,395 B2 1/2012 Pabla et al.
8,099,418 B2 1/2012 Inoue et al.
8,103,510 B2 1/2012 Sato
8,103,947 B2 1/2012 Lunt et al.
8,107,401 B2 1/2012 John et al.
8,112,275 B2 2/2012 Kennewick et al.
8,112,280 B2 2/2012 Lu
8,115,772 B2 2/2012 Ostermann et al.
8,117,026 B2 2/2012 Lee et al.
8,117,037 B2 2/2012 Gazdzinski
8,117,542 B2 2/2012 Radtke et al.

(56) References Cited

U.S. PATENT DOCUMENTS 8,121,413 B2 2/2012 Hwang et al.
8,121,837 B2 2/2012 Agapi et al.
8,122,094 B1 2/2012 Kotab
8,122,353 B2 2/2012 Bouta
8,130,929 B2 3/2012 Wilkes et al.
8,131,557 B2 3/2012 Davis et al.
8,135,115 B1 3/2012 Hogg, Jr. et al.
8,138,912 B2 3/2012 Singh et al.
8,140,330 B2 3/2012 Cevik et al.
8,140,335 B2 3/2012 Kennewick et al.
8,140,368 B2 3/2012 Eggenberger et al.
8,140,567 B2 3/2012 Padovitz et al.
8,145,489 B2 3/2012 Freeman et al.
8,150,694 B2 4/2012 Kennewick et al.
8,150,700 B2 4/2012 Shin et al.
8,155,956 B2 4/2012 Cho et al.
8,156,005 B2 4/2012 Vieri
8,156,060 B2 4/2012 Borzestowski et al.
8,160,877 B1 4/2012 Nucci et al.
8,160,883 B2 4/2012 Lecoeuche
8,165,321 B2 4/2012 Paquier et al.
8,165,886 B1 4/2012 Gagnon et al.
8,166,019 B1 4/2012 Lee et al.
8,166,032 B2 4/2012 Sommer et al.
8,170,790 B2 5/2012 Lee et al.
8,170,966 B1 5/2012 Musat et al.
8,171,137 B1 5/2012 Parks et al.
8,175,872 B2 5/2012 Kristjansson et al.
8,175,876 B2 5/2012 Bou-Ghazale et al.
8,179,370 B1 5/2012 Yamasani et al.
8,188,856 B2 5/2012 Singh et al.
8,190,359 B2 5/2012 Bourne
8,190,596 B2 5/2012 Nambiar et al.
8,194,827 B2 6/2012 Jaiswal et al.
8,195,467 B2 6/2012 Mozer et al.
8,195,468 B2 6/2012 Weider et al.
8,200,489 B1 6/2012 Baggenstoss
8,200,495 B2 6/2012 Braho et al.
8,201,109 B2 6/2012 Van Os et al.
8,204,238 B2 6/2012 Mozer
8,205,788 B1 6/2012 Gazdzinski et al.
8,209,177 B2 6/2012 Sakuma et al.
8,209,183 B1 6/2012 Patel et al.
8,213,911 B2 7/2012 Williams et al.
8,219,115 B1 7/2012 Nelissen
8,219,406 B2 7/2012 Yu et al.
8,219,407 B1 7/2012 Roy et al.
8,219,555 B1 7/2012 Mianji
8,219,608 B2 7/2012 AlSafadi et al.
8,224,649 B2 7/2012 Chaudhari et al.
8,224,757 B2 7/2012 Bohle
8,228,299 B1 7/2012 Maloney et al.
8,233,919 B2 7/2012 Haag et al.
8,234,111 B2 7/2012 Lloyd et al.
8,239,206 B1 8/2012 LeBeau et al.
8,239,207 B2 8/2012 Seligman et al.
8,244,545 B2 8/2012 Paek et al.
8,244,712 B2 8/2012 Serlet et al.
8,250,071 B1 8/2012 Killalea et al.
8,254,829 B1 8/2012 Kindred et al.
8,255,216 B2 8/2012 White
8,255,217 B2 8/2012 Stent et al.
8,260,117 B1 9/2012 Xu et al.
8,260,247 B2 9/2012 Lazaridis et al.
8,260,617 B2 9/2012 Dhanakshirur et al.
8,260,619 B1 9/2012 Bansal et al.
8,270,933 B2 9/2012 Riemer et al.
8,271,287 B1 9/2012 Kermani
8,275,621 B2 9/2012 Alewine et al.
8,275,736 B2 9/2012 Guo et al.
8,279,171 B2 10/2012 Hirai et al.
8,280,438 B2 10/2012 Barbera
8,285,546 B2 10/2012 Reich
8,285,551 B2 10/2012 Gazdzinski
8,285,553 B2 10/2012 Gazdzinski
8,285,737 B1 10/2012 Lynn et al.
8,290,274 B2 10/2012 Mori et al.
8,290,777 B1 10/2012 Nguyen et al.
8,290,778 B2 10/2012 Gazdzinski
8,290,781 B2 10/2012 Gazdzinski
8,296,124 B1 10/2012 Holsztynska et al.
8,296,145 B2 10/2012 Clark et al.
8,296,146 B2 10/2012 Gazdzinski
8,296,153 B2 10/2012 Gazdzinski
8,296,380 B1 10/2012 Kelly et al.
8,296,383 B2 10/2012 Lindahl
8,300,776 B2 10/2012 Davies et al.
8,300,801 B2 10/2012 Sweeney et al.
8,301,456 B2 10/2012 Gazdzinski
8,311,189 B2 11/2012 Champlin et al.
8,311,834 B1 11/2012 Gazdzinski
8,311,835 B2 11/2012 Lecoeuche
8,311,838 B2 11/2012 Lindahl et al.
8,312,017 B2 11/2012 Martin et al.
8,321,786 B2 11/2012 Lunati
8,326,627 B2 12/2012 Kennewick et al.
8,332,205 B2 12/2012 Krishnan et al.
8,332,218 B2 12/2012 Cross, Jr. et al.
8,332,224 B2 12/2012 Di Cristo et al.
8,332,748 B1 12/2012 Karam
8,335,689 B2 12/2012 Wittenstein et al.
8,340,975 B1 12/2012 Rosenberger
8,345,665 B2 1/2013 Vieri et al.
8,346,563 B1 1/2013 Hjelm et al.
8,346,757 B1 1/2013 Lamping et al.
8,352,183 B2 1/2013 Thota et al.
8,352,268 B2 1/2013 Naik et al.
8,352,272 B2 1/2013 Rogers et al.
8,355,919 B2 1/2013 Silverman et al.
8,359,234 B2 1/2013 Vieri
8,370,145 B2 2/2013 Endo et al.
8,370,158 B2 2/2013 Gazdzinski
8,371,503 B2 2/2013 Gazdzinski
8,374,871 B2 2/2013 Ehsani et al.
8,375,320 B2 2/2013 Kotler et al.
8,380,504 B1 2/2013 Peden et al.
8,380,507 B2 2/2013 Herman et al.
8,381,107 B2 2/2013 Rottler et al.
8,381,135 B2 2/2013 Hotelling et al.
8,386,485 B2 2/2013 Kerschberg et al.
8,386,926 B1 2/2013 Matsuoka et al.
8,391,844 B2 3/2013 Novick et al.
8,392,717 B2 3/2013 Chai et al.
8,396,295 B2 3/2013 Gao et al.
8,396,714 B2 3/2013 Rogers et al.
8,396,715 B2 3/2013 Odell et al.
8,401,163 B1 3/2013 Kirchhoff et al.
8,406,745 B1 3/2013 Upadhyay et al.
8,407,239 B2 3/2013 Dean et al.
8,423,288 B2 4/2013 Stahl et al.
8,428,758 B2 4/2013 Naik et al.
8,433,572 B2 4/2013 Caskey et al.
8,433,778 B1 4/2013 Shreesha et al.
8,434,133 B2 4/2013 Kulkarni et al.
8,442,821 B1 5/2013 Vanhoucke
8,447,612 B2 5/2013 Gazdzinski
8,452,597 B2 5/2013 Bringert et al.
8,452,602 B1 5/2013 Bringert et al.
8,453,058 B1 5/2013 Coccaro et al.
8,457,959 B2 6/2013 Kaiser
8,458,115 B2 6/2013 Cai et al.
8,458,278 B2 6/2013 Christie et al.
8,463,592 B2 6/2013 Lu et al.
8,464,150 B2 6/2013 Davidson et al.
8,473,289 B2 6/2013 Jitkoff et al.
8,473,485 B2 6/2013 Wong et al.
8,477,323 B2 7/2013 Low et al.
8,478,816 B2 7/2013 Parks et al.
8,479,122 B2 7/2013 Hotelling et al.
8,484,027 B1 7/2013 Murphy
8,489,599 B2 7/2013 Bellotti
8,498,670 B2 7/2013 Cha et al.
8,498,857 B2 7/2013 Kopparapu et al.
8,514,197 B2 8/2013 Shahraray et al.

(56) References Cited

U.S. PATENT DOCUMENTS

| | | | |
|---|---|---|---|
| 8,515,736 | B1 | 8/2013 | Duta |
| 8,515,750 | B1 | 8/2013 | Lei et al. |
| 8,521,513 | B2 | 8/2013 | Millett et al. |
| 8,521,526 | B1 | 8/2013 | Lloyd et al. |
| 8,521,531 | B1 | 8/2013 | Kim |
| 8,521,533 | B1 | 8/2013 | Ostermann et al. |
| 8,527,276 | B1 | 9/2013 | Senior et al. |
| 8,533,266 | B2 | 9/2013 | Koulomzin et al. |
| 8,537,033 | B2 | 9/2013 | Gueziec |
| 8,539,342 | B1 | 9/2013 | Lewis |
| 8,543,375 | B2 | 9/2013 | Hong |
| 8,543,397 | B1 | 9/2013 | Nguyen |
| 8,543,398 | B1 | 9/2013 | Strope et al. |
| 8,560,229 | B1 | 10/2013 | Park et al. |
| 8,560,366 | B2 | 10/2013 | Mikurak |
| 8,571,528 | B1 | 10/2013 | Channakeshava |
| 8,571,851 | B1 | 10/2013 | Tickner et al. |
| 8,577,683 | B2 | 11/2013 | Dewitt |
| 8,583,416 | B2 | 11/2013 | Huang et al. |
| 8,583,511 | B2 | 11/2013 | Hendrickson |
| 8,583,638 | B2 | 11/2013 | Donelli |
| 8,589,156 | B2 | 11/2013 | Burke et al. |
| 8,589,161 | B2 | 11/2013 | Kennewick et al. |
| 8,589,374 | B2 | 11/2013 | Chaudhari |
| 8,589,869 | B2 | 11/2013 | Wolfram |
| 8,589,911 | B1 | 11/2013 | Sharkey et al. |
| 8,595,004 | B2 | 11/2013 | Koshinaka |
| 8,595,642 | B1 | 11/2013 | Lagassey |
| 8,600,743 | B2 | 12/2013 | Lindahl et al. |
| 8,600,746 | B1 | 12/2013 | Lei et al. |
| 8,600,930 | B2 | 12/2013 | Sata et al. |
| 8,606,090 | B2 | 12/2013 | Eyer |
| 8,606,568 | B1 | 12/2013 | Tickner et al. |
| 8,606,576 | B1 | 12/2013 | Barr et al. |
| 8,606,577 | B1 | 12/2013 | Stewart et al. |
| 8,615,221 | B1 | 12/2013 | Cosenza et al. |
| 8,620,659 | B2 | 12/2013 | Di Cristo et al. |
| 8,620,662 | B2 | 12/2013 | Bellegarda |
| 8,626,681 | B1 | 1/2014 | Jurca et al. |
| 8,630,841 | B2 | 1/2014 | Van Caldwell et al. |
| 8,635,073 | B2 | 1/2014 | Chang |
| 8,638,363 | B2 | 1/2014 | King et al. |
| 8,639,516 | B2 | 1/2014 | Lindahl et al. |
| 8,645,128 | B1 | 2/2014 | Agiomyrgiannakis |
| 8,645,137 | B2 | 2/2014 | Bellegarda et al. |
| 8,645,138 | B1 | 2/2014 | Weinstein et al. |
| 8,654,936 | B1 | 2/2014 | Eslambolchi et al. |
| 8,655,646 | B2 | 2/2014 | Lee et al. |
| 8,655,901 | B1 | 2/2014 | Li et al. |
| 8,660,843 | B2 | 2/2014 | Falcon et al. |
| 8,660,849 | B2 | 2/2014 | Gruber et al. |
| 8,660,924 | B2 | 2/2014 | Hoch et al. |
| 8,660,970 | B1 | 2/2014 | Fiedorowicz |
| 8,661,112 | B2 | 2/2014 | Creamer et al. |
| 8,661,340 | B2 | 2/2014 | Goldsmith et al. |
| 8,670,979 | B2 | 3/2014 | Gruber et al. |
| 8,675,084 | B2 | 3/2014 | Bolton et al. |
| 8,676,273 | B1 | 3/2014 | Fujisaki |
| 8,676,583 | B2 | 3/2014 | Gupta et al. |
| 8,676,904 | B2 | 3/2014 | Lindahl |
| 8,677,377 | B2 | 3/2014 | Cheyer et al. |
| 8,681,950 | B2 | 3/2014 | Vlack et al. |
| 8,682,667 | B2 | 3/2014 | Haughay |
| 8,687,777 | B1 | 4/2014 | Lavian et al. |
| 8,688,446 | B2 | 4/2014 | Yanagihara |
| 8,688,453 | B1 | 4/2014 | Joshi et al. |
| 8,689,135 | B2 | 4/2014 | Portele et al. |
| 8,694,322 | B2 | 4/2014 | Snitkovskiy et al. |
| 8,695,074 | B2 | 4/2014 | Saraf et al. |
| 8,696,364 | B2 | 4/2014 | Cohen |
| 8,706,472 | B2 | 4/2014 | Ramerth et al. |
| 8,706,474 | B2 | 4/2014 | Blume et al. |
| 8,706,503 | B2 | 4/2014 | Cheyer et al. |
| 8,707,195 | B2 | 4/2014 | Fleizach et al. |
| 8,712,778 | B1 | 4/2014 | Thenthiruperai |
| 8,713,119 | B2 | 4/2014 | Lindahl et al. |
| 8,713,418 | B2 | 4/2014 | King et al. |
| 8,719,006 | B2 | 5/2014 | Bellegarda |
| 8,719,014 | B2 | 5/2014 | Wagner |
| 8,719,039 | B1 | 5/2014 | Sharifi |
| 8,731,610 | B2 | 5/2014 | Appaji |
| 8,731,912 | B1 | 5/2014 | Tickner et al. |
| 8,731,942 | B2 | 5/2014 | Cheyer et al. |
| 8,739,208 | B2 | 5/2014 | Davis et al. |
| 8,744,852 | B1 | 6/2014 | Seymour et al. |
| 8,751,971 | B2 | 6/2014 | Fleizach et al. |
| 8,760,537 | B2 | 6/2014 | Johnson et al. |
| 8,762,145 | B2 | 6/2014 | Ouchi et al. |
| 8,762,156 | B2 | 6/2014 | Chen |
| 8,762,469 | B2 | 6/2014 | Lindahl |
| 8,768,693 | B2 | 7/2014 | Somekh et al. |
| 8,768,702 | B2 | 7/2014 | Mason et al. |
| 8,775,154 | B2 | 7/2014 | Clinchant et al. |
| 8,775,177 | B1 | 7/2014 | Heigold et al. |
| 8,775,341 | B1 | 7/2014 | Commons |
| 8,775,931 | B2 | 7/2014 | Fux et al. |
| 8,781,456 | B2 | 7/2014 | Prociw |
| 8,781,841 | B1 | 7/2014 | Wang |
| 8,793,301 | B2 | 7/2014 | Wegenkittl et al. |
| 8,798,255 | B2 | 8/2014 | Lubowich et al. |
| 8,798,995 | B1 | 8/2014 | Edara |
| 8,799,000 | B2 | 8/2014 | Guzzoni et al. |
| 8,805,690 | B1 | 8/2014 | Lebeau et al. |
| 8,812,299 | B1 | 8/2014 | Su |
| 8,812,302 | B2 | 8/2014 | Xiao et al. |
| 8,812,321 | B2 | 8/2014 | Gilbert et al. |
| 8,823,507 | B1 | 9/2014 | Touloumtzis |
| 8,823,793 | B2 | 9/2014 | Clayton et al. |
| 8,831,947 | B2 | 9/2014 | Wasserblat et al. |
| 8,831,949 | B1 | 9/2014 | Smith et al. |
| 8,838,457 | B2 | 9/2014 | Cerra et al. |
| 8,855,915 | B2 | 10/2014 | Furuhata et al. |
| 8,861,925 | B1 | 10/2014 | Ohme |
| 8,862,252 | B2 | 10/2014 | Rottler et al. |
| 8,868,111 | B1 | 10/2014 | Kahn et al. |
| 8,868,409 | B1 | 10/2014 | Mengibar et al. |
| 8,868,431 | B2 | 10/2014 | Yamazaki et al. |
| 8,868,469 | B2 | 10/2014 | Xu et al. |
| 8,868,529 | B2 | 10/2014 | Lerenc |
| 8,880,405 | B2 | 11/2014 | Cerra et al. |
| 8,886,534 | B2 | 11/2014 | Nakano et al. |
| 8,886,540 | B2 | 11/2014 | Cerra et al. |
| 8,886,541 | B2 | 11/2014 | Friedlander |
| 8,892,446 | B2 | 11/2014 | Cheyer et al. |
| 8,893,023 | B2 | 11/2014 | Perry et al. |
| 8,897,822 | B2 | 11/2014 | Martin |
| 8,898,064 | B1 | 11/2014 | Thomas et al. |
| 8,898,568 | B2 | 11/2014 | Bull et al. |
| 8,903,716 | B2 | 12/2014 | Chen et al. |
| 8,909,693 | B2 | 12/2014 | Frissora et al. |
| 8,918,321 | B2 | 12/2014 | Czahor |
| 8,922,485 | B1 | 12/2014 | Lloyd |
| 8,930,176 | B2 | 1/2015 | Li et al. |
| 8,930,191 | B2 | 1/2015 | Gruber et al. |
| 8,938,394 | B1 | 1/2015 | Faaborg et al. |
| 8,938,450 | B2 | 1/2015 | Spivack et al. |
| 8,938,688 | B2 | 1/2015 | Bradford et al. |
| 8,942,986 | B2 | 1/2015 | Cheyer et al. |
| 8,943,423 | B2 | 1/2015 | Merrill et al. |
| 8,964,947 | B1 | 2/2015 | Noolu et al. |
| 8,972,240 | B2 | 3/2015 | Brockett et al. |
| 8,972,432 | B2 | 3/2015 | Shaw et al. |
| 8,972,878 | B2 | 3/2015 | Mohler et al. |
| 8,976,063 | B1 | 3/2015 | Hawkins et al. |
| 8,976,108 | B2 | 3/2015 | Hawkins et al. |
| 8,977,255 | B2 | 3/2015 | Freeman et al. |
| 8,983,383 | B1 | 3/2015 | Haskin |
| 8,984,098 | B1 | 3/2015 | Tomkins et al. |
| 8,989,713 | B2 | 3/2015 | Doulton |
| 8,990,235 | B2 | 3/2015 | King et al. |
| 8,994,660 | B2 | 3/2015 | Neels et al. |
| 8,995,972 | B1 | 3/2015 | Cronin |
| 8,996,350 | B1 | 3/2015 | Dub et al. |
| 8,996,376 | B2 | 3/2015 | Fleizach et al. |

(56) References Cited

U.S. PATENT DOCUMENTS 8,996,381 B2 3/2015 Mozer et al.
8,996,639 B1 3/2015 Faaborg et al.
9,002,714 B2 4/2015 Kim et al.
9,009,046 B1 4/2015 Stewart
9,015,036 B2 4/2015 Karov Zangvil et al.
9,020,804 B2 4/2015 Barbaiani et al.
9,026,425 B2 5/2015 Nikoulina et al.
9,026,426 B2 5/2015 Wu et al.
9,031,834 B2 5/2015 Coorman et al.
9,031,970 B1 5/2015 Das et al.
9,037,967 B1 5/2015 Al-Jefri et al.
9,043,208 B2 5/2015 Koch et al.
9,043,211 B2 5/2015 Haiut et al.
9,046,932 B2 6/2015 Medlock et al.
9,049,255 B2 6/2015 Macfarlane et al.
9,049,295 B1 6/2015 Cooper et al.
9,053,706 B2 6/2015 Jitkoff et al.
9,058,105 B2 6/2015 Drory et al.
9,058,332 B1 6/2015 Darby et al.
9,058,811 B2 6/2015 Wang et al.
9,063,979 B2 6/2015 Chiu et al.
9,064,495 B1 6/2015 Torok et al.
9,065,660 B2 6/2015 Ellis et al.
9,070,247 B2 6/2015 Kuhn et al.
9,070,366 B1 6/2015 Mathias et al.
9,071,701 B2 6/2015 Donaldson et al.
9,075,435 B1 7/2015 Noble et al.
9,075,824 B2 7/2015 Gordo et al.
9,076,448 B2 7/2015 Bennett et al.
9,076,450 B1 7/2015 Sadek et al.
9,081,411 B2 7/2015 Kalns et al.
9,081,482 B1 7/2015 Zhai et al.
9,082,402 B2 7/2015 Yadgar et al.
9,083,581 B1 7/2015 Addepalli et al.
9,094,636 B1 7/2015 Sanders et al.
9,098,467 B1 8/2015 Blanksteen et al.
9,101,279 B2 8/2015 Ritchey et al.
9,112,984 B2 8/2015 Sejnoha et al.
9,117,212 B2 8/2015 Sheets et al.
9,117,447 B2 8/2015 Gruber et al.
9,123,338 B1 9/2015 Sanders et al.
9,143,907 B1 9/2015 Caldwell et al.
9,159,319 B1 10/2015 Hoffmeister
9,164,983 B2 10/2015 Liu et al.
9,171,541 B2 10/2015 Kennewick et al.
9,171,546 B1 10/2015 Pike
9,183,845 B1 11/2015 Gopalakrishnan et al.
9,190,062 B2 11/2015 Haughay
9,202,520 B1 12/2015 Tang
9,208,153 B1 12/2015 Zaveri et al.
9,213,754 B1 12/2015 Zhan et al.
9,218,122 B2 12/2015 Thoma et al.
9,218,809 B2 12/2015 Bellegard et al.
9,218,819 B1 12/2015 Stekkelpa et al.
9,223,537 B2 12/2015 Brown et al.
9,230,561 B2 1/2016 Ostermann et al.
9,232,293 B1 1/2016 Hanson
9,236,047 B2 1/2016 Rasmussen
9,241,073 B1 1/2016 Rensburg et al.
9,245,151 B2 1/2016 LeBeau et al.
9,250,703 B2 2/2016 Hernandez-Abrego et al.
9,251,713 B1 2/2016 Giovanniello et al.
9,251,787 B1 2/2016 Hart et al.
9,255,812 B2 2/2016 Maeoka et al.
9,258,604 B1 2/2016 Bilobrov et al.
9,262,412 B2 2/2016 Yang et al.
9,262,612 B2 2/2016 Cheyer
9,263,058 B2 2/2016 Huang et al.
9,274,598 B2 3/2016 Beymer et al.
9,280,535 B2 3/2016 Varma et al.
9,282,211 B2 3/2016 Osawa
9,286,910 B1 3/2016 Li et al.
9,292,487 B1 3/2016 Weber
9,292,489 B1 3/2016 Sak et al.
9,292,492 B2 3/2016 Sarikaya et al.
9,299,344 B2 3/2016 Braho et al.
9,300,718 B2 3/2016 Khanna
9,301,256 B2 3/2016 Mohan et al.
9,305,543 B2 4/2016 Fleizach et al.
9,305,548 B2 4/2016 Kennewick et al.
9,311,308 B2 4/2016 Sankarasubramaniam et al.
9,311,912 B1 4/2016 Swietlinski et al.
9,313,317 B1 4/2016 LeBeau et al.
9,318,108 B2 4/2016 Gruber et al.
9,325,809 B1 4/2016 Barros et al.
9,325,842 B1 4/2016 Siddiqi et al.
9,330,659 B2 5/2016 Ju et al.
9,330,668 B2 5/2016 Nanavati et al.
9,330,720 B2 5/2016 Lee
9,335,983 B2 5/2016 Breiner et al.
9,338,493 B2 5/2016 Van Os et al.
9,342,829 B2 5/2016 Zhou et al.
9,342,930 B1 5/2016 Kraft et al.
9,349,368 B1 5/2016 Lebeau et al.
9,355,472 B2 5/2016 Kocienda et al.
9,361,084 B1 6/2016 Costa
9,367,541 B1 6/2016 Servan et al.
9,368,114 B2 6/2016 Larson et al.
9,377,871 B2 6/2016 Waddell et al.
9,378,456 B2 6/2016 White et al.
9,378,740 B1 6/2016 Rosen et al.
9,380,155 B1 6/2016 Reding et al.
9,383,827 B1 7/2016 Faaborg et al.
9,384,185 B2 7/2016 Medlock et al.
9,390,726 B1 7/2016 Smus et al.
9,396,722 B2 7/2016 Chung et al.
9,401,140 B1 7/2016 Weber et al.
9,401,147 B2 7/2016 Jitkoff et al.
9,406,224 B1 8/2016 Sanders et al.
9,406,299 B2 8/2016 Gollan et al.
9,408,182 B1 8/2016 Hurley et al.
9,412,392 B2 8/2016 Lindahl
9,418,650 B2 8/2016 Bharadwaj et al.
9,423,266 B2 8/2016 Clark et al.
9,424,246 B2 8/2016 Spencer et al.
9,424,840 B1 8/2016 Hart et al.
9,431,021 B1 8/2016 Scalise et al.
9,432,499 B2 8/2016 Hajdu et al.
9,436,918 B2 9/2016 Pantel et al.
9,437,186 B1 9/2016 Liu et al.
9,437,189 B2 9/2016 Epstein et al.
9,442,687 B2 9/2016 Park et al.
9,443,527 B1 9/2016 Watanabe et al.
9,454,599 B2 9/2016 Golden et al.
9,454,957 B1 9/2016 Mathias et al.
9,465,798 B2 10/2016 Lin
9,465,833 B2 10/2016 Aravamudan et al.
9,465,864 B2 10/2016 Hu et al.
9,466,027 B2 10/2016 Byrne et al.
9,466,294 B1 10/2016 Tunstall-Pedoe et al.
9,471,566 B1 10/2016 Zhang et al.
9,472,196 B1 10/2016 Wang et al.
9,483,388 B2 11/2016 Sankaranarasimhan et al.
9,483,461 B2 11/2016 Fleizach et al.
9,483,529 B1 11/2016 Pasoi et al.
9,484,021 B1 11/2016 Mairesse et al.
9,485,286 B1 11/2016 Sellier et al.
9,495,129 B2 11/2016 Fleizach et al.
9,501,741 B2 11/2016 Cheyer et al.
9,502,025 B2 11/2016 Kennewick et al.
9,508,028 B2 11/2016 Bannister et al.
9,510,044 B1 11/2016 Pereira et al.
9,514,470 B2 12/2016 Topatan et al.
9,516,014 B2 12/2016 Zafiroglu et al.
9,519,453 B2 12/2016 Perkuhn et al.
9,524,355 B2 12/2016 Forbes et al.
9,529,500 B1 12/2016 Gauci et al.
9,531,862 B1 12/2016 Vadodaria
9,535,906 B2 1/2017 Lee et al.
9,536,527 B1 1/2017 Carlson
9,536,544 B2 1/2017 Osterman et al.
9,547,647 B2 1/2017 Badaskar
9,548,050 B2 1/2017 Gruber et al.
9,548,979 B1 1/2017 Johnson et al.

(56) References Cited

U.S. PATENT DOCUMENTS 9,569,549 B1 2/2017 Jenkins et al.
9,571,995 B1 * 2/2017 Scheer .................... H04W 4/16
9,575,964 B2 2/2017 Yadgar et al.
9,576,575 B2 2/2017 Heide
9,578,173 B2 2/2017 Sanghavi et al.
9,602,946 B2 3/2017 Karkkainen et al.
9,607,612 B2 3/2017 Deleeuw
9,612,999 B2 4/2017 Prakah-asante et al.
9,619,200 B2 4/2017 Chakladar et al.
9,620,113 B2 4/2017 Kennewick et al.
9,620,126 B2 4/2017 Chiba
9,626,955 B2 4/2017 Fleizach et al.
9,633,004 B2 4/2017 Giuli et al.
9,633,191 B2 4/2017 Fleizach et al.
9,633,660 B2 4/2017 Haughay
9,633,674 B2 4/2017 Sinha
9,646,313 B2 5/2017 Kim et al.
9,648,107 B1 5/2017 Penilla et al.
9,652,453 B2 5/2017 Mathur et al.
9,658,746 B2 5/2017 Cohn et al.
9,659,002 B2 5/2017 Medlock et al.
9,659,298 B2 5/2017 Lynch et al.
9,665,567 B2 5/2017 Li et al.
9,665,662 B1 5/2017 Gautam et al.
9,668,121 B2 5/2017 Naik et al.
9,672,725 B2 6/2017 Dotan-Cohen et al.
9,672,822 B2 6/2017 Brown et al.
9,690,542 B2 6/2017 Reddy et al.
9,691,161 B1 6/2017 Yalniz et al.
9,691,378 B1 6/2017 Meyers et al.
9,697,016 B2 7/2017 Jacob
9,697,822 B1 7/2017 Naik et al.
9,697,827 B1 7/2017 Lilly et al.
9,698,999 B2 7/2017 Mutagi
9,720,907 B2 8/2017 Bangalore et al.
9,721,566 B2 8/2017 Newendorp et al.
9,721,570 B1 8/2017 Beal et al.
9,723,130 B2 8/2017 Rand
9,734,817 B1 8/2017 Putrycz
9,734,839 B1 8/2017 Adams
9,741,343 B1 8/2017 Miles et al.
9,747,083 B1 8/2017 Roman et al.
9,747,093 B2 8/2017 Latino et al.
9,755,605 B1 9/2017 Li et al.
9,760,566 B2 9/2017 Heck et al.
9,767,710 B2 9/2017 Lee et al.
9,772,994 B2 9/2017 Karov et al.
9,786,271 B1 10/2017 Combs et al.
9,792,907 B2 10/2017 Bocklet et al.
9,798,719 B2 10/2017 Karov et al.
9,812,128 B2 11/2017 Mixter et al.
9,813,882 B1 11/2017 Masterman
9,818,400 B2 11/2017 Paulik et al.
9,823,811 B2 11/2017 Brown et al.
9,823,828 B2 11/2017 Zambetti et al.
9,824,379 B2 11/2017 Khandelwal et al.
9,824,691 B1 11/2017 Montero et al.
9,830,044 B2 11/2017 Brown et al.
9,830,449 B1 11/2017 Wagner
9,842,168 B2 12/2017 Heck et al.
9,842,584 B1 12/2017 Hart et al.
9,846,685 B2 12/2017 Li
9,846,836 B2 12/2017 Gao et al.
9,858,925 B2 1/2018 Gruber et al.
9,858,927 B2 1/2018 Williams et al.
9,886,953 B2 2/2018 Lemay et al.
9,887,949 B2 2/2018 Shepherd et al.
9,892,732 B1 * 2/2018 Tian ........................ G10L 15/00
9,911,415 B2 3/2018 Vanblon et al.
9,916,839 B1 3/2018 Scalise et al.
9,922,642 B2 3/2018 Pitschel et al.
9,928,835 B1 3/2018 Tang
9,934,777 B1 4/2018 Joseph et al.
9,934,785 B1 4/2018 Hulaud
9,940,616 B1 * 4/2018 Morgan ............. G06Q 20/3224
9,946,862 B2 4/2018 Yun et al.
9,948,728 B2 4/2018 Linn et al.
9,959,129 B2 5/2018 Kannan et al.
9,959,506 B1 5/2018 Karppanen
9,966,065 B2 5/2018 Gruber et al.
9,966,068 B2 5/2018 Cash et al.
9,967,381 B1 5/2018 Kashimba et al.
9,971,495 B2 5/2018 Shetty et al.
9,984,686 B1 5/2018 Mutagi et al.
9,986,419 B2 5/2018 Naik et al.
9,990,129 B2 6/2018 Yang et al.
9,990,176 B1 6/2018 Gray
9,990,921 B2 6/2018 Vanblon et al.
9,996,626 B1 6/2018 Bailey et al.
9,998,552 B1 6/2018 Ledet
10,001,817 B2 6/2018 Zambetti et al.
10,013,416 B1 7/2018 Bhardwaj et al.
10,013,654 B1 7/2018 Levy et al.
10,013,979 B1 7/2018 Roma et al.
10,019,436 B2 7/2018 Huang
10,025,378 B2 7/2018 Venable et al.
10,027,662 B1 7/2018 Mutagi et al.
10,032,451 B1 7/2018 Mamkina et al.
10,032,455 B2 7/2018 Newman et al.
10,037,758 B2 7/2018 Jing et al.
10,043,516 B2 8/2018 Saddler et al.
10,049,161 B2 8/2018 Kaneko
10,049,663 B2 8/2018 Orr et al.
10,049,668 B2 8/2018 Huang et al.
10,055,390 B2 8/2018 Sharifi et al.
10,055,681 B2 8/2018 Brown et al.
10,074,360 B2 9/2018 Kim
10,074,371 B1 9/2018 Wang et al.
10,078,487 B2 9/2018 Gruber et al.
10,083,213 B1 9/2018 Podgorny et al.
10,083,690 B2 9/2018 Giuli et al.
10,088,972 B2 10/2018 Brown et al.
10,089,072 B2 10/2018 Piersol et al.
10,096,319 B1 10/2018 Jin et al.
10,101,887 B2 10/2018 Bernstein et al.
10,102,359 B2 10/2018 Cheyer
10,115,055 B2 10/2018 Weiss et al.
10,127,901 B2 11/2018 Zhao et al.
10,127,908 B1 11/2018 Deller et al.
10,134,425 B1 11/2018 Johnson, Jr.
10,135,965 B2 11/2018 Woolsey et al.
10,140,845 B1 * 11/2018 Knas ........................ G08B 7/06
10,146,923 B2 12/2018 Pitkänen et al.
10,169,329 B2 1/2019 Futrell et al.
10,170,123 B2 1/2019 Orr et al.
10,170,135 B1 1/2019 Pearce et al.
10,175,879 B2 1/2019 Missig et al.
10,176,167 B2 1/2019 Evermann
10,176,802 B1 1/2019 Ladhak et al.
10,176,808 B1 1/2019 Lovitt et al.
10,178,301 B1 1/2019 Welbourne et al.
10,185,542 B2 1/2019 Carson et al.
10,186,254 B2 1/2019 Williams et al.
10,186,266 B1 1/2019 Devaraj et al.
10,191,627 B2 1/2019 Cieplinski et al.
10,191,646 B2 1/2019 Zambetti et al.
10,191,718 B2 1/2019 Rhee et al.
10,192,546 B1 1/2019 Piersol et al.
10,192,552 B2 1/2019 Raitio et al.
10,192,557 B2 1/2019 Lee et al.
10,199,051 B2 2/2019 Binder et al.
10,200,824 B2 2/2019 Gross et al.
10,210,860 B1 2/2019 Ward et al.
10,216,351 B2 2/2019 Yang
10,216,832 B2 2/2019 Bangalore et al.
10,223,066 B2 3/2019 Martel et al.
10,225,711 B2 3/2019 Parks et al.
10,228,904 B2 3/2019 Raux
10,229,356 B1 3/2019 Liu et al.
10,236,016 B1 * 3/2019 Li ........................... G10L 15/26
10,237,711 B2 3/2019 Linn et al.
10,242,501 B1 3/2019 Pusch et al.
10,248,308 B2 4/2019 Karunamuni et al.
10,249,300 B2 4/2019 Booker et al.

(56) References Cited

U.S. PATENT DOCUMENTS 10,255,922 B1 4/2019 Sharifi et al.
10,261,830 B2 4/2019 Gupta et al.
10,269,345 B2 4/2019 Castillo Sanchez et al.
10,271,093 B1 * 4/2019 Jobanputra ............ G10L 25/51
10,275,513 B1 4/2019 Cowan et al.
10,289,205 B1 5/2019 Sumter et al.
10,296,160 B2 5/2019 Shah et al.
10,297,253 B2 5/2019 Walker, II et al.
10,303,772 B2 5/2019 Hosn et al.
10,304,463 B2 5/2019 Mixter et al.
10,311,482 B2 6/2019 Baldwin
10,311,871 B2 6/2019 Newendorp et al.
10,325,598 B2 6/2019 Basye et al.
10,332,509 B2 6/2019 Catanzaro et al.
10,332,513 B1 6/2019 D'souza et al.
10,332,518 B2 6/2019 Garg et al.
10,339,224 B2 7/2019 Fukuoka
10,346,540 B2 7/2019 Karov et al.
10,346,753 B2 7/2019 Soon-Shiong et al.
10,346,878 B1 7/2019 Ostermann et al.
10,353,975 B2 7/2019 Oh et al.
10,354,168 B2 7/2019 Bluche
10,354,677 B2 7/2019 Mohamed et al.
10,356,243 B2 7/2019 Sanghavi et al.
10,360,716 B1 7/2019 Van Der Meulen et al.
10,365,887 B1 7/2019 Mulherkar
10,366,160 B2 7/2019 Castelli et al.
10,366,692 B1 7/2019 Adams et al.
10,372,814 B2 8/2019 Gliozzo et al.
10,372,881 B2 8/2019 Ingrassia, Jr. et al.
10,389,876 B2 8/2019 Engelke et al.
1,040,637 A1 9/2019 Paulik et al.
10,402,066 B2 9/2019 Kawana
10,403,283 B1 9/2019 Schramm et al.
10,409,454 B2 9/2019 Kagan et al.
10,417,037 B2 9/2019 Gruber et al.
10,417,344 B2 9/2019 Futrell et al.
10,417,554 B2 9/2019 Scheffler
10,437,928 B2 10/2019 Bhaya et al.
10,446,142 B2 10/2019 Lim et al.
10,453,117 B1 10/2019 Reavely et al.
10,469,665 B1 11/2019 Bell et al.
10,474,961 B2 11/2019 Brigham et al.
10,475,446 B2 11/2019 Gruber et al.
10,482,875 B2 11/2019 Henry
10,490,195 B1 11/2019 Krishnamoorthy et al.
10,496,364 B2 12/2019 Yao
10,496,705 B1 12/2019 Irani et al.
10,497,365 B2 12/2019 Gruber et al.
10,504,518 B1 12/2019 Irani et al.
10,512,750 B1 12/2019 Lewin et al.
10,515,133 B1 12/2019 Sharifi
10,521,946 B1 12/2019 Roche et al.
10,528,386 B2 1/2020 Yu
10,540,976 B2 1/2020 Van Os et al.
10,558,893 B2 2/2020 Bluche
10,566,007 B2 2/2020 Fawaz et al.
10,568,032 B2 2/2020 Freeman et al.
10,580,409 B2 3/2020 Walker, II et al.
10,582,355 B1 3/2020 Lebeau et al.
10,585,957 B2 3/2020 Heck et al.
10,586,369 B1 3/2020 Roche et al.
10,599,449 B1 3/2020 Chatzipanagiotis et al.
10,629,186 B1 4/2020 Slifka
10,630,795 B2 4/2020 Aoki et al.
10,642,934 B2 5/2020 Heck et al.
10,659,851 B2 5/2020 Lister et al.
10,671,428 B2 6/2020 Zeitlin
10,706,841 B2 7/2020 Gruber et al.
10,721,190 B2 7/2020 Zhao et al.
10,732,708 B1 8/2020 Roche et al.
10,748,546 B2 8/2020 Kim et al.
10,755,032 B2 8/2020 Douglas et al.
10,757,499 B1 8/2020 Vautrin et al.
10,769,385 B2 9/2020 Evermann
10,783,151 B1 9/2020 Bushkin et al.
10,783,883 B2 9/2020 Mixter et al.
10,789,945 B2 9/2020 Acero et al.
10,791,176 B2 9/2020 Phipps et al.
10,795,944 B2 10/2020 Brown et al.
10,796,100 B2 10/2020 Bangalore et al.
10,803,255 B2 10/2020 Dubyak et al.
10,811,013 B1 10/2020 Secker-Walker et al.
10,842,968 B1 11/2020 Kahn et al.
10,846,618 B2 11/2020 Ravi et al.
10,860,629 B1 12/2020 Gangadharaiah et al.
10,861,483 B2 12/2020 Feinauer et al.
10,880,668 B1 12/2020 Robinson et al.
10,885,277 B2 1/2021 Ravi et al.
10,909,459 B2 2/2021 Tsatsin et al.
10,931,999 B1 * 2/2021 Jobanputra
10,944,859 B2 3/2021 Weinstein et al.
10,957,311 B2 3/2021 Solomon et al.
10,974,139 B2 4/2021 Feder et al.
10,978,056 B1 4/2021 Challa et al.
10,978,090 B2 4/2021 Binder et al.
10,983,971 B2 4/2021 Carvalho et al.
11,010,763 B1 * 5/2021 Fillinger ................ G06F 21/32
11,037,565 B2 6/2021 Kudurshian et al.
11,061,543 B1 7/2021 Blatz et al.
11,076,039 B2 7/2021 Weinstein et al.
11,169,660 B2 11/2021 Gupta et al.
11,217,255 B2 * 1/2022 Kim ....................... G10L 15/22
2001/0049745 A1 12/2001 Schoeffler
2001/0054087 A1 12/2001 Flom et al.
2003/0028618 A1 2/2003 Currans et al.
2003/0045955 A1 3/2003 Janik
2003/0154207 A1 8/2003 Naito
2004/0107099 A1 6/2004 Charlet
2005/0075875 A1 4/2005 Shozakai et al.
2005/0271186 A1 12/2005 Lichorowic et al.
2005/0272408 A1 * 12/2005 Wilkes-Gibbs ... H04M 1/72457 455/412.2
2006/0074670 A1 4/2006 Weng et al.
2006/0276230 A1 12/2006 McConnell
2007/0002784 A1 * 1/2007 Edwards ................ G08C 23/04 370/315
2007/0156400 A1 7/2007 Wheeler
2007/0162872 A1 7/2007 Hong et al.
2007/0168429 A1 7/2007 Apfel et al.
2007/0198682 A1 * 8/2007 Pazhyannur
2008/0059384 A1 3/2008 Eglen et al.
2008/0081558 A1 * 4/2008 Dunko ............... H04N 21/8355 455/41.1
2008/0134088 A1 6/2008 Tse et al.
2008/0248797 A1 10/2008 Freeman et al.
2008/0317219 A1 * 12/2008 Manzardo ........... H04M 3/4936 379/88.01
2009/0030685 A1 1/2009 Cerra et al.
2009/0031236 A1 1/2009 Robertson et al.
2009/0150553 A1 6/2009 Collart et al.
2009/0204409 A1 8/2009 Mozer et al.
2009/0259472 A1 10/2009 Schroeter
2009/0299752 A1 12/2009 Rodriguez et al.
2009/0313582 A1 12/2009 Rupsingh et al.
2009/0326936 A1 12/2009 Nagashima
2010/0014717 A1 * 1/2010 Rosenkrantz ........... G06F 16/51 382/115
2010/0100080 A1 4/2010 Huculak et al.
2010/0131265 A1 5/2010 Liu et al.
2010/0263015 A1 10/2010 Pandey et al.
2010/0315549 A1 * 12/2010 Basso ................ H04N 21/4402 348/445
2011/0002487 A1 1/2011 Panther et al.
2011/0004475 A1 1/2011 Bellegarda
2011/0009107 A1 1/2011 Guba et al.
2011/0010178 A1 1/2011 Lee et al.
2011/0010644 A1 1/2011 Merrill et al.
2011/0015928 A1 1/2011 Odell et al.
2011/0016150 A1 1/2011 Engstrom et al.
2011/0018695 A1 1/2011 Bells et al.
2011/0021213 A1 1/2011 Carr
2011/0022292 A1 1/2011 Shen et al.
2011/0022388 A1 1/2011 Wu et al.

(56) References Cited

U.S. PATENT DOCUMENTS

| | | | |
|---|---|---|---|
| 2011/0022393 | A1 | 1/2011 | Wäller et al. |
| 2011/0022394 | A1 | 1/2011 | Wide |
| 2011/0022472 | A1 | 1/2011 | Zon |
| 2011/0022952 | A1 | 1/2011 | Wu et al. |
| 2011/0029616 | A1 | 2/2011 | Wang et al. |
| 2011/0030067 | A1 | 2/2011 | Wilson |
| 2011/0033064 | A1 | 2/2011 | Johnson et al. |
| 2011/0034183 | A1 | 2/2011 | Haag et al. |
| 2011/0035144 | A1 | 2/2011 | Okamoto et al. |
| 2011/0035434 | A1 | 2/2011 | Lockwood |
| 2011/0038489 | A1 | 2/2011 | Visser et al. |
| 2011/0040707 | A1 | 2/2011 | Theisen et al. |
| 2011/0043652 | A1 | 2/2011 | King et al. |
| 2011/0045841 | A1 | 2/2011 | Kuhlke et al. |
| 2011/0047072 | A1 | 2/2011 | Ciurea |
| 2011/0047149 | A1 | 2/2011 | Vaananen |
| 2011/0047161 | A1 | 2/2011 | Myaeng et al. |
| 2011/0050591 | A1 | 3/2011 | Kim et al. |
| 2011/0050592 | A1 | 3/2011 | Kim et al. |
| 2011/0054647 | A1 | 3/2011 | Chipchase |
| 2011/0054894 | A1 | 3/2011 | Phillips et al. |
| 2011/0054901 | A1 | 3/2011 | Qin et al. |
| 2011/0055256 | A1 | 3/2011 | Phillips et al. |
| 2011/0060584 | A1 | 3/2011 | Ferrucci et al. |
| 2011/0060587 | A1 | 3/2011 | Phillips et al. |
| 2011/0060589 | A1 | 3/2011 | Weinberg |
| 2011/0060807 | A1 | 3/2011 | Martin et al. |
| 2011/0060812 | A1 | 3/2011 | Middleton |
| 2011/0064387 | A1 | 3/2011 | Mendeloff et al. |
| 2011/0065456 | A1 | 3/2011 | Brennan et al. |
| 2011/0066366 | A1 | 3/2011 | Ellanti et al. |
| 2011/0066468 | A1 | 3/2011 | Huang et al. |
| 2011/0066634 | A1 | 3/2011 | Phillips et al. |
| 2011/0072492 | A1 | 3/2011 | Mohler et al. |
| 2011/0076994 | A1 | 3/2011 | Kim et al. |
| 2011/0077943 | A1 | 3/2011 | Miki et al. |
| 2011/0080260 | A1 | 4/2011 | Wang et al. |
| 2011/0081889 | A1 | 4/2011 | Gao et al. |
| 2011/0082688 | A1 | 4/2011 | Kim et al. |
| 2011/0083079 | A1 | 4/2011 | Farrell et al. |
| 2011/0087491 | A1 | 4/2011 | Wittenstein et al. |
| 2011/0090078 | A1 | 4/2011 | Kim et al. |
| 2011/0093261 | A1 | 4/2011 | Angott |
| 2011/0093265 | A1 | 4/2011 | Stent et al. |
| 2011/0093271 | A1 | 4/2011 | Bernard |
| 2011/0099000 | A1 | 4/2011 | Rai et al. |
| 2011/0099157 | A1 | 4/2011 | LeBeau et al. |
| 2011/0103682 | A1 | 5/2011 | Chidlovskii et al. |
| 2011/0105097 | A1 | 5/2011 | Tadayon et al. |
| 2011/0106736 | A1 | 5/2011 | Aharonson et al. |
| 2011/0106878 | A1 | 5/2011 | Cho et al. |
| 2011/0106892 | A1 | 5/2011 | Nelson et al. |
| 2011/0110502 | A1 | 5/2011 | Daye et al. |
| 2011/0111724 | A1 | 5/2011 | Baptiste |
| 2011/0112827 | A1 | 5/2011 | Kennewick et al. |
| 2011/0112837 | A1 | 5/2011 | Kurki-Suonio et al. |
| 2011/0112838 | A1 | 5/2011 | Adibi |
| 2011/0112921 | A1 | 5/2011 | Kennewick et al. |
| 2011/0116610 | A1 | 5/2011 | Shaw et al. |
| 2011/0119049 | A1 | 5/2011 | Ylonen |
| 2011/0119051 | A1 | 5/2011 | Li et al. |
| 2011/0119623 | A1 | 5/2011 | Kim |
| 2011/0119715 | A1 | 5/2011 | Chang et al. |
| 2011/0123004 | A1 | 5/2011 | Chang et al. |
| 2011/0125498 | A1 | 5/2011 | Pickering et al. |
| 2011/0125540 | A1 | 5/2011 | Jang et al. |
| 2011/0125701 | A1 | 5/2011 | Nair et al. |
| 2011/0130958 | A1 | 6/2011 | Stahl et al. |
| 2011/0131036 | A1 | 6/2011 | DiCristo et al. |
| 2011/0131038 | A1 | 6/2011 | Oyaizu et al. |
| 2011/0131045 | A1 | 6/2011 | Cristo et al. |
| 2011/0137636 | A1 | 6/2011 | Srihari et al. |
| 2011/0141141 | A1 | 6/2011 | Kankainen |
| 2011/0143726 | A1 | 6/2011 | de Silva |
| 2011/0143811 | A1 | 6/2011 | Rodriguez |
| 2011/0144857 | A1 | 6/2011 | Wingrove et al. |
| 2011/0144901 | A1 | 6/2011 | Wang |
| 2011/0144973 | A1 | 6/2011 | Bocchieri et al. |
| 2011/0144999 | A1 | 6/2011 | Jang et al. |
| 2011/0145718 | A1 | 6/2011 | Ketola et al. |
| 2011/0151830 | A1 | 6/2011 | Blanda, Jr. et al. |
| 2011/0153209 | A1 | 6/2011 | Geelen |
| 2011/0153322 | A1 | 6/2011 | Kwak et al. |
| 2011/0153324 | A1 | 6/2011 | Ballinger et al. |
| 2011/0153329 | A1 | 6/2011 | Moorer |
| 2011/0153330 | A1 | 6/2011 | Yazdani et al. |
| 2011/0153373 | A1 | 6/2011 | Dantzig et al. |
| 2011/0154193 | A1 | 6/2011 | Creutz et al. |
| 2011/0157029 | A1 | 6/2011 | Tseng |
| 2011/0161072 | A1 | 6/2011 | Terao et al. |
| 2011/0161076 | A1 | 6/2011 | Davis et al. |
| 2011/0161079 | A1 | 6/2011 | Gruhn et al. |
| 2011/0161309 | A1 | 6/2011 | Lung et al. |
| 2011/0161852 | A1 | 6/2011 | Vainio et al. |
| 2011/0166851 | A1 | 7/2011 | LeBeau et al. |
| 2011/0166855 | A1 | 7/2011 | Vermeulen et al. |
| 2011/0167350 | A1 | 7/2011 | Hoellwarth |
| 2011/0175810 | A1 | 7/2011 | Markovic et al. |
| 2011/0179002 | A1 | 7/2011 | Dumitru et al. |
| 2011/0179372 | A1 | 7/2011 | Moore et al. |
| 2011/0183650 | A1 | 7/2011 | McKee |
| 2011/0184721 | A1 | 7/2011 | Subramanian et al. |
| 2011/0184730 | A1 | 7/2011 | LeBeau et al. |
| 2011/0184736 | A1 | 7/2011 | Slotznick |
| 2011/0184737 | A1 | 7/2011 | Nakano et al. |
| 2011/0184768 | A1 | 7/2011 | Norton et al. |
| 2011/0185288 | A1 | 7/2011 | Gupta et al. |
| 2011/0191108 | A1 | 8/2011 | Friedlander |
| 2011/0191271 | A1 | 8/2011 | Baker et al. |
| 2011/0191344 | A1 | 8/2011 | Jin et al. |
| 2011/0195758 | A1 | 8/2011 | Damale et al. |
| 2011/0196670 | A1 | 8/2011 | Dang et al. |
| 2011/0197128 | A1 | 8/2011 | Assadollahi |
| 2011/0201385 | A1 | 8/2011 | Higginbotham |
| 2011/0201387 | A1 | 8/2011 | Paek et al. |
| 2011/0202526 | A1 | 8/2011 | Lee et al. |
| 2011/0205149 | A1 | 8/2011 | Tom |
| 2011/0208511 | A1 | 8/2011 | Sikstrom et al. |
| 2011/0208524 | A1 | 8/2011 | Haughay |
| 2011/0209088 | A1 | 8/2011 | Hinckley et al. |
| 2011/0212717 | A1 | 9/2011 | Rhoads et al. |
| 2011/0218806 | A1 | 9/2011 | Alewine et al. |
| 2011/0218855 | A1 | 9/2011 | Cao et al. |
| 2011/0219018 | A1 | 9/2011 | Bailey et al. |
| 2011/0223893 | A1 | 9/2011 | Lau et al. |
| 2011/0224972 | A1 | 9/2011 | Millett et al. |
| 2011/0228913 | A1 | 9/2011 | Cochinwala |
| 2011/0231182 | A1 | 9/2011 | Weider et al. |
| 2011/0231184 | A1 | 9/2011 | Kerr |
| 2011/0231188 | A1 | 9/2011 | Kennewick |
| 2011/0231432 | A1 | 9/2011 | Sata et al. |
| 2011/0231474 | A1 | 9/2011 | Locker et al. |
| 2011/0238407 | A1 | 9/2011 | Kent |
| 2011/0238408 | A1 | 9/2011 | Larcheveque et al. |
| 2011/0238676 | A1 | 9/2011 | Liu et al. |
| 2011/0239111 | A1 | 9/2011 | Grover |
| 2011/0242007 | A1 | 10/2011 | Gray et al. |
| 2011/0246471 | A1 | 10/2011 | Rakib |
| 2011/0249144 | A1 | 10/2011 | Chang |
| 2011/0250570 | A1 | 10/2011 | Mack |
| 2011/0258188 | A1 | 10/2011 | Abdalmageed et al. |
| 2011/0260829 | A1 | 10/2011 | Lee |
| 2011/0260861 | A1 | 10/2011 | Singh et al. |
| 2011/0264643 | A1 | 10/2011 | Cao |
| 2011/0264999 | A1 | 10/2011 | Bells et al. |
| 2011/0274303 | A1 | 11/2011 | Filson et al. |
| 2011/0276595 | A1 | 11/2011 | Kirkland et al. |
| 2011/0276598 | A1 | 11/2011 | Kozempel |
| 2011/0276944 | A1 | 11/2011 | Bergman et al. |
| 2011/0279368 | A1 | 11/2011 | Klein et al. |
| 2011/0280143 | A1 | 11/2011 | Li et al. |
| 2011/0282663 | A1 | 11/2011 | Talwar et al. |
| 2011/0282888 | A1 | 11/2011 | Koperski et al. |
| 2011/0282906 | A1 | 11/2011 | Wong |

(56) References Cited

U.S. PATENT DOCUMENTS

| | | | |
|---|---|---|---|
| 2011/0283189 | A1 | 11/2011 | McCarty |
| 2011/0288852 | A1 | 11/2011 | Dymetman et al. |
| 2011/0288855 | A1 | 11/2011 | Roy |
| 2011/0288861 | A1 | 11/2011 | Kurzwei et al. |
| 2011/0288863 | A1 | 11/2011 | Rasmussen |
| 2011/0288866 | A1 | 11/2011 | Rasmussen |
| 2011/0295590 | A1 | 12/2011 | Lloyd et al. |
| 2011/0298585 | A1 | 12/2011 | Barry |
| 2011/0301943 | A1 | 12/2011 | Patch |
| 2011/0302162 | A1 | 12/2011 | Xiao et al. |
| 2011/0306426 | A1 | 12/2011 | Novak et al. |
| 2011/0307241 | A1 | 12/2011 | Waibel et al. |
| 2011/0307491 | A1 | 12/2011 | Fisk et al. |
| 2011/0307810 | A1 | 12/2011 | Hilerio et al. |
| 2011/0313775 | A1 | 12/2011 | Laligand et al. |
| 2011/0314003 | A1 | 12/2011 | Ju et al. |
| 2011/0314032 | A1 | 12/2011 | Bennett et al. |
| 2011/0314404 | A1 | 12/2011 | Kotler et al. |
| 2011/0320187 | A1 | 12/2011 | Motik et al. |
| 2012/0002820 | A1 | 1/2012 | Leichter |
| 2012/0005602 | A1 | 1/2012 | Anttila et al. |
| 2012/0008754 | A1 | 1/2012 | Mukherjee et al. |
| 2012/0010886 | A1 | 1/2012 | Razavilar |
| 2012/0011138 | A1 | 1/2012 | Dunning et al. |
| 2012/0013609 | A1 | 1/2012 | Reponen et al. |
| 2012/0015629 | A1 | 1/2012 | Olsen et al. |
| 2012/0016658 | A1 | 1/2012 | Wu et al. |
| 2012/0016678 | A1 | 1/2012 | Gruber et al. |
| 2012/0019400 | A1 | 1/2012 | Patel et al. |
| 2012/0020490 | A1 | 1/2012 | Leichter |
| 2012/0020503 | A1 | 1/2012 | Endo et al. |
| 2012/0022787 | A1 | 1/2012 | Lebeau et al. |
| 2012/0022857 | A1 | 1/2012 | Baldwin et al. |
| 2012/0022860 | A1 | 1/2012 | Lloyd |
| 2012/0022868 | A1 | 1/2012 | LeBeau |
| 2012/0022869 | A1 | 1/2012 | Lloyd |
| 2012/0022870 | A1 | 1/2012 | Kristjansson et al. |
| 2012/0022872 | A1 | 1/2012 | Gruber et al. |
| 2012/0022874 | A1 | 1/2012 | Lloyd et al. |
| 2012/0022876 | A1 | 1/2012 | Lebeau et al. |
| 2012/0022967 | A1 | 1/2012 | Bachman et al. |
| 2012/0023088 | A1 | 1/2012 | Cheng et al. |
| 2012/0023095 | A1 | 1/2012 | Wadycki et al. |
| 2012/0023462 | A1 | 1/2012 | Rosing et al. |
| 2012/0026395 | A1 | 2/2012 | Jin et al. |
| 2012/0029661 | A1 | 2/2012 | Jones et al. |
| 2012/0029910 | A1 | 2/2012 | Medlock et al. |
| 2012/0034904 | A1 | 2/2012 | LeBeau et al. |
| 2012/0035907 | A1 | 2/2012 | Lebeau et al. |
| 2012/0035908 | A1 | 2/2012 | Lebeau et al. |
| 2012/0035924 | A1 | 2/2012 | Jitkoff et al. |
| 2012/0035925 | A1 | 2/2012 | Friend et al. |
| 2012/0035926 | A1 | 2/2012 | Ambler |
| 2012/0035931 | A1 | 2/2012 | LeBeau et al. |
| 2012/0035932 | A1 | 2/2012 | Jitkoff et al. |
| 2012/0035935 | A1 | 2/2012 | Park et al. |
| 2012/0036556 | A1 | 2/2012 | LeBeau et al. |
| 2012/0039539 | A1 | 2/2012 | Boiman et al. |
| 2012/0039578 | A1 | 2/2012 | Issa et al. |
| 2012/0041752 | A1 | 2/2012 | Wang et al. |
| 2012/0041756 | A1 | 2/2012 | Hanazawa et al. |
| 2012/0041759 | A1 | 2/2012 | Barker et al. |
| 2012/0042014 | A1 | 2/2012 | Desai et al. |
| 2012/0042343 | A1 | 2/2012 | Laligand et al. |
| 2012/0052945 | A1 | 3/2012 | Miyamoto et al. |
| 2012/0053815 | A1 | 3/2012 | Montanari et al. |
| 2012/0053829 | A1 | 3/2012 | Agarwal et al. |
| 2012/0053945 | A1 | 3/2012 | Gupta et al. |
| 2012/0055253 | A1 | 3/2012 | Sinha |
| 2012/0056815 | A1 | 3/2012 | Mehra |
| 2012/0058783 | A1 | 3/2012 | Kim et al. |
| 2012/0059655 | A1 | 3/2012 | Cartales |
| 2012/0059813 | A1 | 3/2012 | Sejnoha et al. |
| 2012/0060052 | A1 | 3/2012 | White et al. |
| 2012/0062473 | A1 | 3/2012 | Xiao et al. |
| 2012/0064975 | A1 | 3/2012 | Gault et al. |
| 2012/0065972 | A1 | 3/2012 | Strifler et al. |
| 2012/0066212 | A1 | 3/2012 | Jennings |
| 2012/0066581 | A1 | 3/2012 | Spalink |
| 2012/0075054 | A1 | 3/2012 | Ge et al. |
| 2012/0075184 | A1 | 3/2012 | Madhvanath |
| 2012/0077479 | A1 | 3/2012 | Sabotta et al. |
| 2012/0078611 | A1 | 3/2012 | Soltani et al. |
| 2012/0078624 | A1 | 3/2012 | Yook et al. |
| 2012/0078627 | A1 | 3/2012 | Wagner |
| 2012/0078635 | A1 | 3/2012 | Rothkopf et al. |
| 2012/0078747 | A1 | 3/2012 | Chakrabarti et al. |
| 2012/0082317 | A1 | 4/2012 | Pance et al. |
| 2012/0083286 | A1 | 4/2012 | Kim et al. |
| 2012/0084086 | A1 | 4/2012 | Gilbert et al. |
| 2012/0084087 | A1 | 4/2012 | Yang et al. |
| 2012/0084089 | A1 | 4/2012 | Lloyd et al. |
| 2012/0084251 | A1 | 4/2012 | Lingenfelder et al. |
| 2012/0084634 | A1 | 4/2012 | Wong et al. |
| 2012/0088219 | A1 | 4/2012 | Briscoe et al. |
| 2012/0089331 | A1 | 4/2012 | Schmidt et al. |
| 2012/0089659 | A1 | 4/2012 | Halevi et al. |
| 2012/0094645 | A1 | 4/2012 | Jeffrey |
| 2012/0101823 | A1 | 4/2012 | Weng et al. |
| 2012/0105257 | A1 | 5/2012 | Murillo et al. |
| 2012/0108166 | A1 | 5/2012 | Hymel |
| 2012/0108221 | A1 | 5/2012 | Thomas et al. |
| 2012/0109632 | A1 | 5/2012 | Sugiura et al. |
| 2012/0109753 | A1 | 5/2012 | Kennewick et al. |
| 2012/0109997 | A1 | 5/2012 | Sparks et al. |
| 2012/0110456 | A1 | 5/2012 | Larco et al. |
| 2012/0114108 | A1 | 5/2012 | Katis et al. |
| 2012/0116770 | A1 | 5/2012 | Chen et al. |
| 2012/0117499 | A1 | 5/2012 | Mori et al. |
| 2012/0117590 | A1 | 5/2012 | Agnihotri et al. |
| 2012/0124126 | A1 | 5/2012 | Alcazar et al. |
| 2012/0124177 | A1 | 5/2012 | Sparks |
| 2012/0124178 | A1 | 5/2012 | Sparks |
| 2012/0128322 | A1 | 5/2012 | Shaffer et al. |
| 2012/0130709 | A1 | 5/2012 | Bocchieri et al. |
| 2012/0130995 | A1 | 5/2012 | Risvik et al. |
| 2012/0135714 | A1 | 5/2012 | King, II |
| 2012/0136529 | A1 | 5/2012 | Curtis et al. |
| 2012/0136572 | A1 | 5/2012 | Norton |
| 2012/0136649 | A1 | 5/2012 | Freising et al. |
| 2012/0136658 | A1 | 5/2012 | Shrum, Jr. et al. |
| 2012/0136855 | A1 | 5/2012 | Ni et al. |
| 2012/0136985 | A1 | 5/2012 | Popescu et al. |
| 2012/0137367 | A1 | 5/2012 | Dupont et al. |
| 2012/0148077 | A1 | 6/2012 | Aldaz et al. |
| 2012/0149342 | A1 | 6/2012 | Cohen et al. |
| 2012/0149394 | A1 | 6/2012 | Singh et al. |
| 2012/0150532 | A1 | 6/2012 | Mirowski |
| 2012/0150544 | A1 | 6/2012 | McLoughlin et al. |
| 2012/0150580 | A1 | 6/2012 | Norton |
| 2012/0158293 | A1 | 6/2012 | Burnham |
| 2012/0158399 | A1 | 6/2012 | Tremblay et al. |
| 2012/0158422 | A1 | 6/2012 | Burnham et al. |
| 2012/0159380 | A1 | 6/2012 | Kocienda et al. |
| 2012/0162540 | A1 | 6/2012 | Ouchi et al. |
| 2012/0163710 | A1 | 6/2012 | Skaff et al. |
| 2012/0166177 | A1 | 6/2012 | Beld et al. |
| 2012/0166196 | A1 | 6/2012 | Ju et al. |
| 2012/0166429 | A1 | 6/2012 | Moore et al. |
| 2012/0166942 | A1 | 6/2012 | Ramerth et al. |
| 2012/0166959 | A1 | 6/2012 | Hilerio et al. |
| 2012/0166998 | A1 | 6/2012 | Cotterill et al. |
| 2012/0173222 | A1 | 7/2012 | Wang et al. |
| 2012/0173244 | A1 | 7/2012 | Kwak et al. |
| 2012/0173464 | A1 | 7/2012 | Tur et al. |
| 2012/0174121 | A1 | 7/2012 | Treat et al. |
| 2012/0176255 | A1 | 7/2012 | Choi et al. |
| 2012/0179457 | A1 | 7/2012 | Newman et al. |
| 2012/0179467 | A1 | 7/2012 | Williams et al. |
| 2012/0179471 | A1 | 7/2012 | Newman et al. |
| 2012/0185237 | A1 | 7/2012 | Gajic et al. |
| 2012/0185480 | A1 | 7/2012 | Ni et al. |
| 2012/0185781 | A1 | 7/2012 | Guzman et al. |
| 2012/0185803 | A1 | 7/2012 | Wang et al. |

(56) References Cited

U.S. PATENT DOCUMENTS

2012/0191461 A1 7/2012 Lin et al.
2012/0192096 A1 7/2012 Bowman et al.
2012/0197743 A1 8/2012 Grigg et al.
2012/0197967 A1 8/2012 Sivavakeesar
2012/0197995 A1 8/2012 Caruso
2012/0197998 A1 8/2012 Kessel et al.
2012/0200489 A1 8/2012 Miyashita et al.
2012/0201362 A1 8/2012 Crossan et al.
2012/0203767 A1 8/2012 Williams et al.
2012/0209454 A1 8/2012 Miller et al.
2012/0209654 A1 8/2012 Romagnino et al.
2012/0209853 A1 8/2012 Desai et al.
2012/0209874 A1 8/2012 Wong et al.
2012/0210266 A1 8/2012 Jiang et al.
2012/0210378 A1 8/2012 Mccoy et al.
2012/0214141 A1 8/2012 Raya et al.
2012/0214517 A1 8/2012 Singh et al.
2012/0215640 A1 8/2012 Ramer et al.
2012/0215762 A1 8/2012 Hall et al.
2012/0221339 A1 8/2012 Wang et al.
2012/0221552 A1 8/2012 Reponen et al.
2012/0223889 A1 9/2012 Medlock et al.
2012/0223936 A1 9/2012 Aughey et al.
2012/0232885 A1 9/2012 Barbosa et al.
2012/0232886 A1 9/2012 Capuozzo et al.
2012/0232906 A1 9/2012 Lindahl
2012/0233207 A1 9/2012 Mohajer
2012/0233266 A1 9/2012 Hassan et al.
2012/0233280 A1 9/2012 Ebara
2012/0239403 A1 9/2012 Cano et al.
2012/0239661 A1 9/2012 Giblin
2012/0239761 A1 9/2012 Linner et al.
2012/0242482 A1 9/2012 Elumalai et al.
2012/0245719 A1 9/2012 Story, Jr. et al.
2012/0245939 A1 9/2012 Braho et al.
2012/0245941 A1 9/2012 Cheyer
2012/0245944 A1 9/2012 Gruber et al.
2012/0246064 A1 9/2012 Balkow
2012/0250858 A1 10/2012 Iqbal et al.
2012/0252367 A1 10/2012 Gaglio et al.
2012/0252540 A1 10/2012 Kirigaya
2012/0253785 A1 10/2012 Hamid et al.
2012/0253791 A1 10/2012 Heck et al.
2012/0254143 A1 10/2012 Varma et al.
2012/0254152 A1 10/2012 Park et al.
2012/0254290 A1 10/2012 Naaman
2012/0259615 A1 10/2012 Morin et al.
2012/0259638 A1 10/2012 Kalinli
2012/0262296 A1 10/2012 Bezar
2012/0265482 A1 10/2012 Grokop et al.
2012/0265528 A1 10/2012 Gruber et al.
2012/0265535 A1 10/2012 Bryant-Rich et al.
2012/0265787 A1 10/2012 Hsu et al.
2012/0265806 A1 10/2012 Blanchflower et al.
2012/0271625 A1 10/2012 Bernard
2012/0271634 A1 10/2012 Lenke
2012/0271635 A1 10/2012 Ljolje
2012/0271640 A1 10/2012 Basir
2012/0271676 A1 10/2012 Aravamudan et al.
2012/0275377 A1 11/2012 Lehane et al.
2012/0278744 A1 11/2012 Kozitsyn et al.
2012/0278812 A1 11/2012 Wang
2012/0284015 A1 11/2012 Drewes
2012/0284027 A1 11/2012 Mallett et al.
2012/0287067 A1 11/2012 Ikegami
2012/0290291 A1 11/2012 Shelley et al.
2012/0290300 A1 11/2012 Lee et al.
2012/0290657 A1 11/2012 Parks et al.
2012/0290680 A1 11/2012 Hwang
2012/0295708 A1 11/2012 Hernandez-Abrego et al.
2012/0296638 A1 11/2012 Patwa
2012/0296649 A1 11/2012 Bansal et al.
2012/0296654 A1 11/2012 Hendrickson et al.
2012/0296891 A1 11/2012 Rangan
2012/0297341 A1 11/2012 Glazer et al.
2012/0297348 A1 11/2012 Santoro
2012/0303369 A1 11/2012 Brush et al.
2012/0303371 A1 11/2012 Labsky et al.
2012/0304124 A1 11/2012 Chen et al.
2012/0304239 A1 11/2012 Shahraray et al.
2012/0309363 A1 12/2012 Gruber et al.
2012/0310642 A1 12/2012 Cao et al.
2012/0310649 A1 12/2012 Cannistraro et al.
2012/0310652 A1 12/2012 O'Sullivan
2012/0310922 A1 12/2012 Johnson et al.
2012/0311478 A1 12/2012 Van Os et al.
2012/0311583 A1 12/2012 Gruber et al.
2012/0311584 A1 12/2012 Gruber et al.
2012/0311585 A1 12/2012 Gruber et al.
2012/0316774 A1 12/2012 Yariv et al.
2012/0316862 A1 12/2012 Sultan et al.
2012/0316875 A1 12/2012 Nyquist et al.
2012/0316878 A1 12/2012 Singleton et al.
2012/0316955 A1 12/2012 Panguluri et al.
2012/0317194 A1 12/2012 Tian
2012/0317498 A1 12/2012 Logan et al.
2012/0321112 A1 12/2012 Schubert et al.
2012/0323560 A1 12/2012 Cortes et al.
2012/0324391 A1 12/2012 Tocci
2012/0327009 A1 12/2012 Fleizach
2012/0329529 A1 12/2012 van der Raadt
2012/0330660 A1 12/2012 Jaiswal
2012/0330661 A1 12/2012 Lindahl
2012/0330990 A1 12/2012 Chen et al.
2013/0002716 A1 1/2013 Walker et al.
2013/0005405 A1 1/2013 Prociw
2013/0006633 A1 1/2013 Grokop et al.
2013/0006637 A1 1/2013 Kanevsky et al.
2013/0006638 A1 1/2013 Lindahl
2013/0007240 A1 1/2013 Qiu et al.
2013/0007648 A1 1/2013 Gamon et al.
2013/0009858 A1 1/2013 Lacey
2013/0010575 A1 1/2013 He et al.
2013/0013313 A1 1/2013 Shechtman et al.
2013/0013319 A1 1/2013 Grant et al.
2013/0014026 A1 1/2013 Beringer et al.
2013/0014143 A1 1/2013 Bhatia et al.
2013/0018659 A1 1/2013 Chi
2013/0018863 A1 1/2013 Regan et al.
2013/0024277 A1 1/2013 Tuchman et al.
2013/0024576 A1 1/2013 Dishneau et al.
2013/0027875 A1 1/2013 Zhu et al.
2013/0028404 A1 1/2013 Omalley et al.
2013/0030787 A1 1/2013 Cancedda et al.
2013/0030789 A1 1/2013 Dalce
2013/0030804 A1 1/2013 Zavaliagkos et al.
2013/0030815 A1 1/2013 Madhvanath et al.
2013/0030904 A1 1/2013 Aidasani et al.
2013/0030913 A1 1/2013 Zhu et al.
2013/0030955 A1 1/2013 David
2013/0031162 A1 1/2013 Willis et al.
2013/0031476 A1 1/2013 Coin et al.
2013/0033643 A1 2/2013 Kim et al.
2013/0035086 A1 2/2013 Chardon et al.
2013/0035942 A1 2/2013 Kim et al.
2013/0035961 A1 2/2013 Yegnanarayanan
2013/0035994 A1 2/2013 Pattan et al.
2013/0036200 A1 2/2013 Roberts et al.
2013/0038618 A1 2/2013 Urbach
2013/0041647 A1 2/2013 Ramerth et al.
2013/0041654 A1 2/2013 Walker et al.
2013/0041661 A1 2/2013 Lee et al.
2013/0041665 A1 2/2013 Jang et al.
2013/0041667 A1 2/2013 Longe et al.
2013/0041968 A1 2/2013 Cohen et al.
2013/0046544 A1 2/2013 Kay et al.
2013/0047178 A1 2/2013 Moon et al.
2013/0050089 A1 2/2013 Neels et al.
2013/0054550 A1 2/2013 Bolohan
2013/0054609 A1 2/2013 Rajput et al.
2013/0054613 A1 2/2013 Bishop
2013/0054631 A1 2/2013 Govani et al.
2013/0054675 A1 2/2013 Jenkins et al.
2013/0054706 A1 2/2013 Graham et al.

(56) References Cited

U.S. PATENT DOCUMENTS

| | | | |
|---|---|---|---|
| 2013/0054945 A1 | 2/2013 | Free et al. | |
| 2013/0055099 A1 | 2/2013 | Yao et al. | |
| 2013/0055147 A1 | 2/2013 | Vasudev et al. | |
| 2013/0060571 A1 | 3/2013 | Soemo et al. | |
| 2013/0060807 A1 | 3/2013 | Rambhia et al. | |
| 2013/0061139 A1 | 3/2013 | Mahkovec et al. | |
| 2013/0063611 A1 | 3/2013 | Papakipos et al. | |
| 2013/0066832 A1 | 3/2013 | Sheehan et al. | |
| 2013/0067307 A1 | 3/2013 | Tian et al. | |
| 2013/0067312 A1 | 3/2013 | Rose | |
| 2013/0067421 A1 | 3/2013 | Osman et al. | |
| 2013/0069769 A1 | 3/2013 | Pennington et al. | |
| 2013/0073286 A1 | 3/2013 | Bastea-Forte et al. | |
| 2013/0073293 A1 | 3/2013 | Jang et al. | |
| 2013/0073346 A1 | 3/2013 | Chun et al. | |
| 2013/0073580 A1 | 3/2013 | Mehanna et al. | |
| 2013/0073676 A1 | 3/2013 | Cockcroft | |
| 2013/0077772 A1* | 3/2013 | Lichorowic ............ | G10L 13/00 379/88.01 |
| 2013/0078930 A1 | 3/2013 | Chen et al. | |
| 2013/0080152 A1 | 3/2013 | Brun et al. | |
| 2013/0080162 A1 | 3/2013 | Chang et al. | |
| 2013/0080167 A1 | 3/2013 | Mozer | |
| 2013/0080177 A1 | 3/2013 | Chen | |
| 2013/0080178 A1 | 3/2013 | Kang et al. | |
| 2013/0080251 A1 | 3/2013 | Dempski | |
| 2013/0082967 A1 | 4/2013 | Hillis et al. | |
| 2013/0084882 A1 | 4/2013 | Khorashadi et al. | |
| 2013/0085755 A1 | 4/2013 | Bringert et al. | |
| 2013/0085761 A1 | 4/2013 | Bringert et al. | |
| 2013/0086609 A1 | 4/2013 | Levy et al. | |
| 2013/0090921 A1 | 4/2013 | Liu et al. | |
| 2013/0091090 A1 | 4/2013 | Spivack et al. | |
| 2013/0095805 A1 | 4/2013 | LeBeau et al. | |
| 2013/0096909 A1 | 4/2013 | Brun et al. | |
| 2013/0096911 A1 | 4/2013 | Beaufort et al. | |
| 2013/0096917 A1 | 4/2013 | Edgar et al. | |
| 2013/0097566 A1 | 4/2013 | Berglund | |
| 2013/0097682 A1 | 4/2013 | Zeljkovic et al. | |
| 2013/0100017 A1 | 4/2013 | Papakipos et al. | |
| 2013/0100268 A1 | 4/2013 | Mihailidis et al. | |
| 2013/0103391 A1 | 4/2013 | Millmore et al. | |
| 2013/0103405 A1 | 4/2013 | Namba et al. | |
| 2013/0106742 A1 | 5/2013 | Lee et al. | |
| 2013/0107053 A1 | 5/2013 | Ozaki | |
| 2013/0109412 A1 | 5/2013 | Nguyen et al. | |
| 2013/0110505 A1 | 5/2013 | Gruber et al. | |
| 2013/0110515 A1 | 5/2013 | Guzzoni et al. | |
| 2013/0110518 A1 | 5/2013 | Gruber et al. | |
| 2013/0110519 A1 | 5/2013 | Cheyer et al. | |
| 2013/0110520 A1 | 5/2013 | Cheyer et al. | |
| 2013/0110943 A1 | 5/2013 | Menon et al. | |
| 2013/0111330 A1 | 5/2013 | Staikos et al. | |
| 2013/0111348 A1 | 5/2013 | Gruber et al. | |
| 2013/0111365 A1 | 5/2013 | Chen et al. | |
| 2013/0111487 A1 | 5/2013 | Cheyer et al. | |
| 2013/0111581 A1 | 5/2013 | Griffin et al. | |
| 2013/0115927 A1 | 5/2013 | Gruber et al. | |
| 2013/0117022 A1 | 5/2013 | Chen et al. | |
| 2013/0124189 A1 | 5/2013 | Baldwin et al. | |
| 2013/0124672 A1 | 5/2013 | Pan | |
| 2013/0125168 A1 | 5/2013 | Agnihotri et al. | |
| 2013/0130669 A1 | 5/2013 | Xiao et al. | |
| 2013/0132081 A1 | 5/2013 | Ryu et al. | |
| 2013/0132084 A1 | 5/2013 | Stonehocker et al. | |
| 2013/0132089 A1 | 5/2013 | Fanty et al. | |
| 2013/0132871 A1 | 5/2013 | Zeng et al. | |
| 2013/0138440 A1 | 5/2013 | Strope et al. | |
| 2013/0141551 A1 | 6/2013 | Kim | |
| 2013/0142317 A1 | 6/2013 | Reynolds | |
| 2013/0142345 A1 | 6/2013 | Waldmann | |
| 2013/0144594 A1 | 6/2013 | Bangalore et al. | |
| 2013/0144616 A1 | 6/2013 | Bangalore | |
| 2013/0151258 A1 | 6/2013 | Chandrasekar et al. | |
| 2013/0151339 A1 | 6/2013 | Kim et al. | |
| 2013/0152092 A1 | 6/2013 | Yadgar | |
| 2013/0154811 A1 | 6/2013 | Ferren et al. | |
| 2013/0155948 A1 | 6/2013 | Pinheiro et al. | |
| 2013/0156198 A1 | 6/2013 | Kim et al. | |
| 2013/0157629 A1 | 6/2013 | Lee et al. | |
| 2013/0158977 A1 | 6/2013 | Senior | |
| 2013/0159847 A1 | 6/2013 | Banke et al. | |
| 2013/0159861 A1 | 6/2013 | Rottler et al. | |
| 2013/0165232 A1 | 6/2013 | Nelson et al. | |
| 2013/0166278 A1 | 6/2013 | James et al. | |
| 2013/0166303 A1 | 6/2013 | Chang et al. | |
| 2013/0166332 A1 | 6/2013 | Hammad | |
| 2013/0166442 A1 | 6/2013 | Nakajima et al. | |
| 2013/0167242 A1 | 6/2013 | Paliwal | |
| 2013/0170738 A1 | 7/2013 | Capuozzo et al. | |
| 2013/0172022 A1 | 7/2013 | Seymour et al. | |
| 2013/0173258 A1 | 7/2013 | Liu et al. | |
| 2013/0173268 A1 | 7/2013 | Weng et al. | |
| 2013/0173513 A1 | 7/2013 | Chu et al. | |
| 2013/0173610 A1 | 7/2013 | Hu et al. | |
| 2013/0173614 A1 | 7/2013 | Ismalon | |
| 2013/0174034 A1 | 7/2013 | Brown et al. | |
| 2013/0176147 A1 | 7/2013 | Anderson et al. | |
| 2013/0176208 A1 | 7/2013 | Tanaka et al. | |
| 2013/0176244 A1 | 7/2013 | Yamamoto et al. | |
| 2013/0176592 A1 | 7/2013 | Sasaki | |
| 2013/0179168 A1 | 7/2013 | Bae et al. | |
| 2013/0179172 A1 | 7/2013 | Nakamura et al. | |
| 2013/0179440 A1 | 7/2013 | Gordon | |
| 2013/0179806 A1 | 7/2013 | Bastide et al. | |
| 2013/0183942 A1 | 7/2013 | Novick et al. | |
| 2013/0183944 A1 | 7/2013 | Mozer et al. | |
| 2013/0185059 A1 | 7/2013 | Riccardi | |
| 2013/0185066 A1 | 7/2013 | Tzirkel-Hancock et al. | |
| 2013/0185074 A1 | 7/2013 | Gruber et al. | |
| 2013/0185081 A1 | 7/2013 | Cheyer et al. | |
| 2013/0185336 A1 | 7/2013 | Singh et al. | |
| 2013/0187850 A1 | 7/2013 | Schulz et al. | |
| 2013/0187857 A1 | 7/2013 | Griffin et al. | |
| 2013/0190021 A1 | 7/2013 | Vieri et al. | |
| 2013/0191117 A1 | 7/2013 | Atti et al. | |
| 2013/0191408 A1 | 7/2013 | Volkert et al. | |
| 2013/0197911 A1 | 8/2013 | Wei et al. | |
| 2013/0197914 A1 | 8/2013 | Yelvington et al. | |
| 2013/0198159 A1 | 8/2013 | Hendry | |
| 2013/0198841 A1 | 8/2013 | Poulson | |
| 2013/0204813 A1 | 8/2013 | Master et al. | |
| 2013/0204897 A1 | 8/2013 | McDougall | |
| 2013/0204967 A1 | 8/2013 | Seo et al. | |
| 2013/0207898 A1 | 8/2013 | Sullivan et al. | |
| 2013/0210410 A1 | 8/2013 | Xu | |
| 2013/0210492 A1 | 8/2013 | You et al. | |
| 2013/0212501 A1 | 8/2013 | Anderson et al. | |
| 2013/0218553 A1 | 8/2013 | Fujii et al. | |
| 2013/0218560 A1 | 8/2013 | Hsiao et al. | |
| 2013/0218574 A1 | 8/2013 | Falcon et al. | |
| 2013/0218899 A1 | 8/2013 | Raghavan et al. | |
| 2013/0219333 A1 | 8/2013 | Palwe et al. | |
| 2013/0222249 A1 | 8/2013 | Pasquero et al. | |
| 2013/0223279 A1 | 8/2013 | Tinnakornsrisuphap et al. | |
| 2013/0225128 A1 | 8/2013 | Gomar | |
| 2013/0226935 A1 | 8/2013 | Bai et al. | |
| 2013/0226996 A1 | 8/2013 | Itagaki et al. | |
| 2013/0231917 A1 | 9/2013 | Naik | |
| 2013/0234947 A1 | 9/2013 | Kristensson et al. | |
| 2013/0235987 A1 | 9/2013 | Arroniz-Escobar | |
| 2013/0238312 A1 | 9/2013 | Waibel | |
| 2013/0238326 A1 | 9/2013 | Kim et al. | |
| 2013/0238540 A1 | 9/2013 | O'donoghue et al. | |
| 2013/0238647 A1 | 9/2013 | Thompson | |
| 2013/0238729 A1 | 9/2013 | Holzman et al. | |
| 2013/0244615 A1 | 9/2013 | Miller | |
| 2013/0246048 A1 | 9/2013 | Nagase et al. | |
| 2013/0246050 A1 | 9/2013 | Yu et al. | |
| 2013/0246329 A1 | 9/2013 | Pasquero et al. | |
| 2013/0253911 A1 | 9/2013 | Petri et al. | |
| 2013/0253912 A1 | 9/2013 | Medlock et al. | |
| 2013/0260739 A1 | 10/2013 | Saino | |
| 2013/0262168 A1 | 10/2013 | Makanawala et al. | |

(56) References Cited

U.S. PATENT DOCUMENTS

2013/0268263 A1 10/2013 Park et al.
2013/0268956 A1 10/2013 Recco
2013/0275117 A1 10/2013 Winer
2013/0275136 A1 10/2013 Czahor
2013/0275138 A1 10/2013 Gruber et al.
2013/0275164 A1 10/2013 Gruber et al.
2013/0275199 A1 10/2013 Proctor, Jr. et al.
2013/0275625 A1 10/2013 Taivalsaari et al.
2013/0275875 A1 10/2013 Gruber et al.
2013/0275899 A1 10/2013 Schubert et al.
2013/0279724 A1 10/2013 Stafford et al.
2013/0282709 A1 10/2013 Zhu et al.
2013/0283168 A1 10/2013 Brown et al.
2013/0283199 A1 10/2013 Selig et al.
2013/0283283 A1 10/2013 Wang et al.
2013/0285913 A1 10/2013 Griffin et al.
2013/0288722 A1 10/2013 Ramanujam et al.
2013/0289991 A1 10/2013 Eshwar et al.
2013/0289993 A1 10/2013 Rao
2013/0289994 A1 10/2013 Newman et al.
2013/0290001 A1 10/2013 Yun et al.
2013/0290222 A1 10/2013 Gordo et al.
2013/0290905 A1 10/2013 Luvogt et al.
2013/0291015 A1 10/2013 Pan
2013/0297078 A1 11/2013 Kolavennu
2013/0297198 A1 11/2013 Velde et al.
2013/0297317 A1 11/2013 Lee et al.
2013/0297319 A1 11/2013 Kim
2013/0297348 A1 11/2013 Cardoza et al.
2013/0300645 A1 11/2013 Fedorov
2013/0300648 A1 11/2013 Kim et al.
2013/0303106 A1 11/2013 Martin
2013/0304476 A1 11/2013 Kim et al.
2013/0304479 A1 11/2013 Teller et al.
2013/0304758 A1 11/2013 Gruber et al.
2013/0304815 A1 11/2013 Puente et al.
2013/0305119 A1 11/2013 Kern et al.
2013/0307855 A1 11/2013 Lamb et al.
2013/0307997 A1 11/2013 O'Keefe et al.
2013/0308922 A1 11/2013 Sano et al.
2013/0311179 A1 11/2013 Wagner
2013/0311184 A1 11/2013 Badavne et al.
2013/0311487 A1 11/2013 Moore et al.
2013/0311997 A1 11/2013 Gruber et al.
2013/0315038 A1 11/2013 Ferren et al.
2013/0316679 A1 11/2013 Miller et al.
2013/0316746 A1 11/2013 Miller et al.
2013/0317921 A1 11/2013 Havas
2013/0318478 A1 11/2013 Ogura
2013/0321267 A1 12/2013 Bhatti et al.
2013/0322634 A1 12/2013 Bennett et al.
2013/0322665 A1 12/2013 Bennett et al.
2013/0325340 A1 12/2013 Forstall et al.
2013/0325436 A1 12/2013 Wang et al.
2013/0325443 A1 12/2013 Begeja et al.
2013/0325447 A1 12/2013 Levien et al.
2013/0325448 A1 12/2013 Levien et al.
2013/0325460 A1 12/2013 Kim et al.
2013/0325480 A1 12/2013 Lee et al.
2013/0325481 A1 12/2013 Van Os et al.
2013/0325484 A1 12/2013 Chakladar et al.
2013/0325844 A1 12/2013 Plaisant
2013/0325967 A1 12/2013 Parks et al.
2013/0325970 A1 12/2013 Roberts et al.
2013/0325979 A1 12/2013 Mansfield et al.
2013/0326576 A1 12/2013 Zhang et al.
2013/0328809 A1 12/2013 Smith
2013/0329023 A1 12/2013 Suplee, III et al.
2013/0331127 A1 12/2013 Sabatelli et al.
2013/0332113 A1 12/2013 Piemonte et al.
2013/0332159 A1 12/2013 Federighi et al.
2013/0332162 A1 12/2013 Keen
2013/0332164 A1 12/2013 Nalk
2013/0332168 A1 12/2013 Kim et al.
2013/0332172 A1 12/2013 Prakash et al.
2013/0332400 A1 12/2013 González
2013/0332538 A1 12/2013 Clark et al.
2013/0332721 A1 12/2013 Chaudhri et al.
2013/0337771 A1* 12/2013 Klein .................... H04W 4/90 455/411
2013/0339256 A1 12/2013 Shroff
2013/0339454 A1 12/2013 Walker et al.
2013/0339991 A1 12/2013 Ricci
2013/0342672 A1 12/2013 Gray et al.
2013/0343584 A1 12/2013 Bennett et al.
2013/0343721 A1 12/2013 Abecassis
2013/0346065 A1 12/2013 Davidson et al.
2013/0346068 A1 12/2013 Solem et al.
2013/0346347 A1 12/2013 Patterson et al.
2013/0346488 A1 12/2013 Lunt et al.
2013/0347018 A1 12/2013 Limp et al.
2013/0347029 A1 12/2013 Tang et al.
2013/0347102 A1 12/2013 Shi
2013/0347117 A1 12/2013 Parks et al.
2014/0001255 A1 1/2014 Anthoine
2014/0002338 A1 1/2014 Raffa et al.
2014/0006012 A1 1/2014 Zhou et al.
2014/0006025 A1 1/2014 Krishnan et al.
2014/0006027 A1 1/2014 Kim et al.
2014/0006028 A1 1/2014 Hu
2014/0006030 A1 1/2014 Fleizach et al.
2014/0006153 A1 1/2014 Thangam et al.
2014/0006191 A1 1/2014 Shankar et al.
2014/0006483 A1 1/2014 Garmark et al.
2014/0006496 A1 1/2014 Dearman et al.
2014/0006562 A1 1/2014 Handa et al.
2014/0006947 A1 1/2014 Garmark et al.
2014/0006951 A1 1/2014 Hunter
2014/0006955 A1 1/2014 Greenzeiger et al.
2014/0008163 A1 1/2014 Mikonaho et al.
2014/0012445 A1 1/2014 Fleckenstein et al.
2014/0012574 A1 1/2014 Pasupalak et al.
2014/0012580 A1 1/2014 Ganong, III et al.
2014/0012586 A1 1/2014 Rubin et al.
2014/0012587 A1 1/2014 Park
2014/0019116 A1 1/2014 Lundberg et al.
2014/0019133 A1 1/2014 Bao et al.
2014/0019460 A1 1/2014 Sambrani et al.
2014/0028029 A1 1/2014 Jochman
2014/0028477 A1 1/2014 Michalske
2014/0028735 A1 1/2014 Williams et al.
2014/0032453 A1 1/2014 Eustice et al.
2014/0032678 A1 1/2014 Koukoumidis et al.
2014/0033071 A1 1/2014 Gruber et al.
2014/0035823 A1 2/2014 Khoe et al.
2014/0037075 A1 2/2014 Bouzid et al.
2014/0039888 A1 2/2014 Taubman et al.
2014/0039893 A1 2/2014 Weiner et al.
2014/0039894 A1 2/2014 Shostak
2014/0040274 A1 2/2014 Aravamudan et al.
2014/0040748 A1 2/2014 Lemay et al.
2014/0040754 A1 2/2014 Donelli
2014/0040801 A1 2/2014 Patel et al.
2014/0040918 A1 2/2014 Li
2014/0040961 A1 2/2014 Green et al.
2014/0046934 A1 2/2014 Zhou et al.
2014/0047001 A1 2/2014 Phillips et al.
2014/0052451 A1 2/2014 Cheong et al.
2014/0052680 A1 2/2014 Nitz et al.
2014/0052791 A1 2/2014 Chakra et al.
2014/0053082 A1 2/2014 Park
2014/0053101 A1 2/2014 Buehler et al.
2014/0053210 A1 2/2014 Cheong et al.
2014/0057610 A1 2/2014 Olincy et al.
2014/0059030 A1 2/2014 Hakkani-Tur et al.
2014/0067361 A1 3/2014 Nikoulina et al.
2014/0067371 A1 3/2014 Liensberger
2014/0067402 A1 3/2014 Kim
2014/0067649 A1* 3/2014 Kannan ................. G06Q 30/01 705/38
2014/0067738 A1 3/2014 Kingsbury
2014/0068751 A1 3/2014 Last
2014/0074454 A1 3/2014 Brown et al.
2014/0074466 A1 3/2014 Sharifi et al.

(56) References Cited

U.S. PATENT DOCUMENTS

2014/0074470 A1 3/2014 Jansche et al.
2014/0074472 A1 3/2014 Lin et al.
2014/0074482 A1 3/2014 Ohno
2014/0074483 A1 3/2014 Van Os
2014/0074589 A1 3/2014 Nielsen et al.
2014/0074815 A1 3/2014 Plimton
2014/0075453 A1 3/2014 Bellessort et al.
2014/0078065 A1 3/2014 Akkok
2014/0079195 A1 3/2014 Srivastava et al.
2014/0080410 A1 3/2014 Jung et al.
2014/0080428 A1 3/2014 Rhoads et al.
2014/0081619 A1 3/2014 Solntseva et al.
2014/0081633 A1 3/2014 Badaskar
2014/0081635 A1 3/2014 Yanagihara
2014/0081829 A1 3/2014 Milne
2014/0081941 A1 3/2014 Bai et al.
2014/0082500 A1 3/2014 Wilensky et al.
2014/0082501 A1 3/2014 Bae et al.
2014/0082545 A1 3/2014 Zhai et al.
2014/0082715 A1 3/2014 Grajek et al.
2014/0086458 A1 3/2014 Rogers
2014/0087711 A1 3/2014 Geyer et al.
2014/0088952 A1 3/2014 Fife et al.
2014/0088961 A1 3/2014 Woodward et al.
2014/0088964 A1 3/2014 Bellegarda
2014/0088970 A1 3/2014 Kang
2014/0092007 A1 4/2014 Kim et al.
2014/0095171 A1 4/2014 Lynch et al.
2014/0095172 A1 4/2014 Cabaco et al.
2014/0095173 A1 4/2014 Lynch et al.
2014/0095432 A1 4/2014 Trumbull et al.
2014/0095601 A1 4/2014 Abuelsaad et al.
2014/0095965 A1 4/2014 Li
2014/0096077 A1 4/2014 Jacob et al.
2014/0096209 A1 4/2014 Saraf et al.
2014/0098247 A1 4/2014 Rao et al.
2014/0100847 A1 4/2014 Ishii et al.
2014/0101127 A1 4/2014 Simhon et al.
2014/0104175 A1 4/2014 Ouyang et al.
2014/0108017 A1 4/2014 Mason et al.
2014/0108391 A1 4/2014 Volkert
2014/0112556 A1 4/2014 Kalinli-akbacak
2014/0114554 A1 4/2014 Lagassey
2014/0115062 A1 4/2014 Liu et al.
2014/0115114 A1 4/2014 Garmark et al.
2014/0118155 A1 5/2014 Bowers et al.
2014/0118624 A1 5/2014 Jang et al.
2014/0120961 A1 5/2014 Buck
2014/0122059 A1 5/2014 Patel et al.
2014/0122085 A1 5/2014 Piety et al.
2014/0122086 A1 5/2014 Kapur et al.
2014/0122136 A1 5/2014 Jayanthi
2014/0122153 A1 5/2014 Truitt
2014/0123022 A1 5/2014 Lee et al.
2014/0128021 A1 5/2014 Walker et al.
2014/0129006 A1 5/2014 Chen et al.
2014/0129226 A1 5/2014 Lee et al.
2014/0132935 A1 5/2014 Kim et al.
2014/0134983 A1 5/2014 Jung et al.
2014/0135036 A1 5/2014 Bonanni et al.
2014/0136013 A1 5/2014 Wolverton et al.
2014/0136187 A1 5/2014 Wolverton et al.
2014/0136195 A1 5/2014 Abdossalami et al.
2014/0136212 A1 5/2014 Kwon et al.
2014/0136946 A1 5/2014 Matas
2014/0136987 A1 5/2014 Rodriguez
2014/0142922 A1 5/2014 Liang et al.
2014/0142923 A1 5/2014 Jones et al.
2014/0142935 A1 5/2014 Lindahl et al.
2014/0142953 A1 5/2014 Kim et al.
2014/0143550 A1 5/2014 Ganong, III et al.
2014/0143721 A1 5/2014 Suzuki et al.
2014/0143784 A1 5/2014 Mistry et al.
2014/0146200 A1 5/2014 Scott et al.
2014/0149118 A1 5/2014 Lee et al.
2014/0152577 A1 6/2014 Yuen et al.
2014/0153709 A1 6/2014 Byrd et al.
2014/0155031 A1 6/2014 Lee et al.
2014/0156262 A1 6/2014 Yuen et al.
2014/0156279 A1 6/2014 Okamoto et al.
2014/0157319 A1 6/2014 Kimura et al.
2014/0157422 A1 6/2014 Livshits et al.
2014/0163751 A1 6/2014 Davis et al.
2014/0163951 A1 6/2014 Nikoulina et al.
2014/0163953 A1 6/2014 Parikh
2014/0163954 A1 6/2014 Joshi et al.
2014/0163962 A1 6/2014 Castelli et al.
2014/0163976 A1 6/2014 Park et al.
2014/0163977 A1 6/2014 Hoffmeister et al.
2014/0163978 A1 6/2014 Basye et al.
2014/0163981 A1 6/2014 Cook et al.
2014/0163995 A1 6/2014 Burns et al.
2014/0164305 A1 6/2014 Lynch et al.
2014/0164312 A1 6/2014 Lynch et al.
2014/0164476 A1 6/2014 David
2014/0164508 A1 6/2014 Lynch
2014/0164532 A1 6/2014 Lynch et al.
2014/0164533 A1 6/2014 Lynch
2014/0164953 A1 6/2014 Lynch et al.
2014/0168344 A1* 6/2014 Shoemake ............ H04N 7/147
348/14.01
2014/0169795 A1 6/2014 Clough
2014/0171064 A1 6/2014 Das
2014/0172412 A1 6/2014 Viegas et al.
2014/0172878 A1 6/2014 Clark et al.
2014/0173445 A1 6/2014 Grassiotto
2014/0173460 A1 6/2014 Kim
2014/0176814 A1 6/2014 Ahn
2014/0179295 A1 6/2014 Luebbers et al.
2014/0180499 A1 6/2014 Cooper et al.
2014/0180689 A1 6/2014 Kim
2014/0180697 A1 6/2014 Torok et al.
2014/0181865 A1 6/2014 Koganei
2014/0188335 A1 7/2014 Madhok et al.
2014/0188460 A1 7/2014 Ouyang et al.
2014/0188477 A1 7/2014 Zhang
2014/0188478 A1 7/2014 Zhang
2014/0188485 A1 7/2014 Kim et al.
2014/0188835 A1 7/2014 Zhang et al.
2014/0195226 A1 7/2014 Yun et al.
2014/0195230 A1 7/2014 Han et al.
2014/0195233 A1 7/2014 Bapat et al.
2014/0195244 A1 7/2014 Cha et al.
2014/0195251 A1 7/2014 Zeinstra et al.
2014/0195252 A1 7/2014 Gruber et al.
2014/0198048 A1 7/2014 Unruh et al.
2014/0203939 A1 7/2014 Harrington et al.
2014/0205076 A1 7/2014 Kumar et al.
2014/0207439 A1 7/2014 Venkatapathy et al.
2014/0207446 A1 7/2014 Klein et al.
2014/0207447 A1 7/2014 Jiang et al.
2014/0207466 A1 7/2014 Smadi
2014/0207468 A1 7/2014 Bartnik
2014/0207582 A1 7/2014 Flinn et al.
2014/0211944 A1 7/2014 Hayward et al.
2014/0214429 A1 7/2014 Pantel
2014/0214537 A1 7/2014 Yoo et al.
2014/0215367 A1 7/2014 Kim et al.
2014/0215513 A1 7/2014 Ramer et al.
2014/0218372 A1 8/2014 Missig et al.
2014/0222422 A1 8/2014 Sarikaya et al.
2014/0222435 A1 8/2014 Li et al.
2014/0222436 A1 8/2014 Binder et al.
2014/0222678 A1 8/2014 Sheets et al.
2014/0222967 A1 8/2014 Harrang et al.
2014/0223377 A1 8/2014 Shaw et al.
2014/0223481 A1 8/2014 Fundament
2014/0226503 A1 8/2014 Cooper et al.
2014/0229158 A1 8/2014 Zweig et al.
2014/0229184 A1 8/2014 Shires
2014/0230055 A1 8/2014 Boehl
2014/0232570 A1 8/2014 Skinder et al.
2014/0232656 A1 8/2014 Pasquero et al.
2014/0236595 A1 8/2014 Gray

(56) References Cited

U.S. PATENT DOCUMENTS

2014/0236986 A1 8/2014 Guzman
2014/0237042 A1 8/2014 Ahmed et al.
2014/0237366 A1 8/2014 Poulos et al.
2014/0244248 A1 8/2014 Arisoy et al.
2014/0244249 A1 8/2014 Mohamed et al.
2014/0244254 A1 8/2014 Ju et al.
2014/0244257 A1 8/2014 Colibro et al.
2014/0244258 A1 8/2014 Song et al.
2014/0244263 A1 8/2014 Pontual et al.
2014/0244266 A1 8/2014 Brown et al.
2014/0244268 A1 8/2014 Abdelsamie et al.
2014/0244270 A1 8/2014 Han et al.
2014/0244271 A1 8/2014 Lindahl
2014/0244712 A1 8/2014 Walters et al.
2014/0245140 A1 8/2014 Brown et al.
2014/0247383 A1 9/2014 Dave et al.
2014/0247926 A1 9/2014 Gainsboro et al.
2014/0249812 A1 9/2014 Bou-Ghazale et al.
2014/0249816 A1 9/2014 Pickering et al.
2014/0249817 A1 9/2014 Hart et al.
2014/0249820 A1 9/2014 Hsu et al.
2014/0249821 A1 9/2014 Kennewick et al.
2014/0250046 A1 9/2014 Winn et al.
2014/0257809 A1 9/2014 Goel et al.
2014/0257815 A1 9/2014 Zhao et al.
2014/0257902 A1 9/2014 Moore et al.
2014/0258324 A1 9/2014 Mauro et al.
2014/0258357 A1 9/2014 Singh et al.
2014/0258857 A1 9/2014 Dykstra-Erickson et al.
2014/0258905 A1 9/2014 Lee et al.
2014/0267022 A1 9/2014 Kim
2014/0267599 A1 9/2014 Drouin et al.
2014/0267933 A1 9/2014 Young
2014/0272821 A1 9/2014 Pitschel et al.
2014/0273979 A1 9/2014 Van Os et al.
2014/0274005 A1 9/2014 Luna et al.
2014/0274203 A1 9/2014 Ganong, III et al.
2014/0274211 A1 9/2014 Sejnoha et al.
2014/0278051 A1 9/2014 Mcgavran et al.
2014/0278343 A1 9/2014 Tran
2014/0278349 A1 9/2014 Grieves et al.
2014/0278379 A1 9/2014 Coccaro et al.
2014/0278390 A1 9/2014 Kingsbury et al.
2014/0278391 A1 9/2014 Braho et al.
2014/0278394 A1 9/2014 Bastyr et al.
2014/0278406 A1 9/2014 Tsumura et al.
2014/0278413 A1 9/2014 Pitschel et al.
2014/0278426 A1 9/2014 Jost et al.
2014/0278429 A1 9/2014 Ganong, III
2014/0278435 A1 9/2014 Ganong, III et al.
2014/0278436 A1 9/2014 Khanna et al.
2014/0278438 A1 9/2014 Hart et al.
2014/0278443 A1 9/2014 Gunn et al.
2014/0278444 A1 9/2014 Larson et al.
2014/0278513 A1 9/2014 Prakash et al.
2014/0279622 A1 9/2014 Lamoureux et al.
2014/0279739 A1 9/2014 Elkington et al.
2014/0279787 A1 9/2014 Cheng et al.
2014/0280072 A1 9/2014 Coleman
2014/0280107 A1 9/2014 Heymans et al.
2014/0280138 A1 9/2014 Li et al.
2014/0280292 A1 9/2014 Skinder
2014/0280353 A1 9/2014 Delaney et al.
2014/0280450 A1 9/2014 Luna
2014/0280757 A1 9/2014 Tran
2014/0281944 A1 9/2014 Winer
2014/0281983 A1 9/2014 Xian et al.
2014/0281997 A1 9/2014 Fleizach et al.
2014/0282003 A1 9/2014 Gruber et al.
2014/0282007 A1 9/2014 Fleizach
2014/0282045 A1 9/2014 Ayanam et al.
2014/0282178 A1 9/2014 Borzello et al.
2014/0282201 A1 9/2014 Pasquero et al.
2014/0282203 A1 9/2014 Pasquero et al.
2014/0282559 A1 9/2014 Verduzco et al.
2014/0282586 A1 9/2014 Shear et al.
2014/0282743 A1 9/2014 Howard et al.
2014/0288990 A1 9/2014 Moore et al.
2014/0289508 A1 9/2014 Wang
2014/0297267 A1 10/2014 Spencer et al.
2014/0297281 A1 10/2014 Togawa et al.
2014/0297284 A1 10/2014 Gruber et al.
2014/0297288 A1 10/2014 Yu et al.
2014/0298395 A1 10/2014 Yang et al.
2014/0304086 A1 10/2014 Dasdan et al.
2014/0304605 A1 10/2014 Ohmura et al.
2014/0309990 A1 10/2014 Gandrabur et al.
2014/0309996 A1 10/2014 Zhang
2014/0310001 A1 10/2014 Kalns et al.
2014/0310002 A1 10/2014 Nitz et al.
2014/0310348 A1 10/2014 Keskitalo et al.
2014/0310365 A1 10/2014 Sample et al.
2014/0310595 A1 10/2014 Acharya et al.
2014/0313007 A1 10/2014 Harding
2014/0315492 A1 10/2014 Woods
2014/0316585 A1 10/2014 Boesveld et al.
2014/0317030 A1 10/2014 Shen et al.
2014/0317502 A1 10/2014 Brown et al.
2014/0324429 A1 10/2014 Weilhammer et al.
2014/0324884 A1 10/2014 Lindahl et al.
2014/0330560 A1 11/2014 Venkatesha et al.
2014/0330569 A1 11/2014 Kolavennu et al.
2014/0330951 A1 11/2014 Sukoff et al.
2014/0335823 A1 11/2014 Heredia et al.
2014/0337037 A1 11/2014 Chi
2014/0337048 A1 11/2014 Brown et al.
2014/0337266 A1 11/2014 Wolverton et al.
2014/0337370 A1 11/2014 Aravamudan et al.
2014/0337371 A1 11/2014 Li
2014/0337438 A1 11/2014 Govande et al.
2014/0337621 A1 11/2014 Nakhimov
2014/0337751 A1 11/2014 Lim et al.
2014/0337814 A1 11/2014 Kalns et al.
2014/0342762 A1 11/2014 Hajdu et al.
2014/0343834 A1 11/2014 Demerchant et al.
2014/0343943 A1 11/2014 Al-telmissani
2014/0343946 A1 11/2014 Torok et al.
2014/0344205 A1 11/2014 Luna et al.
2014/0344627 A1 11/2014 Schaub et al.
2014/0344687 A1 11/2014 Durham et al.
2014/0347181 A1 11/2014 Luna et al.
2014/0347383 A1 11/2014 Cornell et al.
2014/0350847 A1 11/2014 Ichinokawa
2014/0350924 A1 11/2014 Zurek et al.
2014/0350933 A1 11/2014 Bak et al.
2014/0351741 A1 11/2014 Medlock et al.
2014/0351760 A1 11/2014 Skory et al.
2014/0358519 A1 12/2014 Mirkin et al.
2014/0358521 A1 12/2014 Mikutel et al.
2014/0358523 A1 12/2014 Sheth et al.
2014/0358549 A1 12/2014 O'Connor et al.
2014/0359637 A1 12/2014 Yan
2014/0359709 A1 12/2014 Nassar et al.
2014/0361973 A1 12/2014 Raux et al.
2014/0363074 A1 12/2014 Dolfing et al.
2014/0364149 A1 12/2014 Marti et al.
2014/0365209 A1 12/2014 Evermann
2014/0365214 A1 12/2014 Bayley
2014/0365216 A1 12/2014 Gruber et al.
2014/0365226 A1 12/2014 Sinha
2014/0365227 A1 12/2014 Cash et al.
2014/0365407 A1 12/2014 Brown et al.
2014/0365505 A1 12/2014 Clark et al.
2014/0365880 A1 12/2014 Bellegarda
2014/0365885 A1 12/2014 Carson et al.
2014/0365895 A1 12/2014 Magahern et al.
2014/0365922 A1 12/2014 Yang
2014/0365945 A1 12/2014 Karunamuni et al.
2014/0370817 A1 12/2014 Luna
2014/0370841 A1 12/2014 Roberts et al.
2014/0372112 A1 12/2014 Xue et al.
2014/0372356 A1 12/2014 Bilal et al.
2014/0372468 A1 12/2014 Collins et al.
2014/0372931 A1 12/2014 Zhai et al.

(56) References Cited

U.S. PATENT DOCUMENTS

2014/0379326 A1 12/2014 Sarikaya et al.
2014/0379334 A1 12/2014 Fry
2014/0379341 A1 12/2014 Seo et al.
2014/0379798 A1 12/2014 Bunner et al.
2014/0380285 A1 12/2014 Gabel et al.
2015/0003797 A1 1/2015 Schmidt
2015/0004958 A1 1/2015 Wang et al.
2015/0005009 A1 1/2015 Tomkins et al.
2015/0006148 A1 1/2015 Goldszmit et al.
2015/0006157 A1 1/2015 Silva et al.
2015/0006167 A1 1/2015 Kato et al.
2015/0006176 A1 1/2015 Pogue et al.
2015/0006178 A1 1/2015 Peng et al.
2015/0006184 A1 1/2015 Marti et al.
2015/0006199 A1 1/2015 Snider et al.
2015/0012271 A1 1/2015 Peng et al.
2015/0012862 A1 1/2015 Ikeda et al.
2015/0019219 A1 1/2015 Tzirkel-Hancock et al.
2015/0019221 A1 1/2015 Lee et al.
2015/0019944 A1 1/2015 Kalgi
2015/0019954 A1 1/2015 Dalal et al.
2015/0019974 A1 1/2015 Doi et al.
2015/0025405 A1 1/2015 Vairavan et al.
2015/0025890 A1 1/2015 Jagatheesan et al.
2015/0026620 A1 1/2015 Kwon et al.
2015/0027178 A1 1/2015 Scalisi
2015/0031416 A1 1/2015 Labowicz et al.
2015/0032443 A1 1/2015 Karov et al.
2015/0032457 A1 1/2015 Koo et al.
2015/0033219 A1 1/2015 Breiner et al.
2015/0033275 A1 1/2015 Natani et al.
2015/0034855 A1 2/2015 Shen
2015/0038161 A1 2/2015 Jakobson et al.
2015/0039292 A1 2/2015 Suleman et al.
2015/0039295 A1 2/2015 Soschen
2015/0039299 A1 2/2015 Weinstein et al.
2015/0039305 A1 2/2015 Huang
2015/0039606 A1 2/2015 Salaka et al.
2015/0040012 A1 2/2015 Faaborg et al.
2015/0045003 A1 2/2015 Vora et al.
2015/0045007 A1 2/2015 Cash
2015/0045068 A1 2/2015 Soffer et al.
2015/0046434 A1 2/2015 Lim et al.
2015/0046537 A1 2/2015 Rakib
2015/0046828 A1 2/2015 Desai et al.
2015/0050633 A1 2/2015 Christmas et al.
2015/0050923 A1 2/2015 Tu et al.
2015/0051754 A1 2/2015 Kwon et al.
2015/0053779 A1 2/2015 Adamek et al.
2015/0053781 A1 2/2015 Nelson et al.
2015/0055879 A1 2/2015 Yang
2015/0058013 A1 2/2015 Pakhomov et al.
2015/0058018 A1 2/2015 Georges et al.
2015/0058720 A1 2/2015 Smadja et al.
2015/0058785 A1 2/2015 Ookawara
2015/0065149 A1 3/2015 Russell et al.
2015/0065200 A1 3/2015 Namgung et al.
2015/0066479 A1 3/2015 Pasupalak et al.
2015/0066494 A1 3/2015 Salvador et al.
2015/0066496 A1 3/2015 Deoras et al.
2015/0066506 A1 3/2015 Romano et al.
2015/0066516 A1 3/2015 Nishikawa et al.
2015/0066817 A1 3/2015 Slayton et al.
2015/0067485 A1 3/2015 Kim et al.
2015/0067819 A1 3/2015 Shribman et al.
2015/0067822 A1 3/2015 Randall
2015/0071121 A1 3/2015 Patil et al.
2015/0073788 A1 3/2015 Sak et al.
2015/0073804 A1 3/2015 Senior et al.
2015/0074524 A1 3/2015 Nicholson et al.
2015/0074615 A1 3/2015 Han et al.
2015/0081295 A1 3/2015 Yun et al.
2015/0082180 A1 3/2015 Ames et al.
2015/0082229 A1 3/2015 Ouyang et al.
2015/0086174 A1 3/2015 Abecassis et al.
2015/0088511 A1 3/2015 Bharadwaj et al.
2015/0088514 A1 3/2015 Typrin
2015/0088518 A1 3/2015 Kim et al.
2015/0088522 A1 3/2015 Hendrickson et al.
2015/0088523 A1 3/2015 Schuster
2015/0088998 A1 3/2015 Isensee et al.
2015/0092520 A1 4/2015 Robison et al.
2015/0094834 A1 4/2015 Vega et al.
2015/0095031 A1 4/2015 Conkie et al.
2015/0095159 A1 4/2015 Kennewick et al.
2015/0095268 A1 4/2015 Greenzeiger et al.
2015/0095278 A1 4/2015 Flinn et al.
2015/0100144 A1 4/2015 Lee et al.
2015/0100313 A1 4/2015 Sharma
2015/0100316 A1 4/2015 Williams et al.
2015/0100537 A1 4/2015 Grieves et al.
2015/0100983 A1 4/2015 Pan
2015/0106061 A1 4/2015 Yang et al.
2015/0106085 A1 4/2015 Lindahl
2015/0106093 A1 4/2015 Weeks et al.
2015/0106737 A1 4/2015 Montoy-Wilson et al.
2015/0113407 A1 4/2015 Hoffert et al.
2015/0113435 A1 4/2015 Phillips
2015/0120296 A1 4/2015 Stern et al.
2015/0120641 A1 4/2015 Soon-Shiong et al.
2015/0120723 A1 4/2015 Deshmukh et al.
2015/0121216 A1 4/2015 Brown et al.
2015/0121227 A1* 4/2015 Peng .................... G10L 13/047 715/727
2015/0123898 A1 5/2015 Kim et al.
2015/0127337 A1 5/2015 Heigold et al.
2015/0127348 A1 5/2015 Follis
2015/0127350 A1 5/2015 Agiomyrgiannakis
2015/0128058 A1 5/2015 Anajwala
2015/0133049 A1 5/2015 Lee et al.
2015/0133109 A1 5/2015 Freeman et al.
2015/0134318 A1 5/2015 Cuthbert et al.
2015/0134322 A1 5/2015 Cuthbert et al.
2015/0134323 A1 5/2015 Cuthbert et al.
2015/0134334 A1 5/2015 Sachidanandam et al.
2015/0135085 A1 5/2015 Shoham et al.
2015/0135123 A1 5/2015 Carr et al.
2015/0140934 A1 5/2015 Abdurrahman et al.
2015/0140990 A1 5/2015 Kim et al.
2015/0141150 A1 5/2015 Zha
2015/0142420 A1 5/2015 Sarikaya et al.
2015/0142438 A1 5/2015 Dai et al.
2015/0142440 A1 5/2015 Parkinson et al.
2015/0142447 A1 5/2015 Kennewick et al.
2015/0142851 A1 5/2015 Gupta et al.
2015/0143419 A1 5/2015 Bhagwat et al.
2015/0148013 A1 5/2015 Baldwin et al.
2015/0149177 A1 5/2015 Kalns et al.
2015/0149182 A1 5/2015 Kalns et al.
2015/0149354 A1 5/2015 Mccoy
2015/0149469 A1 5/2015 Xu et al.
2015/0149899 A1 5/2015 Bernstein et al.
2015/0149964 A1 5/2015 Bernstein et al.
2015/0154001 A1 6/2015 Knox et al.
2015/0154185 A1 6/2015 Waibel
2015/0154976 A1 6/2015 Mutagi
2015/0160635 A1* 6/2015 Schofield ................ G10L 17/22 725/32
2015/0160855 A1 6/2015 Bi
2015/0161291 A1 6/2015 Gur et al.
2015/0161370 A1 6/2015 North et al.
2015/0161521 A1 6/2015 Shah et al.
2015/0161989 A1 6/2015 Hsu et al.
2015/0162000 A1 6/2015 Di Censo et al.
2015/0162001 A1 6/2015 Kar et al.
2015/0162006 A1 6/2015 Kummer
2015/0163558 A1 6/2015 Wheatley
2015/0169081 A1 6/2015 Neels et al.
2015/0169284 A1 6/2015 Quast et al.
2015/0169336 A1 6/2015 Harper et al.
2015/0169696 A1 6/2015 Krishnappa et al.
2015/0170073 A1 6/2015 Baker
2015/0170664 A1 6/2015 Doherty et al.
2015/0172262 A1 6/2015 Ortiz, Jr. et al.

(56) References Cited

U.S. PATENT DOCUMENTS

2015/0172463 A1 6/2015 Quast et al.
2015/0178388 A1 6/2015 Winnemoeller et al.
2015/0178785 A1 6/2015 Salonen
2015/0179168 A1 6/2015 Hakkani-tur et al.
2015/0179176 A1 6/2015 Ryu et al.
2015/0181285 A1 6/2015 Zhang et al.
2015/0185964 A1 7/2015 Stout
2015/0185993 A1 7/2015 Wheatley et al.
2015/0185996 A1 7/2015 Brown et al.
2015/0186012 A1 7/2015 Coleman et al.
2015/0186110 A1 7/2015 Kannan
2015/0186154 A1 7/2015 Brown et al.
2015/0186155 A1 7/2015 Brown et al.
2015/0186156 A1 7/2015 Brown et al.
2015/0186351 A1 7/2015 Hicks et al.
2015/0186538 A1 7/2015 Yan et al.
2015/0186783 A1 7/2015 Byrne et al.
2015/0186892 A1 7/2015 Zhang et al.
2015/0187355 A1 7/2015 Parkinson et al.
2015/0187369 A1 7/2015 Dadu et al.
2015/0189362 A1 7/2015 Lee et al.
2015/0193379 A1 7/2015 Mehta
2015/0193391 A1 7/2015 Khvostichenko et al.
2015/0193392 A1 7/2015 Greenblatt et al.
2015/0194152 A1 7/2015 Katuri et al.
2015/0194165 A1 7/2015 Faaborg et al.
2015/0195379 A1 7/2015 Zhang et al.
2015/0195606 A1 7/2015 McDevitt
2015/0199077 A1 7/2015 Zuger et al.
2015/0199960 A1 7/2015 Huo et al.
2015/0199965 A1 7/2015 Leak et al.
2015/0199967 A1 7/2015 Reddy et al.
2015/0201064 A1 7/2015 Bells et al.
2015/0201077 A1 7/2015 Konig et al.
2015/0205425 A1 7/2015 Kuscher et al.
2015/0205568 A1 7/2015 Matsuoka
2015/0205632 A1 7/2015 Gaster
2015/0205858 A1 7/2015 Xie et al.
2015/0206529 A1 7/2015 Kwon et al.
2015/0208226 A1 7/2015 Kuusilinna et al.
2015/0212791 A1 7/2015 Kumar et al.
2015/0213140 A1 7/2015 Volkert
2015/0213796 A1 7/2015 Waltermann et al.
2015/0215258 A1 7/2015 Nowakowski et al.
2015/0215350 A1 7/2015 Slayton et al.
2015/0217870 A1 8/2015 Mccullough et al.
2015/0220264 A1 8/2015 Lewis et al.
2015/0220507 A1 8/2015 Mohajer et al.
2015/0220715 A1 8/2015 Kim et al.
2015/0220972 A1 8/2015 Subramanya et al.
2015/0221302 A1 8/2015 Han et al.
2015/0221304 A1 8/2015 Stewart
2015/0221307 A1 8/2015 Shah et al.
2015/0222586 A1 8/2015 Ebersman et al.
2015/0224848 A1 8/2015 Eisenhour
2015/0227505 A1 8/2015 Morimoto
2015/0227633 A1 8/2015 Shapira
2015/0228274 A1 8/2015 Leppanen et al.
2015/0228275 A1 8/2015 Watanabe et al.
2015/0228281 A1 8/2015 Raniere
2015/0228283 A1 8/2015 Ehsani et al.
2015/0228292 A1 8/2015 Goldstein et al.
2015/0230095 A1 8/2015 Smith et al.
2015/0234556 A1 8/2015 Zhu et al.
2015/0234636 A1 8/2015 Barnes, Jr.
2015/0234800 A1 8/2015 Patrick et al.
2015/0235434 A1 8/2015 Miller et al.
2015/0237301 A1 8/2015 Shi et al.
2015/0242091 A1 8/2015 Lu et al.
2015/0242385 A1 8/2015 Bao et al.
2015/0243278 A1 8/2015 Kibre et al.
2015/0243279 A1 8/2015 Morse et al.
2015/0243283 A1 8/2015 Halash et al.
2015/0244665 A1 8/2015 Choi et al.
2015/0245154 A1 8/2015 Dadu et al.
2015/0248651 A1 9/2015 Akutagawa et al.
2015/0248886 A1 9/2015 Sarikaya et al.
2015/0249715 A1 9/2015 Helvik et al.
2015/0253146 A1 9/2015 Annapureddy et al.
2015/0253885 A1 9/2015 Kagan et al.
2015/0254057 A1 9/2015 Klein et al.
2015/0254058 A1 9/2015 Klein et al.
2015/0254333 A1 9/2015 Fife et al.
2015/0255071 A1 9/2015 Chiba
2015/0256873 A1 9/2015 Klein et al.
2015/0261298 A1 9/2015 Li
2015/0261496 A1 9/2015 Faaborg et al.
2015/0261850 A1 9/2015 Mittal
2015/0262458 A1* 9/2015 Faaborg ................ H04M 19/04 340/539.11
2015/0262583 A1 9/2015 Kanda et al.
2015/0269139 A1 9/2015 McAteer et al.
2015/0269420 A1* 9/2015 Kim ........................ G10L 17/00 382/118
2015/0269617 A1 9/2015 Mikurak
2015/0269677 A1 9/2015 Milne
2015/0269943 A1 9/2015 VanBlon et al.
2015/0277574 A1 10/2015 Jain et al.
2015/0278199 A1 10/2015 Hazen et al.
2015/0278348 A1 10/2015 Paruchuri et al.
2015/0278370 A1 10/2015 Stratvert et al.
2015/0278737 A1 10/2015 Chen Huebscher et al.
2015/0279358 A1 10/2015 Kingsbury et al.
2015/0279360 A1 10/2015 Mengibar et al.
2015/0279366 A1 10/2015 Krestnikov et al.
2015/0281380 A1 10/2015 Wang et al.
2015/0281401 A1 10/2015 Le et al.
2015/0286627 A1 10/2015 Chang et al.
2015/0286716 A1 10/2015 Snibbe et al.
2015/0286937 A1 10/2015 Hildebrand
2015/0287401 A1 10/2015 Lee et al.
2015/0287409 A1 10/2015 Jang
2015/0287411 A1 10/2015 Kojima et al.
2015/0288629 A1 10/2015 Choi et al.
2015/0294086 A1 10/2015 Kare et al.
2015/0294377 A1 10/2015 Chow
2015/0294516 A1 10/2015 Chiang
2015/0294670 A1 10/2015 Roblek et al.
2015/0295915 A1 10/2015 Xiu
2015/0301796 A1 10/2015 Visser et al.
2015/0302316 A1 10/2015 Buryak et al.
2015/0302855 A1 10/2015 Kim et al.
2015/0302856 A1 10/2015 Kim et al.
2015/0302857 A1 10/2015 Yamada
2015/0302870 A1 10/2015 Burke et al.
2015/0308470 A1 10/2015 Graham et al.
2015/0309691 A1 10/2015 Seo et al.
2015/0309997 A1 10/2015 Lee et al.
2015/0310114 A1 10/2015 Ryger et al.
2015/0310858 A1 10/2015 Li et al.
2015/0310862 A1 10/2015 Dauphin et al.
2015/0310879 A1 10/2015 Buchanan et al.
2015/0310888 A1 10/2015 Chen
2015/0312182 A1 10/2015 Langholz
2015/0312409 A1 10/2015 Czarnecki et al.
2015/0314454 A1 11/2015 Breazeal et al.
2015/0317069 A1 11/2015 Clements et al.
2015/0317310 A1 11/2015 Eiche et al.
2015/0319264 A1 11/2015 Allen et al.
2015/0319411 A1 11/2015 Kasmir et al.
2015/0324041 A1 11/2015 Varley et al.
2015/0324334 A1 11/2015 Lee et al.
2015/0324362 A1 11/2015 Glass et al.
2015/0331664 A1 11/2015 Osawa et al.
2015/0331711 A1 11/2015 Huang et al.
2015/0332667 A1 11/2015 Mason
2015/0334346 A1 11/2015 Cheatham, III et al.
2015/0339049 A1 11/2015 Kasemset et al.
2015/0339391 A1 11/2015 Kang et al.
2015/0340033 A1 11/2015 Di Fabbrizio et al.
2015/0340034 A1 11/2015 Schalkwyk et al.
2015/0340040 A1 11/2015 Mun et al.
2015/0340042 A1 11/2015 Sejnoha et al.
2015/0341717 A1 11/2015 Song et al.

(56) References Cited

U.S. PATENT DOCUMENTS

| | | | |
|---|---|---|---|
| 2015/0346845 A1 | 12/2015 | Di Censo et al. | |
| 2015/0347086 A1 | 12/2015 | Liedholm et al. | |
| 2015/0347381 A1 | 12/2015 | Bellegarda | |
| 2015/0347382 A1 | 12/2015 | Dolfing et al. | |
| 2015/0347385 A1 | 12/2015 | Flor et al. | |
| 2015/0347393 A1 | 12/2015 | Futrell et al. | |
| 2015/0347552 A1 | 12/2015 | Habouzit et al. | |
| 2015/0347733 A1 | 12/2015 | Tsou et al. | |
| 2015/0347985 A1 | 12/2015 | Gross et al. | |
| 2015/0348533 A1 | 12/2015 | Saddler et al. | |
| 2015/0348547 A1 | 12/2015 | Paulik et al. | |
| 2015/0348548 A1 | 12/2015 | Piernot et al. | |
| 2015/0348549 A1 | 12/2015 | Giuli et al. | |
| 2015/0348551 A1 | 12/2015 | Gruber et al. | |
| 2015/0348554 A1 | 12/2015 | Orr et al. | |
| 2015/0348555 A1 | 12/2015 | Sugita | |
| 2015/0348565 A1 | 12/2015 | Rhoten et al. | |
| 2015/0349934 A1 | 12/2015 | Pollack et al. | |
| 2015/0350031 A1 | 12/2015 | Burks et al. | |
| 2015/0350342 A1 | 12/2015 | Thorpe et al. | |
| 2015/0350594 A1 | 12/2015 | Mate et al. | |
| 2015/0352999 A1 | 12/2015 | Bando et al. | |
| 2015/0355879 A1 | 12/2015 | Beckhardt et al. | |
| 2015/0356410 A1 | 12/2015 | Faith et al. | |
| 2015/0363587 A1 | 12/2015 | Ahn et al. | |
| 2015/0364128 A1 | 12/2015 | Zhao et al. | |
| 2015/0364140 A1 | 12/2015 | Thörn | |
| 2015/0365251 A1 | 12/2015 | Kinoshita et al. | |
| 2015/0370531 A1 | 12/2015 | Faaborg | |
| 2015/0370780 A1 | 12/2015 | Wang et al. | |
| 2015/0370787 A1 | 12/2015 | Akbacak et al. | |
| 2015/0370884 A1 | 12/2015 | Hurley et al. | |
| 2015/0371215 A1 | 12/2015 | Zhou et al. | |
| 2015/0371529 A1 | 12/2015 | Dolecki | |
| 2015/0371639 A1 | 12/2015 | Foerster et al. | |
| 2015/0371663 A1 | 12/2015 | Gustafson et al. | |
| 2015/0371664 A1 | 12/2015 | Bar-Or et al. | |
| 2015/0371665 A1 | 12/2015 | Naik et al. | |
| 2015/0373183 A1 | 12/2015 | Woolsey et al. | |
| 2015/0379118 A1 | 12/2015 | Wickenkamp et al. | |
| 2015/0379414 A1 | 12/2015 | Yeh et al. | |
| 2015/0379993 A1 | 12/2015 | Subhojit et al. | |
| 2015/0381923 A1 | 12/2015 | Wickenkamp et al. | |
| 2015/0382047 A1 | 12/2015 | Van Os et al. | |
| 2015/0382079 A1 | 12/2015 | Lister et al. | |
| 2015/0382147 A1 | 12/2015 | Clark et al. | |
| 2015/0382164 A1* | 12/2015 | Chung | H04W 4/16 455/414.1 |
| 2016/0004499 A1 | 1/2016 | Kim et al. | |
| 2016/0004690 A1 | 1/2016 | Bangalore et al. | |
| 2016/0005320 A1 | 1/2016 | Decharms et al. | |
| 2016/0006795 A1 | 1/2016 | Yunten | |
| 2016/0012038 A1 | 1/2016 | Edwards et al. | |
| 2016/0014476 A1 | 1/2016 | Caliendo, Jr. et al. | |
| 2016/0018872 A1 | 1/2016 | Tu et al. | |
| 2016/0018900 A1 | 1/2016 | Tu et al. | |
| 2016/0018959 A1 | 1/2016 | Yamashita et al. | |
| 2016/0019886 A1 | 1/2016 | Hong | |
| 2016/0021414 A1 | 1/2016 | Padi et al. | |
| 2016/0026258 A1 | 1/2016 | Ou et al. | |
| 2016/0027431 A1 | 1/2016 | Kurzweil et al. | |
| 2016/0028666 A1 | 1/2016 | Li | |
| 2016/0028802 A1 | 1/2016 | Balasingh et al. | |
| 2016/0029316 A1 | 1/2016 | Mohan et al. | |
| 2016/0034042 A1 | 2/2016 | Joo | |
| 2016/0034811 A1 | 2/2016 | Paulik et al. | |
| 2016/0036953 A1 | 2/2016 | Lee et al. | |
| 2016/0041809 A1 | 2/2016 | Clayton et al. | |
| 2016/0042735 A1 | 2/2016 | Vibbert et al. | |
| 2016/0042748 A1 | 2/2016 | Jain et al. | |
| 2016/0043905 A1 | 2/2016 | Fiedler | |
| 2016/0048666 A1 | 2/2016 | Dey et al. | |
| 2016/0050254 A1 | 2/2016 | Rao et al. | |
| 2016/0055422 A1 | 2/2016 | Li | |
| 2016/0061623 A1 | 3/2016 | Pahwa et al. | |
| 2016/0062459 A1 | 3/2016 | Publicover et al. | |
| 2016/0062605 A1 | 3/2016 | Agarwal et al. | |
| 2016/0063094 A1 | 3/2016 | Udupa et al. | |
| 2016/0063095 A1 | 3/2016 | Nassar et al. | |
| 2016/0063998 A1 | 3/2016 | Krishnamoorthy et al. | |
| 2016/0065155 A1 | 3/2016 | Bharj et al. | |
| 2016/0065626 A1 | 3/2016 | Jain et al. | |
| 2016/0066020 A1 | 3/2016 | Mountain | |
| 2016/0070581 A1 | 3/2016 | Soon-Shiong | |
| 2016/0071516 A1 | 3/2016 | Lee et al. | |
| 2016/0071517 A1 | 3/2016 | Beaver et al. | |
| 2016/0071521 A1 | 3/2016 | Haughay | |
| 2016/0072940 A1 | 3/2016 | Cronin | |
| 2016/0077794 A1 | 3/2016 | Kim et al. | |
| 2016/0078359 A1 | 3/2016 | Csurka et al. | |
| 2016/0078860 A1 | 3/2016 | Paulik et al. | |
| 2016/0080165 A1 | 3/2016 | Ehsani et al. | |
| 2016/0080475 A1 | 3/2016 | Singh et al. | |
| 2016/0085295 A1 | 3/2016 | Shimy et al. | |
| 2016/0085827 A1 | 3/2016 | Chadha et al. | |
| 2016/0086116 A1 | 3/2016 | Rao et al. | |
| 2016/0086599 A1 | 3/2016 | Kurata et al. | |
| 2016/0088335 A1 | 3/2016 | Zucchetta | |
| 2016/0091871 A1 | 3/2016 | Marti et al. | |
| 2016/0091967 A1 | 3/2016 | Prokofieva et al. | |
| 2016/0092434 A1 | 3/2016 | Bellegarda | |
| 2016/0092447 A1 | 3/2016 | Pathurudeen et al. | |
| 2016/0092766 A1 | 3/2016 | Sainath et al. | |
| 2016/0093291 A1 | 3/2016 | Kim | |
| 2016/0093298 A1 | 3/2016 | Naik et al. | |
| 2016/0093301 A1 | 3/2016 | Bellegarda et al. | |
| 2016/0093304 A1 | 3/2016 | Kim et al. | |
| 2016/0094700 A1 | 3/2016 | Lee et al. | |
| 2016/0094889 A1 | 3/2016 | Venkataraman et al. | |
| 2016/0094979 A1 | 3/2016 | Naik et al. | |
| 2016/0098991 A1 | 4/2016 | Luo et al. | |
| 2016/0098992 A1 | 4/2016 | Renard et al. | |
| 2016/0099892 A1 | 4/2016 | Palakovich et al. | |
| 2016/0099984 A1 | 4/2016 | Karagiannis et al. | |
| 2016/0104480 A1 | 4/2016 | Sharifi | |
| 2016/0104486 A1 | 4/2016 | Penilla et al. | |
| 2016/0111091 A1 | 4/2016 | Bakish | |
| 2016/0112746 A1 | 4/2016 | Zhang et al. | |
| 2016/0112792 A1 | 4/2016 | Lee et al. | |
| 2016/0117386 A1 | 4/2016 | Ajmera et al. | |
| 2016/0118048 A1 | 4/2016 | Heide | |
| 2016/0119338 A1 | 4/2016 | Cheyer | |
| 2016/0125048 A1 | 5/2016 | Hamada | |
| 2016/0125071 A1 | 5/2016 | Gabbai | |
| 2016/0132046 A1 | 5/2016 | Beoughter et al. | |
| 2016/0132290 A1 | 5/2016 | Raux | |
| 2016/0132484 A1 | 5/2016 | Nauze et al. | |
| 2016/0132488 A1 | 5/2016 | Clark et al. | |
| 2016/0133254 A1 | 5/2016 | Vogel et al. | |
| 2016/0139662 A1 | 5/2016 | Dabhade | |
| 2016/0140951 A1 | 5/2016 | Agiomyrgiannakis et al. | |
| 2016/0140962 A1 | 5/2016 | Sharifi | |
| 2016/0147725 A1 | 5/2016 | Patten et al. | |
| 2016/0148610 A1 | 5/2016 | Kennewick, Jr. et al. | |
| 2016/0148612 A1 | 5/2016 | Guo et al. | |
| 2016/0149966 A1 | 5/2016 | Remash et al. | |
| 2016/0150020 A1 | 5/2016 | Farmer et al. | |
| 2016/0151668 A1 | 6/2016 | Barnes et al. | |
| 2016/0154624 A1 | 6/2016 | Son et al. | |
| 2016/0154880 A1 | 6/2016 | Hoarty | |
| 2016/0155442 A1 | 6/2016 | Kannan et al. | |
| 2016/0155443 A1 | 6/2016 | Khan et al. | |
| 2016/0156574 A1 | 6/2016 | Hum et al. | |
| 2016/0162456 A1 | 6/2016 | Munro et al. | |
| 2016/0163311 A1 | 6/2016 | Crook et al. | |
| 2016/0163312 A1 | 6/2016 | Naik et al. | |
| 2016/0170710 A1 | 6/2016 | Kim et al. | |
| 2016/0170966 A1 | 6/2016 | Kolo | |
| 2016/0171980 A1 | 6/2016 | Liddell et al. | |
| 2016/0173578 A1 | 6/2016 | Sharma et al. | |
| 2016/0173617 A1 | 6/2016 | Allinson | |
| 2016/0173960 A1 | 6/2016 | Snibbe et al. | |
| 2016/0179462 A1 | 6/2016 | Bjorkengren | |
| 2016/0179464 A1 | 6/2016 | Reddy et al. | |

(56) References Cited

U.S. PATENT DOCUMENTS

2016/0179787 A1 6/2016 Deleeuw
2016/0180840 A1 6/2016 Siddiq et al.
2016/0180844 A1 6/2016 Vanblon et al.
2016/0182410 A1 6/2016 Janakiraman et al.
2016/0182709 A1 6/2016 Kim et al.
2016/0188181 A1 6/2016 Smith
2016/0188738 A1 6/2016 Gruber et al.
2016/0189198 A1 6/2016 Daniel et al.
2016/0189715 A1 6/2016 Nishikawa
2016/0189717 A1 6/2016 Kannan et al.
2016/0196110 A1 7/2016 Yehoshua et al.
2016/0198319 A1 7/2016 Huang et al.
2016/0203002 A1 7/2016 Kannan et al.
2016/0203193 A1 7/2016 Kevin et al.
2016/0210551 A1 7/2016 Lee et al.
2016/0210981 A1 7/2016 Lee
2016/0212206 A1 7/2016 Wu et al.
2016/0212208 A1 7/2016 Kulkarni et al.
2016/0212488 A1 7/2016 Os et al.
2016/0217784 A1 7/2016 Gelfenbeyn et al.
2016/0217794 A1 7/2016 Imoto et al.
2016/0224540 A1 8/2016 Stewart et al.
2016/0224559 A1 8/2016 Hicks et al.
2016/0224774 A1 8/2016 Pender
2016/0225372 A1 8/2016 Cheung et al.
2016/0227107 A1 8/2016 Beaumont
2016/0227633 A1 8/2016 Sun et al.
2016/0232500 A1 8/2016 Wang et al.
2016/0239568 A1 8/2016 Packer et al.
2016/0239645 A1 8/2016 Heo et al.
2016/0239848 A1 8/2016 Chang et al.
2016/0240187 A1 8/2016 Fleizach et al.
2016/0240189 A1 8/2016 Lee et al.
2016/0240192 A1 8/2016 Raghuvir
2016/0247061 A1 8/2016 Trask et al.
2016/0249319 A1 8/2016 Dotan-Cohen et al.
2016/0253312 A1 9/2016 Rhodes
2016/0253528 A1 9/2016 Gao et al.
2016/0259623 A1 9/2016 Sumner et al.
2016/0259656 A1 9/2016 Sumner et al.
2016/0259779 A1 9/2016 Labsky et al.
2016/0260431 A1 9/2016 Newendorp et al.
2016/0260433 A1 9/2016 Sumner et al.
2016/0260434 A1 9/2016 Gelfenbeyn et al.
2016/0260436 A1 9/2016 Lemay et al.
2016/0262442 A1 9/2016 Davila et al.
2016/0266871 A1 9/2016 Schmid et al.
2016/0267904 A1 9/2016 Biadsy et al.
2016/0274938 A1 9/2016 Calvanese Strinati et al.
2016/0275941 A1 9/2016 Bellegarda et al.
2016/0275947 A1 9/2016 Li et al.
2016/0282824 A1 9/2016 Smallwood et al.
2016/0282956 A1 9/2016 Ouyang et al.
2016/0283185 A1 9/2016 Mclaren et al.
2016/0284005 A1 9/2016 Daniel et al.
2016/0284199 A1 9/2016 Dotan-Cohen et al.
2016/0285808 A1 9/2016 Franklin et al.
2016/0286045 A1 9/2016 Shaltiel et al.
2016/0292603 A1 10/2016 Prajapati et al.
2016/0293157 A1 10/2016 Chen et al.
2016/0293168 A1 10/2016 Chen
2016/0294755 A1 10/2016 Prabhu
2016/0299685 A1 10/2016 Zhai et al.
2016/0299882 A1 10/2016 Hegerty et al.
2016/0299883 A1 10/2016 Zhu et al.
2016/0299977 A1 10/2016 Hreha
2016/0300571 A1 10/2016 Foerster et al.
2016/0301639 A1 10/2016 Liu et al.
2016/0306683 A1 10/2016 Standley et al.
2016/0307566 A1 10/2016 Bellegarda
2016/0308799 A1 10/2016 Schubert et al.
2016/0309035 A1 10/2016 Li
2016/0313906 A1 10/2016 Kilchenko et al.
2016/0314788 A1 10/2016 Jitkoff et al.
2016/0314789 A1 10/2016 Marcheret et al.
2016/0314792 A1 10/2016 Alvarez et al.
2016/0315996 A1 10/2016 Ha et al.
2016/0317924 A1 11/2016 Tanaka et al.
2016/0321239 A1 11/2016 Iso-Sipilä et al.
2016/0321261 A1 11/2016 Spasojevic et al.
2016/0321358 A1 11/2016 Kanani et al.
2016/0322043 A1 11/2016 Bellegarda
2016/0322044 A1 11/2016 Jung et al.
2016/0322045 A1 11/2016 Hatfield et al.
2016/0322048 A1 11/2016 Amano et al.
2016/0322050 A1 11/2016 Wang et al.
2016/0328147 A1 11/2016 Zhang et al.
2016/0328205 A1 11/2016 Agrawal et al.
2016/0328893 A1 11/2016 Cordova et al.
2016/0329060 A1 11/2016 Ito et al.
2016/0334973 A1 11/2016 Reckhow et al.
2016/0335138 A1 11/2016 Surti et al.
2016/0335139 A1 11/2016 Hurley et al.
2016/0335532 A1 11/2016 Sanghavi et al.
2016/0336007 A1 11/2016 Hanazawa et al.
2016/0336010 A1 11/2016 Lindahl
2016/0336011 A1 11/2016 Koll et al.
2016/0336024 A1 11/2016 Choi et al.
2016/0337299 A1 11/2016 Lane et al.
2016/0337301 A1 11/2016 Rollins et al.
2016/0342317 A1 11/2016 Lim et al.
2016/0342685 A1 11/2016 Basu et al.
2016/0342781 A1 11/2016 Jeon
2016/0350650 A1 12/2016 Leeman-Munk et al.
2016/0351190 A1 12/2016 Piernot et al.
2016/0352567 A1 12/2016 Robbins et al.
2016/0352924 A1 12/2016 Senarath et al.
2016/0357304 A1 12/2016 Hatori et al.
2016/0357728 A1 12/2016 Bellegarda et al.
2016/0357790 A1 12/2016 Elkington et al.
2016/0357861 A1 12/2016 Carlhian et al.
2016/0357870 A1 12/2016 Hentschel et al.
2016/0358598 A1 12/2016 Williams et al.
2016/0358600 A1 12/2016 Nallasamy et al.
2016/0358619 A1 12/2016 Ramprashad et al.
2016/0359771 A1 12/2016 Sridhar
2016/0360039 A1 12/2016 Sanghavi et al.
2016/0360336 A1 12/2016 Gross et al.
2016/0360382 A1 12/2016 Gross et al.
2016/0364378 A1 12/2016 Futrell et al.
2016/0365101 A1 12/2016 Foy et al.
2016/0371250 A1 12/2016 Rhodes
2016/0372112 A1 12/2016 Miller et al.
2016/0372119 A1 12/2016 Sak et al.
2016/0378747 A1 12/2016 Orr et al.
2016/0379091 A1 12/2016 Lin et al.
2016/0379626 A1 12/2016 Deisher et al.
2016/0379632 A1 12/2016 Hoffmeister et al.
2016/0379633 A1 12/2016 Lehman et al.
2016/0379639 A1 12/2016 Weinstein et al.
2016/0379641 A1 12/2016 Liu et al.
2017/0000348 A1 1/2017 Karsten et al.
2017/0003931 A1 1/2017 Dvortsov et al.
2017/0004824 A1 1/2017 Yoo et al.
2017/0005818 A1 1/2017 Gould
2017/0006329 A1 1/2017 Jang et al.
2017/0011091 A1 1/2017 Chehreghani
2017/0011279 A1 1/2017 Soldevila et al.
2017/0011303 A1 1/2017 Annapureddy et al.
2017/0011742 A1 1/2017 Jing et al.
2017/0013124 A1 1/2017 Havelka et al.
2017/0013331 A1 1/2017 Watanabe et al.
2017/0018271 A1 1/2017 Khan et al.
2017/0019987 A1 1/2017 Dragone et al.
2017/0023963 A1 1/2017 Davis et al.
2017/0025124 A1 1/2017 Mixter et al.
2017/0026318 A1 1/2017 Daniel et al.
2017/0026509 A1 1/2017 Rand
2017/0027522 A1 2/2017 Van Hasselt et al.
2017/0031576 A1 2/2017 Saoji et al.
2017/0032783 A1 2/2017 Lord et al.
2017/0032787 A1 2/2017 Dayal
2017/0032791 A1 2/2017 Elson et al.
2017/0039283 A1 2/2017 Bennett et al.

(56) References Cited

U.S. PATENT DOCUMENTS

2017/0039475 A1 2/2017 Cheyer et al.
2017/0040002 A1 2/2017 Basson et al.
2017/0041388 A1 2/2017 Tal et al.
2017/0047063 A1 2/2017 Ohmura et al.
2017/0052760 A1 2/2017 Johnson et al.
2017/0053652 A1 2/2017 Choi et al.
2017/0055895 A1 3/2017 Jardins et al.
2017/0060385 A1* 3/2017 Goldsmith ............ H04M 1/725
2017/0060853 A1 3/2017 Lee et al.
2017/0061423 A1 3/2017 Bryant et al.
2017/0068423 A1 3/2017 Napolitano et al.
2017/0068513 A1 3/2017 Stasior et al.
2017/0068550 A1 3/2017 Zeitlin
2017/0068670 A1 3/2017 Orr et al.
2017/0069308 A1 3/2017 Aleksic et al.
2017/0075653 A1 3/2017 Dawidowsky et al.
2017/0076720 A1 3/2017 Gopalan et al.
2017/0076721 A1 3/2017 Bargetzi et al.
2017/0078490 A1 3/2017 Kaminsky et al.
2017/0083179 A1 3/2017 Gruber et al.
2017/0083285 A1 3/2017 Meyers et al.
2017/0083504 A1 3/2017 Huang
2017/0084277 A1 3/2017 Sharifi
2017/0085547 A1 3/2017 De Aguiar et al.
2017/0085696 A1 3/2017 Abkairov
2017/0090428 A1 3/2017 Oohara
2017/0090569 A1 3/2017 Levesque
2017/0091168 A1 3/2017 Bellegarda et al.
2017/0091169 A1 3/2017 Bellegarda et al.
2017/0091612 A1 3/2017 Gruber et al.
2017/0092259 A1 3/2017 Jeon
2017/0092270 A1 3/2017 Newendorp et al.
2017/0092278 A1 3/2017 Evermann et al.
2017/0093356 A1 3/2017 Cudak et al.
2017/0097743 A1 4/2017 Hameed et al.
2017/0102837 A1 4/2017 Toumpelis
2017/0102915 A1 4/2017 Kuscher et al.
2017/0103749 A1 4/2017 Zhao et al.
2017/0103752 A1 4/2017 Senior et al.
2017/0105190 A1 4/2017 Logan et al.
2017/0110117 A1 4/2017 Chakladar et al.
2017/0110125 A1 4/2017 Xu et al.
2017/0116177 A1 4/2017 Walia
2017/0116982 A1 4/2017 Gelfenbeyn et al.
2017/0116987 A1 4/2017 Kang et al.
2017/0116989 A1 4/2017 Yadgar et al.
2017/0124190 A1 5/2017 Wang et al.
2017/0124311 A1 5/2017 Li et al.
2017/0125016 A1 5/2017 Wang
2017/0127124 A9 5/2017 Wilson et al.
2017/0131778 A1 5/2017 Iyer
2017/0132019 A1 5/2017 Karashchuk et al.
2017/0132199 A1 5/2017 Vescovi et al.
2017/0133007 A1 5/2017 Drewes
2017/0140041 A1 5/2017 Dotan-Cohen et al.
2017/0140052 A1 5/2017 Bufe, III et al.
2017/0140644 A1 5/2017 Hwang et al.
2017/0140760 A1 5/2017 Sachdev
2017/0147722 A1 5/2017 Greenwood
2017/0147841 A1 5/2017 Stagg et al.
2017/0148044 A1 5/2017 Fukuda et al.
2017/0154033 A1 6/2017 Lee
2017/0154055 A1 6/2017 Dimson et al.
2017/0154176 A1* 6/2017 Yun ......................... G10L 15/22
2017/0155940 A1 6/2017 Jin et al.
2017/0155965 A1 6/2017 Ward
2017/0161018 A1 6/2017 Lemay et al.
2017/0161268 A1 6/2017 Badaskar
2017/0161293 A1 6/2017 Ionescu et al.
2017/0161393 A1 6/2017 Oh et al.
2017/0161500 A1 6/2017 Yang
2017/0162191 A1 6/2017 Grost et al.
2017/0162202 A1 6/2017 Formhals et al.
2017/0162203 A1 6/2017 Huang et al.
2017/0169506 A1 6/2017 Wishne et al.
2017/0169818 A1 6/2017 Vanblon et al.
2017/0169819 A1 6/2017 Mese et al.
2017/0177080 A1 6/2017 Deleeuw
2017/0177547 A1 6/2017 Ciereszko et al.
2017/0178619 A1 6/2017 Naik et al.
2017/0178620 A1 6/2017 Fleizach et al.
2017/0178626 A1 6/2017 Gruber et al.
2017/0180499 A1 6/2017 Gelfenbeyn et al.
2017/0185375 A1 6/2017 Martel et al.
2017/0185581 A1 6/2017 Bojja et al.
2017/0186429 A1 6/2017 Giuli et al.
2017/0187711 A1 6/2017 Joo et al.
2017/0193083 A1 7/2017 Bhatt et al.
2017/0195493 A1 7/2017 Sudarsan et al.
2017/0195495 A1 7/2017 Deora et al.
2017/0195636 A1 7/2017 Child et al.
2017/0199870 A1 7/2017 Zheng et al.
2017/0199874 A1 7/2017 Patel et al.
2017/0200066 A1 7/2017 Wang et al.
2017/0201609 A1 7/2017 Salmenkaita et al.
2017/0201613 A1 7/2017 Engelke et al.
2017/0206899 A1 7/2017 Bryant et al.
2017/0215052 A1 7/2017 Koum et al.
2017/0220212 A1 8/2017 Yang et al.
2017/0221486 A1 8/2017 Kurata et al.
2017/0223189 A1 8/2017 Meredith et al.
2017/0227935 A1 8/2017 Su et al.
2017/0228367 A1 8/2017 Pasupalak et al.
2017/0228382 A1 8/2017 Haviv et al.
2017/0229121 A1 8/2017 Taki et al.
2017/0230429 A1 8/2017 Garmark et al.
2017/0230497 A1 8/2017 Kim et al.
2017/0230709 A1 8/2017 Van Os et al.
2017/0235361 A1 8/2017 Rigazio et al.
2017/0235618 A1 8/2017 Lin et al.
2017/0235721 A1 8/2017 Almosallam et al.
2017/0236512 A1 8/2017 Williams et al.
2017/0236514 A1 8/2017 Nelson
2017/0238039 A1 8/2017 Sabattini
2017/0242478 A1 8/2017 Ma
2017/0242653 A1 8/2017 Lang et al.
2017/0242657 A1 8/2017 Jarvis et al.
2017/0242840 A1 8/2017 Lu et al.
2017/0243468 A1 8/2017 Dotan-Cohen et al.
2017/0243576 A1 8/2017 Millington et al.
2017/0243586 A1 8/2017 Civelli et al.
2017/0249309 A1 8/2017 Sarikaya
2017/0256256 A1 9/2017 Wang et al.
2017/0262051 A1 9/2017 Tall et al.
2017/0263247 A1 9/2017 Kang et al.
2017/0263248 A1 9/2017 Gruber et al.
2017/0263249 A1 9/2017 Akbacak et al.
2017/0263254 A1 9/2017 Dewan et al.
2017/0264451 A1 9/2017 Yu et al.
2017/0264711 A1 9/2017 Natarajan et al.
2017/0270822 A1 9/2017 Cohen
2017/0270912 A1 9/2017 Levit et al.
2017/0278514 A1 9/2017 Mathias et al.
2017/0279795 A1* 9/2017 Redberg ............. H04L 63/0861
2017/0285915 A1 10/2017 Napolitano et al.
2017/0286397 A1 10/2017 Gonzalez
2017/0287472 A1 10/2017 Ogawa et al.
2017/0289305 A1 10/2017 Liensberger et al.
2017/0295446 A1 10/2017 Shivappa
2017/0301348 A1 10/2017 Chen et al.
2017/0308552 A1 10/2017 Soni et al.
2017/0308609 A1 10/2017 Berkhin et al.
2017/0311005 A1 10/2017 Lin
2017/0316775 A1 11/2017 Le et al.
2017/0316782 A1 11/2017 Haughay
2017/0319123 A1 11/2017 Voss et al.
2017/0323637 A1 11/2017 Naik
2017/0329466 A1 11/2017 Krenkler et al.
2017/0329490 A1 11/2017 Esinovskaya et al.
2017/0329572 A1 11/2017 Shah et al.
2017/0329630 A1 11/2017 Jann et al.
2017/0330567 A1 11/2017 Van Wissen et al.
2017/0336920 A1 11/2017 Chan et al.
2017/0337035 A1 11/2017 Choudhary et al.

(56) References Cited

U.S. PATENT DOCUMENTS

2017/0337478 A1 11/2017 Sarikaya et al.
2017/0337540 A1* 11/2017 Buckman ................ G10L 17/06
2017/0345411 A1 11/2017 Raitio et al.
2017/0345420 A1 11/2017 Barnett, Jr.
2017/0345429 A1 11/2017 Hardee et al.
2017/0346949 A1 11/2017 Sanghavi et al.
2017/0351487 A1 12/2017 Avilés-Casco et al.
2017/0352346 A1 12/2017 Paulik et al.
2017/0352350 A1 12/2017 Booker et al.
2017/0357478 A1 12/2017 Piersol et al.
2017/0357529 A1 12/2017 Venkatraman et al.
2017/0357632 A1 12/2017 Pagallo et al.
2017/0357633 A1 12/2017 Wang et al.
2017/0357637 A1 12/2017 Nell et al.
2017/0357640 A1 12/2017 Bellegarda et al.
2017/0357716 A1 12/2017 Bellegarda et al.
2017/0358300 A1 12/2017 Laurens et al.
2017/0358301 A1 12/2017 Raitio et al.
2017/0358302 A1 12/2017 Orr et al.
2017/0358303 A1 12/2017 Walker et al.
2017/0358304 A1 12/2017 Castillo et al.
2017/0358305 A1 12/2017 Kudurshian et al.
2017/0358317 A1 12/2017 James
2017/0359680 A1 12/2017 Ledvina et al.
2017/0365251 A1 12/2017 Park et al.
2017/0371509 A1 12/2017 Jung et al.
2017/0371885 A1 12/2017 Aggarwal et al.
2017/0374093 A1 12/2017 Dhar et al.
2017/0374176 A1 12/2017 Agrawal et al.
2018/0004372 A1 1/2018 Zurek et al.
2018/0004396 A1 1/2018 Ying
2018/0005112 A1 1/2018 Iso-Sipila et al.
2018/0007060 A1 1/2018 Leblang et al.
2018/0007096 A1 1/2018 Levin et al.
2018/0007210 A1* 1/2018 Todasco .................. G10L 15/22
2018/0007538 A1 1/2018 Naik et al.
2018/0012596 A1 1/2018 Piernot et al.
2018/0018248 A1 1/2018 Bhargava et al.
2018/0018590 A1 1/2018 Szeto et al.
2018/0018814 A1 1/2018 Patrik et al.
2018/0024985 A1 1/2018 Asano
2018/0025124 A1 1/2018 Mohr et al.
2018/0025287 A1 1/2018 Mathew et al.
2018/0028918 A1 2/2018 Tang et al.
2018/0033431 A1 2/2018 Newendorp et al.
2018/0033435 A1 2/2018 Jacobs, II
2018/0033436 A1 2/2018 Zhou
2018/0046340 A1 2/2018 Mall
2018/0047201 A1 2/2018 Filev et al.
2018/0047391 A1 2/2018 Baik et al.
2018/0047393 A1 2/2018 Tian et al.
2018/0047406 A1 2/2018 Park
2018/0052909 A1 2/2018 Sharifi et al.
2018/0054505 A1 2/2018 Hart et al.
2018/0060032 A1 3/2018 Boesen
2018/0060301 A1 3/2018 Li et al.
2018/0060312 A1 3/2018 Won
2018/0060555 A1 3/2018 Boesen
2018/0061400 A1 3/2018 Carbune et al.
2018/0061401 A1 3/2018 Sarikaya et al.
2018/0062691 A1 3/2018 Barnett, Jr.
2018/0063308 A1 3/2018 Crystal et al.
2018/0063324 A1 3/2018 Van Meter, II
2018/0063624 A1 3/2018 Boesen
2018/0067904 A1 3/2018 Li
2018/0067914 A1 3/2018 Chen et al.
2018/0067918 A1 3/2018 Bellegarda et al.
2018/0068074 A1 3/2018 Shen
2018/0069743 A1 3/2018 Bakken et al.
2018/0075847 A1 3/2018 Lee et al.
2018/0075849 A1 3/2018 Khoury et al.
2018/0077095 A1 3/2018 Deyle et al.
2018/0082692 A1 3/2018 Khoury et al.
2018/0088969 A1 3/2018 Vanblon et al.
2018/0089166 A1 3/2018 Meyer et al.
2018/0089588 A1 3/2018 Ravi et al.
2018/0090143 A1 3/2018 Saddler et al.
2018/0091604 A1 3/2018 Yamashita et al.
2018/0091847 A1 3/2018 Wu et al.
2018/0096683 A1 4/2018 James et al.
2018/0096690 A1 4/2018 Mixter et al.
2018/0101599 A1 4/2018 Kenneth et al.
2018/0101925 A1 4/2018 Brinig et al.
2018/0102914 A1 4/2018 Kawachi et al.
2018/0107917 A1 4/2018 Hewavitharana et al.
2018/0107945 A1 4/2018 Gao et al.
2018/0108346 A1 4/2018 Paulik et al.
2018/0108351 A1 4/2018 Beckhardt et al.
2018/0108357 A1 4/2018 Liu
2018/0113673 A1 4/2018 Sheynblat
2018/0121432 A1 5/2018 Parson et al.
2018/0122376 A1 5/2018 Kojima
2018/0122378 A1 5/2018 Mixter et al.
2018/0126260 A1 5/2018 Chansoriya et al.
2018/0129967 A1 5/2018 Herreshoff
2018/0130470 A1 5/2018 Lemay et al.
2018/0130471 A1 5/2018 Trufinescu et al.
2018/0137856 A1 5/2018 Gilbert
2018/0137857 A1 5/2018 Zhou et al.
2018/0137865 A1 5/2018 Ling
2018/0143857 A1 5/2018 Anbazhagan et al.
2018/0143967 A1 5/2018 Anbazhagan et al.
2018/0144465 A1 5/2018 Hsieh et al.
2018/0144615 A1 5/2018 Kinney et al.
2018/0144746 A1 5/2018 Mishra et al.
2018/0144748 A1* 5/2018 Leong ..................... G10L 15/22
2018/0146089 A1 5/2018 Rauenbuehler et al.
2018/0150744 A1 5/2018 Orr et al.
2018/0152557 A1 5/2018 White et al.
2018/0157372 A1 6/2018 Kurabayashi
2018/0157992 A1 6/2018 Susskind et al.
2018/0158548 A1 6/2018 Taheri et al.
2018/0158552 A1 6/2018 Liu et al.
2018/0165857 A1 6/2018 Lee et al.
2018/0166076 A1 6/2018 Higuchi et al.
2018/0167884 A1 6/2018 Dawid et al.
2018/0173403 A1 6/2018 Carbune et al.
2018/0173542 A1 6/2018 Chan et al.
2018/0174406 A1 6/2018 Arashi et al.
2018/0174576 A1 6/2018 Soltau et al.
2018/0174597 A1 6/2018 Lee et al.
2018/0182376 A1 6/2018 Gysel et al.
2018/0188840 A1 7/2018 Tamura et al.
2018/0188948 A1 7/2018 Ouyang et al.
2018/0189267 A1 7/2018 Takiel
2018/0190263 A1 7/2018 Calef, III
2018/0190273 A1 7/2018 Karimli et al.
2018/0190279 A1 7/2018 Anderson et al.
2018/0191670 A1 7/2018 Suyama
2018/0196683 A1 7/2018 Radebaugh et al.
2018/0210874 A1 7/2018 Fuxman et al.
2018/0213448 A1 7/2018 Segal et al.
2018/0217810 A1 8/2018 Agrawal
2018/0218735 A1 8/2018 Hunt et al.
2018/0221783 A1 8/2018 Gamero
2018/0225131 A1 8/2018 Tommy et al.
2018/0225274 A1 8/2018 Tommy et al.
2018/0232203 A1 8/2018 Gelfenbeyn et al.
2018/0232688 A1 8/2018 Pike et al.
2018/0233132 A1 8/2018 Herold et al.
2018/0233140 A1 8/2018 Koishida et al.
2018/0247065 A1 8/2018 Rhee et al.
2018/0253209 A1 9/2018 Jaygarl et al.
2018/0253652 A1 9/2018 Palzer et al.
2018/0260680 A1 9/2018 Finkelstein et al.
2018/0268023 A1 9/2018 Korpusik et al.
2018/0268106 A1 9/2018 Velaga
2018/0270343 A1 9/2018 Rout et al.
2018/0275839 A1 9/2018 Kocienda et al.
2018/0276197 A1 9/2018 Nell et al.
2018/0277113 A1 9/2018 Hartung et al.
2018/0278740 A1 9/2018 Choi et al.
2018/0285056 A1 10/2018 Cutler et al.
2018/0288104 A1* 10/2018 Padilla ................... G10L 15/22

(56) References Cited

U.S. PATENT DOCUMENTS

2018/0293984 A1 10/2018 Lindahl
2018/0293988 A1 10/2018 Huang et al.
2018/0293989 A1 10/2018 De et al.
2018/0299878 A1 10/2018 Cella et al.
2018/0300317 A1 10/2018 Bradbury
2018/0300400 A1 10/2018 Paulus
2018/0300608 A1 10/2018 Sevrens et al.
2018/0308470 A1 10/2018 Park et al.
2018/0308477 A1 10/2018 Nagasaka
2018/0308480 A1 10/2018 Jang et al.
2018/0308485 A1 10/2018 Kudurshian et al.
2018/0308486 A1 10/2018 Saddler et al.
2018/0314362 A1 11/2018 Kim et al.
2018/0314552 A1 11/2018 Kim et al.
2018/0315416 A1 11/2018 Berthelsen et al.
2018/0322112 A1 11/2018 Bellegarda et al.
2018/0322881 A1 11/2018 Min et al.
2018/0324518 A1 11/2018 Dusan et al.
2018/0329677 A1 11/2018 Gruber et al.
2018/0329957 A1 11/2018 Frazzingaro et al.
2018/0329982 A1 11/2018 Patel et al.
2018/0329998 A1 11/2018 Thomson et al.
2018/0330714 A1 11/2018 Paulik et al.
2018/0330721 A1 11/2018 Thomson et al.
2018/0330722 A1 11/2018 Newendorp et al.
2018/0330723 A1 11/2018 Acero et al.
2018/0330729 A1 11/2018 Golipour et al.
2018/0330730 A1 11/2018 Garg et al.
2018/0330731 A1 11/2018 Zeitlin et al.
2018/0330733 A1 11/2018 Orr et al.
2018/0330737 A1 11/2018 Paulik et al.
2018/0332118 A1 11/2018 Phipps et al.
2018/0332389 A1 11/2018 Ekkizogloy et al.
2018/0335903 A1 11/2018 Coffman et al.
2018/0336049 A1 11/2018 Mukherjee et al.
2018/0336184 A1 11/2018 Bellegarda et al.
2018/0336197 A1 11/2018 Skilling et al.
2018/0336275 A1 11/2018 Graham et al.
2018/0336439 A1 11/2018 Kliger et al.
2018/0336449 A1 11/2018 Adan et al.
2018/0336880 A1 11/2018 Arik et al.
2018/0336885 A1 11/2018 Mukherjee et al.
2018/0336892 A1 11/2018 Kim et al.
2018/0336894 A1 11/2018 Graham et al.
2018/0336904 A1 11/2018 Piercy et al.
2018/0336905 A1 11/2018 Kim et al.
2018/0336911 A1 11/2018 Dahl et al.
2018/0336920 A1 11/2018 Bastian et al.
2018/0338191 A1 11/2018 Van Scheltinga et al.
2018/0341643 A1 11/2018 Alders et al.
2018/0343557 A1 11/2018 Naik et al.
2018/0349084 A1 12/2018 Nagasaka et al.
2018/0349346 A1 12/2018 Hatori et al.
2018/0349349 A1 12/2018 Bellegarda et al.
2018/0349447 A1 12/2018 Maccartney et al.
2018/0349472 A1 12/2018 Kohlschuetter et al.
2018/0349728 A1 12/2018 Wang et al.
2018/0350345 A1 12/2018 Naik
2018/0350353 A1 12/2018 Gruber et al.
2018/0357073 A1 12/2018 Johnson et al.
2018/0357308 A1 12/2018 Cheyer
2018/0358015 A1 12/2018 Cash et al.
2018/0358019 A1 12/2018 Mont-Reynaud
2018/0365653 A1 12/2018 Cleaver et al.
2018/0366105 A1 12/2018 Kim
2018/0373487 A1 12/2018 Gruber et al.
2018/0373493 A1 12/2018 Watson et al.
2018/0373796 A1 12/2018 Rathod
2018/0374484 A1 12/2018 Huang et al.
2019/0005024 A1 1/2019 Somech et al.
2019/0012141 A1 1/2019 Piersol et al.
2019/0012449 A1 1/2019 Cheyer
2019/0012599 A1 1/2019 El Kaliouby et al.
2019/0013018 A1 1/2019 Rekstad
2019/0013025 A1 1/2019 Alcorn et al.
2019/0014450 A1 1/2019 Gruber et al.
2019/0019077 A1 1/2019 Griffin et al.
2019/0027152 A1 1/2019 Huang et al.
2019/0034040 A1 1/2019 Shah et al.
2019/0034826 A1 1/2019 Ahmad et al.
2019/0035405 A1 1/2019 Haughay
2019/0037258 A1 1/2019 Lewis et al.
2019/0042059 A1 2/2019 Baer
2019/0042627 A1 2/2019 Osotio et al.
2019/0043507 A1 2/2019 Huang et al.
2019/0044854 A1 2/2019 Yang et al.
2019/0045040 A1 2/2019 Lee et al.
2019/0051309 A1 2/2019 Kim et al.
2019/0057697 A1 2/2019 Giuli et al.
2019/0065144 A1 2/2019 Sumner et al.
2019/0065993 A1 2/2019 Srinivasan et al.
2019/0066674 A1 2/2019 Jaygarl et al.
2019/0068810 A1 2/2019 Okamoto et al.
2019/0073607 A1 3/2019 Jia et al.
2019/0073998 A1 3/2019 Leblang et al.
2019/0074009 A1 3/2019 Kim et al.
2019/0074015 A1 3/2019 Orr et al.
2019/0074016 A1 3/2019 Orr et al.
2019/0079476 A1 3/2019 Funes
2019/0080685 A1 3/2019 Johnson, Jr.
2019/0080698 A1 3/2019 Miller
2019/0082044 A1 3/2019 Melendez et al.
2019/0087412 A1 3/2019 Seyed Ibrahim et al.
2019/0087455 A1 3/2019 He et al.
2019/0095050 A1 3/2019 Gruber et al.
2019/0095171 A1 3/2019 Carson et al.
2019/0102145 A1 4/2019 Wilberding et al.
2019/0102378 A1 4/2019 Piernot et al.
2019/0102381 A1 4/2019 Futrell et al.
2019/0103103 A1 4/2019 Ni et al.
2019/0103112 A1 4/2019 Walker et al.
2019/0116264 A1 4/2019 Sanghavi et al.
2019/0122666 A1 4/2019 Raitio et al.
2019/0122692 A1 4/2019 Binder et al.
2019/0124019 A1 4/2019 Leon et al.
2019/0129499 A1 5/2019 Li
2019/0129615 A1 5/2019 Sundar et al.
2019/0132694 A1 5/2019 Hanes et al.
2019/0134501 A1 5/2019 Feder et al.
2019/0138704 A1 5/2019 Shrivastava et al.
2019/0139541 A1 5/2019 Andersen et al.
2019/0139563 A1 5/2019 Chen et al.
2019/0141494 A1 5/2019 Gross et al.
2019/0147052 A1 5/2019 Lu et al.
2019/0147369 A1 5/2019 Gupta et al.
2019/0147880 A1 5/2019 Booker et al.
2019/0149972 A1 5/2019 Parks et al.
2019/0156830 A1 5/2019 Devaraj et al.
2019/0158994 A1 5/2019 Gross et al.
2019/0164546 A1 5/2019 Piernot et al.
2019/0172467 A1 6/2019 Kim et al.
2019/0173996 A1 6/2019 Butcher et al.
2019/0179607 A1 6/2019 Thangarathnam et al.
2019/0179890 A1 6/2019 Evermann
2019/0180770 A1 6/2019 Kothari et al.
2019/0182176 A1* 6/2019 Niewczas ............... G10L 15/22
2019/0187787 A1 6/2019 White et al.
2019/0188326 A1 6/2019 Daianu et al.
2019/0188328 A1 6/2019 Oyenan et al.
2019/0189118 A1 6/2019 Piernot et al.
2019/0189125 A1 6/2019 Van Os et al.
2019/0197053 A1 6/2019 Graham et al.
2019/0213601 A1 7/2019 Hackman et al.
2019/0213774 A1 7/2019 Jiao et al.
2019/0213999 A1 7/2019 Grupen et al.
2019/0214024 A1 7/2019 Gruber et al.
2019/0220245 A1 7/2019 Martel et al.
2019/0220246 A1 7/2019 Orr et al.
2019/0220247 A1 7/2019 Lemay et al.
2019/0220704 A1 7/2019 Schulz-Trieglaff et al.
2019/0220727 A1 7/2019 Dohrmann et al.
2019/0222684 A1 7/2019 Li et al.
2019/0230215 A1 7/2019 Zhu et al.
2019/0230426 A1 7/2019 Chun

(56) References Cited

U.S. PATENT DOCUMENTS

2019/0236130 A1 8/2019 Li et al.
2019/0236459 A1 8/2019 Cheyer et al.
2019/0244618 A1 8/2019 Newendorp et al.
2019/0251167 A1 8/2019 Krishnapura Subbaraya et al.
2019/0251339 A1 8/2019 Hawker
2019/0251960 A1 8/2019 Maker et al.
2019/0259386 A1 8/2019 Kudurshian et al.
2019/0272825 A1 9/2019 O'Malley et al.
2019/0272831 A1 9/2019 Kajarekar
2019/0273963 A1 9/2019 Jobanputra et al.
2019/0278841 A1 9/2019 Pusateri et al.
2019/0287012 A1 9/2019 Celikyilmaz et al.
2019/0287522 A1 9/2019 Lambourne et al.
2019/0295529 A1 9/2019 Tomita
2019/0295544 A1 9/2019 Garcia et al.
2019/0303442 A1 10/2019 Peitz et al.
2019/0310765 A1 10/2019 Napolitano et al.
2019/0311708 A1 10/2019 Bengio et al.
2019/0318722 A1 10/2019 Bromand
2019/0318724 A1 10/2019 Chao et al.
2019/0318725 A1 10/2019 Le Roux et al.
2019/0318732 A1 10/2019 Huang et al.
2019/0318735 A1 10/2019 Chao et al.
2019/0318739 A1 10/2019 Garg et al.
2019/0339784 A1 11/2019 Lemay et al.
2019/0341027 A1 11/2019 Vescovi et al.
2019/0341056 A1 11/2019 Paulik et al.
2019/0347063 A1 11/2019 Liu et al.
2019/0348022 A1 11/2019 Park et al.
2019/0354548 A1 11/2019 Orr et al.
2019/0355346 A1 11/2019 Bellegarda
2019/0355384 A1 11/2019 Sereshki et al.
2019/0361729 A1 11/2019 Gruber et al.
2019/0369748 A1 12/2019 Hindi et al.
2019/0369842 A1 12/2019 Dolbakian et al.
2019/0369868 A1 12/2019 Jin et al.
2019/0370292 A1 12/2019 Irani et al.
2019/0370323 A1 12/2019 Davidson et al.
2019/0371315 A1 12/2019 Newendorp et al.
2019/0371316 A1 12/2019 Weinstein et al.
2019/0371317 A1 12/2019 Irani et al.
2019/0371331 A1 12/2019 Schramm et al.
2019/0372902 A1 12/2019 Piersol
2019/0373102 A1 12/2019 Weinstein et al.
2019/0385418 A1 12/2019 Mixter et al.
2019/0387352 A1 12/2019 Jot et al.
2020/0019609 A1 1/2020 Yu et al.
2020/0020326 A1 1/2020 Srinivasan et al.
2020/0035224 A1 1/2020 Ward et al.
2020/0042334 A1 2/2020 Radebaugh et al.
2020/0043482 A1 2/2020 Gruber et al.
2020/0043489 A1 2/2020 Bradley et al.
2020/0044485 A1 2/2020 Smith et al.
2020/0051583 A1 2/2020 Wu et al.
2020/0053218 A1 2/2020 Gray
2020/0058299 A1 2/2020 Lee et al.
2020/0065601 A1 2/2020 Andreassen
2020/0073629 A1 3/2020 Lee et al.
2020/0075018 A1 3/2020 Chen
2020/0076538 A1 3/2020 Soultan et al.
2020/0081615 A1 3/2020 Lu et al.
2020/0090393 A1 3/2020 Shin et al.
2020/0091958 A1 3/2020 Curtis et al.
2020/0092625 A1 3/2020 Raffle
2020/0098362 A1 3/2020 Piernot et al.
2020/0098368 A1 3/2020 Lemay et al.
2020/0104357 A1 4/2020 Bellegarda et al.
2020/0104362 A1 4/2020 Yang et al.
2020/0104369 A1 4/2020 Bellegarda
2020/0104668 A1 4/2020 Sanghavi et al.
2020/0105260 A1 4/2020 Piernot et al.
2020/0117717 A1 4/2020 Ramamurti et al.
2020/0118566 A1 4/2020 Zhou
2020/0118568 A1 4/2020 Kudurshian et al.
2020/0125820 A1 4/2020 Kim et al.
2020/0127988 A1 4/2020 Bradley et al.
2020/0134316 A1 4/2020 Krishnamurthy et al.
2020/0135029 A1 4/2020 Raichelgauz et al.
2020/0135180 A1 4/2020 Mukherjee et al.
2020/0137230 A1 4/2020 Spohrer
2020/0143812 A1 5/2020 Walker, II et al.
2020/0143819 A1 5/2020 Delcroix et al.
2020/0152186 A1 5/2020 Koh et al.
2020/0159579 A1 5/2020 Shear et al.
2020/0159651 A1 5/2020 Myers
2020/0160179 A1 5/2020 Chien et al.
2020/0169637 A1 5/2020 Sanghavi et al.
2020/0175566 A1 6/2020 Bender et al.
2020/0176004 A1 6/2020 Kleijn et al.
2020/0176018 A1 6/2020 Feinauer et al.
2020/0184964 A1 6/2020 Myers et al.
2020/0184966 A1 6/2020 Yavagal
2020/0193997 A1 6/2020 Piernot et al.
2020/0210142 A1 7/2020 Mu et al.
2020/0218780 A1 7/2020 Mei et al.
2020/0219517 A1 7/2020 Wang et al.
2020/0221155 A1 7/2020 Hansen et al.
2020/0227034 A1 7/2020 Summa et al.
2020/0227044 A1 7/2020 Lindahl
2020/0243069 A1 7/2020 Amores et al.
2020/0249985 A1 8/2020 Zeitlin
2020/0252508 A1 8/2020 Gray
2020/0258508 A1 8/2020 Aggarwal et al.
2020/0267222 A1 8/2020 Phipps et al.
2020/0272485 A1 8/2020 Karashchuk et al.
2020/0279556 A1 9/2020 Gruber et al.
2020/0279576 A1 9/2020 Binder et al.
2020/0279627 A1 9/2020 Nida et al.
2020/0285327 A1 9/2020 Hindi et al.
2020/0286472 A1 9/2020 Newendorp et al.
2020/0286493 A1 9/2020 Orr et al.
2020/0294494 A1 9/2020 Suyama et al.
2020/0298394 A1 9/2020 Han et al.
2020/0301950 A1 9/2020 Theo et al.
2020/0302356 A1 9/2020 Gruber et al.
2020/0302919 A1 9/2020 Greborio et al.
2020/0302925 A1 9/2020 Shah et al.
2020/0302930 A1 9/2020 Chen et al.
2020/0302932 A1 9/2020 Schramm et al.
2020/0304955 A1 9/2020 Gross et al.
2020/0304972 A1 9/2020 Gross et al.
2020/0305084 A1 9/2020 Freeman et al.
2020/0310513 A1 10/2020 Nicholson et al.
2020/0312315 A1 10/2020 Li et al.
2020/0312317 A1 10/2020 Kothari et al.
2020/0314191 A1 10/2020 Madhavan et al.
2020/0319850 A1 10/2020 Stasior et al.
2020/0327895 A1 10/2020 Gruber et al.
2020/0334492 A1 10/2020 Yuan et al.
2020/0342849 A1 10/2020 Yu et al.
2020/0342863 A1 10/2020 Aggarwal et al.
2020/0356243 A1 11/2020 Meyer et al.
2020/0356634 A1 11/2020 Srinivasan et al.
2020/0357391 A1 11/2020 Ghoshal et al.
2020/0357406 A1 11/2020 York et al.
2020/0357409 A1 11/2020 Sun et al.
2020/0364411 A1 11/2020 Evermann
2020/0365155 A1 11/2020 Milden
2020/0372633 A1 11/2020 Lee, II et al.
2020/0372904 A1 11/2020 Vescovi et al.
2020/0372905 A1 11/2020 Wang et al.
2020/0374243 A1 11/2020 Jina et al.
2020/0379610 A1 12/2020 Ford et al.
2020/0379640 A1 12/2020 Bellegarda et al.
2020/0379726 A1 12/2020 Blatz et al.
2020/0379727 A1 12/2020 Blatz et al.
2020/0379728 A1 12/2020 Gada et al.
2020/0380389 A1 12/2020 Eldeeb et al.
2020/0380956 A1 12/2020 Rossi et al.
2020/0380963 A1 12/2020 Chappidi et al.
2020/0380966 A1 12/2020 Acero et al.
2020/0380973 A1 12/2020 Novitchenko et al.
2020/0380980 A1 12/2020 Shum et al.
2020/0380985 A1 12/2020 Gada et al.

(56) References Cited

U.S. PATENT DOCUMENTS

| | | | |
|---|---|---|---|
| 2020/0382616 | A1 | 12/2020 | Vaishampayan et al. |
| 2020/0382635 | A1 | 12/2020 | Vora et al. |
| 2021/0006943 | A1 | 1/2021 | Gross et al. |
| 2021/0011557 | A1 | 1/2021 | Lemay et al. |
| 2021/0012775 | A1 | 1/2021 | Kang et al. |
| 2021/0012776 | A1 | 1/2021 | Peterson et al. |
| 2021/0043190 | A1 | 2/2021 | Wang et al. |
| 2021/0065698 | A1 | 3/2021 | Topcu et al. |
| 2021/0067631 | A1 | 3/2021 | Van Os et al. |
| 2021/0072953 | A1 | 3/2021 | Amarilio et al. |
| 2021/0074264 | A1 | 3/2021 | Liang et al. |
| 2021/0090314 | A1 | 3/2021 | Hussen et al. |
| 2021/0097998 | A1 | 4/2021 | Kim et al. |
| 2021/0104232 | A1 | 4/2021 | Lee et al. |
| 2021/0105528 | A1 | 4/2021 | Van Os et al. |
| 2021/0110106 | A1 | 4/2021 | Vescovi et al. |
| 2021/0110115 | A1 | 4/2021 | Moritz et al. |
| 2021/0110254 | A1 | 4/2021 | Duy et al. |
| 2021/0124597 | A1 | 4/2021 | Ramakrishnan et al. |
| 2021/0127220 | A1 | 4/2021 | Mathieu et al. |
| 2021/0141839 | A1 | 5/2021 | Tang et al. |
| 2021/0149629 | A1 | 5/2021 | Martel et al. |
| 2021/0149996 | A1 | 5/2021 | Bellegarda |
| 2021/0150151 | A1 | 5/2021 | Jiaming et al. |
| 2021/0151041 | A1 | 5/2021 | Gruber et al. |
| 2021/0151070 | A1 | 5/2021 | Binder et al. |
| 2021/0152684 | A1 | 5/2021 | Weinstein et al. |
| 2021/0165826 | A1 | 6/2021 | Graham et al. |
| 2021/0191603 | A1 | 6/2021 | Napolitano et al. |
| 2021/0191968 | A1 | 6/2021 | Orr et al. |
| 2021/0216760 | A1 | 7/2021 | Dominic et al. |
| 2021/0224032 | A1 | 7/2021 | Ryan et al. |
| 2021/0224474 | A1 | 7/2021 | Jerome et al. |
| 2021/0233532 | A1 | 7/2021 | Aram et al. |
| 2021/0248804 | A1 | 8/2021 | Hussen Abdelaziz et al. |
| 2021/0249009 | A1 | 8/2021 | Manjunath et al. |
| 2021/0258881 | A1 | 8/2021 | Freeman et al. |
| 2021/0264913 | A1 | 8/2021 | Schramm et al. |
| 2021/0271333 | A1 | 9/2021 | Hindi et al. |
| 2021/0281965 | A1 | 9/2021 | Malik et al. |
| 2021/0294569 | A1 | 9/2021 | Piersol et al. |
| 2021/0294571 | A1 | 9/2021 | Carson et al. |
| 2021/0306812 | A1 | 9/2021 | Gross et al. |
| 2021/0312931 | A1 | 10/2021 | Paulik et al. |
| 2021/0318901 | A1 | 10/2021 | Gruber et al. |
| 2021/0327409 | A1 | 10/2021 | Naik |
| 2021/0334528 | A1 | 10/2021 | Bray et al. |
| 2021/0335342 | A1 | 10/2021 | Yuan et al. |
| 2021/0349605 | A1 | 11/2021 | Nonaka et al. |
| 2021/0349608 | A1 | 11/2021 | Blatz et al. |
| 2021/0350799 | A1 | 11/2021 | Hansen et al. |
| 2021/0350803 | A1 | 11/2021 | Hansen et al. |
| 2021/0350810 | A1 | 11/2021 | Phipps et al. |
| 2021/0352115 | A1 | 11/2021 | Hansen et al. |
| 2021/0357172 | A1 | 11/2021 | Sinesio et al. |
| 2021/0365161 | A1 | 11/2021 | Ellis et al. |
| 2021/0365174 | A1 | 11/2021 | Ellis et al. |
| 2021/0366480 | A1 | 11/2021 | Lemay et al. |
| 2021/0373851 | A1 | 12/2021 | Stasior et al. |
| 2021/0375290 | A1 | 12/2021 | Hu et al. |
| 2021/0377381 | A1 | 12/2021 | Aggarwal et al. |
| 2021/0390259 | A1 | 12/2021 | Hildick-Smith et al. |
| 2021/0390955 | A1 | 12/2021 | Piernot et al. |

FOREIGN PATENT DOCUMENTS

| | | | |
|---|---|---|---|
| AU | 2015101171 | A4 | 10/2015 |
| AU | 2018100187 | A4 | 3/2018 |
| AU | 2017222436 | A1 | 10/2018 |
| CA | 2792412 | A1 | 7/2011 |
| CA | 2666438 | C | 6/2013 |
| CH | 709795 | A1 | 12/2015 |
| CN | 101292282 | A | 10/2008 |
| CN | 101939740 | A | 1/2011 |
| CN | 101951553 | A | 1/2011 |
| CN | 102137193 | A | 7/2011 |
| CN | 102160043 | A | 8/2011 |
| CN | 102246136 | A | 11/2011 |
| CN | 202035047 | U | 11/2011 |
| CN | 202092650 | U | 12/2011 |
| CN | 102324233 | A | 1/2012 |
| CN | 102340590 | A | 2/2012 |
| CN | 102346557 | A | 2/2012 |
| CN | 102346719 | A | 2/2012 |
| CN | 102349087 | A | 2/2012 |
| CN | 102368256 | A | 3/2012 |
| CN | 102402985 | A | 4/2012 |
| CN | 102405463 | A | 4/2012 |
| CN | 102449438 | A | 5/2012 |
| CN | 102495406 | A | 6/2012 |
| CN | 102498457 | A | 6/2012 |
| CN | 102510426 | A | 6/2012 |
| CN | 102520789 | A | 6/2012 |
| CN | 101661754 | B | 7/2012 |
| CN | 102629246 | A | 8/2012 |
| CN | 102651217 | A | 8/2012 |
| CN | 102663016 | A | 9/2012 |
| CN | 102681761 | A | 9/2012 |
| CN | 102681896 | A | 9/2012 |
| CN | 102682769 | A | 9/2012 |
| CN | 102682771 | A | 9/2012 |
| CN | 102685295 | A | 9/2012 |
| CN | 102693725 | A | 9/2012 |
| CN | 102694909 | A | 9/2012 |
| CN | 202453859 | U | 9/2012 |
| CN | 102722478 | A | 10/2012 |
| CN | 102737104 | A | 10/2012 |
| CN | 102750087 | A | 10/2012 |
| CN | 102792320 | A | 11/2012 |
| CN | 102801853 | A | 11/2012 |
| CN | 102820033 | A | 12/2012 |
| CN | 102844738 | A | 12/2012 |
| CN | 102866828 | A | 1/2013 |
| CN | 102870065 | A | 1/2013 |
| CN | 102882752 | A | 1/2013 |
| CN | 102890936 | A | 1/2013 |
| CN | 102915731 | A | 2/2013 |
| CN | 102917004 | A | 2/2013 |
| CN | 102917271 | A | 2/2013 |
| CN | 102918493 | A | 2/2013 |
| CN | 102955652 | A | 3/2013 |
| CN | 103035240 | A | 4/2013 |
| CN | 103035251 | A | 4/2013 |
| CN | 103038728 | A | 4/2013 |
| CN | 103064956 | A | 4/2013 |
| CN | 103078995 | A | 5/2013 |
| CN | 103093334 | A | 5/2013 |
| CN | 103093755 | A | 5/2013 |
| CN | 103109249 | A | 5/2013 |
| CN | 103135916 | A | 6/2013 |
| CN | 103187053 | A | 7/2013 |
| CN | 103198831 | A | 7/2013 |
| CN | 103209369 | A | 7/2013 |
| CN | 103217892 | A | 7/2013 |
| CN | 103226949 | A | 7/2013 |
| CN | 103236260 | A | 8/2013 |
| CN | 103246638 | A | 8/2013 |
| CN | 103268315 | A | 8/2013 |
| CN | 103280218 | A | 9/2013 |
| CN | 103292437 | A | 9/2013 |
| CN | 103327063 | A | 9/2013 |
| CN | 103365279 | A | 10/2013 |
| CN | 103366741 | A | 10/2013 |
| CN | 203249629 | U | 10/2013 |
| CN | 103390016 | A | 11/2013 |
| CN | 103412789 | A | 11/2013 |
| CN | 103414949 | A | 11/2013 |
| CN | 103426428 | A | 12/2013 |
| CN | 103455234 | A | 12/2013 |
| CN | 103456303 | A | 12/2013 |
| CN | 103456306 | A | 12/2013 |
| CN | 103457837 | A | 12/2013 |
| CN | 103475551 | A | 12/2013 |
| CN | 103477592 | A | 12/2013 |

(56) References Cited

FOREIGN PATENT DOCUMENTS

| | | | |
|---|---|---|---|
| CN | 103533143 | A | 1/2014 |
| CN | 103533154 | A | 1/2014 |
| CN | 103543902 | A | 1/2014 |
| CN | 103562863 | A | 2/2014 |
| CN | 103582896 | A | 2/2014 |
| CN | 103593054 | A | 2/2014 |
| CN | 103608859 | A | 2/2014 |
| CN | 103620605 | A | 3/2014 |
| CN | 103645876 | A | 3/2014 |
| CN | 103677261 | A | 3/2014 |
| CN | 103714816 | A | 4/2014 |
| CN | 103716454 | A | 4/2014 |
| CN | 103727948 | A | 4/2014 |
| CN | 103744761 | A | 4/2014 |
| CN | 103760984 | A | 4/2014 |
| CN | 103765385 | A | 4/2014 |
| CN | 103778527 | A | 5/2014 |
| CN | 103780758 | A | 5/2014 |
| CN | 103792985 | A | 5/2014 |
| CN | 103794212 | A | 5/2014 |
| CN | 103795850 | A | 5/2014 |
| CN | 103809548 | A | 5/2014 |
| CN | 103841268 | A | 6/2014 |
| CN | 103885663 | A | 6/2014 |
| CN | 103902373 | A | 7/2014 |
| CN | 103930945 | A | 7/2014 |
| CN | 103942932 | A | 7/2014 |
| CN | 103959751 | A | 7/2014 |
| CN | 203721183 | U | 7/2014 |
| CN | 103971680 | A | 8/2014 |
| CN | 104007832 | A | 8/2014 |
| CN | 104036774 | A | 9/2014 |
| CN | 104038621 | A | 9/2014 |
| CN | 104050153 | A | 9/2014 |
| CN | 104090652 | A | 10/2014 |
| CN | 104113471 | A | 10/2014 |
| CN | 104125322 | A | 10/2014 |
| CN | 104144377 | A | 11/2014 |
| CN | 104145304 | A | 11/2014 |
| CN | 104169837 | A | 11/2014 |
| CN | 104180815 | A | 12/2014 |
| CN | 104185868 | A | 12/2014 |
| CN | 104240701 | A | 12/2014 |
| CN | 104243699 | A | 12/2014 |
| CN | 104281259 | A | 1/2015 |
| CN | 104281390 | A | 1/2015 |
| CN | 104284257 | A | 1/2015 |
| CN | 104284486 | A | 1/2015 |
| CN | 104335207 | A | 2/2015 |
| CN | 104335234 | A | 2/2015 |
| CN | 104350454 | A | 2/2015 |
| CN | 104360990 | A | 2/2015 |
| CN | 104374399 | A | 2/2015 |
| CN | 104423625 | A | 3/2015 |
| CN | 104423780 | A | 3/2015 |
| CN | 104427104 | A | 3/2015 |
| CN | 104463552 | A | 3/2015 |
| CN | 104464733 | A | 3/2015 |
| CN | 104487929 | A | 4/2015 |
| CN | 104516522 | A | 4/2015 |
| CN | 104573472 | A | 4/2015 |
| CN | 104575493 | A | 4/2015 |
| CN | 104575501 | A | 4/2015 |
| CN | 104584010 | A | 4/2015 |
| CN | 104584096 | A | 4/2015 |
| CN | 104584601 | A | 4/2015 |
| CN | 104604274 | A | 5/2015 |
| CN | 104679472 | A | 6/2015 |
| CN | 104699746 | A | 6/2015 |
| CN | 104731441 | A | 6/2015 |
| CN | 104769584 | A | 7/2015 |
| CN | 104821167 | A | 8/2015 |
| CN | 104821934 | A | 8/2015 |
| CN | 104836909 | A | 8/2015 |
| CN | 104854583 | A | 8/2015 |
| CN | 104867492 | A | 8/2015 |
| CN | 104869342 | A | 8/2015 |
| CN | 104951077 | A | 9/2015 |
| CN | 104967748 | A | 10/2015 |
| CN | 104969289 | A | 10/2015 |
| CN | 104978963 | A | 10/2015 |
| CN | 105025051 | A | 11/2015 |
| CN | 105027197 | A | 11/2015 |
| CN | 105093526 | A | 11/2015 |
| CN | 105100356 | A | 11/2015 |
| CN | 105164719 | A | 12/2015 |
| CN | 105190607 | A | 12/2015 |
| CN | 105247511 | A | 1/2016 |
| CN | 105247551 | A | 1/2016 |
| CN | 105264524 | A | 1/2016 |
| CN | 105278681 | A | 1/2016 |
| CN | 105320251 | A | 2/2016 |
| CN | 105320726 | A | 2/2016 |
| CN | 105379234 | A | 3/2016 |
| CN | 105430186 | A | 3/2016 |
| CN | 105471705 | A | 4/2016 |
| CN | 105472587 | A | 4/2016 |
| CN | 105516441 | A | 4/2016 |
| CN | 105556592 | A | 5/2016 |
| CN | 105808200 | A | 7/2016 |
| CN | 105830048 | A | 8/2016 |
| CN | 105869641 | A | 8/2016 |
| CN | 105872222 | A | 8/2016 |
| CN | 105917311 | A | 8/2016 |
| CN | 106030699 | A | 10/2016 |
| CN | 106062734 | A | 10/2016 |
| CN | 106415412 | A | 2/2017 |
| CN | 106462383 | A | 2/2017 |
| CN | 106463114 | A | 2/2017 |
| CN | 106465074 | A | 2/2017 |
| CN | 106534469 | A | 3/2017 |
| CN | 106558310 | A | 4/2017 |
| CN | 106773742 | A | 5/2017 |
| CN | 106776581 | A | 5/2017 |
| CN | 107004412 | A | 8/2017 |
| CN | 107450800 | A | 12/2017 |
| CN | 107480161 | A | 12/2017 |
| CN | 107491285 | A | 12/2017 |
| CN | 107491468 | A | 12/2017 |
| CN | 107506037 | A | 12/2017 |
| CN | 107545262 | A | 1/2018 |
| CN | 107608998 | A | 1/2018 |
| CN | 107615378 | A | 1/2018 |
| CN | 107623616 | A | 1/2018 |
| CN | 107786730 | A | 3/2018 |
| CN | 107852436 | A | 3/2018 |
| CN | 107871500 | A | 4/2018 |
| CN | 107919123 | A | 4/2018 |
| CN | 107924313 | A | 4/2018 |
| CN | 107978313 | A | 5/2018 |
| CN | 108647681 | A | 10/2018 |
| CN | 109447234 | A | 3/2019 |
| CN | 109657629 | A | 4/2019 |
| CN | 110135411 | A | 8/2019 |
| CN | 110263144 | A | 9/2019 |
| CN | 105164719 | B | 11/2019 |
| CN | 110531860 | A | 12/2019 |
| CN | 110598671 | A | 12/2019 |
| CN | 110647274 | A | 1/2020 |
| CN | 110825469 | A | 2/2020 |
| CN | 111316203 | A | 6/2020 |
| DE | 202016008226 | U1 | 5/2017 |
| EP | 1511277 | A1 | 3/2005 |
| EP | 2309491 | A1 | 4/2011 |
| EP | 2329348 | A1 | 6/2011 |
| EP | 2339576 | A2 | 6/2011 |
| EP | 2400373 | A1 | 12/2011 |
| EP | 2431842 | A2 | 3/2012 |
| EP | 2523109 | A1 | 11/2012 |
| EP | 2523188 | A1 | 11/2012 |
| EP | 2551784 | A1 | 1/2013 |
| EP | 2555536 | A1 | 2/2013 |
| EP | 2575128 | A2 | 4/2013 |
| EP | 2608610 | A1 | 6/2013 |

(56) References Cited

FOREIGN PATENT DOCUMENTS

| | | | | |
|---|---|---|---|---|
| EP | 2632129 | A1 | 8/2013 | |
| EP | 2639792 | A1 | 9/2013 | |
| EP | 2669854 | A1 * | 12/2013 | ............ G06F 15/16 |
| EP | 2669889 | A2 | 12/2013 | |
| EP | 2672229 | A2 | 12/2013 | |
| EP | 2672231 | A2 | 12/2013 | |
| EP | 2675147 | A1 | 12/2013 | |
| EP | 2680257 | A1 | 1/2014 | |
| EP | 2683147 | A1 | 1/2014 | |
| EP | 2683175 | A1 | 1/2014 | |
| EP | 2672231 | A3 | 4/2014 | |
| EP | 2717259 | A2 | 4/2014 | |
| EP | 2725577 | A2 | 4/2014 | |
| EP | 2733598 | A2 | 5/2014 | |
| EP | 2733896 | A1 | 5/2014 | |
| EP | 2743846 | A2 | 6/2014 | |
| EP | 2760015 | A1 | 7/2014 | |
| EP | 2779160 | A1 | 9/2014 | |
| EP | 2781883 | A2 | 9/2014 | |
| EP | 2787683 | A1 | 10/2014 | |
| EP | 2801890 | A1 | 11/2014 | |
| EP | 2801972 | A1 | 11/2014 | |
| EP | 2801974 | A2 | 11/2014 | |
| EP | 2824564 | A1 | 1/2015 | |
| EP | 2849177 | A1 | 3/2015 | |
| EP | 2879402 | A1 | 6/2015 | |
| EP | 2881939 | A1 | 6/2015 | |
| EP | 2891049 | A1 | 7/2015 | |
| EP | 2915021 | A2 | 9/2015 | |
| EP | 2930715 | A1 | 10/2015 | |
| EP | 2938022 | A1 | 10/2015 | |
| EP | 2940556 | A1 | 11/2015 | |
| EP | 2947859 | A1 | 11/2015 | |
| EP | 2950307 | A1 | 12/2015 | |
| EP | 2957986 | A1 | 12/2015 | |
| EP | 2973380 | A2 | 1/2016 | |
| EP | 2985984 | A2 | 2/2016 | |
| EP | 2891049 | A4 | 3/2016 | |
| EP | 3032532 | A1 | 6/2016 | |
| EP | 3035329 | A1 | 6/2016 | |
| EP | 3038333 | A1 | 6/2016 | |
| EP | 3093737 | A2 * | 11/2016 | ........ A61B 5/02416 |
| EP | 3115905 | A1 | 1/2017 | |
| EP | 3125097 | A2 | 2/2017 | |
| EP | 2672231 | B1 | 5/2017 | |
| EP | 3161612 | A1 | 5/2017 | |
| EP | 3200185 | A1 | 8/2017 | |
| EP | 3224708 | A1 | 10/2017 | |
| EP | 3227771 | A1 | 10/2017 | |
| EP | 3246916 | A1 | 11/2017 | |
| EP | 3270658 | A1 | 1/2018 | |
| EP | 3300074 | A1 | 3/2018 | |
| EP | 2973380 | B1 | 8/2018 | |
| EP | 2983065 | B1 | 8/2018 | |
| EP | 3392876 | A1 | 10/2018 | |
| EP | 3401773 | A1 | 11/2018 | |
| EP | 2973002 | B1 | 6/2019 | |
| EP | 3506151 | A1 | 7/2019 | |
| EP | 3323058 | B1 | 2/2020 | |
| IN | 2011MU03716 | A | 2/2012 | |
| IN | 2012MU01227 | A | 6/2012 | |
| JP | 2000-56944 | A | 2/2000 | |
| JP | 2000-187474 | A | 7/2000 | |
| JP | 2007-334301 | A | 12/2007 | |
| JP | 2008-268340 | A | 11/2008 | |
| JP | 2011-41026 | A | 2/2011 | |
| JP | 2011-45005 | A | 3/2011 | |
| JP | 2011-59659 | A | 3/2011 | |
| JP | 2011-81541 | A | 4/2011 | |
| JP | 2011-525045 | A | 9/2011 | |
| JP | 2011-238022 | A | 11/2011 | |
| JP | 2012-14394 | A | 1/2012 | |
| JP | 2012-502377 | A | 1/2012 | |
| JP | 2012-22478 | A | 2/2012 | |
| JP | 2012-33997 | A | 2/2012 | |
| JP | 2012-37619 | A | 2/2012 | |
| JP | 2012-40655 | A | 3/2012 | |
| JP | 2012-63536 | A | 3/2012 | |
| JP | 2012-508530 | A | 4/2012 | |
| JP | 2012-89020 | A | 5/2012 | |
| JP | 2012-511774 | A | 5/2012 | |
| JP | 2012-116442 | A | 6/2012 | |
| JP | 2012-142744 | A | 7/2012 | |
| JP | 2012-147063 | A | 8/2012 | |
| JP | 2012-150804 | A | 8/2012 | |
| JP | 2012-164070 | A | 8/2012 | |
| JP | 2012-518847 | A | 8/2012 | |
| JP | 2012-211932 | A | 11/2012 | |
| JP | 2012-220959 | A | 11/2012 | |
| JP | 2013-37688 | A | 2/2013 | |
| JP | 2013-46171 | A | 3/2013 | |
| JP | 2013-511214 | A | 3/2013 | |
| JP | 2013-65284 | A | 4/2013 | |
| JP | 2013-73240 | A | 4/2013 | |
| JP | 2013-513315 | A | 4/2013 | |
| JP | 2013-80476 | A | 5/2013 | |
| JP | 2013-517566 | A | 5/2013 | |
| JP | 2013-131087 | A | 7/2013 | |
| JP | 2013-134430 | A | 7/2013 | |
| JP | 2013-134729 | A | 7/2013 | |
| JP | 2013-140520 | A | 7/2013 | |
| JP | 2013-527947 | A | 7/2013 | |
| JP | 2013-528012 | A | 7/2013 | |
| JP | 2013-148419 | A | 8/2013 | |
| JP | 2013-156349 | A | 8/2013 | |
| JP | 2013-174987 | A | 9/2013 | |
| JP | 2013-535059 | A | 9/2013 | |
| JP | 2013-200265 | A | 10/2013 | |
| JP | 2013-200423 | A | 10/2013 | |
| JP | 2013-205999 | A | 10/2013 | |
| JP | 2013-238935 | A | 11/2013 | |
| JP | 2013-238936 | A | 11/2013 | |
| JP | 2013-248292 | A | 12/2013 | |
| JP | 2013-257694 | A | 12/2013 | |
| JP | 2013-258600 | A | 12/2013 | |
| JP | 2014-2586 | A | 1/2014 | |
| JP | 2014-10688 | A | 1/2014 | |
| JP | 2014-502445 | A | 1/2014 | |
| JP | 2014-26629 | A | 2/2014 | |
| JP | 2014-45449 | A | 3/2014 | |
| JP | 2014-507903 | A | 3/2014 | |
| JP | 2014-60600 | A | 4/2014 | |
| JP | 2014-72586 | A | 4/2014 | |
| JP | 2014-77969 | A | 5/2014 | |
| JP | 2014-89711 | A | 5/2014 | |
| JP | 2014-109889 | A | 6/2014 | |
| JP | 2014-124332 | A | 7/2014 | |
| JP | 2014-126600 | A | 7/2014 | |
| JP | 2014-140121 | A | 7/2014 | |
| JP | 2014-518409 | A | 7/2014 | |
| JP | 2014-142566 | A | 8/2014 | |
| JP | 2014-145842 | A | 8/2014 | |
| JP | 2014-146940 | A | 8/2014 | |
| JP | 2014-150323 | A | 8/2014 | |
| JP | 2014-519648 | A | 8/2014 | |
| JP | 2014-524627 | A | 9/2014 | |
| JP | 2014-191272 | A | 10/2014 | |
| JP | 2014-219614 | A | 11/2014 | |
| JP | 2014-222514 | A | 11/2014 | |
| JP | 2015-1931 | A | 1/2015 | |
| JP | 2015-4928 | A | 1/2015 | |
| JP | 2015-8001 | A | 1/2015 | |
| JP | 2015-12301 | A | 1/2015 | |
| JP | 2015-18365 | A | 1/2015 | |
| JP | 2015-501022 | A | 1/2015 | |
| JP | 2015-501034 | A | 1/2015 | |
| JP | 2015-504619 | A | 2/2015 | |
| JP | 2015-41845 | A | 3/2015 | |
| JP | 2015-52500 | A | 3/2015 | |
| JP | 2015-60423 | A | 3/2015 | |
| JP | 2015-81971 | A | 4/2015 | |
| JP | 2015-83938 | A | 4/2015 | |
| JP | 2015-94848 | A | 5/2015 | |
| JP | 2015-514254 | A | 5/2015 | |

(56) References Cited

FOREIGN PATENT DOCUMENTS

| | | | |
|---|---|---|---|
| JP | 2015-519675 | A | 7/2015 |
| JP | 2015-524974 | A | 8/2015 |
| JP | 2015-526776 | A | 9/2015 |
| JP | 2015-527683 | A | 9/2015 |
| JP | 2015-528140 | A | 9/2015 |
| JP | 2015-528918 | A | 10/2015 |
| JP | 2015-531909 | A | 11/2015 |
| JP | 2016-504651 | A | 2/2016 |
| JP | 2016-35614 | A | 3/2016 |
| JP | 2016-508007 | A | 3/2016 |
| JP | 2016-71247 | A | 5/2016 |
| JP | 2016-119615 | A | 6/2016 |
| JP | 2016-151928 | A | 8/2016 |
| JP | 2016-524193 | A | 8/2016 |
| JP | 2016-536648 | A | 11/2016 |
| JP | 2017-19331 | A | 1/2017 |
| JP | 2017-516153 | A | 6/2017 |
| JP | 2017-123187 | A | 7/2017 |
| JP | 2017-211608 | A | 11/2017 |
| JP | 2017-537361 | A | 12/2017 |
| JP | 6291147 | B1 | 2/2018 |
| JP | 2018-101242 | A | 6/2018 |
| JP | 2018-113035 | A | 7/2018 |
| JP | 2018-525950 | A | 9/2018 |
| JP | 2018-536889 | A | 12/2018 |
| KR | 10-2011-0043644 | A | 4/2011 |
| KR | 10-1032792 | B1 | 5/2011 |
| KR | 10-2011-0068490 | A | 6/2011 |
| KR | 10-2011-0072847 | A | 6/2011 |
| KR | 10-2011-0086492 | A | 7/2011 |
| KR | 10-2011-0100620 | A | 9/2011 |
| KR | 10-2011-0113414 | A | 10/2011 |
| KR | 10-2011-0115134 | A | 10/2011 |
| KR | 10-2012-0020164 | A | 3/2012 |
| KR | 10-2012-0031722 | A | 4/2012 |
| KR | 10-2012-0066523 | A | 6/2012 |
| KR | 10-2012-0082371 | A | 7/2012 |
| KR | 10-2012-0084472 | A | 7/2012 |
| KR | 10-1178310 | B1 | 8/2012 |
| KR | 10-2012-0120316 | A | 11/2012 |
| KR | 10-2012-0137424 | A | 12/2012 |
| KR | 10-2012-0137435 | A | 12/2012 |
| KR | 10-2012-0137440 | A | 12/2012 |
| KR | 10-2012-0138826 | A | 12/2012 |
| KR | 10-2012-0139827 | A | 12/2012 |
| KR | 10-1193668 | B1 | 12/2012 |
| KR | 10-2013-0035983 | A | 4/2013 |
| KR | 10-2013-0086750 | A | 8/2013 |
| KR | 10-2013-0090947 | A | 8/2013 |
| KR | 10-2013-0108563 | A | 10/2013 |
| KR | 10-1334342 | B1 | 11/2013 |
| KR | 10-2013-0131252 | A | 12/2013 |
| KR | 10-2013-0133629 | A | 12/2013 |
| KR | 10-2014-0007282 | A | 1/2014 |
| KR | 10-2014-0024271 | A | 2/2014 |
| KR | 10-2014-0025996 | A | 3/2014 |
| KR | 10-2014-0031283 | A | 3/2014 |
| KR | 10-2014-0033574 | A | 3/2014 |
| KR | 10-2014-0042994 | A | 4/2014 |
| KR | 10-2014-0055204 | A | 5/2014 |
| KR | 10-2014-0059697 | A | 5/2014 |
| KR | 10-2014-0068752 | A | 6/2014 |
| KR | 10-2014-0088449 | A | 7/2014 |
| KR | 10-2014-0093949 | A | 7/2014 |
| KR | 10-2014-0106715 | A | 9/2014 |
| KR | 10-2014-0107253 | A | 9/2014 |
| KR | 10-2014-0147557 | A | 12/2014 |
| KR | 10-2015-0013631 | A | 2/2015 |
| KR | 10-1506510 | B1 | 3/2015 |
| KR | 10-2015-0038375 | A | 4/2015 |
| KR | 10-2015-0039380 | A | 4/2015 |
| KR | 10-2015-0041974 | A | 4/2015 |
| KR | 10-2015-0043512 | A | 4/2015 |
| KR | 10-2015-0062811 | A | 6/2015 |
| KR | 10-2015-0095624 | A | 8/2015 |
| KR | 10-1555742 | B1 | 9/2015 |
| KR | 10-2015-0113127 | A | 10/2015 |
| KR | 10-2015-0131262 | A | 11/2015 |
| KR | 10-2015-0138109 | A | 12/2015 |
| KR | 10-2016-0004351 | A | 1/2016 |
| KR | 10-2016-0010523 | A | 1/2016 |
| KR | 10-2016-0040279 | A | 4/2016 |
| KR | 10-2016-0055839 | A | 5/2016 |
| KR | 10-2016-0065503 | A | 6/2016 |
| KR | 10-2016-0101079 | A | 8/2016 |
| KR | 10-2016-0101198 | A | 8/2016 |
| KR | 10-2016-0105847 | A | 9/2016 |
| KR | 10-2016-0121585 | A | 10/2016 |
| KR | 10-2016-0140694 | A | 12/2016 |
| KR | 10-2016-0147854 | A | 12/2016 |
| KR | 10-2017-0036805 | A | 4/2017 |
| KR | 10-2017-0104006 | A | 9/2017 |
| KR | 10-2017-0107058 | A | 9/2017 |
| KR | 10-1776673 | B1 | 9/2017 |
| KR | 10-2018-0032632 | A | 3/2018 |
| KR | 10-2018-0034637 | A | 4/2018 |
| KR | 10-2018-0135877 | A | 12/2018 |
| KR | 10-1959328 | B1 | 3/2019 |
| KR | 10-2020-0105519 | A | 9/2020 |
| RU | 2012141604 | A | 4/2014 |
| TW | 201110108 | A | 3/2011 |
| TW | 201142823 | A1 | 12/2011 |
| TW | 201227715 | A | 7/2012 |
| TW | 201245989 | A | 11/2012 |
| TW | 201312548 | A | 3/2013 |
| TW | 201407184 | A | 2/2014 |
| TW | 201610982 | A | 3/2016 |
| TW | 201629750 | A | 8/2016 |
| WO | 2007/027546 | A2 | 3/2007 |
| WO | 2008034111 | A2 | 3/2008 |
| WO | 2010/109358 | A1 | 9/2010 |
| WO | 2011/057346 | A1 | 5/2011 |
| WO | 2011/060106 | A1 | 5/2011 |
| WO | 2011/088053 | A2 | 7/2011 |
| WO | 2011/093025 | A1 | 8/2011 |
| WO | 2011/116309 | A1 | 9/2011 |
| WO | 2011/133543 | A1 | 10/2011 |
| WO | 2011/133573 | A2 | 10/2011 |
| WO | 2011/097309 | A3 | 12/2011 |
| WO | 2011/150730 | A1 | 12/2011 |
| WO | 2011/163350 | A1 | 12/2011 |
| WO | 2011/088053 | A3 | 1/2012 |
| WO | 2012/008434 | A1 | 1/2012 |
| WO | 2012/019020 | A1 | 2/2012 |
| WO | 2012/019637 | A1 | 2/2012 |
| WO | 2012/033312 | A1 | 3/2012 |
| WO | 2012/056463 | A1 | 5/2012 |
| WO | 2012/063260 | A2 | 5/2012 |
| WO | 2012/084965 | A1 | 6/2012 |
| WO | 2012/092562 | A1 | 7/2012 |
| WO | 2012/112331 | A2 | 8/2012 |
| WO | 2012/129231 | A1 | 9/2012 |
| WO | 2012/063260 | A3 | 10/2012 |
| WO | 2012/135157 | A2 | 10/2012 |
| WO | 2012/154317 | A1 | 11/2012 |
| WO | 2012/154748 | A1 | 11/2012 |
| WO | 2012/155079 | A2 | 11/2012 |
| WO | 2012/160567 | A1 | 11/2012 |
| WO | 2012/167168 | A2 | 12/2012 |
| WO | 2012/173902 | A2 | 12/2012 |
| WO | 2013/009578 | A2 | 1/2013 |
| WO | 2013/022135 | A1 | 2/2013 |
| WO | 2013/022223 | A2 | 2/2013 |
| WO | 2013/048880 | A1 | 4/2013 |
| WO | 2013/049358 | A1 | 4/2013 |
| WO | 2013/057153 | A1 | 4/2013 |
| WO | 2013/101489 | A1 | 7/2013 |
| WO | 2013/118988 | A1 | 8/2013 |
| WO | 2013/122310 | A1 | 8/2013 |
| WO | 2013/128999 | A1 | 9/2013 |
| WO | 2013/133533 | A1 | 9/2013 |
| WO | 2013/137660 | A1 | 9/2013 |
| WO | 2013/163113 | A1 | 10/2013 |
| WO | 2013/163857 | A1 | 11/2013 |

(56) References Cited

FOREIGN PATENT DOCUMENTS

WO 2013/169842 A2 11/2013
WO 2013/173504 A1 11/2013
WO 2013/173511 A2 11/2013
WO 2013/176847 A1 11/2013
WO 2013/184953 A1 12/2013
WO 2013/184990 A1 12/2013
WO 2014/003138 A1 1/2014
WO 2014/004544 A2 1/2014
WO 2014/018580 A1 1/2014
WO 2014/021967 A1 2/2014
WO 2014/022148 A1 2/2014
WO 2014/028735 A2 2/2014
WO 2014/028797 A1 2/2014
WO 2014/031505 A1 2/2014
WO 2014/032461 A1 3/2014
WO 2014/040022 A2 3/2014
WO 2014/046475 A1 3/2014
WO 2014/047047 A1 3/2014
WO 2014/048855 A1 4/2014
WO 2014/066352 A1 5/2014
WO 2014/070872 A2 5/2014
WO 2014/073825 A1 5/2014
WO 2014/078965 A1 5/2014
WO 2014/093339 A1 6/2014
WO 2014/096506 A1 6/2014
WO 2014/124332 A2 8/2014
WO 2014/137074 A1 9/2014
WO 2014/138604 A1 9/2014
WO 2014/143959 A2 9/2014
WO 2014/144395 A2 9/2014
WO 2014/144579 A1 9/2014
WO 2014/144949 A2 9/2014
WO 2014/149473 A1 9/2014
WO 2014/151153 A2 9/2014
WO 2014/124332 A3 10/2014
WO 2014/159578 A1 10/2014
WO 2014/159581 A1 10/2014
WO 2014/162570 A1 10/2014
WO 2014/169269 A1 10/2014
WO 2014/173189 A1 10/2014
WO 2013/173504 A8 12/2014
WO 2014/197336 A1 12/2014
WO 2014/197339 A1 12/2014
WO 2014/197635 A2 12/2014
WO 2014/197730 A1 12/2014
WO 2014/200728 A1 12/2014
WO 2014/203495 A1 12/2014
WO 2014/204659 A2 12/2014
WO 2014/210392 A2 12/2014
WO 2015/018440 A1 2/2015
WO 2015/020942 A1 2/2015
WO 2015/029379 A1 3/2015
WO 2015/030796 A1 3/2015
WO 2015/036817 A1 3/2015
WO 2015/041882 A1 3/2015
WO 2015/041892 A1 3/2015
WO 2015/047932 A1 4/2015
WO 2015/053485 A1 4/2015
WO 2015/080530 A1 6/2015
WO 2015/084659 A1 6/2015
WO 2015/092943 A1 6/2015
WO 2015/094169 A1 6/2015
WO 2015/094369 A1 6/2015
WO 2015/098306 A1 7/2015
WO 2015/099939 A1 7/2015
WO 2015/112625 A1 7/2015
WO 2015/116151 A1 8/2015
WO 2015/121449 A1 8/2015
WO 2015/151133 A1 10/2015
WO 2015/153310 A1 10/2015
WO 2015/157013 A1 10/2015
WO 2015/183401 A1 12/2015
WO 2015/183699 A1 12/2015
WO 2015/184186 A1 12/2015
WO 2015/184387 A1 12/2015
WO 2015/200207 A1 12/2015
WO 2016/027933 A1 2/2016
WO 2016/028946 A1 2/2016
WO 2016/033257 A1 3/2016
WO 2016/039992 A1 3/2016
WO 2016/040721 A1 3/2016
WO 2016045192 A1 3/2016
WO 2016/051519 A1 4/2016
WO 2016/052164 A1 4/2016
WO 2016/054230 A1 4/2016
WO 2016/057268 A1 4/2016
WO 2016/075081 A1 5/2016
WO 2016/085775 A2 6/2016
WO 2016/085776 A1 6/2016
WO 2016/089029 A1 6/2016
WO 2016/100139 A 6/2016
WO 2016/111881 A1 7/2016
WO 2016/144840 A1 9/2016
WO 2016/144982 A1 9/2016
WO 2016/144983 A1 9/2016
WO 2016/175354 A1 11/2016
WO 2016/187149 A1 11/2016
WO 2016/190950 A1 12/2016
WO 2016/209444 A1 12/2016
WO 2016/209924 A1 12/2016
WO 2017/044160 A1 3/2017
WO 2017/044257 A1 3/2017
WO 2017/044260 A1 3/2017
WO 2017/044629 A1 3/2017
WO 2017/053311 A1 3/2017
WO 2017/058293 A1 4/2017
WO 2017/059388 A1 4/2017
WO 2017/071420 A1 5/2017
WO 2017/142116 A1 8/2017
WO 2017/160487 A1 9/2017
WO 2017/200777 A1 11/2017
WO 2017/203484 A1 11/2017
WO 2017/213678 A1 12/2017
WO 2017/213682 A1 12/2017
WO 2017/218194 A1 12/2017
WO 2018/009397 A1 1/2018
WO 2018/044633 A1 3/2018
WO 2018/067528 A1 4/2018
WO 2018/176053 A1 9/2018
WO 2018/209152 A1 11/2018
WO 2018/213401 A1 11/2018
WO 2018/213415 A1 11/2018
WO 2019/067930 A1 4/2019
WO 2019/078576 A1 4/2019
WO 2019/079017 A1 4/2019
WO 2019/143397 A1 7/2019
WO 2019/147429 A1 8/2019
WO 2019/236217 A1 12/2019
WO 2020/010530 A1 1/2020

OTHER PUBLICATIONS

Notice of Allowance received for Korean Patent Application No. 10-2022-7002381, mailed on Oct. 13, 2022, 7 pages (2 pages of English Translation and 5 pages of Official Copy).

Decision to Grant received for European Patent Application No. 20179164.7, mailed on Apr. 26, 2022, 3 pages.

Office Action received for Korean Patent Application No. 10-2022-7002381, mailed on Apr. 25, 2022, 5 pages (2 pages of English Translation and 3 pages of Official Copy).

Extended European Search Report received for European Patent Application No. 22167039.1, mailed on Nov. 9, 2022, 9 pages.

Notice of Acceptance received for Australian Patent Application No. 2021218193, mailed on Sep. 1, 2022, 3 pages.

Office Action received for Chinese Patent Application No. 201880002639.X, mailed on Mar. 17, 2023, 23 pages (10 pages of English Translation and 13 pages of Official Copy).

Office Action received for Japanese Patent Application No. 2022-033719, mailed on Mar. 27, 2023, 10 pages (5 pages of English Translation and 5 pages of Official Copy).

Notice of Allowance received for Japanese Patent Application No. 2022-033719, mailed on Oct. 2, 2023, 4 pages (1 page of English Translation and 3 pages of Official Copy).

(56) References Cited

OTHER PUBLICATIONS

Notice of Allowance received for Japanese Patent Application No. 2020-123111, mailed on Feb. 4, 2022, 4 pages (1 page of English Translation and 3 pages of Official Copy).
Office Action received for European Patent Application No. 22167039.1, mailed on Jul. 1, 2024, 4 pages.
Notice of Allowance received for Chinese Patent Application No. 201880002639.X, mailed on May 2, 2023, 5 pages (1 page of English Translation and 4 pages of Official Copy).
Adium, "AboutAdium—Adium X—Trac", Online available at:—<http://web.archive.org/web/20070819113247/http://trac.adiumx.com/wiki/AboutAdium>, retrieved on Nov. 25, 2011, 2 pages.
Advisory Action received for U.S. Patent Application No. 16/267,146, mailed on Dec. 10, 2019, 4 pages.
"Alexa, Turn Up the Heat! Smartthings Samsung [online]", Online available at:—<https://web.archive.org/web/20160329142041/https://blog.smartthings.com/news/smartthingsupdates/alexa-turn-up-the-heat/>, Mar. 3, 2016, 3 pages.
Alfred App, "Alfred", Online available at:—<http://www.alfredapp.com/>, retrieved on Feb. 8, 2012, 5 pages.
Anania Peter, "Amazon Echo with Home Automation (Smartthings)", Online available at:—<https://www.youtube.com/watch?v=LMW6aXmsWNE>, Dec. 20, 2015, 1 page.
Api.Ai, "Android App Review—Speaktoit Assistant", Online available at: <https://www.youtube.com/watch?v=myE498nyfGw>, Mar. 30, 2011, 3 pages.
Apple, "VoiceOver for OS X", Online available at: <http://www.apple.com/accessibility/voiceover/>, May 19, 2014, pp. 1-3.
Applicant Initiated Interview Summary received for U.S. Appl. No. 15/679,108, mailed on Jan. 26, 2021, 6 pages.
Applicant Initiated Interview Summary received for U.S. Appl. No. 15/679,108, mailed on Jul. 23, 2021, 4 pages.
Applicant Initiated Interview Summary received for U.S. Appl. No. 15/679,108, mailed on Oct. 28, 2019, 4 pages.
Applicant Initiated Interview Summary received for U.S. Appl. No. 16/267,146, mailed on Nov. 13, 2019, 4 pages.
"Ask Alexa—Things That Are Smart Wiki", Online available at:—<http://thingsthataresmart.wiki/index.php?title=Ask_Alexa&oldid=4283>, Jun. 8, 2016, pp. 1-31.
Berry et al., "PTIME: Personalized Assistance for Calendaring", ACM Transactions on Intelligent Systems and Technology, vol. 2, No. 4, Article 40, Jul. 2011, pp. 1-22.
Bertolucci, Jeff, "Google Adds Voice Search to Chrome Browser", PC World, Jun. 14, 2011, 5 pages.
Butcher, Mike, "EVI Arrives in Town to go Toe-to-Toe with Siri", TechCrunch, Jan. 23, 2012, pp. 1-2.
Caraballo et al., "Language Identification Based on a Discriminative Text Categorization Technique", Iberspeech 2012—VII Jornadas En Tecnologia Del Habla And III Iberian Sltech Workshop, Nov. 21, 2012, pp. 1-10.
Castleos, "Whole House Voice Control Demonstration", Online available at:—<https://www.youtube.com/watch?v=9SRCoxrZ_W4>, Jun. 2, 2012, 1 pages.
Chen, Yi, "Multimedia Siri Finds and Plays Whatever You Ask For", PSFK Report, Feb. 9, 2012, pp. 1-9.
Cheyer, Adam, "Adam Cheyer—About", Online available at:—<http://www.adam.cheyer.com/about.html>, retrieved on Sep. 17, 2012, pp. 1-2.
Choi et al., "Acoustic and Visual Signal based Context Awareness System for Mobile Application", IEEE Transactions on Consumer Electronics, vol. 57, No. 2, May 2011, pp. 738-746.
Colt, Sam, "Here's One Way Apple's Smartwatch Could Be Better Than Anything Else", Business Insider, Aug. 21, 2014, pp. 1-4.
Decision to Grant received for Danish Patent Application No. PA201770434, mailed on Dec. 4, 2018, 2 pages.
Decision to Grant received for Danish Patent Application No. PA201770435, mailed on Dec. 14, 2018, 2 pages.
Decision to Grant received for Danish Patent Application No. PA201870504, mailed on Jan. 24, 2020, 2 pages.
Decision to Grant received for European Patent Application No. 18732187.2, mailed on Jun. 25, 2020, 2 pages.
Decision to Grant received for European Patent Application No. 19150939.7, mailed on Jun. 25, 2020, 2 pages.
Deedeevuu, "Amazon Echo Alarm Feature", Online available at:—<https://www.youtube.com/watch?v=fdjU8eRLk7c>, Feb. 16, 2015, 1 page.
"Directv™ Voice", Now Part of the Directtv Mobile App for Phones, Sep. 18, 2013, 5 pages.
Evi, "Meet Evi: The One Mobile Application that Provides Solutions for your Everyday Problems", Feb. 2012, 3 pages.
Extended European Search Report received for European Patent Application No. 19150939.7, mailed on Apr. 17, 2019, 9 pages.
Extended European Search Report received for European Patent Application No. 20179164.7, mailed on Oct. 30, 2020, 12 pages.
Final Office Action received for U.S. Appl. No. 15/679, 108, mailed on Aug. 26, 2019, 22 pages.
Final Office Action received for U.S. Appl. No. 15/679, 108, mailed on Oct. 19, 2020, 21 pages.
Final Office Action received for U.S. Appl. No. 16/267, 146, mailed on Sep. 17, 2019, 21 pages.
Findlater et al., "Beyond QWERTY: Augmenting Touch-Screen Keyboards with Multi-Touch Gestures for Non-Alphanumeric Input", CHI '12, May 5-10, 2012, 4 pages.
Gannes, Liz, "Alfred App Gives Personalized Restaurant Recommendations", AllThingsD, Jul. 18, 2011, pp. 1-3.
Guay, Matthew, "Location-Driven Productivity with Task Ave", Online available at:—<http://iphone.appstorm.net/reviews/productivity/location-driven-productivity-with-task-ave/>, Feb. 19, 2011, 7 pages.
Guim, Mark, "How to Set a Person-Based Reminder with Cortana", Online available at:—http://www.wpcentral.com/how-to-person-based-reminder-cortana>, Apr. 26, 2014, 15 pages.
Hardawar, Devindra, "Driving App Waze Builds its own Siri for Hands-Free Voice Control", Online available at:—<http://venturebeat.com/2012/02/09/driving-app-waze-builds-its-own-siri-for-hands-free-voice-control/>, retrieved on Feb. 9, 2012, 4 pages.
Hashimoto, Yoshiyuki, "Simple Guide for iPhone Siri, which can be Operated with your Voice", Shuwa System Co. Ltd., vol. 1, Jul. 5, 2012, pp. 8, 130, 131.
"Headset Button Controller v7.3 APK Full APP Download for Andriod, Blackberry, iPhone", Online available at:—<http://fullappdownload.com/headset-button-controller-v7-3-apk/>, Jan. 27, 2014, 11 pages.
"Hear Voice from Google Translate", Online available at:—<https://www.youtube.com/watch?v=18AvMhFqD28>, Jan. 28, 2011, 1 page.
id3.org, "id3v2.4.0-Frames", Online available at:—<http://id3.org/id3v2.4.0-frames?action=print>, retrieved on Jan. 22, 2015, pp. 1-41.
Intention to Grant received for Danish Patent Application No. PA201770434, mailed on Jul. 2, 2018, 2 pages.
Intention to Grant received for Danish Patent Application No. PA201770434, mailed on Sep. 18, 2018, 2 pages.
Intention to Grant received for Danish Patent Application No. PA201770435, mailed on Jul. 2, 2018, 2 pages.
Intention to Grant received for Danish Patent Application No. PA201770435, mailed on Sep. 18, 2018, 2 pages.
Intention to Grant received for Danish Patent Application No. PA201870504, mailed on Sep. 23, 2019, 2 pages.
Intention to Grant received for European Patent Application No. 18732187.2, mailed on Mar. 25, 2020, 7 pages.
Intention to Grant received for European Patent Application No. 19150939.7, mailed on Feb. 4, 2020, 8 pages.
"Interactive Voice", Online available at:—http://www.helloivee.com/company/>, retrieved on Feb. 10, 2014, 2 pages.
International Preliminary Report on Patentability received for PCT Patent Application No. PCT/US2018/032919, mailed on Nov. 28, 2019, 22 pages.
International Search Report and Written Opinion received for PCT Patent Application No. PCT/US2018/032919, mailed on Oct. 12, 2018, 32 pages.
Invitation to Pay Additional Fees and Partial International Search Report received for PCT Patent Application No. PCT/US2018/032919, mailed on Jul. 26, 2018, 17 pages.

(56) References Cited

OTHER PUBLICATIONS

Jawaid et al., "Machine Translation with Significant Word Reordering and Rich Target-Side Morphology", WDS'11 Proceedings of Contributed Papers, Part I, 2011, pp. 161-166.
Jonsson et al., "Proximity-based Reminders Using Bluetooth", 2014 IEEE International Conference on Pervasive Computing and Communications Demonstrations, 2014, pp. 151-153.
Jouvet et al., "Evaluating Grapheme-to-phoneme Converters in Automatic Speech Recognition Context", IEEE, 2012, pp. 4821-4824.
Kazmucha Allyson, "How to Send Map Locations Using iMessage", iMore.com, Online available at:—<http://www.imore.com/how-use-imessage-share-your-location-your-iphone>, Aug. 2, 2012, 6 pages.
Kickstarter, "Ivee Sleek: Wi-Fi Voice-Activated Assistant", Online available at:—<https://www.kickstarter.com/projects/ivee/ivee-sleek-wi-fi-voice-activated-assistant>, retrieved on Feb. 10, 2014, pp. 1-13.
Lewis Cameron, "Task Ave for iPhone Review", Mac Life, Online available at:—<http://www.maclife.com/article/reviews/task_ave_iphone_review>, Mar. 3, 2011, 5 pages.
"Meet Ivee, Your Wi-Fi Voice Activated Assistant", Availale Online at:—<http://www.helloivee.com/>, retrieved on Feb. 10, 2014, 8 pages.
Miller Chance, "Google Keyboard Updated with New Personalized Suggestions Feature", Online available at:—<http://9to5google.com/2014/03/19/google-keyboard-updated-with-new-personalized-suggestions-feature/>, Mar. 19, 2014, 4 pages.
"Mobile Speech Solutions, Mobile Accessibility", SVOX AG Product Information Sheet, Online available at:—<http://www.svox.com/site/bra840604/con782768/mob965831936.aSQ?osLang=1>, Sep. 27, 2012, 1 page.
Morrison Jonathan, "iPhone 5 Siri Demo", Online Available at:—<https://www.youtube.com/watch?v =_wHWwG5lhWc>, Sep. 21, 2012, 3 pages.
My Cool Aids, "What's New", Online available at:—<http://www.mycoolaids.com/>, 2012, 1 page.
"Natural Language Interface Using Constrained Intermediate Dictionary of Results", List of Publications Manually reviewed for the Search of U.S. Pat. No. 7,177,798, Mar. 22, 2013, 1 page.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Non-Final Office Action received for U.S. Appl. No. 15/679,108, mailed on Apr. 2, 2021, 28 pages.
Non-Final Office Action received for U.S. Appl. No. 15/679,108, mailed on Jan. 30, 2019, 25 pages.
Non-Final Office Action received for U.S. Appl. No. 15/679,108, mailed on Mar. 6, 2020, 21 pages.
Non-Final Office Action received for U.S. Appl. No. 16/267,146, mailed on Jun. 17, 2019, 23 pages.
Notice of Acceptance received for Australian Patent Application No. 2018271099, mailed on Feb. 5, 2019, 3 pages.
Notice of Acceptance received for Australian Patent Application No. 2019200295, mailed on Feb. 13, 2019, 3 pages.
Notice of Acceptance received for Australian Patent Application No. 2019203392, mailed on Nov. 14, 2019, 3 pages.
Notice of Acceptance received for Australian Patent Application No. 2020201470, mailed on May 6, 2021, 3 pages.
Notice of Allowance received for Chinese Patent Application No. 201910065508.2, mailed on Apr. 8, 2021, 6 pages.
Notice of Allowance received for Chinese Patent Application No. 201910310783.6, mailed on May 20, 2020, 6 pages.
Notice of Allowance received for Japanese Patent Application No. 2018-567925, mailed on Sep. 20, 2019, 4 pages.
Notice of Allowance received for Japanese Patent Application No. 2019-001345, mailed on Jun. 19, 2020, 4 pages.
Notice of Allowance received for Korean Patent Application No. 10-2018-7038134, mailed on Jan. 7, 2020, 4 pages.
Notice of Allowance received for Korean Patent Application No. 10-2019-7001796, mailed on Dec. 9, 2019, 5 pages.
Notice of Allowance received for Korean Patent Application No. 10-2020-7010065, mailed on Apr. 14, 2021, 4 pages.
Notice of Allowance received for U.S. Appl. No. 15/679,108, mailed on Aug. 25, 2021, 17 pages.
Notice of Allowance received for U.S. Appl. No. 16/267,146, mailed on Apr. 9, 2020, 12 pages.
Nozawa et al., "iPhone 4S Perfect Manual", vol. 1, First Edition, Nov. 11, 2011, 4 pages.
Office Action received for Australian Patent Application No. 2020201470, mailed on Dec. 4, 2020, 4 pages.
Office Action received for Chinese Patent Application No. 201910065508.2, mailed on Dec. 8, 2020, 11 pages.
Office Action received for Chinese Patent Application No. 201910065508.2, mailed on Jul. 21, 2020, 10 pages.
Office Action received for Chinese Patent Application No. 201910065508.2, mailed on Nov. 11, 2019, 14 pages.
Office Action received for Chinese Patent Application No. 201910310783.6, mailed on Nov. 25, 2019, 6 pages.
Office Action received for Danish Patent Application No. PA201770434, mailed on Apr. 5, 2018, 3 pages.
Office Action received for Danish Patent Application No. PA201770435, mailed on Apr. 9, 2018, 3 pages.
Office Action received for Danish Patent Application No. PA201870504, mailed on Apr. 29, 2019, 4 pages.
Office Action received for European Patent Application No. 18732187.2, mailed on Sep. 30, 2019, 6 pages.
Office Action received for European Patent Application No. 20179164.7, mailed on Jun. 18, 2021, 4 pages.
Office Action received for Japanese Patent Application No. 2018-567925, mailed on Jun. 7, 2019, 5 pages.
Office Action received for Japanese Patent Application No. 2019-001345, mailed on Jun. 18, 2019, 11 pages.
Office Action received for Japanese Patent Application No. 2019-001345, mailed on Oct. 28, 2019, 7 pages.
Office Action received for Japanese Patent Application No. 2020-123111, mailed on Jun. 25, 2021, 10 pages.
Office Action received for Korean Patent Application No. 10-2018-7038134, mailed on Apr. 25, 2019, 5 pages.
Office Action received for Korean Patent Application No. 10-2018-7038134, mailed on Sep. 3, 2019, 11 pages.
Office Action received for Korean Patent Application No. 10-2019-7001796, mailed on Apr. 24, 2019, 5 pages.
Office Action received for Korean Patent Application No. 10-2020-7010065, mailed on Jun. 5, 2020, 11 pages.
Osxdaily, "Get a List of Siri Commands Directly from Siri", Online available at: <http://osxdaily.com/2013/02/05/list-siri-commands/>, Feb. 5, 2013, 15 pages.
Pathak et al., "Privacy-preserving Speech Processing: Cryptographic and String-matching Frameworks Show Promise", In: IEEE signal processing magazine, Online available at:—<http://www.merl.com/publications/docs/TR2013-063.pdf>, Feb. 13, 2013, 16 pages.
Patra et al., "A Kernel-Based Approach for Biomedical Named Entity Recognition", Scientific World Journal, vol. 2013, 2013, pp. 1-7.
Rios Mafe, "New Bar Search for Facebook", YouTube, available at:—<https://www.youtube.com/watch?v=vwgN1WbvCas>, Jul. 19, 2013, 2 pages.
Routines, "SmartThings Support", Online available at:—<https://web.archive.org/web/20151207165701/https://support.smartthings.com/hc/en-us/articles/205380034-Routines>, 2015, 3 pages.
Sarawagi Sunita, "CRF Package Page", Online available at:—<http://crf.sourceforge.net/>, retrieved on Apr. 6, 2011, 2 pages.
Search Report and Opinion received for Danish Patent Application No. PA201870504, mailed on Oct. 12, 2018, 12 pages.
Search Report received for Danish Patent Application No. PA201770434, mailed on Oct. 18, 2017, 8 pages.
Search Report received for Danish Patent Application No. PA201770435, mailed on Oct. 24, 2017, 8 pages.
Simonite, Tom, "One Easy Way to Make Siri Smarter", Technology Review, Oct. 18, 2011, 2 pages.

(56) References Cited

OTHER PUBLICATIONS

"SmartThings +Amazon Echo", Smartthings Samsung [online], Online available at:—<https://web.archive.org/web/20160509231428/https://blog.smartthings.com/featured/alexa-turn-on-my-smartthings/>, Aug. 21, 2015, 3 pages.
SRI, "SRI Speech: Products: Software Development Kits: EduSpeak", Online available at:—<http://web.archive.org/web/20090828084033/http://www.speechatsri.com/products/eduspeak>shtml, retrieved on Jun. 20, 2013, pp. 1-2.
Sullivan Danny, "How Google Instant's Autocomplete Suggestions Work", Online available at:—<http://searchengineland.com/how-google-instant-autocomplete-suggestions-work-62592>, Apr. 6, 2011, 12 pages.
Sundaram et al., "Latent Perceptual Mapping with Data-Driven Variable-Length Acoustic Units for Template-Based Speech Recognition", ICASSP 2012, Mar. 2012, pp. 4125-4128.
Tofel et al., "SpeakToit: A Personal Assistant for Older iPhones, iPads", Apple News, Tips and Reviews, Feb. 9, 2012, 7 pages.
Tucker Joshua, "Too Lazy to Grab Your TV Remote? Use Siri Instead", Engadget, Nov. 30, 2011, pp. 1-8.
Vodafone Deutschland, "Samsung Galaxy S3 Tastatur Spracheingabe", Online available at—https://www.youtube.com/watch?v=6kOd6Gr8uFE>, Aug. 22, 2012, 1 page.
Wikipedia, "Acoustic Model", Online available at:—<http://en.wikipedia.org/wiki/AcousticModel>, retrieved on Sep. 14, 2011, pp. 1-2.
Wikipedia, "Language Model", Online available at:—<http://en.wikipedia.org/wiki/Language_model>, retrieved on Sep. 14, 2011, 4 pages.
Wikipedia, "Speech Recognition", Online available at:—<http://en.wikipedia.org/wiki/Speech_recognition>, retrieved on Sep. 14, 2011, 12 pages.
Xiang et al., "Correcting Phoneme Recognition Errors in Learning Word Pronunciation through Speech Interaction", Speech Communication, vol. 55, No. 1, Jan. 1, 2013, pp. 190-203.
Yan et al., "A Scalable Approach to Using DNN-derived Features in GMM-HMM Based Acoustic Modeling for LVCSR", 14th Annual Conference of the International Speech Communication Association, InterSpeech 2013, Aug. 2013, pp. 104-108.
Zainab, "Google Input Tools Shows Onscreen Keyboard in Multiple Languages. [Chrome]", Online available at:—<http://www.addictivetips.com/internet-tips/google-input-tools-shows-multiple-language-onscreen-keyboards-chrome/>, Jan. 3, 2012, 3 pages.
Zangerle et al., "Recommending # Tags in Twitter", proceedings of the Workshop on Semantic Adaptive Socail Web, 2011, pp. 1-12.
Zhong et al., "JustSpeak: Enabling Universal Voice Control on Android", W4A'14, Proceedings of the 11th Web for All Conference, No. 36, Apr. 7-9, 2014, 8 pages.
Aaaaplay, "Sony Media Remote for iOS and Android", Online available at: <https://www.youtube.com/watch?v=W8QoeQhlGok>, Feb. 4, 2012, 3 pages.
Abdelaziz et al., "Speaker-Independent Speech-Driven Visual Speech Synthesis using Domain-Adapted Acoustic Models", May 15, 2019, 9 pages.
Accessibility on iOS, Apple Inc., online available at: https://developer.apple.com/accessibility/ios/, Retrieved on Jul. 26, 2021, 2 pages.
Alsharif et al., "Long Short-Term Memory Neural Network for Keyboard Gesture Decoding", IEEE International Conference on Acoustics, Speech and Signal Processing (ICASSP), Brisbane, Australia, Sep. 2015, 5 pages.
Android Authority, "How to use Tasker: A Beginner's Guide", Online available at:—<https://youtube.com/watch?v= rDpdS_YWzFc>, May 1, 2013, 1 page.
Apple Differential Privacy Team, "Learning with Privacy at Scale", Apple Machine Learning Blog, vol. 1, No. 8, Online available at: <https://machinelearning.apple.com/2017/12/06/learning-with-privacy-at-scale.html>, Dec. 2017, 9 pages.
Asakura et al., "What LG thinks; How the TV should be in the Living Room", HiVi, vol. 31, No. 7, Stereo Sound Publishing, Inc., Jun. 17, 2013, pp. 68-71 (Official Copy Only). {See communication under 37 CFR § 1.98(a) (3)}.
Ashingtondctech & Gaming, "SwipeStatusBar—Reveal the Status Bar in a Fullscreen App", Online Available at: <https://www.youtube.com/watch?v=wA_tT9IAreQ>, Jul. 1, 2013, 3 pages.
Automate Your Life, "How to Setup Google Home Routines—A Google Home Routines Walkthrough", Online Available at: <https://www.youtube.com/watch?v=pXokZHP9kZg>, Aug. 12, 2018, 1 page.
Bell, Jason, "Machine Learning Hands-On for Developers and Technical Professionals", Wiley, 2014, 82 pages.
Bellegarda, Jeromer, "Chapter 1: Spoken Language Understanding for Natural Interaction: The Siri Experience", Natural Interaction with Robots, Knowbots and Smartphones, 2014, pp. 3-14.
Bellegarda, Jeromer, "Spoken Language Understanding for Natural Interaction: The Siri Experience", Slideshow retrieved from: <https://www.uni-ulm.de/fileadmin/website_uni_ulm/iui.iwsds2012/files/Bellegarda.pdf>, International Workshop on Spoken Dialog Systems (IWSDS), May 2012, pp. 1-43.
beointegration.com, "BeoLink Gateway—Programming Example", Online Available at: <https:/ /www.youtube.com/watch?v=TXDaJFm5UH4>, Mar. 4, 2015, 3 pages.
Bodapati et al., "Neural Word Decomposition Models for Abusive Language Detection", Proceedings of the Third Workshop on Abusive Language Online, Aug. 1, 2019, pp. 135-145.
Burgess, Brian, "Amazon Echo Tip: Enable the Wake-Up Sound", Online available at:—<https://www.groovypost.com/howto/amazon-echo-tip-enable-wake-up-sound/>, Jun. 30, 2015, 4 pages.
Büttner et al., "The Design Space of Augmented and Virtual Reality Applications for Assistive Environments in Manufacturing: A Visual Approach", In Proceedings of the 10th International Conference on PErvasive Technologies Related to Assistive Environments (PETRA '17), Island of Rhodes, Greece, Online available at: https://dl.acm.org/doi/pdf/10.1145/3056540.3076193, Jun. 21-23, 2017, pp. 433-440.
Cambria et al., "Jumping NLP curves: A Review of Natural Language Processing Research.", IEEE Computational Intelligence magazine, 2014, vol. 9, May 2014, pp. 48-57.
Chang et al., "Monaural Multi-Talker Speech Recognition with Attention Mechanism and Gated Convolutional Networks", Interspeech 2018, Sep. 2-6, 2018, pp. 1586-1590.
Chen et al., "A Convolutional Neural Network with Dynamic Correlation Pooling", 13th International Conference on Computational Intelligence and Security, IEEE, 2017, pp. 496-499.
Chen et al., "Progressive Joint Modeling in Unsupervised Single-Channel Overlapped Speech Recognition", IEEE/ACM Transactions on Audio, Speech, and Language Processing, vol. 26, No. 1, Jan. 2018, pp. 184-196.
Chen, Angela, "Amazon's Alexa now handles patient health information", Available online at: <https://www.theverge.com/2019/4/4/18295260/amazon-hipaa-alexa-echo-patient-health-information-privacy-voice-assistant>, Apr. 4, 2019, 2 pages.
Chenghao, Yuan, "MacroDroid", Online available at: https://www.ifanr.com/weizhizao/612531, Jan. 25, 2016, 7 pages (Official Copy Only). {See communication under 37 CFR § 1.98(a) (3)}.
Conneau et al., "Supervised Learning of Universal Sentence Representations from Natural Language Inference Data", Proceedings of the 2017 Conference on Empirical Methods in Natural Language Processing, Copenhagen, Denmark, Sep. 7-11, 2017, pp. 670-680.
Czech Lucas, "A System for Recognizing Natural Spelling of English Words", Diploma Thesis, Karlsruhe Institute of Technology, May 7, 2014, 107 pages.
Dai, et al., "Transformer-XL: Attentive Language Models Beyond a Fixed-Length Context", Online available at: arXiv:1901.02860v3, Jun. 2, 2019, 20 pages.
Delcroix et al., "Context Adaptive Deep Neural Networks for Fast Acoustic Model Adaptation", ICASSP, 2015, pp. 4535-4539.
Delcroix et al., "Context Adaptive Neural Network for Rapid Adaptation of Deep CNN Based Acoustic Models", Interspeech 2016, Sep. 8-12, 2016, pp. 1573-1577.

(56) References Cited

OTHER PUBLICATIONS

Derrick, Amanda, "How to Set Up Google Home for Multiple Users", Lifewire, Online available at:—<https://www.lifewire.com/set-up-google-home-multiple-users-4685691>, Jun. 8, 2020, 9 pages.
Dighe et al., "Lattice-Based Improvements for Voice Triggering Using Graph Neural Networks", in 2020 IEEE International Conference on Acoustics, Speech and Signal Processing (ICASSP), Jan. 25, 2020, 5 pages.
Dihelson, "How Can I Use Voice or Phrases as Triggers to Macrodroid?", Macrodroid Forums, Online Available at:—<https://www.tapatalk.com/groups/macrodroid/how-can-i-use-voice-or-phrases-as-triggers-to-macr-t4845.html>, May 9, 2018, 5 pages.
Dwork et al., "The Algorithmic Foundations of Differential Privacy", Foundations and Trends in Theoretical Computer Science: vol. 9: No. 3-4, 211-407, 2014, 281 pages.
Earthling1984, "Samsung Galaxy Smart Stay Feature Explained", Online available at:—<https://www.youtube.com/watch?v=RpjBNtSjupl>, May 29, 2013, 1 page.
Eder et al., "At the Lower End of Language—Exploring the Vulgar and Obscene Side of German", Proceedings of the Third Workshop on Abusive Language Online, Florence, Italy, Aug. 1, 2019, pp. 119-128.
Edim, et al., "A Multi-Agent Based Virtual Personal Assistant for E-Health Service", Journal of Information Engineering and Applications, vol. 3, No. 11, 2013, 9 pages.
Filipowicz, Luke, "How to use the QuickType keyboard in iOS 8", Online available at:—<https://www.imore.com/comment/568232>, Oct. 11, 2014, pp. 1-17.
Gadget Hacks, "Tasker Too Complicated? Give MacroDroid a Try [How-To]", Online available at: <https://www.youtube.com/watch?v=8YL9cWCykKc>, May 27, 2016, 1 page.
"Galaxy S7: How to Adjust Screen Timeout & Lock Screen Timeout", Online available at :—<https://www.youtube.com/watch?v=n6e1WKUS2ww>, Jun. 9, 2016, 1 page.
Ganin et al., "Unsupervised Domain Adaptation by Backpropagation", in Proceedings of the 32nd International Conference on Machine Learning, vol. 37, Jul. 2015, 10 pages.
Gatys et al., "Image Style Transfer Using Convolutional Neural Networks", Proceedings of IEEE International Conference on Acoustics, Speech and Signal Processing (ICASSP), 2016, pp. 2414-2423.
Geyer et al., "Differentially Private Federated Learning: A Client Level Perspective", arXiv:1712.07557v2, Mar. 2018, 7 pages.
Ghauth et al., "Text Censoring System for Filtering Malicious Content Using Approximate String Matching and Bayesian Filtering", Proc. 4th INNS Symposia Series on Computational Intelligence in Information Systems, Bandar Seri Begawan, Brunei, 2015, pp. 149-158.
Goodfellow et al., "Generative Adversarial Networks", Proceedings of the Neural Information Processing Systems, Dec. 2014, 9 pages.
Google Developers, "Voice search in your app", Online available at:—<https://www.youtube.com/watch?v=PS1FbB5qWEI>, Nov. 12, 2014, 1 page.
Graves, Alex, "Sequence Transduction with Recurrent Neural Networks", Proceeding of International Conference of Machine Learning (ICML) Representation Learning Workshop, Nov. 14, 2012, 9 pages.
Gu et al., "BadNets: Evaluating Backdooring Attacks on Deep Neural Networks", IEEE Access, vol. 7, Mar. 21, 2019, pp. 47230-47244.
Guo et al., "StateLens: A Reverse Engineering Solution for Making Existing Dynamic Touchscreens Accessible", In Proceedings of the 32nd Annual Symposium on User Interface Software and Technology (UIST '19), New Orleans, LA, USA, Online available at: https://dl.acm.org/doi/pdf/10.1145/3332165.3347873, Oct. 20-23, 2019, pp. 371-385.
Guo et al., "Time-Delayed Bottleneck Highway Networks Using a DFT Feature for Keyword Spotting", IEEE International Conference on Acoustics, Speech and Signal Processing (ICASSP). IEEE, 2018, 5 pages.
Guo et al., "VizLens: A Robust and Interactive Screen Reader for Interfaces in the Real World", In Proceedings of the 29th Annual Symposium on User Interface Software and Technology (UIST '16), Tokyo, Japan, Online available at: https://dl.acm.org/doi/pdf/10.1145/2984511.2984518, Oct. 16-19, 2016, pp. 651-664.
Gupta et al., "I-vector-based Speaker Adaptation of Deep Neural Networks For French Broadcast Audio Transcription", ICASSP, 2014, 2014, pp. 6334-6338.
Gupta, Naresh, "Inside Bluetooth Low Energy", Artech House, 2013, 274 pages.
Haung et al., "A Study for Improving Device-Directed Speech Detection Toward Frictionless Human-Machine Interaction", in Proc. Interspeech, 2019, 5 pages.
Hawkeye, "Hawkeye—A better user testing platform", Online Available at: https://www.youtube.com/watch?v=el0TW0g_760, Oct. 16, 2019, 3 pages.
Hawkeye, "Learn where people look in your products", Online Available at: https://www.usehawkeye.com, 2019, 6 pages.
Heller et al., "AudioScope: Smartphones as Directional Microphones in Mobile Audio Augmented Reality Systems", In Proceedings of the 33rd Annual ACM Conference on Human Factors in Computing Systems (CHI '15), Crossings, Seoul, Korea, Online available at: https://dl.acm.org/doi/pdf/10.1145/2702123.2702159, Apr. 18-23, 2015, pp. 949-952.
Henderson et al., "Efficient Natural Language Response Suggestion for Smart Reply", Available Online at: https://static.googleusercontent.com/media/research.google.com/en//pubs/archive/1846e8a466c079eae7e90727e27caf5f98f10e0c.pdf, 2017, 15 pages.
Hershey et al., "Deep Clustering: Discriminative Embeddings For Segmentation and Separation", Proc. ICASSP, Mar. 2016, 6 pages.
"Hey Google: How to Create a Shopping List with Your Google Assistant", Online available at:—<https://www.youtube.com/watch?v=w9NCsElax1Y>, May 25, 2018, 1 page.
Hinton et al., "Distilling the Knowledge in A Neural Network", arXiv preprintarXiv:1503.02531, Mar. 2, 2015, 9 pages.
"How to Enable Google Assistant on Galaxy S7 and Other Android Phones (No Root)", Online available at:—<https://www.youtube.com/watch?v=HekIQbWyksE>, Mar. 20, 2017, 1 page.
"How to Use Ok Google Assistant Even Phone is Locked", Online available at:—<https://www.youtube.com/watch?v=9B_gP4j_SP8>, Mar. 12, 2018, 1 page.
Hutsko et al., "iPhone All-in-One for Dummies", 3rd Edition, 2013, 98 pages.
Idasallinen, "What's The 'Like' Meter Based on?", Online Available at:—<https://community.spotify.com/t5/Content-Questions/What-s-the-like-meter-based-on/td-p/1209974>, Sep. 22, 2015, 6 pages.
Ikeda, Masaru, "beGLOBAL SEOUL 2015 Startup Battle: Talkey", YouTube Publisher, Online Available at:—https://www.youtube.com/watch?v=4Wkp7sAAldg>, May 14, 2015, 1 page.
Inews and Tech, "How To Use The QuickType Keyboard In IOS 8", Online available at:—http://www.inewsandtech.com/how-to-use-the-quicktype-keyboard-in-ios-8/>, Sep. 17, 2014, 6 pages.
Intention to Grant received for European Patent Application No. 20179164.7, mailed on Dec. 1, 2021, 8 pages.
Internet Services and Social Net, "How to Search for Similar Websites", Online available at:—<https://www.youtube.com/watch?v=nLf2uirpt5s>, see from 0:17 to 1:06, Jul. 4, 2013, 1 page.
"iPhone 6 Smart Guide Full Version for SoftBank", Gijutsu-Hyohron Co. Ltd., vol. 1, Dec. 1, 2014, 4 pages (Official Copy Only). {See communication under 37 CFR § 1.98(a) (3)}.
Isik et al., "Single-Channel Multi-Speaker Separation using Deep Clustering", Interspeech 2016, Sep. 8-12, 2016, pp. 545-549.
Jeon et al., "Voice Trigger Detection from LVCSR Hypothesis Lattices Using Bidirectional Lattice Recurrent Neural Networks", International Conference on Acoustics, Speech and Signal Processing (ICASSP). IEEE, Feb. 29, 2020, 5 pages.
Kannan et al., "Smart Reply: Automated Response Suggestion for Email", Available Online at: https://arxiv.org/pdf/1606.04870.pdf, Jun. 15, 2016, 10 pages.
Karn, Ujjwal, "An Intuitive Explanation of Convolutional Neural Networks", The Data Science Blog, Aug. 11, 2016, 23 pages.
Kastrenakes, Jacob, "Siri's creators will unveil their new AI bot on Monday", The Verge, Online available at:—<https://web.archive.

(56) References Cited

OTHER PUBLICATIONS org/web/20160505090418/https://www.theverge.com/2016/5/4/11593564/viv-labs-unveiling-monday-new-ai-from-siri-creators>, May 4, 2016, 3 pages.
King et al., "Robust Speech Recognition Via Anchor Word Representations", Interspeech 2017, Aug. 20-24, 2017, pp. 2471-2475.
Kondrat, Tomek, "Automation for Everyone with MacroDroid", Online available at: https://www.xda-developers.com/automation-for-everyone-with-macrodroid/, Nov. 17, 2013, 6 pages.
Kruger et al., "Virtual World Accessibility with the Perspective Viewer", Proceedings of ICEAPVI, Athens, Greece, Feb. 12-14, 2015, 6 pages.
Kumar, Shiu, "Ubiquitous Smart Home System Using Android Application", International Journal of Computer Networks & Communications (IJCNC) vol. 6, No. 1, Jan. 2014, pp. 33-43.
Kumatani et al., "Direct Modeling of Raw Audio with DNNS For Wake Word Detection", in 2017 IEEE Automatic Speech Recognition and Understanding Workshop (ASRU), 2017, 6 pages.
Lee, Sungjin, "Structured Discriminative Model for Dialog State Tracking", Proceedings of the SIGDIAL 2013 Conference, Aug. 22-24, 2013, pp. 442-451.
Lin, Luyuan, "An Assistive Handwashing System with Emotional Intelligence", Using Emotional Intelligence in Cognitive Intelligent Assistant Systems, 2014, 101 pages.
"Link Your Voice to Your Devices with Voice Match, Google Assistant Help", Online available at: <https://support.google.com/assistant/answer/9071681?co=GENIE.Platform%3DAndroid&hl=en>, Retrieved on Jul. 1, 2020, 2 pages.
Liou et al., "Autoencoder for Words", Neurocomputing, vol. 139, Sep. 2014, pp. 84-96.
Liu et al., "Accurate Endpointing with Expected Pause Duration", Sep. 6-10, 2015, pp. 2912-2916.
Loukides et al., "What Is the Internet of Things?", O'Reilly Media, Inc., Online Available at: <https://www.oreilly.com/library/view/what-is-the/9781491975633/>, 2015, 31 pages.
Luo et al., "Speaker-Independent Speech Separation with Deep Attractor Network", IEEE/ACM Transactions on Audio, Speech, and Language Processing, vol. 26, No. 4, Apr. 2018, pp. 787-796.
Maas et al., "Combining Acoustic Embeddings and Decoding Features for End-of-Utterance Detection in Real-Time Far-Field Speech Recognition Systems", in 2018 IEEE International Conference on Acoustics, Speech and Signal Processing (ICASSP). IEEE, 2018, 5 pages.
Mallidi et al., "Device-Directed Utterance Detection", Proc. Interspeech, Aug. 7, 2018, 4 pages.
Marketing Land, "Amazon Echo: Play music", Online Available at:—<https://www.youtube.com/watch?v=A7V5NPbsXi4>, Apr. 27, 2015, 3 pages.
"Method to Provide Remote Voice Navigation Capability on the Device", ip.com, Jul. 21, 2016, 4 pages.
Mhatre et al., "Donna Interactive Chat-bot acting as a Personal Assistant", International Journal of Computer Applications (0975-8887), vol. 140, No. 10, Apr. 2016, 6 pages.
Microsoft Soundscape—A map delivered in 3D sound, Microsoft Research, Online available at: https://www.microsoft.com/en-us/research/product/soundscape/, Retrieved on Jul. 26, 2021, 5 pages.
Mikolov et al., "Linguistic Regularities in Continuous Space Word Representations", Proceedings of NAACL-HLT, Jun. 9-14, 2013, pp. 746-751.
Mnih et al., "Human-Level Control Through Deep Reinforcement Learning", Nature, vol. 518, Feb. 26, 2015, pp. 529-533.
Modern Techies, "Braina-Artificial Personal Assistant for PC (like Cortana, Siri)!!!!", Online available at: <https://www.youtube.com/watch?v =_Coo2P8ilqQ>, Feb. 24, 2017, 3 pages.
Müller et al., "A Taxonomy for Information Linking in Augmented Reality", AVR 2016, Part I, LNCS 9768, 2016, pp. 368-387.
Muller et al., "Control Theoretic Models of Pointing", ACM Transactions on Computer-Human Interaction, Aug. 2017, 36 pages.
Nakamura et al., "Study of Information Clouding Methods to Prevent Spoilers of Sports Match", Proceedings of the International Working Conference on Advanced Visual Interfaces (AVI' 12), ISBN: 978-1-4503-1287-5, May 2012, pp. 661-664.
Nakamura et al., "Study of Methods to Diminish Spoilers of Sports Match: Potential of a Novel Concept "Information Clouding"", vol. 54, No. 4, ISSN: 1882-7764. Online available at: <https://ipsj.ixsq.nii.ac.jp/ej/index.php?active_action=repository_view_main_item_detail&page_id=13&block_id=8&item_id=91589&item_no=1>, Apr. 2013, pp. 1402-1412 (Official Copy Only). {See communication under 37 CFR § 1.98(a) (3)}.
Norouzian et al., "Exploring Attention Mechanism for Acoustic based Classification of Speech Utterances into System-Directed and Non-System-Directed", International Conference on Acoustics, Speech and Signal Processing (ICASSP). IEEE, Feb. 1, 2019, 5 pages.
Pak, Gamerz, "Braina: Artificially Intelligent Assistant Software for Windows PC in (urdu / hindhi)", Online available at: <https://www.youtube.com/watch?v=JH_rMjw8lqc>, Jul. 24, 2018, 3 pages.
Pavlopoulos et al., "ConvAI at SemEval-2019 Task 6: Offensive Language Identification and Categorization with Perspective and BERT", Proceedings of the 13th International Workshop on Semantic Evaluation (SemEval-2019), Jun. 6-7, 2019, pp. 571-576.
Pc Mag, "How to Voice Train Your Google Home Smart Speaker", Online available at: <https://in.pcmag.com/google-home/126520/how-to-voice-train-your-google-home-smart-speaker>, Oct. 25, 2018, 12 pages.
Pennington et al., "GloVe: Global Vectors for Word Representation", Proceedings of the Conference on Empirical Methods Natural Language Processing (EMNLP), Doha, Qatar, Oct. 25-29, 2014, pp. 1532-1543.
Perlow, Jason, "Alexa Loop Mode with Playlist for Sleep Noise", Online Available at: <https://www.youtube.com/watch?v=nSkSuXziJSg>, Apr. 11, 2016, 3 pages.
Philips, Chris, "Thumbprint Radio: A Uniquely Personal Station Inspired by All of Your Thumbs Up", Pandora News, Online Available at:—<https://blog.pandora.com/author/chris-phillips/>, Dec. 14, 2015, 7 pages.
Ping, et al., "Deep Voice 3: Scaling Text to Speech with Convolutional Sequence Learning", Available online at: https://arxiv.org/abs/1710.07654, Feb. 22, 2018, 16 pages.
pocketables.com,"AutoRemote example profile", Online available at: https://www.youtube.com/watch?v=kC_zhUnNZj8, Jun. 25, 2013, 1 page.
"Pose, Cambridge Dictionary Definition of Pose", Available online at: <https://dictionary.cambridge.org/dictionary/english/pose>, 4 pages.
Qian et al., "Single-channel Multi-Talker Speech Recognition With Permutation Invariant Training", Speech Communication, Issue 104, 2018, pp. 1-11.
"Quick Type Keyboard on IOS 8 Makes Typing Easier", Online available at:—<https://www.youtube.com/watch?v=0CldLR4fhVU>, Jun. 3, 2014, 3 pages.
"Radio Stations Tailored to You Based on the Music You Listen to on iTunes", Apple Announces iTunes Radio, Press Release, Jun. 10, 2013, 3 pages.
Rasch, Katharina, "Smart Assistants for Smart Homes", Doctoral Thesis in Electronic and Computer Systems, 2013, 150 pages.
Raux, Antoine, "High-Density Dialog Management The Topic Stack", Adventures in High Density, Online available at: https://medium.com/adventures-in-high-density/high-density-dialog-management-23efcf91db1e, Aug. 1, 2018, 10 pages.
Ravi, Sujith, "Google AI Blog: On-device Machine Intelligence", Available Online at: https://ai.googleblog.com/2017/02/on-device-machine-intelligence.html, Feb. 9, 2017, 4 pages.
Ritchie, Rene, "QuickType keyboard in iOS 8: Explained", Online Available at:—<https://www.imore.com/quicktype-keyboards-ios-8-explained>, Jun. 21, 2014, pp. 1-19.
Robbins, F Mike, "Automatically place an Android Phone on Vibrate at Work", Available online at: https://mikefrobbins.com/2016/07/21/automatically-place-an-android-phone-on-vibrate-at-work/, Jul. 21, 2016, pp. 1-11.
Rodrigues et al., "Exploring Mixed Reality in Specialized Surgical Environments", In Proceedings of the 2017 CHI Conference Extended Abstracts on Human Factors in Computing Systems (CHI EA '17), Denver, CO, USA, Online available at: https://dl.acm.org/doi/pdf/10.1145/3027063.3053273, May 6-11, 2017, pp. 2591-2598.

(56) References Cited

OTHER PUBLICATIONS

Ross et al., "Epidemiology as a Framework for Large-Scale Mobile Application Accessibility Assessment", In Proceedings of the 19th International ACM SIGACCESS Conference on Computers and Accessibility (ASSETS '17), Baltimore, MD, USA, Online available at: https://dl.acm.org/doi/pdf/10.1145/3132525.3132547, Oct. 29-Nov. 1, 2017, pp. 2-11.
Rowland et al., "Designing Connected Products: UX for the Consumer Internet of Things", O'Reilly, May 2015, 452 pages.
Samsung Support, "Create a Quick Command in Bixby to Launch Custom Settings by at Your Command", Online Available at:—<https://www.facebook.com/samsungsupport/videos/10154746303151213>, Nov. 13, 2017, 1 page.
Santos et al., "Fighting Offensive Language on Social Media with Unsupervised Text Style Transfer", Proceedings of the 56th Annual Meeting of the Association for Computational Linguistics (vol. 2: Short Papers), May 20, 2018, 6 pages.
Schenk et al., "GazeEverywhere: Enabling Gaze-only User Interaction on an Unmodified Desktop PC in Everyday Scenarios", In Proceedings of the 2017 CHI Conference on Human Factors in Computing Systems (CHI'17). ACM, New York, NY, 30343044. Online Available at: https://doi.org/10.1145/3025453.3025455, May 6-11, 2017, 11 pages.
Seehafer Brent, "Activate Google Assistant on Galaxy S7 with Screen off", Online available at:—<https://productforums.google.com/forum/#!topic/websearch/lp3qIGBHLVI>, Mar. 8, 2017, 4 pages.
Selfridge et al., "Interact: Tightly-coupling Multimodal Dialog with an Interactive Virtual Assistant", International Conference on Multimodal Interaction, ACM, Nov. 9, 2015, pp. 381-382.
Senior et al., "Improving DNN Speaker Independence With I-Vector Inputs", ICASSP, 2014, pp. 225-229.
Seroter et al., "SOA Patterns with BizTalk Server 2013 and Microsoft Azure", Packt Publishing, Jun. 2015, 454 pages.
Settle et al., "End-to-End Multi-Speaker Speech Recognition", Proc. ICASSP, Apr. 2018, 6 pages.
Shen et al., "Style Transfer from Non-Parallel Text by Cross-Alignment", 31st Conference on Neural Information Processing Systems (NIPS 2017), 2017, 12 pages.
Sigtia et al., "Efficient Voice Trigger Detection for Low Resource Hardware", in Proc. Interspeech 2018, Sep. 2-6, 2018, pp. 2092-2096.
Sigtia et al., "Multi-Task Learning for Voice Trigger Detection", in IEEE International Conference on Acoustics, Speech and Signal Processing (ICASSP), 2020, Apr. 20, 2020, 5 pages.
Simonite, Tom, "Confronting Siri: Microsoft Launches Digital Assistant Cortana", 2014, 2 pages (Official Copy Only). {See communication under 37 CFR § 1.98(a) (3)}.
Siou, Serge, "How to Control Apple TV 3rd Generation Using Remote app", Online available at: <https://www.youtube.com/watch?v=PhyKftZ0S9M>, May 12, 2014, 3 pages.
"Skilled at Playing my iPhone 5", Beijing Hope Electronic Press, Jan. 2013, 6 pages (Official Copy Only). {See communication under 37 CFR § 1.98(a) (3)}.
Smith, Jake, "Amazon Alexa Calling: How to Set it up and Use it on Your Echo", iGeneration, May 30, 2017, 5 pages.
Song, Yang, "Research of Chinese Continuous Digital Speech Input System Based on HTK", Computer and Digital Engineering, vol. 40, No. 4, Dec. 31, 2012, 5 pages (Official Copy Only). {See communication under 37 CFR § 1.98(a) (3)}.
Speicher et al., "What is Mixed Reality?", In Proceedings of the 2019 CHI Conference on Human Factors in Computing Systems (CHI '19). ACM, Article 537, Glasgow, Scotland, UK, Online available at: https://dl.acm.org/doi/pdf/10.1145/3290605.3300767, May 4-9, 2019, 15 pages.
Sperber et al., "Self-Attentional Models for Lattice Inputs", in Proceedings of the 57th Annual Meeting of the Association for Computational Linguistics, Florence, Italy, Association for Computational Linguistics, Jun. 4, 2019, 13 pages.
Sundermeyer et al., "From Feedforward to Recurrent LSTM Neural Networks for Language Modeling.", IEEE Transactions to Audio, Speech, and Language Processing, vol. 23, No. 3, Mar. 2015, pp. 517-529.
Sundermeyer et al., "LSTM Neural Networks for Language Modeling", INTERSPEECH 2012, Sep. 9-13, 2012, pp. 194-197.
Sutskever et al., "Sequence to Sequence Learning with Neural Networks", Proceedings of the 27th International Conference on Neural Information Processing Systems, 2014, 9 pages.
Tamar et al., "Value Iteration Networks", Advances in Neural Information Processing Systems, vol. 29, 2016, 16 pages.
Tan et al., "Knowledge Transfer in Permutation Invariant Training for Single-channel Multi-Talker Speech Recognition", ICASSP 2018, 2018, pp. 5714-5718.
Tech Target Contributor, "AI Accelerator", Available online at: https://searchenterpriseai.techtarget.com/definition/AI-accelerator, Apr. 2018, 3 pages.
Tech With Brett, "Everything the Google Nest Hub Can Do", Available online at: https://www.youtube.com/watch?v=x3vdytgru2E, Nov. 12, 2018, 13 pages.
Tech With Brett, "Google Home Multiple Users Setup", Available online at: https://www.youtube.com/watch?v=BQOAbRUeFRo&t=257s, Jun. 29, 2017, 4 pages.
Tkachenko, Sergey, "Chrome will automatically create Tab Groups", Available online at: https://winaero.com/chrome-will-automatically-create-tab-groups/, Sep. 18, 2020, 5 pages.
Tkachenko, Sergey, "Enable Tab Groups Auto Create in Google Chrome", Available online at: https://winaero.com/enable-tab-groups-auto-create-in-google-chrome/, Nov. 30, 2020, 5 pages.
"Use Macrodroid skillfully to automatically clock in with Ding Talk", Online available at: https://blog.csdn.net/qq_26614295/article/details/84304541, Nov. 20, 2018, 11 pages (Official Copy Only). {See communication under 37 CFR § 1.98(a) (3)}.
Vaswani et al., "Attention is all You Need", 31st Conference on Neural Information Processing Systems (NIPS 2017), 2017, pp. 1-11.
Vazquez et al., "An Assisted Photography Framework to Help Visually Impaired Users Properly Aim a Camera", ACM Transactions on Computer-Human Interaction, vol. 21, No. 5, Article 25, Online available at: https://dl.acm.org/doi/pdf/10.1145/2651380, Nov. 2014, 29 pages.
Velian Speaks Tech, "10 Google Assistant Tips!", Available online at: https://www.youtube.com/watch?v=3RNWA3NK9fs, Feb. 24, 2020, 3 pages.
Villemure et al., "The Dragon Drive Innovation Showcase: Advancing the State-of-the-art in Automotive Assistants", 2018, 7 pages.
Walker, Amy, "NHS Gives Amazon Free Use of Health Data Under Alexa Advice Deal", Available online at: <https://www.theguardian.com/society/2019/dec/08/nhs-gives-amazon-free-use-of-health-data-under-alexa-advice-deal>, 3 pages.
Wang et al., "End-to-end Anchored Speech Recognition", Proc. ICASSP2019, May 12-17, 2019, 5 pages.
Wang, et al., "Tacotron: Towards End to End Speech Synthesis", Available online at: https://arxiv.org/abs/1703.10135, Apr. 6, 2017, 10 pages.
Wang, et al., "Training Deep Neural Networks with 8-bit Floating Point Numbers", 32nd Conference on Neural Information Processing Systems (Neurl PS 2018), 2018, 10 pages.
Wei et al., "Design and Implement on Smart Home System", 2013 Fourth International Conference on Intelligent Systems Design and Engineering Applications, Available online at: https://ieeexplore.ieee.org/document/6843433, 2013, pp. 229-231.
Weng et al., "Deep Neural Networks for Single-Channel Multi-Talker Speech Recognition", IEEE/ACM Transactions on Audio, Speech, and Language Processing, vol. 23, No. 10, Oct. 2015, pp. 1670-1679.
"What's on Spotify?", Music for everyone, Online Available at:—<https://web.archive.org/web/20160428115328/https://www.spotify.com/us/>, Apr. 28, 2016, 6 pages.
Wikipedia, "Home Automation", Online Available at:—<https://en.wikipedia.org/w/index.php?title=Home_automation&oldid=686569068>, Oct. 19, 2015, 9 pages.

(56) References Cited

OTHER PUBLICATIONS

Wikipedia, "Siri", Online Available at:—<https://en.wikipedia.org/w/index.php?title=Siri&oldid=689697795>, Nov. 8, 2015, 13 Pages.
Wikipedia, "Virtual Assistant", Wikipedia, Online Available at:—<https://en.wikipedia.org/w/index.php?title=Virtual_assistant&oldid=679330666>, Sep. 3, 2015, 4 pages.
Win, et al., "Myanmar Text to Speech System based on Tacotron-2", International Conference on Information and Communication Tehcnology Convergence (ICTC), Oct. 21-23, 2020, pp. 578-583.
Wu et al., "Monophone-Based Background Modeling for Two-Stage On-device Wake Word Detection", in 2018 IEEE International Conference on Acoustics, Speech and Signal Processing (ICASSP), Apr. 2018, 5 pages.
X.Ai, "How it Works", Online available at:—<https://web.archive.org/web/20160531201426/https://x.ai/how-it-works/>, May 31, 2016, 6 pages.
Xu et al., "Policy Optimization of Dialogue Management in Spoken Dialogue System for Out-of-Domain Utterances", 2016 International Conference on Asian Language Processing (IALP), IEEE, Nov. 21, 2016, pp. 10-13.
Xu et al., "Show, Attend and Tell: Neural Image Caption Generation with Visual Attention", Proceedings of the 32nd International Conference on Machine Learning, Lille, France, 2015, 10 pages.
Yang Astor, "Control Android TV via Mobile Phone APP RKRemoteControl", Online Available at: <https://www.youtube.com/watch?v=zpmUeOX_xro>, Mar. 31, 2015, 4 pages.
Yates Michaelc., "How Can I Exit Google Assistant After I'm Finished with it", Online available at:—<https://productforums.google.com/forum/#!msg/phone-by-google/faECnR2RJwA/gKNtOkQgAQAJ>, Jan. 11, 2016, 2 pages.
Ye et al., "iPhone 4S Native Secret", Jun. 30, 2012, 1 page (Official Copy Only). {See communication under 37 CFR § 1.98(a) (3)}.
Yeh Jui-Feng, "Speech Act Identification Using Semantic Dependency Graphs with Probabilistic Context-free Grammars", ACM Transactions on Asian and Low-Resource Language Information Processing, vol. 15, No. 1, Dec. 2015, pp. 5.1-5.28.
Young et al., "POMDP-Based Statistical Spoken Dialog Systems: A Review", Proceedings of the IEEE, vol. 101, No. 5, 2013, 18 pages.
Yousef, Zulfikara., "Braina (A.I) Artificial Intelligence Virtual Personal Assistant", Online available at:—<https://www.youtube.com/watch?v=2h6xpB8bPSA>, Feb. 7, 2017, 3 pages.
Yu et al., "Permutation Invariant Training of Deep Models for Speaker-Independent Multi-talker Speech Separation", Proc. ICASSP, 2017, 5 pages.
Yu et al., "Recognizing Multi-Talker Speech with Permutation Invariant Training", Interspeech 2017, Aug. 20-24, 2017, pp. 2456-2460.
Zhan et al., "Play with Android Phones", Feb. 29, 2012, 1 page (Official Copy Only). {See communication under 37 CFR § 1.98(a) (3)}.
Zhang et al., "Interaction Proxies for Runtime Repair and Enhancement of Mobile Application Accessibility", In Proceedings of the 2017 CHI Conference on Human Factors in Computing Systems (CHI '17). ACM, Denver, CO, USA, Online available at: https://dl.acm.org/doi/pdf/10.1145/3025453.3025846, May 6-11, 2017, pp. 6024-6037.
Zhang et al., "Very Deep Convolutional Networks for End-To-End Speech Recognition", IEEE International Conference on Acoustics, Speech and Signal Processing (ICASSP), 2017, 5 pages.
Zhao et al., "Big Data Analysis and Application", Aviation Industry Press, Dec. 2015, pp. 236-241 (Official Copy Only). {See communication under 37 CFR § 1.98(a) (3)}.
Zhao et al., "CueSee: Exploring Visual Cues for People with Low Vision to Facilitate a Visual Search Task", In Proceedings of the 2016 ACM International Joint Conference on Pervasive and Ubiquitous Computing. ACM, UbiComp '16, Heidelberg, Germany, Online available at: https://dl.acm.org/doi/pdf/10.1145/2971648.2971730, Sep. 12-16, 2016, pp. 73-84.
Zhao et al., "Enabling People with Visual Impairments to Navigate Virtual Reality with a Haptic and Auditory Cane Simulation", In Proceedings of the 2018 CHI Conference. On Human Factors in Computing Systems (CHI '18). ACM, Article 116, Montréal, QC, Canada, Online available at: https://dl.acm.org/doi/pdf/10.1145/3173574.3173690, Apr. 21-26, 2018, 14 pages.
Zhao et al., "SeeingVR: A Set of Tools to Make Virtual Reality More Accessible to People with Low Vision", In Proceedings of the 2019 CHI Conference on Human Factors in Computing Systems (CHI '19). ACM, Article 111, Glasgow, Scotland, UK, Online available at: https://dl.acm.org/doi/pdf/10.1145/3290605.3300341, May 4-9, 2019, 14 pages.
Zheng, et al., "Intent Detection and Semantic Parsing for Navigation Dialogue Language Processing", 2017 IEEE 20th International Conference on Intelligent Transportation Systems (ITSC), 2017, 6 pages.
Zhou et al., "Learning Dense Correspondence via 3D-guided Cycle Consistency", Proceedings of the IEEE Conference on Computer Vision and Pattern Recognition (CVPR), 2016, 10 pages.
Zmolikova et al., "Speaker-Aware Neural Network Based Beamformer for Speaker Extraction in Speech Mixtures", Interspeech 2017, Aug. 20-24, 2017, pp. 2655-2659.
Office Action received for Japanese Patent Application No. 2023-187807, mailed on Sep. 13, 2024, 13 pages (6 pages of English Translation and 7 pages of Official Copy).

* cited by examiner

FAR-FIELD EXTENSION OF DIGITAL ASSISTANT SERVICES FOR PROVIDING A NOTIFICATION OF AN EVENT TO A USER

CROSS-REFERENCE TO RELATED APPLICATIONS

This application is a continuation of U.S. patent application Ser. No. 15/679,108, filed on Aug. 16, 2017, entitled "FAR-FIELD EXTENSION FOR DIGITAL ASSISTANT SERVICES," now U.S. Pat. No. 11,217,255 issued on Jan. 4, 2022 which claims priority to U.S. Provisional Patent Application Ser. No. 62/507,151, filed on May 16, 2017, entitled "FAR-FIELD EXTENSION FOR DIGITAL ASSISTANT SERVICES," which is hereby incorporated by reference in its entirety for all purposes.

FIELD

This relates generally to intelligent automated assistants and, more specifically, to far field extension for digital assistant services.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

Using a digital assistant typically require direct interaction between the user and the digital assistant. For example, the user may be required to be in close proximity (e.g., in the same room) with the electronic device on which the digital assistant operates. The digital assistant may thus directly receive the user's speech input via its microphone and provide response to the user via its speaker. Under certain circumstances, requiring the user to be in close proximity with the electronic device may cause difficulty and inconvenience for the user to interact with the digital assistant. For example, if the user and the electronic device on which the digital assistant operates are separated beyond a distance (e.g., in different rooms) such that the digital assistant is incapable of, or has difficult of, receiving the user's speech input, the digital assistant may be incapable of providing digital assistant services to the user. Thus, techniques for far-field extension of digital assistant services are desired.

Furthermore, different types of electronic devices may have different capabilities. As a result, digital assistant services provided at different devices may be different. Certain digital assistant services may not be provided at certain devices due to device capability limitations. For example, while a digital assistant operating on a smartphone device may output voice reading of text messages, a digital assistant operating on a TV set-top box may be incapable of doing the same due to device limitations. Thus, it is desired to provide digital assistant services using multiple devices to mitigate the device capability limitation.

SUMMARY

Systems and processes for providing digital assistant services are provided.

Example methods are disclosed herein. An example method includes, at an electronic device having one or more processors, receiving, from a first user, a first speech input representing a user request. The method further includes obtaining an identity of the first user; and in accordance with the user identity, providing a representation of the user request to at least one of a second electronic device or a third electronic device. The method further includes receiving, based on a determination of whether the second electronic device or the third electronic device, or both, is to provide the response to the first electronic device, the response to the user request from the second electronic device or the third electronic device. The method further includes providing a representation the response to the first user.

Example non-transitory computer-readable media are disclosed herein. An example non-transitory computer-readable storage medium stores one or more programs. The one or more programs comprise instructions, which when executed by one or more processors of an electronic device, cause the electronic device to receive, from a first user, a first speech input representing a user request. The one or more programs further comprise instructions that cause the electronic device to obtain an identity of the first user; and in accordance with the user identity, provide a representation of the user request to at least one of a second electronic device or a third electronic device. The one or more programs further comprise instructions that cause the electronic device to receive, based on a determination of whether the second electronic device or the third electronic device, or both, is to provide the response to the first electronic device, the response to the user request from the second electronic device or the third electronic device. The one or more programs further comprise instructions that cause the electronic device to provide a representation of the response to the first user.

Example electronic devices are disclosed herein. An example electronic device comprises one or more processors; a memory; and one or more programs, where the one or more programs are stored in the memory and configured to be executed by the one or more processors, the one or more programs including instructions for receiving, from a first user, a first speech input representing a user request. The one or more programs further include instructions for obtaining an identity of the first user; and in accordance with the user identity, providing a representation of the user request to at least one of a second electronic device or a third electronic device. The one or more programs further include instructions for receiving, based on a determination of whether the second electronic device or the third electronic device, or both, is to provide the response to the first electronic device, the response to the user request from the second electronic device or the third electronic device. The one or more programs further include instructions for providing a representation of the response to the first user.

An example electronic device comprises means for receiving, from a first user, a first speech input representing a user request. The electronic device further includes means obtaining an identity of the first user; and in accordance with the user identity, providing a representation of the user request to at least one of a second electronic device or a third electronic device. The electronic device further includes means for receiving, based on a determination of whether the second electronic device or the third electronic device, or both, is to provide the response to the first electronic device, the response to the user request from the second electronic device or the third electronic device. The electronic device further includes means for providing a representation of the response to the first user.

Example methods are disclosed herein. An example method includes, at an electronic device having one or more processors, receiving a notification of an event associated with a first user. The method further includes, in response to receiving the notification, outputting an indication of the notification. The method further includes receiving one or more speech inputs; and in accordance with the one or more speech inputs, determining whether the notification is to be provided at the first electronic device. The method further includes, in accordance with a determination that the notification is to be provided at the first electronic device, providing the notification at the first electronic device.

Example non-transitory computer-readable media are disclosed herein. An example non-transitory computer-readable storage medium stores one or more programs. The one or more programs comprise instructions, which when executed by one or more processors of an electronic device, cause the electronic device to receive a notification of an event associated with a first user. The one or more programs further include instructions that cause the electronic device to output an indication of the notification in response to receiving the notification. The one or more programs further include instructions that cause the electronic device to receive one or more speech inputs; and in accordance with the one or more speech inputs, determine whether the notification is to be provided at the first electronic device. The one or more programs further include instructions that cause the electronic device to, in accordance with a determination that the notification is to be provided at the first electronic device, provide the notification at the first electronic device.

Example electronic devices are disclosed herein. An example electronic device comprises one or more processors; a memory; and one or more programs, where the one or more programs are stored in the memory and configured to be executed by the one or more processors, the one or more programs including instructions for receiving a notification of an event associated with a first user. The one or more programs including instructions for, in response to receiving the notification, outputting an indication of the notification. The one or more programs including instructions for receiving one or more speech inputs; and in accordance with the one or more speech inputs, determining whether the notification is to be provided at the first electronic device. The one or more programs including instructions for, in accordance with a determination that the notification is to be provided at the first electronic device, providing the notification at the first electronic device.

An example electronic device comprises means for receiving a notification of an event associated with a first user. The electronic device further includes means for, in response to receiving the notification, outputting an indication of the notification. The electronic device further includes means for receiving one or more speech inputs; and in accordance with the one or more speech inputs, determining whether the notification is to be provided at the first electronic device. The electronic device further includes means for, in accordance with a determination that the notification is to be provided at the first electronic device, providing the notification at the first electronic device.

Example methods are disclosed herein. An example method includes, at an electronic device having one or more processors, receiving, from a first user, a first speech input representing a user request. The method further includes obtaining capability data associated with one or more electronic devices capable of being communicatively coupled to the first electronic device. The method further includes, in accordance with the capability data, identifying, from the one or more electronic devices capable of being communicatively coupled to the first electronic device, a second electronic device for providing at least a portion of a response to the user request. The method further includes causing the second electronic device to provide at least a portion of the response to the first user.

Example non-transitory computer-readable media are disclosed herein. An example non-transitory computer-readable storage medium stores one or more programs. The one or more programs comprise instructions, which when executed by one or more processors of an electronic device, cause the electronic device to receive, from a first user, a first speech input representing a user request. The one or more programs further include instructions that cause the electronic device to obtain capability data associated with one or more electronic devices capable of being communicatively coupled to the first electronic device. The one or more programs further include instructions that cause the electronic device to, in accordance with the capability data, identify, from the one or more electronic devices capable of being communicatively coupled to the first electronic device, a second electronic device for providing at least a portion of a response to the user request. The one or more programs further include instructions that cause the electronic device to provide at least a portion of the response to the first user.

Example electronic devices are disclosed herein. An example electronic device comprises one or more processors; a memory; and one or more programs, where the one or more programs are stored in the memory and configured to be executed by the one or more processors, the one or more programs including instructions for receiving, from a first user, a first speech input representing a user request. The one or more programs further include instructions for obtaining capability data associated with one or more electronic devices capable of being communicatively coupled to the first electronic device. The one or more programs further include instructions for, in accordance with the capability data, identifying, from the one or more electronic devices capable of being communicatively coupled to the first electronic device, a second electronic device for providing at least a portion of a response to the user request. The one or more programs further include instructions for causing the second electronic device to provide at least a portion of the response to the first user.

An example electronic device comprises means for receiving, from a first user, a first speech input representing a user request. The electronic device further includes means for obtaining capability data associated with one or more electronic devices capable of being communicatively coupled to the first electronic device. The electronic device further includes means for, in accordance with the capability data, identifying, from the one or more electronic devices capable of being communicatively coupled to the first electronic device, a second electronic device for providing at least a portion of a response to the user request. The electronic device further includes means for causing the second electronic device to provide at least a portion of the response to the first user.

Techniques for far-field extension of digital assistant services by one or more service-extension devices can improve the user-interaction interface. For example, using one or more service-extension devices, a user is no longer required to be in close proximity (e.g., in the same room) with an electronic device for receiving digital assistant services provided by the digital assistant operating on the electronic device. Further, the service-extension devices can flexibly obtain responses to user requests from a device disposed in the vicinity of the user and/or a device disposed remotely, depending on the content of the user request. For example, if the user requests personal information (e.g., calendar events), a service-extension device may obtain a response from a device disposed in the vicinity of the user (e.g., the user's smartphone), rather than a remote device, thereby reducing the time required for providing services to the user. Under some circumstances, obtaining a response from a local device may also alleviate privacy concerns because sensitive or confidential information may be contained in a communicated between local devices. Further, the ability to obtain responses from different devices enhances the capability of a service-extension device to provide responses to a user. For example, if user-requested information cannot be obtained from one device (e.g., the user's smartphone), the service-extension device may obtain the response from another device (e.g., a server). As a result, a service-extension device can dynamically obtain responses from one or more devices, and efficiently extend digital assistant services from multiple devices.

One or more service-extension devices can further extend digital assistant services to enhance the continuity in providing digital assistant services. For example, one or more service-extension devices can determine whether a response to the user request (e.g., playing music) is to be provided at any particular service-extension device or at another electronic device, depending on the user's location, movement, preferences, etc. This capability of selecting a best device to provide service extension enhances the continuity for providing digital assistant services among multiple devices and further improves the user-interaction interface. Moreover, one or more service-extension devices can be shared by multiple users (e.g., family members) and the operation of the devices can be based on authentication of the multiple users. As a result, the same service-extension devices can extend digital assistant services from multiple electronic devices associated with multiple users. This capability of sharing service-extension devices enhances the efficiency in providing the digital assistant extension services.

Furthermore, techniques for providing a notification to the user using one or more service-extension devices can provide prompt notifications to the user in an extended distance. For example, a user may be separated from a user device for a distance and may thus be incapable of directly receiving notifications provided by the user device. One or more service-extension devices can receive notifications from the user device (e.g., the user's smartphone), and provide an audio and/or visual output associated with the notification to the user. Thus, the service-extension devices effectively extended the distance that a user device can provide notifications to the user.

Furthermore, techniques for providing digital assistant services using multiple devices can mitigate the device capability limitation. For example, a user device may not be able to provide services in response to user requests due to the limitation of its capability (e.g., small screen size, lack of requested information, etc.). The user device can identify another device that is capable of providing the services and cause the other device to provide the requested services to the user. The ability to identify another device that is capable of providing the requested services leverages the capabilities of a collection of devices to provide digital assistant services to the user, and enhances the user-interaction efficiency by reducing the user's burden to seek for a suitable device.

Furthermore, these techniques enhance the operability of the device and makes the user-device interface more efficient, which, additionally, reduces power usage and improves battery life of the device by enabling the user to use the device more quickly and efficiently.

DETAILED DESCRIPTION

Figure 1:
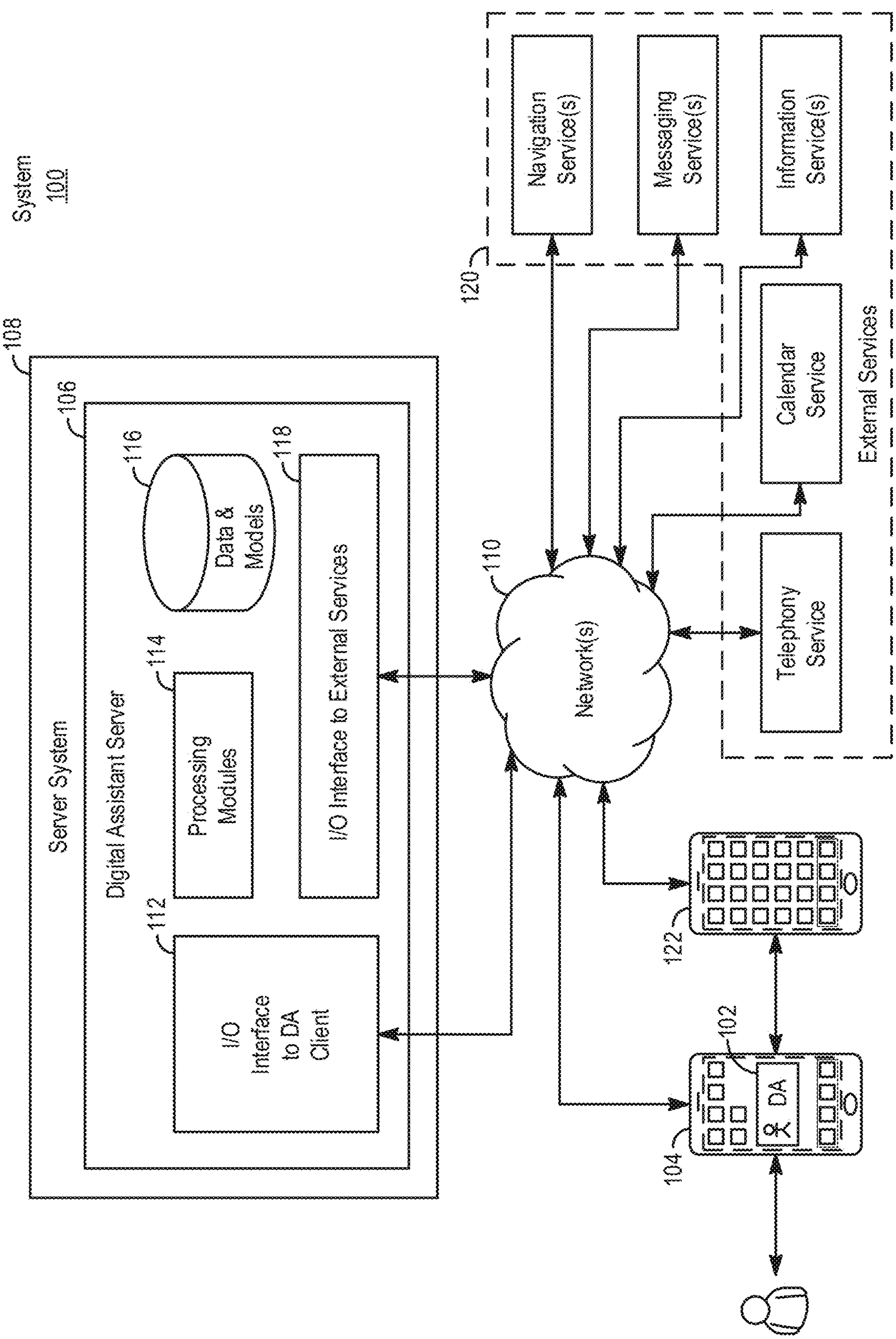
FIG. 1 is a block diagram illustrating a system and environment for implementing a digital assistant, according to various examples.

In the following description of examples, reference is made to the accompanying drawings in which are shown by way of illustration specific examples that can be practiced. It is to be understood that other examples can be used and structural changes can be made without departing from the scope of the various examples.

The present disclosure provides techniques for far-field extension of digital assistant services by one or more service-extension devices. As described, using service-extension devices can improve the user-interaction interface. In some examples, a first electronic device can be a service-extension device. The first electronic device can receive a speech input representing a user request. The first electronic device can obtain an identity of the user based on, for example, authentication of the user by a second electronic device and/or a third electronic device. In some examples, the second electronic device can be a device disposed remotely from the first electronic device (e.g., a remote server); and the third electronic device can be a device disposed in the vicinity of the first electronic device (e.g., the user's smartphone). After the identified is obtained, the first electronic device can provide a representation of the user request to at least one of the second electronic device and the third electronic device. One or both of the second electronic device and the third electronic device can determine whether to provide a response to the first electronic device. The first electronic device (e.g., a service-extension device) can receive the response and provide a representation of the response to the user. As such, the first electronic device effectively extends the digital assistant services provided by one or both of the second electronic device and the third electronic device.

The present disclosure further provides techniques for providing notifications using one or more service-extension devices. As described above, using one or more service-extension devices, notifications can be provided to the user promptly in an extended distance. In some examples, a first electronic device can receive a notification from another device (e.g., a user's smartphone) and output an indication (e.g., a beep) of the notification. The first electronic device may receive one or more speech inputs inquiring about the indication and instructing the first electronic device to perform an operation of the notification (e.g., outputting the notification). The first electronic device can determine whether the notification should be provided; and provide the notification according to the determination.

The present disclosure further provides techniques for providing digital assistant services using multiple devices. As described above, providing digital assistant services using multiple devices can mitigate the device capability limitation. In some examples, a first electronic device receives a speech input representing a user request and obtains capability data associated with one or more electronic devices capable of being communicatively coupled to the first electronic device. The capability data can include device capabilities and informational capabilities. In accordance with the capability data, the first electronic device can identify a second electronic device for providing at least a portion of a response to the user request; and cause the second electronic device to provide at least a portion of the response.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

FIG. 1 illustrates a block diagram of system 100 according to various examples. In some examples, system 100 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next Week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time. There are numerous other ways, of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1, in some examples, a digital assistant is implemented according to a client-server model. The digital assistant includes client-side portion 102 (hereafter "DA client 102") executed on user device 104 and server-side portion 106 (hereafter "DA server 106") executed on server system 108. DA client 102 communicates with DA server 106 through one or more networks 110. DA client 102 provides client-side functionalities such as user-facing input and output processing and communication with DA server 106. DA server 106 provides server-side functionalities for any number of DA clients 102 each residing on a respective user device 104.

In some examples, DA server 106 includes client-facing I/O interface 112, one or more processing modules 114, data and models 116, and I/O interface to external services 118. The client-facing I/O interface 112 facilitates the client-facing input and output processing for DA server 106. One or more processing modules 114 utilize data and models 116 to process speech input and determine the user's intent based on natural language input. Further, one or more processing modules 114 perform task execution based on inferred user intent. In some examples, DA server 106 communicates with external services 120 through network(s) 110 for task completion or information acquisition. I/O interface to external services 118 facilitates such communications.

User device 104 can be any suitable electronic device. In some examples, user device is a portable multifunctional device (e.g., device 200, described below with reference to FIG. 2A), a multifunctional device (e.g., device 400, described below with reference to FIG. 4), or a personal electronic device (e.g., device 600, described below with reference to FIG. 6A-6B.) A portable multifunctional device is, for example, a mobile telephone that also contains other functions, such as PDA and/or music player functions. Specific examples of portable multifunction devices include the iPhone®, iPod Touch®, and iPad® devices from Apple Inc. of Cupertino, California. Other examples of portable multifunction devices include, without limitation, laptop or tablet computers. Further, in some examples, user device 104 is a non-portable multifunctional device. In particular, user device 104 is a desktop computer, a game console, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatus or a distributed network of computers. In some examples, server system 108 also employs various virtual devices and/or services of third-party service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to devices 200, 400, or 600 described below with reference to FIGS. 2A, 4, and 6A-6B. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information (e.g., a user request received at user device 104) to DA server 106 via second user device 122. DA server 106 processes the information and return relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server system 106.

Although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

2. Electronic Devices

Figure 2A:
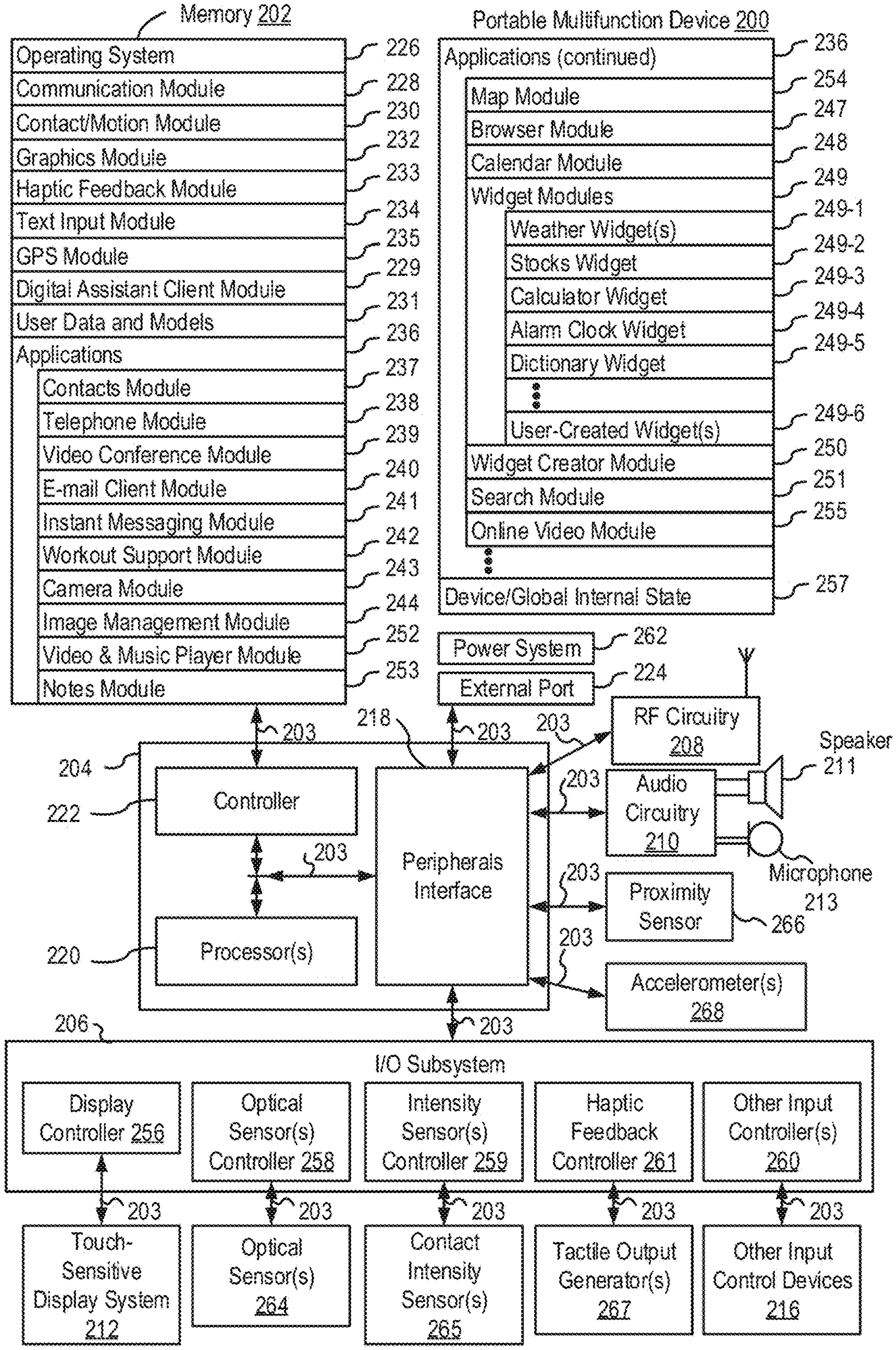
FIG. 2A is a block diagram illustrating a portable multifunction device implementing the client-side portion of a digital assistant, according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 includes one or more computer-readable storage mediums. The computer-readable storage mediums are, for example, tangible and non-transitory. Memory 202 includes high-speed random access memory and also includes non-volatile memory, such as one or more magnetic disk storage devices, flash memory devices, or other non-volatile solid-state memory devices. Memory controller 222 controls access to memory 202 by other components of device 200.

In some examples, a non-transitory computer-readable storage medium of memory 202 is used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) are stored on a non-transitory computer-readable storage medium (not shown) of the server system 108 or are divided between the non-transitory computer-readable storage medium of memory 202 and the non-transitory computer-readable storage medium of server system 108.

Peripherals interface 218 is used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data are retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button disengages a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) turns power to device 200 on or off. The user is able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output includes graphics, text, icons, video, and any combination thereof (collectively termed "graphics"). In some embodiments, some or all of the visual output correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 uses LCD (liquid crystal display) technology, LPD (light emitting polymer display) technology, or LED (light emitting diode) technology, although other display technologies may be used in other embodiments. Touch screen 212 and display controller 256 detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, California.

A touch-sensitive display in some embodiments of touch screen 212 is analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 is as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 has, for example, a video resolution in excess of 100 dpi. In some embodiments, the touch screen has a video resolution of approximately 160 dpi. The user makes contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 includes a touchpad (not shown) for activating or deactivating particular functions. In some embodiments, the touchpad is a touch-sensitive area of the device that, unlike the touch screen, does not display visual output. The touchpad is a touch-sensitive surface that is separate from touch screen 212 or an extension of the touch-sensitive surface formed by the touch screen.

Device 200 also includes power system 262 for powering the various components. Power system 262 includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 also includes one or more optical sensors 264. FIG. 2A shows an optical sensor coupled to optical sensor controller 258 in I/O subsystem 206. Optical sensor 264 includes charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 captures still images or video. In some embodiments, an optical sensor is located on the back of device 200, opposite touch screen display 212 on the front of the device so that the touch screen display is used as a viewfinder for still and/or video image acquisition. In some embodiments, an optical sensor is located on the front of the device so that the user's image is obtained for video conferencing while the user views the other video conference participants on the touch screen display. In some embodiments, the position of optical sensor 264 can be changed by the user (e.g., by rotating the lens and the sensor in the device housing) so that a single optical sensor 264 is used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 also includes one or more proximity sensors 266. FIG. 2A shows proximity sensor 266 coupled to peripherals interface 218. Alternately, proximity sensor 266 is coupled to input controller 260 in I/O subsystem 206. Proximity sensor 266 is performed as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 also includes one or more accelerometers 268. FIG. 2A shows accelerometer 268 coupled to peripherals interface 218. Alternately, accelerometer 268 is coupled to an input controller 260 in I/O subsystem 206. Accelerometer 268 performs, for example, as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
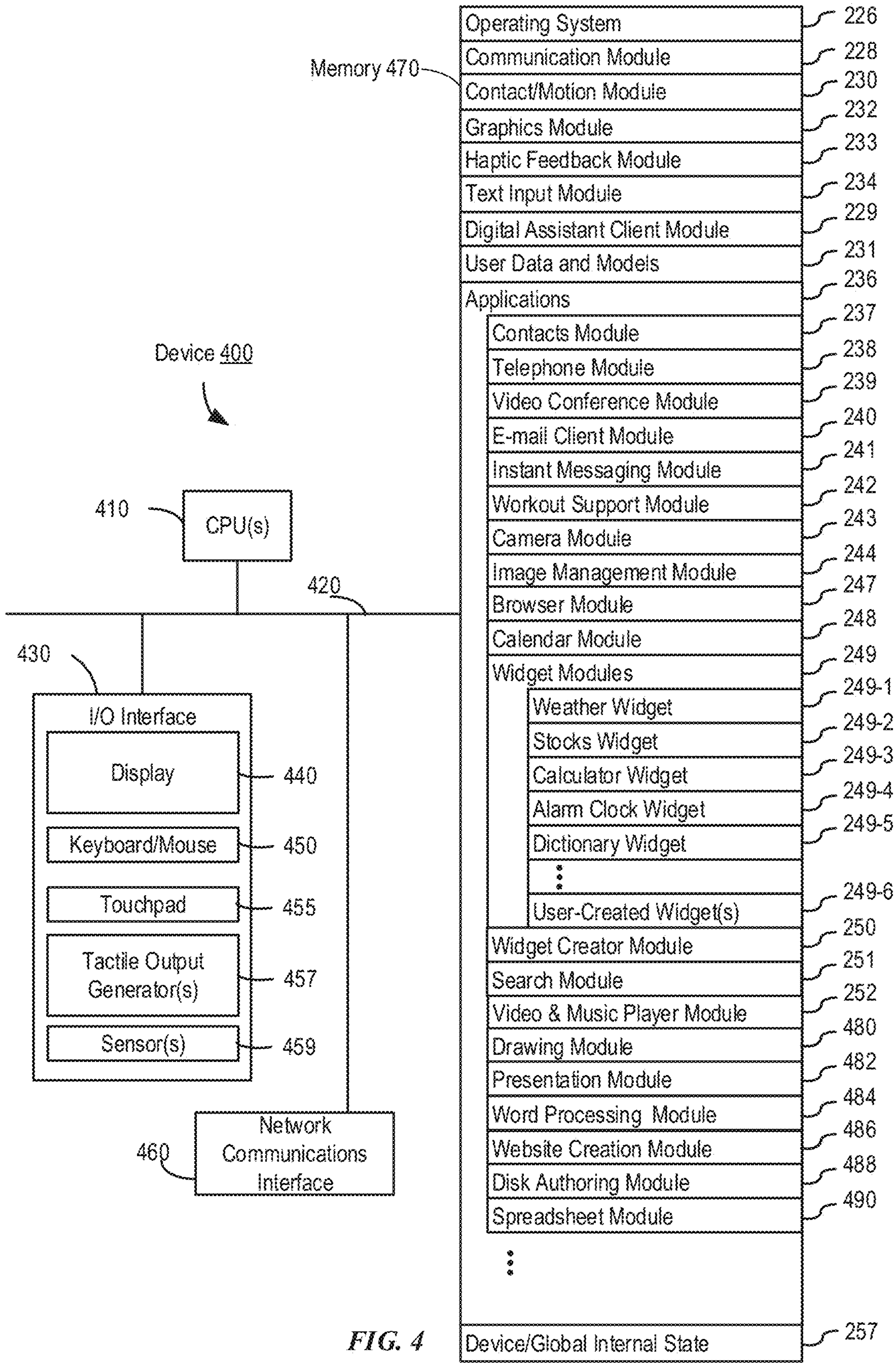
FIG. 4 is a block diagram of an exemplary multifunction device with a display and a touch-sensitive surface, according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 stores data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting-a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is, in some examples, a component of graphics module 232, provides soft keyboards for entering text in various applications (e.g., contacts 237, email 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and map/navigation widgets).

Digital assistant client module 229 includes various client-side digital assistant instructions to provide the client-side functionalities of the digital assistant. For example, digital assistant client module 229 is capable of accepting voice input (e.g., speech input), text input, touch input, and/or gestural input through various user interfaces (e.g., microphone 213, accelerometer(s) 268, touch-sensitive display system 212, optical sensor(s) 229, other input control devices 216, etc.) of portable multifunction device 200. Digital assistant client module 229 is also capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output is provided as voice, sound, alerts, text messages, menus, graphics, videos, animations, vibrations, and/or combinations of two or more of the above. During operation, digital assistant client module 229 communicates with DA server 106 using RF circuitry 208.

User data and models 231 include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 include various models (e.g., speech recognition models, statistical language models, natural language processing models, ontology, task flow models, service models, etc.) for processing user input and determining user intent.

In some examples, digital assistant client module 229 utilizes the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 provides the contextual information or a subset thereof with the user input to DA server 106 to help infer the user's intent. In some examples, the digital assistant also uses the contextual information to determine how to prepare and deliver outputs to the user. Contextual information is referred to as context data.

In some examples, the contextual information that accompanies the user input includes sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 is provided to DA server 106 as contextual information associated with a user input.

In some examples, the digital assistant client module 229 selectively provides information (e.g., user data 231) stored on the portable multifunction device 200 in response to requests from DA server 106. In some examples, digital assistant client module 229 also elicits additional input from the user via a natural language dialogue or other user interfaces upon request by DA server 106. Digital assistant client module 229 passes the additional input to DA server 106 to help DA server 106 in intent deduction and/or fulfillment of the user's intent expressed in the user request.

A more detailed description of a digital assistant is described below with reference to FIGS. 7A-7C. It should be recognized that digital assistant client module 229 can include any number of the sub-modules of digital assistant module 726 described below.

Applications 236 include the following modules (or sets of instructions), or a subset or superset thereof:

- Contacts module 237 (sometimes called an address book or contact list);
- Telephone module 238;
- Video conference module 239;
- E-mail client module 240;
- Instant messaging (IM) module 241;
- Workout support module 242;
- Camera module 243 for still and/or video images;
- Image management module 244;
- Video player module;
- Music player module;
- Browser module 247;
- Calendar module 248;
- Widget modules 249, which includes, in some examples, one or more of: weather widget 249-1, stocks widget 249-2, calculator widget 249-3, alarm clock widget 249-4, dictionary widget 249-5, and other widgets obtained by the user, as well as user-created widgets 249-6;
- Widget creator module 250 for making user-created widgets 249-6;
- Search module 251;
- Video and music player module 252, which merges video player module and music player module;
- Notes module 253;
- Map module 254; and/or
- Online video module 255.

Examples of other applications 236 that are stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 238, video conference module 239, e-mail 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 are used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication uses any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that can be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 are used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touchscreen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 are used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 14/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can be combined or otherwise rearranged in various embodiments. For example, video player module can be combined with music player module into a single module (e.g., video and music player module 252, FIG. 2A). In some embodiments, memory 202 stores a subset of the modules and data structures identified above. Furthermore, memory 202 stores additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
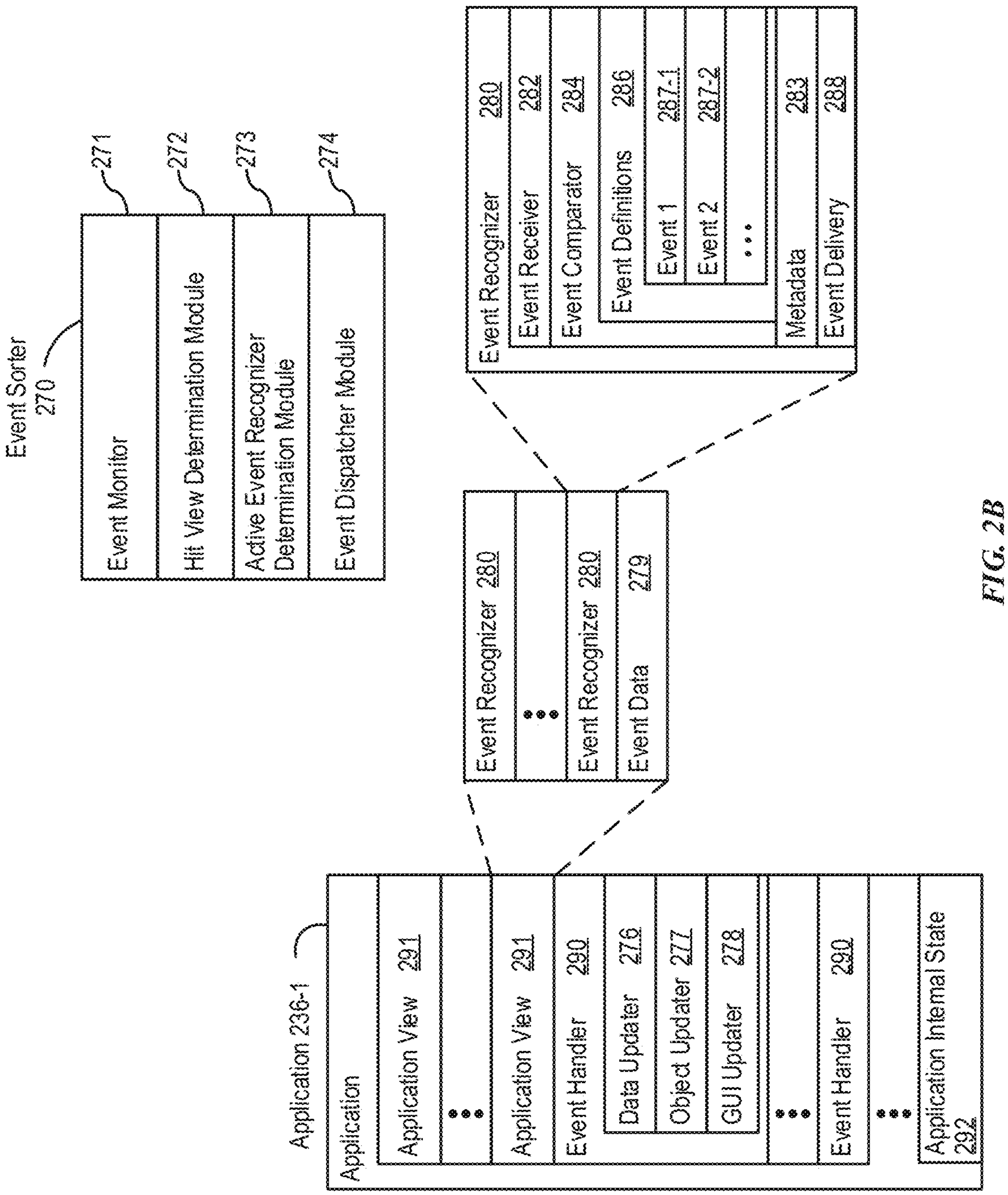
FIG. 2B is a block diagram illustrating exemplary components for event handling, according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected correspond to programmatic levels within a programmatic or view hierarchy of the application. For example, the lowest level view in which a touch is detected is called the hit view, and the set of events that are recognized as proper inputs is determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 utilizes or calls data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
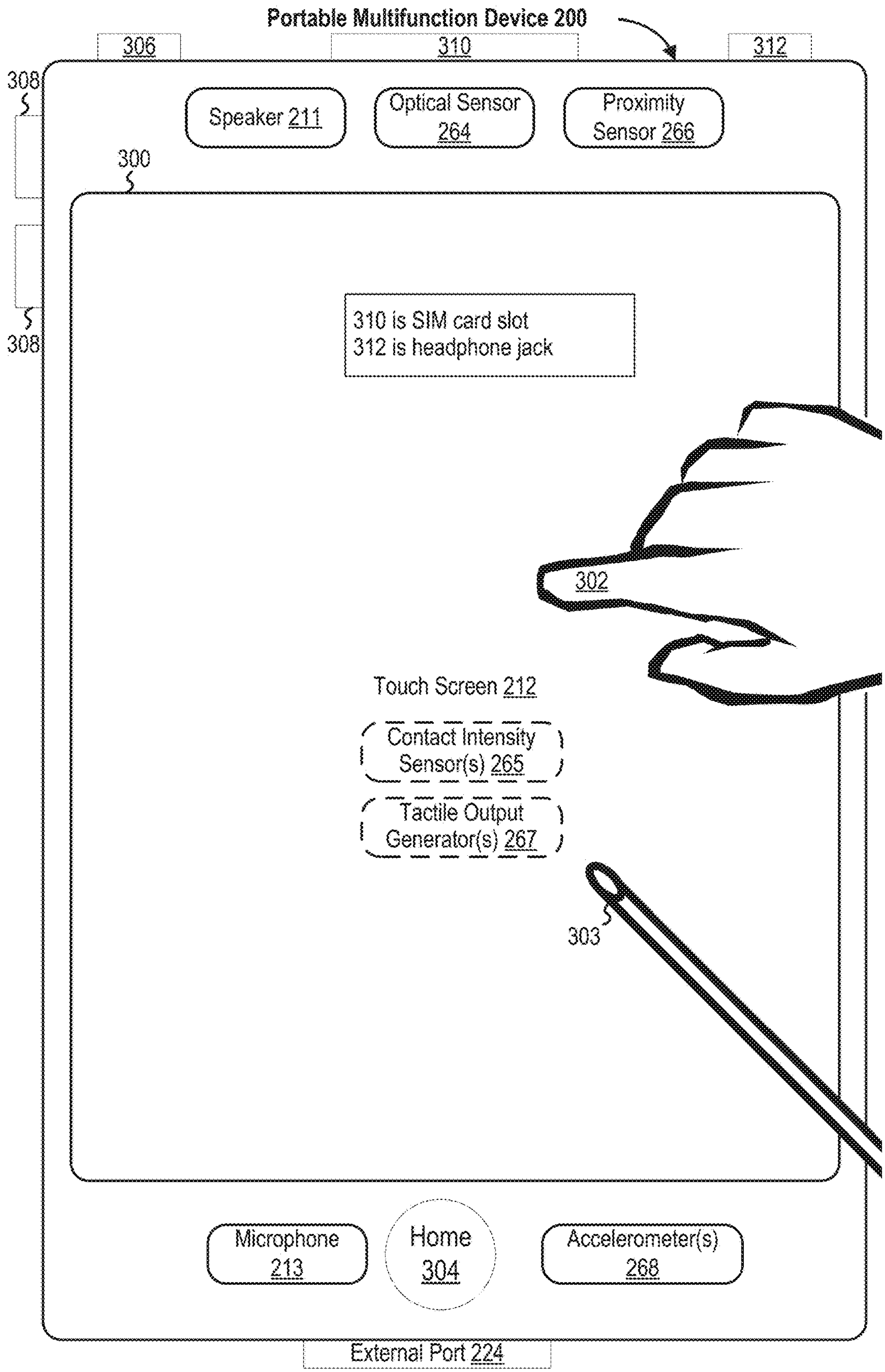
FIG. 3 illustrates a portable multifunction device implementing the client-side portion of a digital assistant, according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 also includes one or more physical buttons, such as "home" or menu button 304. As described previously, menu button 304 is used to navigate to any application 236 in a set of applications that is executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 is, in some examples, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are combined or otherwise rearranged in various embodiments. In some embodiments, memory 470 stores a subset of the modules and data structures identified above. Furthermore, memory 470 stores additional modules and data structures not described above.

Attention is now directed towards embodiments of user interfaces that can be implemented on, for example, portable multifunction device 200.

Figure 5A:
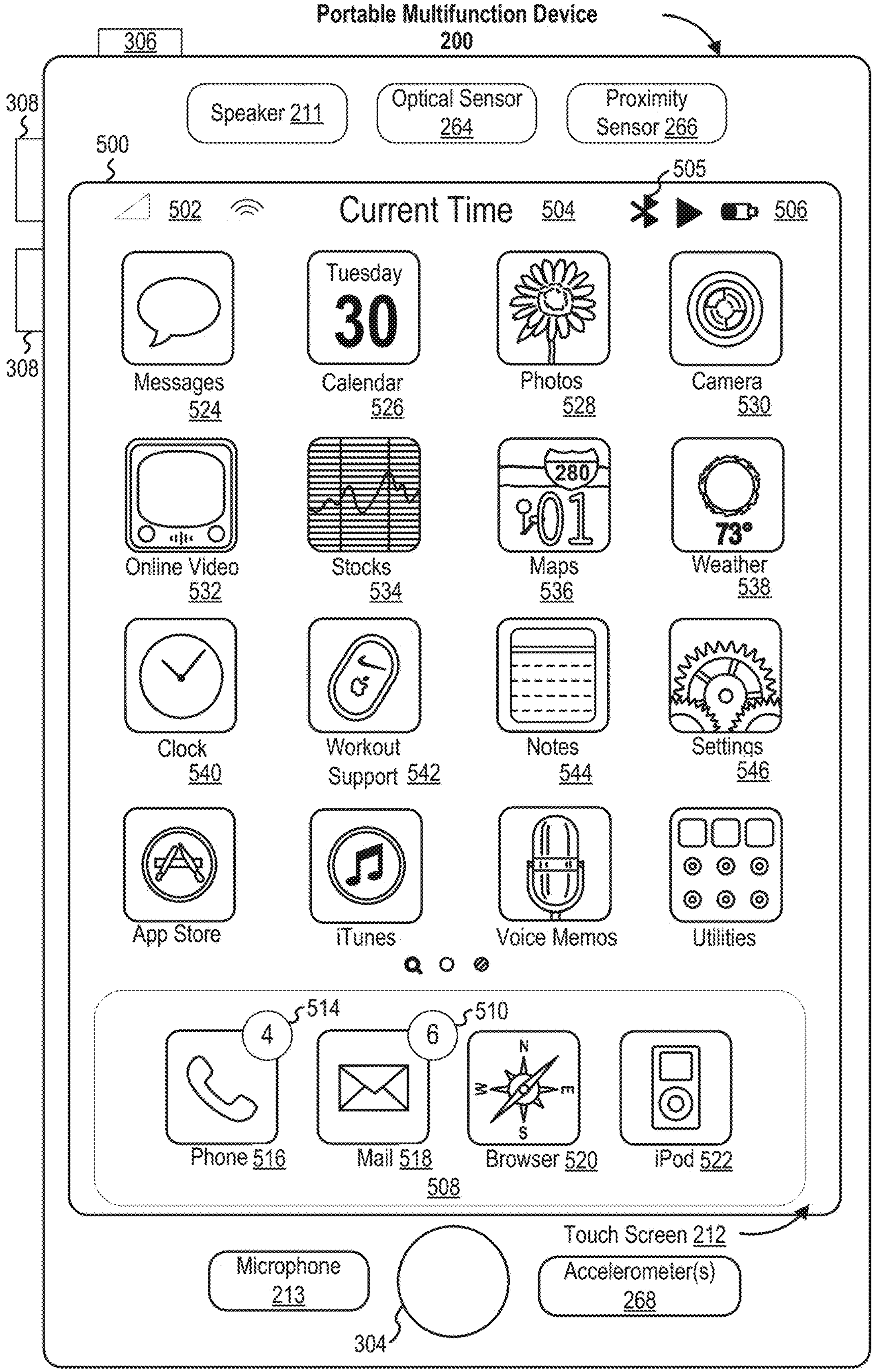
FIG. 5A illustrates an exemplary user interface for a menu of applications on a portable multifunction device, according to various examples.

FIG. 5A illustrates an exemplary user interface for a menu of applications on portable multifunction device 200 in accordance with some embodiments. Similar user interfaces are implemented on device 400. In some embodiments, user interface 500 includes the following elements, or a subset or superset thereof:

- Signal strength indicator(s) 502 for wireless communication(s), such as cellular and Wi-Fi signals;
- Time 504;
- Bluetooth indicator 505;
- Battery status indicator 506;
- Tray 508 with icons for frequently used applications, such as:
  - Icon 516 for telephone module 238, labeled "Phone," which optionally includes an indicator 514 of the number of missed calls or voicemail messages;
  - Icon 518 for e-mail client module 240, labeled "Mail," which optionally includes an indicator 510 of the number of unread e-mails;
  - Icon 520 for browser module 247, labeled "Browser;" and
  - Icon 522 for video and music player module 252, also referred to as iPod (trademark of Apple Inc.) module 252, labeled "iPod;" and
- Icons for other applications, such as:
  - Icon 524 for IM module 241, labeled "Messages;"
  - Icon 526 for calendar module 248, labeled "Calendar;"
  - Icon 528 for image management module 244, labeled "Photos;"
  - Icon 530 for camera module 243, labeled "Camera;"
  - Icon 532 for online video module 255, labeled "Online Video;"
  - Icon 534 for stocks widget 249-2, labeled "Stocks;"
  - Icon 536 for map module 254, labeled "Maps;"
  - Icon 538 for weather widget 249-1, labeled "Weather;"
  - Icon 540 for alarm clock widget 249-4, labeled "Clock;"
  - Icon 542 for workout support module 242, labeled "Workout Support;"
  - Icon 544 for notes module 253, labeled "Notes;" and
  - Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 is optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
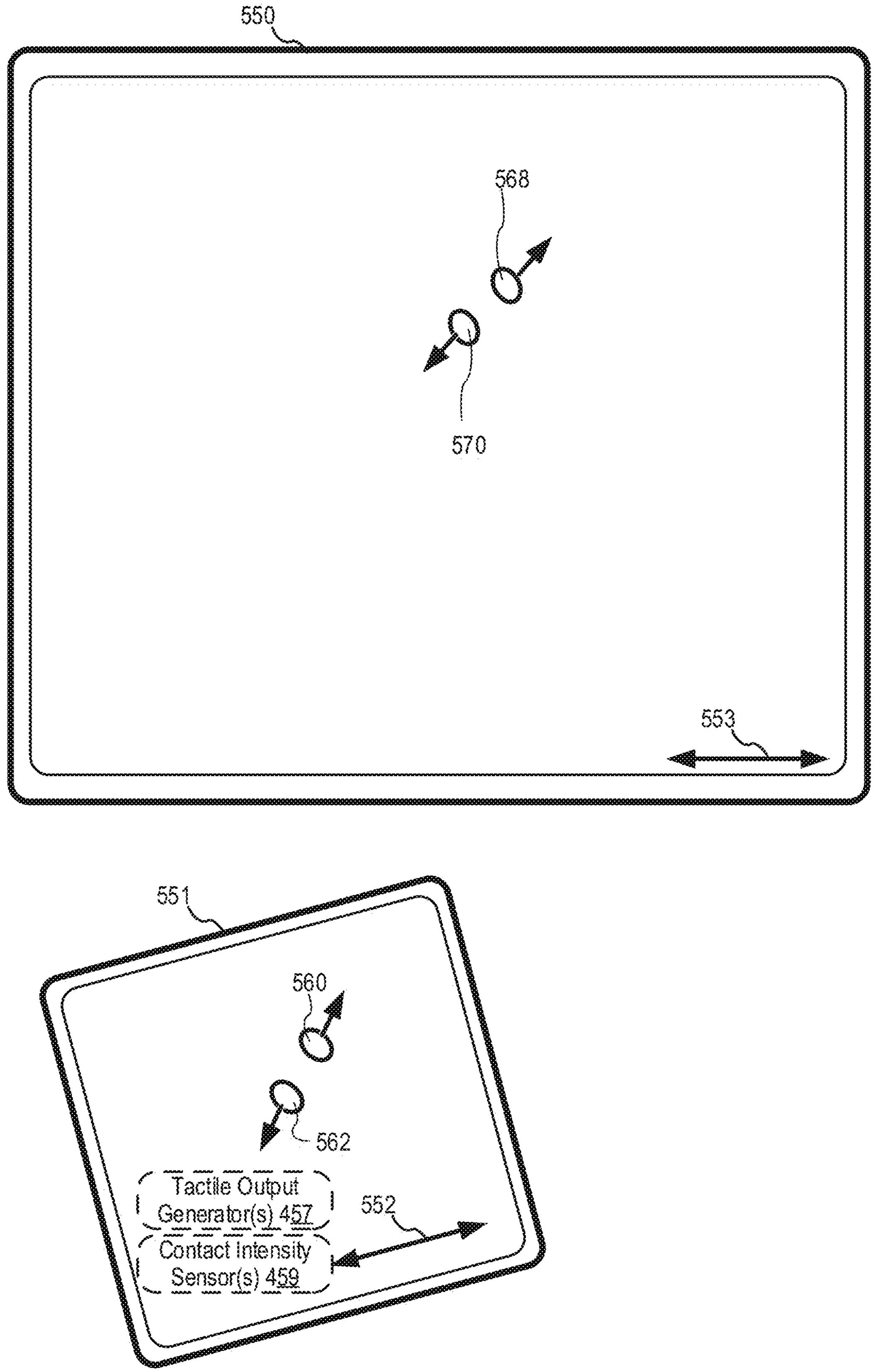
FIG. 5B illustrates an exemplary user interface for a multifunction device with a touch-sensitive surface that is separate from the display, according to various examples.

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
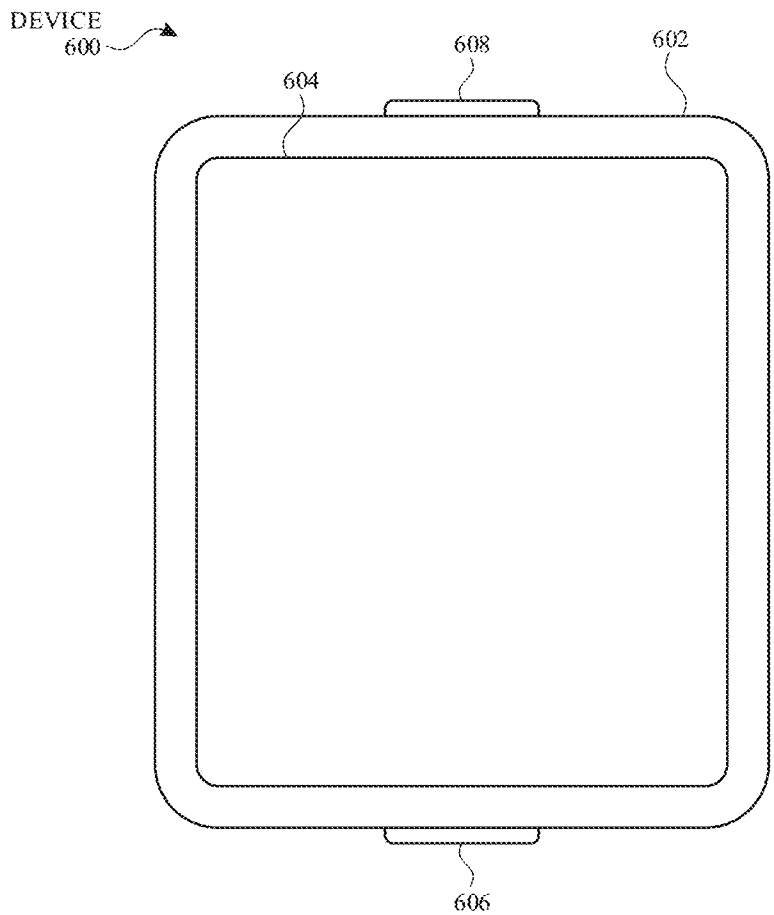
FIG. 6A illustrates a personal electronic device, according to various examples.

FIG. 6A illustrates exemplary personal electronic device 600. Device 600 includes body 602. In some embodiments, device 600 includes some or all of the features described with respect to devices 200 and 400 (e.g., FIGS. 2A-4). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) has one or more intensity sensors for detecting intensity of contacts (e.g., touches) being applied. The one or more intensity sensors of touch screen 604 (or the touch-sensitive surface) provide output data that represents the intensity of touches. The user interface of device 600 responds to touches based on their intensity, meaning that touches of different intensities can invoke different user interface operations on device 600.

Techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, are physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms permit device 600 to be worn by a user.

Figure 6B:
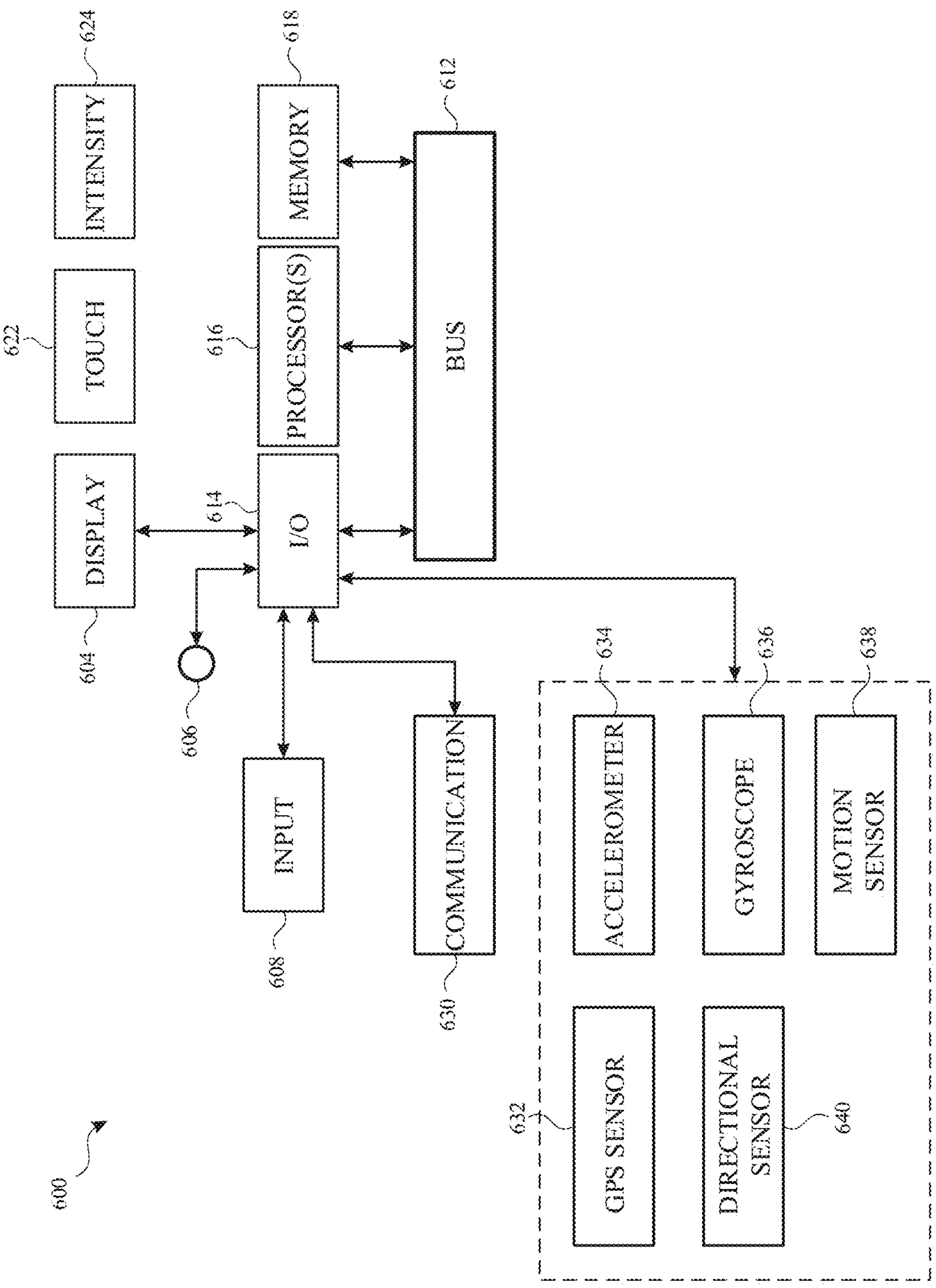
FIG. 6B is a block diagram illustrating a personal electronic device, according to various examples.

FIG. 6B depicts exemplary personal electronic device 600. In some embodiments, device 600 includes some or all of the components described with respect to FIGS. 2A, 2B, and 4. Device 600 has bus 612 that operatively couples I/O section 614 with one or more computer processors 616 and memory 618. I/O section 614 is connected to display 604, which can have touch-sensitive component 622 and, optionally, touch-intensity sensitive component 624. In addition, I/O section 614 is connected with communication unit 630 for receiving application and operating system data, using Wi-Fi, Bluetooth, near field communication (NFC), cellular, and/or other wireless communication techniques. Device 600 includes input mechanisms 606 and/or 608. Input mechanism 606 is a rotatable input device or a depressible and rotatable input device, for example. Input mechanism 608 is a button, in some examples.

Input mechanism 608 is a microphone, in some examples. Personal electronic device 600 includes, for example, various sensors, such as GPS sensor 632, accelerometer 634, directional sensor 640 (e.g., compass), gyroscope 636, motion sensor 638, and/or a combination thereof, all of which are operatively connected to I/O section 614.

Memory 618 of personal electronic device 600 is a non-transitory computer-readable storage medium, for storing computer-executable instructions, which, when executed by one or more computer processors 616, for example, cause the computer processors to perform the techniques and processes described below. The computer-executable instructions, for example, are also stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that is, for example, displayed on the display screen of devices 200, 400, 600, 810A-C, 820, 830, 840, 1182, 1186, 1880, and/or 1882 (FIGS. 2A-2B, 4, 6, 8A-8B, 9A-9C, 10A-10C, 11A-11D, 12A-12C, 13A-13B, 14, 15A-15G, and 18A-18E). For example, an image (e.g., icon), a button, and text (e.g., hyperlink) each constitutes an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location is based on only a portion of the continuous swipe contact, and not the entire swipe contact (e.g., only the portion of the swipe contact at the end location). In some embodiments, a smoothing algorithm is applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensify of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
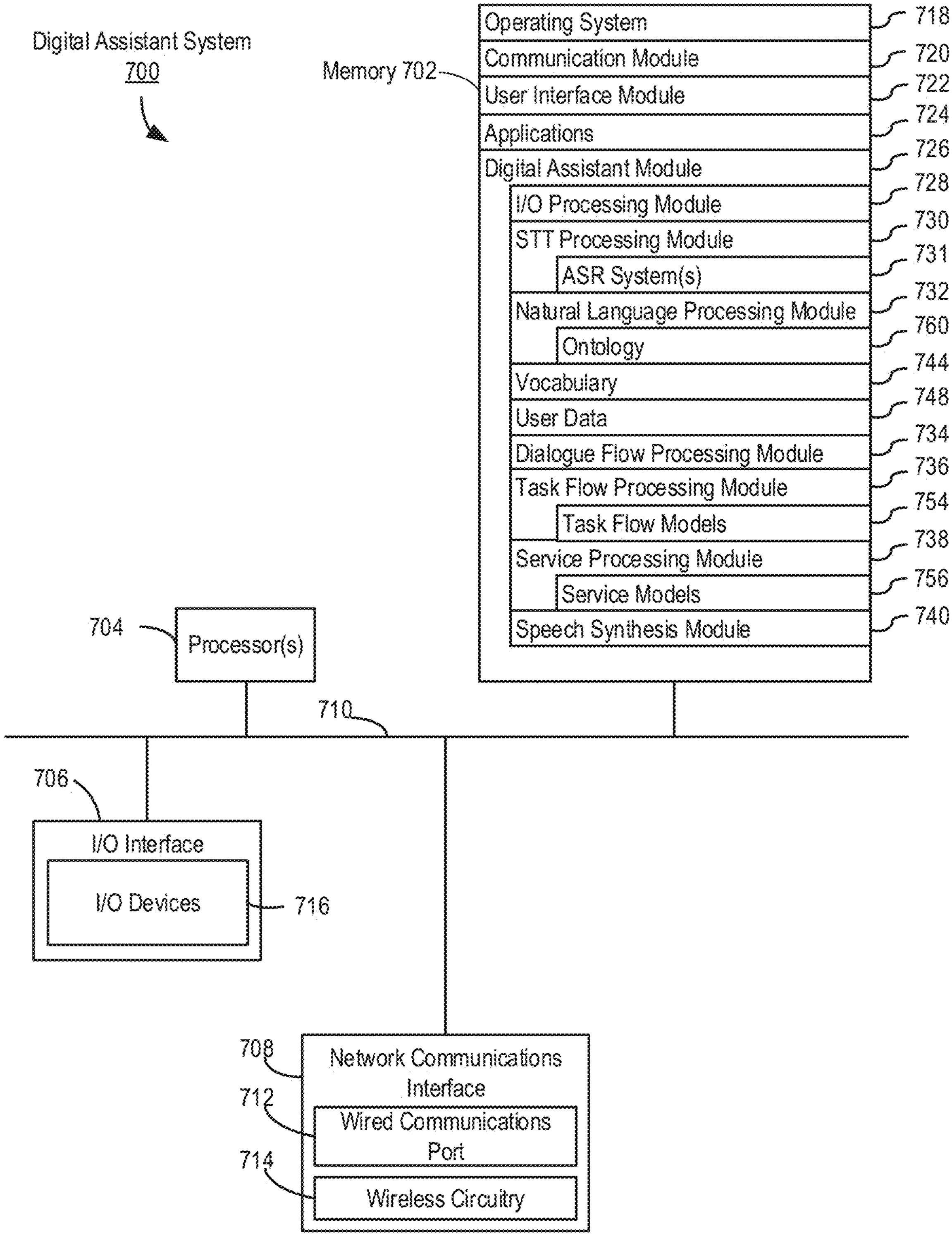
FIG. 7A is a block diagram illustrating a digital assistant system or a server portion thereof, according to various examples.

FIG. 7A illustrates a block diagram of digital assistant system 700 in accordance with various examples. In some examples, digital assistant system 700 is implemented on a standalone computer system. In some examples, digital assistant system 700 is distributed across multiple computers. In some examples, some of the modules and functions of the digital assistant are divided into a server portion and a client portion, where the client portion resides on one or more user devices (e.g., devices 104, 122, 200, 400, 600, 810A-C, 830, 840, 1182, 1186, 1880, and/or 1882) and communicates with the server portion (e.g., server system 108) through one or more networks, e.g., as shown in FIG. 1. In some examples, digital assistant system 700 is an implementation of server system 108 (and/or DA server 106) shown in FIG. 1. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 200, 400, 600, 810A-C, 820, 830, 840, 1182, 1186, 1880, and/or 1882 in FIGS. 2A-2B, 4, 6A-6B, 8A-8B, 9A-9C, 10A-10C, 11A-11D, 12A-12C, 13A-13B, 14, 15A-15G, and 18A-18E, respectively. In some examples, digital assistant system 700 represents the server portion of a digital assistant implementation, and can interact with the user through a client-side portion residing on a user device (e.g., devices 104, 200, 400, 600, 810A-C, 830, 840, 1182, 1186, 1880, and/or 1882).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RF circuitry 208 of electronic devices such as devices 200, 400, and 600 shown in FIG. 2A, 4, 6A-6B, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following sub-modules, or a subset or superset thereof: input/output processing module 728, speech-to-text (STT) processing module 730, natural language processing module 732, dialogue flow processing module 734, task flow processing module 736, service processing module 738, and speech synthesis module 740. Each of these modules has access to one or more of the following systems or data and models of the digital assistant module 726, or a subset or superset thereof: ontology 760, vocabulary index 744, user data 748, task flow models 754, service models 756, and ASR systems.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
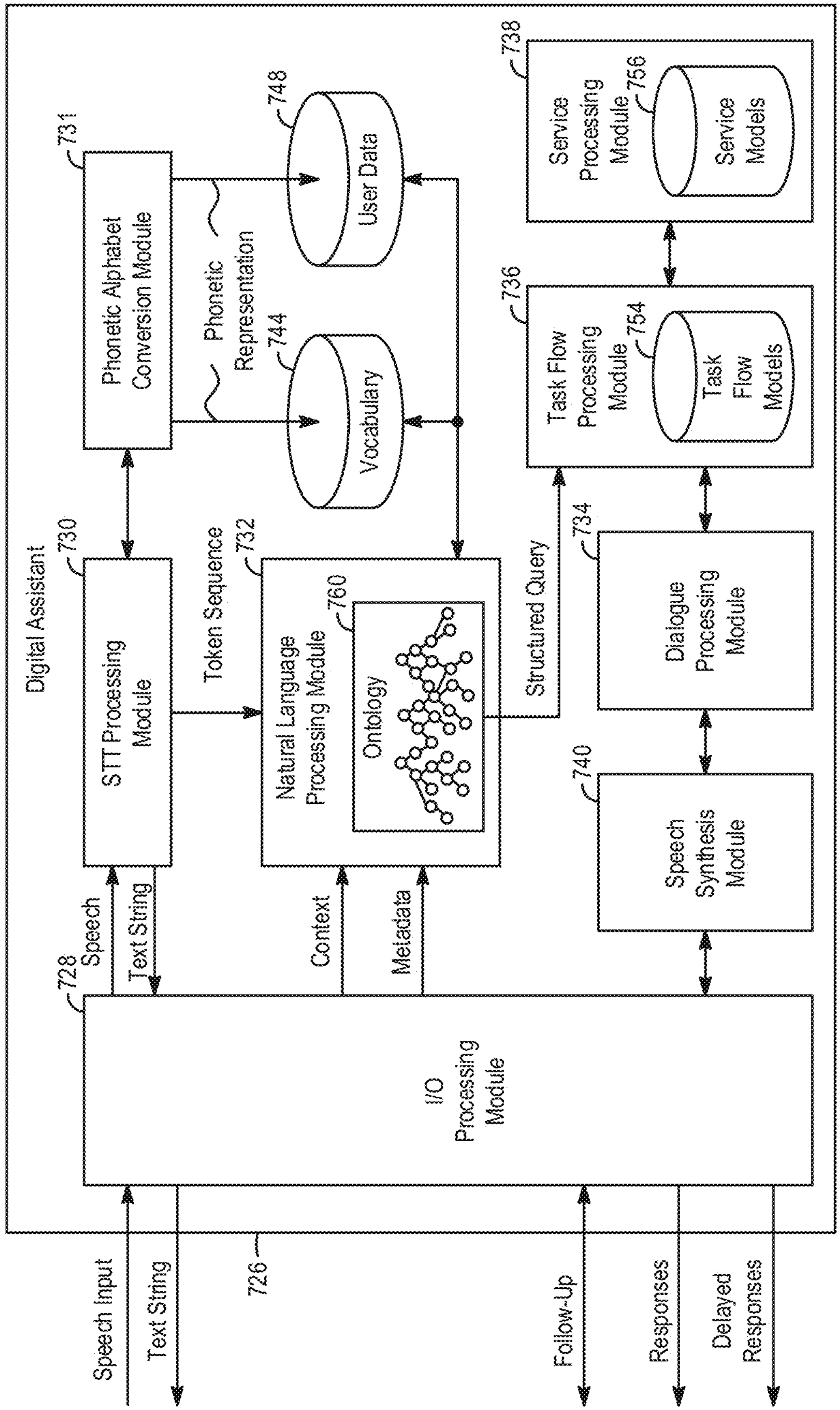
FIG. 7B illustrates the functions of the digital assistant shown in FIG. 7A, according to various examples.

In some examples, as shown in FIG. 7B, I/O processing module 728 interacts with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receives answers from, the user regarding the user request. When a user request is received by I/O processing module 728 and the user request includes speech input, I/O processing module 728 forwards the speech input to STT processing module 730 (or speech recognizer) for speech-to-text conversions.

STT processing module 730 includes one or more ASR systems. The one or more ASR systems can process the speech input that is received through I/O processing module 728 to produce a recognition result. Each ASR system includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result is passed to natural language processing module 732 for intent deduction. In some examples, STT processing module 730 produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing module 730 ranks the candidate text representations and provides the n-best (e.g., n highest ranked) candidate text representation(s) to natural language processing module 732 for intent deduction, where n is a predetermined integer greater than zero. For example, in one example, only the highest ranked (n=1) candidate text representation is passed to natural language processing module 732 for intent deduction. In another example, the five highest ranked (n=5) candidate text representations are passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of /tə'meɪroʊ/ and /tə'mɑtoʊ/. Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation /tə'meɪroʊ/ is ranked higher than /tə'mɑtoʊ/, because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity. For example, the candidate pronunciation /tə'meɪroʊ/ is associated with the United States, whereas the candidate pronunciation /tə'mɑtoʊ/ is associated with Great Britain. Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /tə'meɪroʊ/ (associated with the United States) is ranked higher than the candidate pronunciation /tə'mɑtoʊ/ (associated with Great Britain). In some examples, one of the ranked candidate pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identifies the sequence of phonemes /tə'meɪroʊ/ corresponding to a portion of the speech input, it can then determine, based on vocabulary index 744, that this sequence corresponds to the word "tomato."

In some examples, STT processing module 730 uses approximate matching techniques to determine words in an utterance. Thus, for example, the STT processing module 730 determines that the sequence of phonemes /tə'meɪroʊ/ corresponds to the word "tomato," even if that particular sequence of phonemes is not one of the candidate sequence of phonemes for that word.

Natural language processing module 732 ("natural language processor") of the digital assistant takes the n-best candidate text representation(s) ("word sequence(s)" or "token sequence(s)") generated by STT processing module 730, and attempts to associate each of the candidate text representations with one or more "actionable intents" recognized by the digital assistant. An "actionable intent" (or "user intent") represents a task that can be performed by the digital assistant, and can have an associated task flow implemented in task flow models 754. The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the candidate text representations received from STT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

Figure 7C:
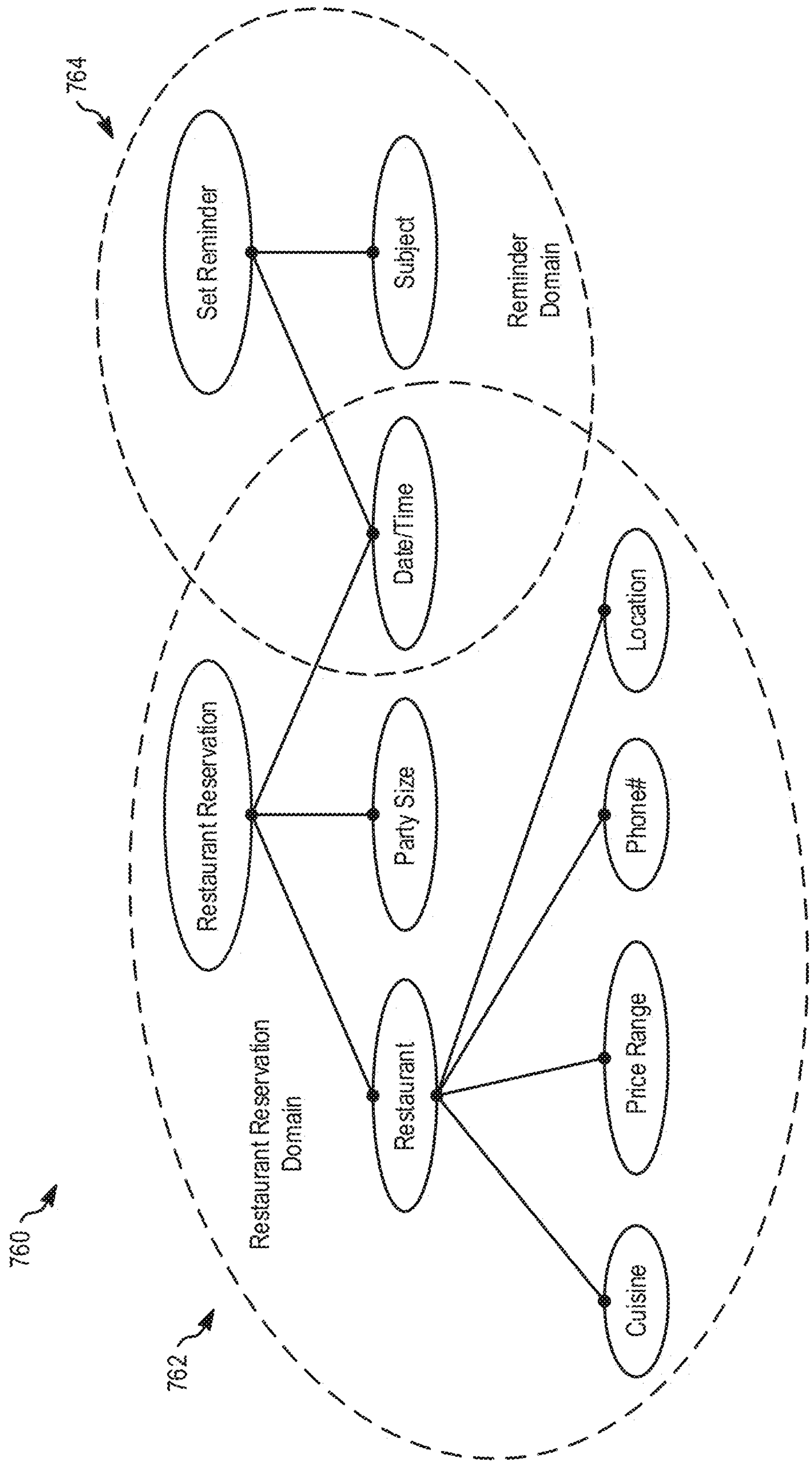
FIG. 7C illustrates a portion of an ontology, according to various examples.

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked concept nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 744 optionally includes words and phrases in different languages.

Natural language processing module 732 receives the candidate text representations (e.g., text string(s) or token sequence(s)) from STT processing module 730, and for each candidate representation, determines what nodes are implicated by the words in the candidate text representation. In some examples, if a word or phrase in the candidate text representation is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party" would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a candidate text representation and contextual information associated with the candidate text representation. Based on the candidate text representation and the associated contextual information, the one or more machine learning mechanism are configured to determine intent confidence scores over a set of candidate actionable intents. Natural language processing module 732 can select one or more candidate actionable intents from the set of candidate actionable intents based on the determined intent confidence scores. In some examples, an ontology (e.g., ontology 760) is also used to select the one or more candidate actionable intents from the set of candidate actionable intents.

Other details of searching an ontology based on a token string is described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} is not specified in the structured query based on the information currently available. In some examples, natural language processing module 732 populates some parameters of the structured query with received contextual information. For example, in some examples, if the user requested a sushi restaurant "near me," natural language processing module 732 populates a {location} parameter in the structured query with GPS coordinates from the user device.

In some examples, natural language processing module 732 identifies multiple candidate actionable intents for each candidate text representation received from STT processing module 730. Further, in some examples, a respective structured query (partial or complete) is generated for each identified candidate actionable intent. Natural language processing module 732 determines an intent confidence score for each candidate actionable intent and ranks the candidate actionable intents based on the intent confidence scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable intents are provided to task flow processing module 736, where m is a predetermined integer greater than zero. In some examples, the structured query (or queries) for the m-best candidate actionable intents are provided to task flow processing module 736 with the corresponding candidate text representation(s).

Other details of inferring a user intent based on multiple candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generate requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and send the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response (i.e., an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable intent. In other examples, the first structured query is selected from the received structured queries based on a combination of the corresponding speech recognition confidence scores and the corresponding intent confidence scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable intent. The second structured query is selected, for example, based on the speech recognition confidence score of the corresponding candidate text representation, the intent confidence score of the corresponding candidate actionable intent, a missing necessary parameter in the first structured query, or any combination thereof.

Speech synthesis module 740 is configured to synthesize speech outputs for presentation to the user. Speech synthesis module 740 synthesizes speech outputs based on text provided by the digital assistant. For example, the generated dialogue response is in the form of a text string. Speech synthesis module 740 converts the text string to an audible speech output. Speech synthesis module 740 uses any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis module 740 is configured to synthesize individual words based on phonemic strings corresponding to the words. For example, a phonemic string is associated with a word in the generated dialogue response. The phonemic string is stored in metadata associated with the word. Speech synthesis model 740 is configured to directly process the phonemic string in the metadata to synthesize the word in speech form.

In some examples, instead of (or in addition to) using speech synthesis module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Exemplary Functions of a Digital Assistant Providing Digital Assistant Services Based on User Inputs.

FIGS. 2A-2B, 4, 6, 8A-8B, 9A-9C, 10A-10C, 11A-11D, 12A-12C, 13A-13B, and 14 illustrate functionalities of providing digital assistant services by a digital assistant operating on an electronic device. In some examples, the digital assistant (e.g., digital assistant system 700) is implemented by a user device according to various examples. In some examples, the user device, a server (e.g., server 108, device 820), or a combination thereof, may implement a digital assistant system (e.g., digital assistant system 700). The user device can be implemented using, for example, device 200, 400, 600, 810A-C, 820, 830, 840, 1182, and/or 1186. In some examples, the user device is a device having audio outputting capabilities and network connectivity, a smartphone, a laptop computer, a desktop computer, or a tablet computer.

Figure 8A:
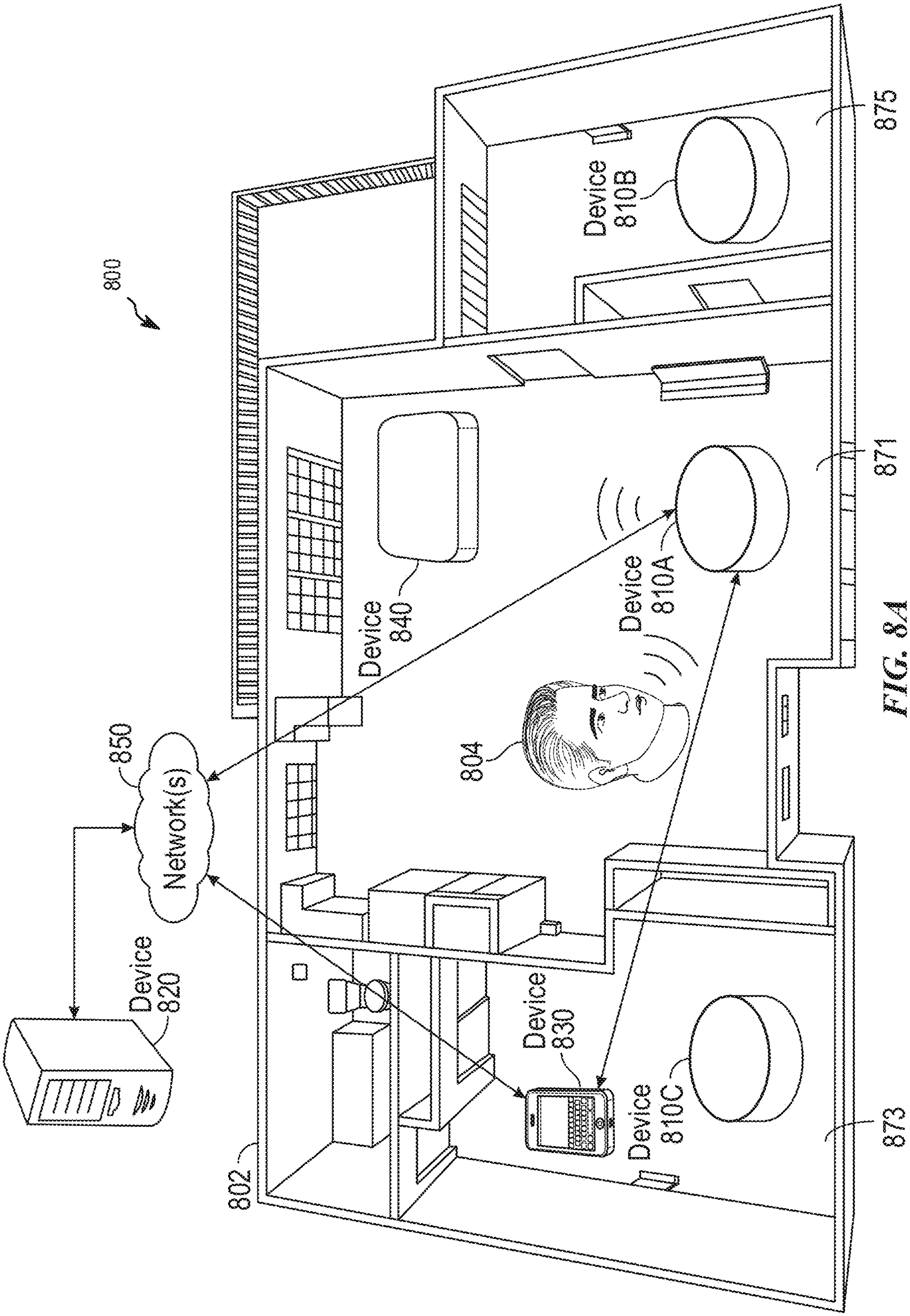
FIGS. 8A-8B illustrate functionalities of providing digital assistant services at a first electronic device based on a user input, according to various examples.
Figure 8B:
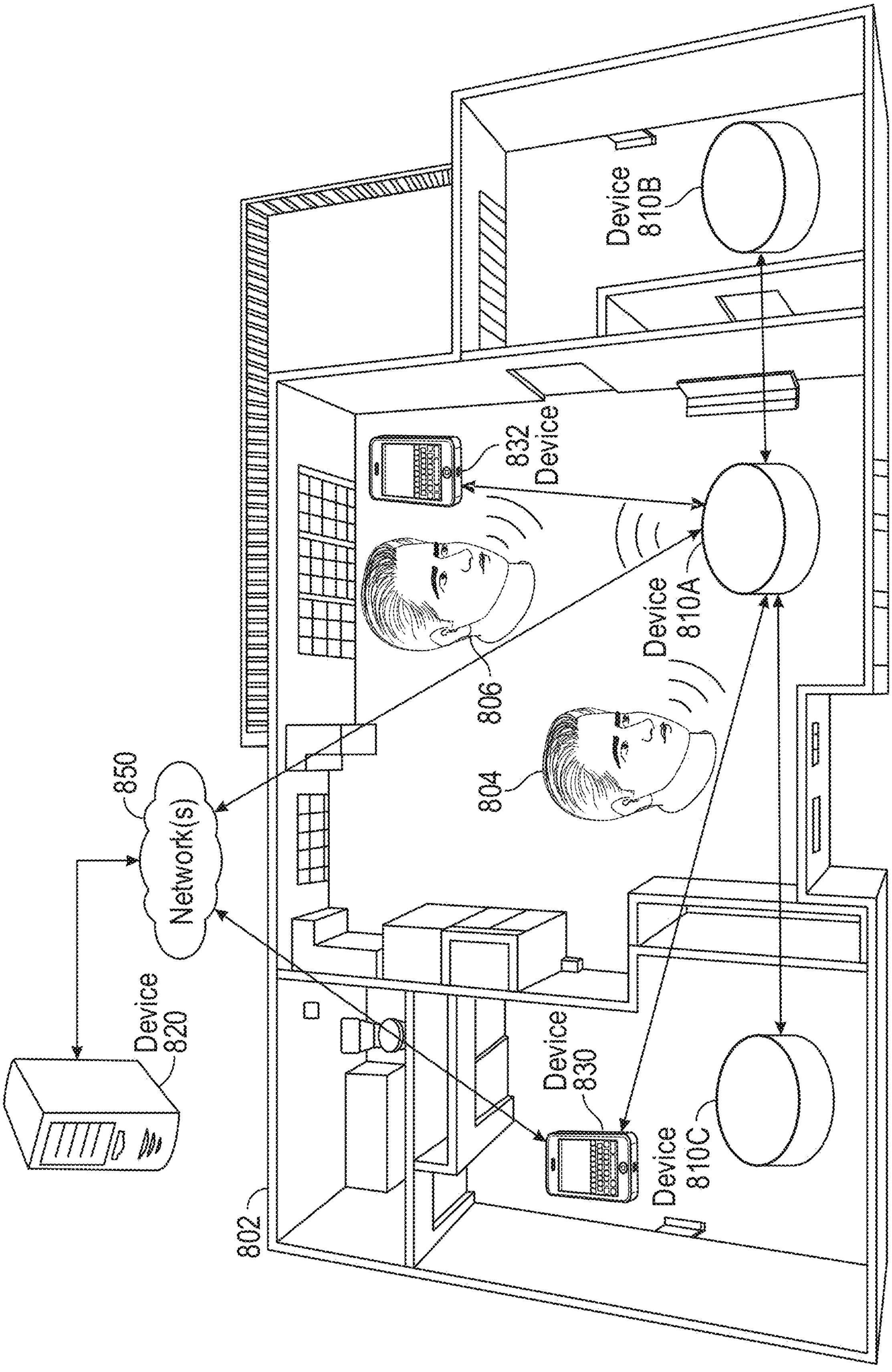

FIGS. 8A-8B illustrate functionalities of providing digital assistant services at one or more electronic devices 810A-C based on a user input, according to various examples. In some examples, electronic device 810A (and similarly other electronic devices 810B-C) can include one or more audio input and output devices (e.g., a microphone and one or more speakers) and one or more network communication interfaces. Device 810A and devices 810B-C are collectively referred to as electronic devices 810 or devices 810. Device 810A, and similarly devices 810B-C, can include multiple speakers to provide surround sound. In some example, an electronic device 810 can further include one or more indicators (e.g., lights) for providing device operational indications. For example, one or more indicators of device 810A may emit light to indicate that device 810A is powered on, connected to a network, outputting audios, etc. Devices 810A-C can be service-extension devices to extend digital assistant services from other devices.

As illustrated in FIG. 8A, in some examples, the digital assistant operating on device 810A can be configured to communicatively couple to other electronic devices (e.g., devices 810B-C, 820, 830, and/or 840) via a direct communication connection, such as Bluetooth, near-field communication (NFC), BTLE (Bluetooth Low Energy), or the like, or via a wired or wireless network, such as a local Wi-Fi network. For example, a digital assistant operating on device 810A can detect devices 810B,C via Bluetooth discovery, and communicatively couple to devices 810B-C via a Bluetooth connection. As another example, the digital assistant operating on device 810A can detect a Wi-Fi network and communicatively couple to devices 830 and 840 via a Wi-Fi network. As another example, the digital assistant operating on device 810A can detect a near field communication when the device 830 (e.g., a client device such as the user's smartphone) is in close proximity with, or physically in touch with, device 810A. For instance, to pair up device 810A and device 830, user 804 may tap device 810A with device 830, thereby establishing near-field communication between the two devices. As another example, the digital assistant operating on device 810A can detect that device 830 (e.g., a client device such as the user's smartphone) is within a predetermined distance (e.g., within a range of Bluetooth communication) and establish a connection with device 830. For instance, as user 804 approaches or enters area 800 with device 830, the digital assistant operating on device 810A may detect that device 830 is within communication range, and thus connect with device 830. As another example, the digital assistant operating on device 810A can establish a connection with device 830 based on one or more previous established connections between the two devices. For instance, the digital assistant operating on device 810A can store a log file indicating the devices that it connected in the past, and optionally connection parameters. Thus, based on the log file, the digital assistant operating on device 810A can determine, for example, that it has connected to device 830 before. Based on such determination, the digital assistant operating on device 810A can establish the connection with device 830.

In some examples, electronic device 820 can be a server; and devices 830 and 840 can be client devices disposed in the vicinity of electronic devices 810. For example, device 820 can be a remotely disposed cloud server; and devices 830 and 840 can be the user's smartphone and a TV set-top box, respectively. In some examples, the digital assistant operating on device 810A establishes one or more connections with at least one of devices 820, 830, and 840, before it can receive user inputs comprising user requests and/or provide representations of user requests to one or more of devices 820, 830, and 840. Receiving user inputs and providing representations of user requests to devices 820, 830, and/or 840 are described in more detail below. Establishing connections before receiving user inputs and providing representations of user requests to other devices can improve the operation efficiency and speed of providing responses to user requests. For example, by establishing connections beforehand, the digital assistant operating on device 810A may not waste time to establish a connection after a user input is received.

In some examples, after establishing a connection between device 810A and device 830 (e.g., a client device such as the user's smartphone), the digital assistant operating on device 810A and/or device 830 can notify device 820 (e.g., a server) of the established connection. As described in more detail below, the digital assistant operating on device 810A may provide representations of a user request to one or both of device 820 and device 830 for obtaining responses. Device 820 may be a remote device such as a server and device 830 may be a device disposed in the vicinity of device 810A. Thus, notifying device 820 (e.g., a remote server) of a connection between device 810A and device 830 can facilitate an efficient operation. For example, as described below, in some embodiments, the digital assistant operating on device 810A may provide the representations of the user request to both device 820 and device 830. Device 820 and/or device 830 may determine that device 830 (e.g., a client device disposed in the vicinity of device 810A) is capable of providing the response. Thus, because device 820 is notified that device 830 and device 810A are connected, device 820 may not provide a response to device 810A. Instead, device 820 may coordinate with device 830 to provide the response. In some examples, because device 830 (e.g., the user's smartphone) is disposed in the vicinity of device 810A, the response may be provided in a faster and more efficient manner.

In some examples, the digital assistant operating on devices 810A can establish connections with one or more devices having the same type. For example, as shown in FIG. 8A, a plurality of devices 810A-C can be service-extension devices and can be disposed in area 800. The digital assistant operating on device 810A can thus establish a connection with each of device 810B and device 810C. As described in more detail below, establishing connections between devices 810A, 810B, and 810C enables responses to be provided to user 804 by any device 810A-C disposed in area 800. This provides flexibility and improves the user-interaction efficiency. For example, user 804 may provide a speech input (e.g., "Play music") to device 810A, and receive a response by device 810C (e.g., music playing at device 810C).

In some embodiments, devices 810A-C can be service-extension devices for extending digital assistant services from one device to another. For example, as shown in FIG. 8A, devices 810A-C can be disposed in the vicinity of an electronic device 830 (e.g., a smartphone device) and/or electronic device 840 (e.g., a TV set-top box) to extend digital assistant services provided by electronic devices 830 and/or 840. In some examples, disposing devices 810A-C in the vicinity of devices 830 and/or 840 may include disposing devices 810A-C within a predetermined boundary surrounding, or a predetermined distance from, devices 830 and/or 840. For example, devices 810A-C may be disposed in the same house or building as devices 830 or 840. As shown in FIG. 8A, user 804 may be physically within or nearby an area 800, which may include one or more rooms 871, 873, and 875. User 804 may by physically located in room 871, while electronic device 830 (e.g., the user's smartphone) may be disposed in another room 873. In some examples, user 804 may want to access digital assistant services provided by device 830, despite that device 830 is incapable of directly communicating with user 804 (e.g., device 830 may not be able to directly receive the user 804's speech input via its microphone). In some examples, devices 810A-C can serve as service-extension devices for extending digital assistant services provided by device 830, as described in more detail below.

In some embodiments, one or more devices 810A-C may or may not be associated with a single device or user. Devices 810A-C (e.g., service-extension devices) can be shared by multiple users and can extend digital assistant services for multiple devices. In some examples, one or more devices 810A-C can extend digital assistant services to a plurality of users. As illustrated in FIG. 8B, user 804 and user 806 can share one or more devices 810A-C. For example, user 804 may have an associated device 830 (e.g., user 804's smartphone or smart watch); and user 806 may have an associated device 832 (e.g., user 806's smartphone or tablet). In some examples, the digital assistant operating on device 810A can establish a connection between itself and device 830; and a connection between itself and device 832. As such, the digital assistant operating on device 810A can extend digital assistant services for one or both devices 830 and 832. The capability of extending digital assistant services for multiple devices enables devices 810A-C to be shared by, for example, multiple users (e.g., family members).

With reference back to FIG. 8A, in some embodiments, a digital assistant operating on electronic device 810A can receive, from user 804, a speech input representing a user request. For example, user 804 may provide one or more speech inputs such as "What is on my calendar tomorrow?", "When is my first meeting?", "How is the weather?" or "Play Star Wars from my movie application." In some examples, the user request can be a request for information specific to user 804. For example, the speech inputs such as "What is on my calendar tomorrow?" or "When is my first meeting tomorrow?" represent requests for information specific to user 804. In some examples, the user request can be a request for non-user specific information. For examples, the speech inputs such as "How is the weather tomorrow?" or "What is the today's stock price of AAPL?" represent requests for information that is not specific to any particular user.

In some embodiments, prior to receiving the user's speech input, the digital assistant operating on device 810A can receive an additional speech input that includes a predetermined content. In response to receiving the additional speech input, the digital assistant operating on device 810A can activate device 810A. For example, device 810A may be placed in a standby mode or a lower power mode. Placing device 810A in standby mode or a lower power mode can reduce power consumption and in some examples, enhances the protection of the user's privacy. For example, during a standby mode or lower power mode, only limited voice detection and/or speech processing functions are enabled for the digital assistant operating on device 810A. Other functions of device 810A (e.g., camera, indication light, speaker, etc.) may be disabled. In some examples, during the standby mode or lower power mode, the digital assistant operating on device 810A can still detect a speech input and determine whether the speech input includes predetermined content such as "Wake up, speaker" or "Hey, Speaker." Based on the determination, the digital assistant operating on device 810A can activate the device 810A. In some examples, after device 810A is activated, device 810A exits the standby mode and switches to a normal operation mode. In the normal operation mode, the digital assistant operating on device 810A can perform additional functions.

As illustrated in FIG. 8A, in an area 800 (e.g., a house), a plurality of devices 810A-C can be disposed. In some examples, a speech input activating one of device 810A-C may or may not activate other devices being disposed in the vicinity. For example, as described above, user 804 may provide a speech input including predetermined content (e.g., "Wake up, speaker") to device 810A. In some examples, device 810B may be disposed in another portion of area 800 (e.g., another room) and thus may not receive the speech input. As a result, device 810B may not be activated. In some examples, device 810B may be disposed in the vicinity of device 810A (e.g., in the same room) and may also receive the speech input including the predetermined content. In some examples, the digital assistant operating on device 810A can coordinate with device 810B to determine which device should be activated. For example, the digital assistants operating on device 810A and device 810B can both detect and record the volume or sound pressure associated with the speech input. Based on the comparison of the sound pressure detected at device 810A and the sound pressure detected at device 810B, the user's position relative to the two devices can be determined. For example, it may be determined that the user is physically closer to device 810A than to device 810B. As a result, device 810A may be activated while device 810B may not be activated. It is appreciated that the determination of which device is to be activated can be based on the user's speech input (e.g., user 804 provides "wake up, speaker in living room") and/or any context information such as the user's preferences, the user's relative position, the capabilities and attributes of the devices (e.g., one device is better for performing certain tasks than another device), etc.

In some embodiments, after receiving the user's speech input, the digital assistant operating on electronic device 810A can output one or more speech inquiries regarding the user request. For example, a user intent may not be determined or clear based on the user's speech input; or the digital assistant operating on device 810A may not have properly received the speech input. As such, the digital assistant operating on device 810A may output a speech inquiry such as "What's that?" or "I did not quite get that," thereby seeking to clarify the user request. In response to the one or more speech inquiries, user 804 can thus provide one or more additional speech inputs clarifying his or her requests (e.g., repeat or rephrase the previous speech input). And device 810A can receive the one or more additional speech inputs.

Figure 9A:
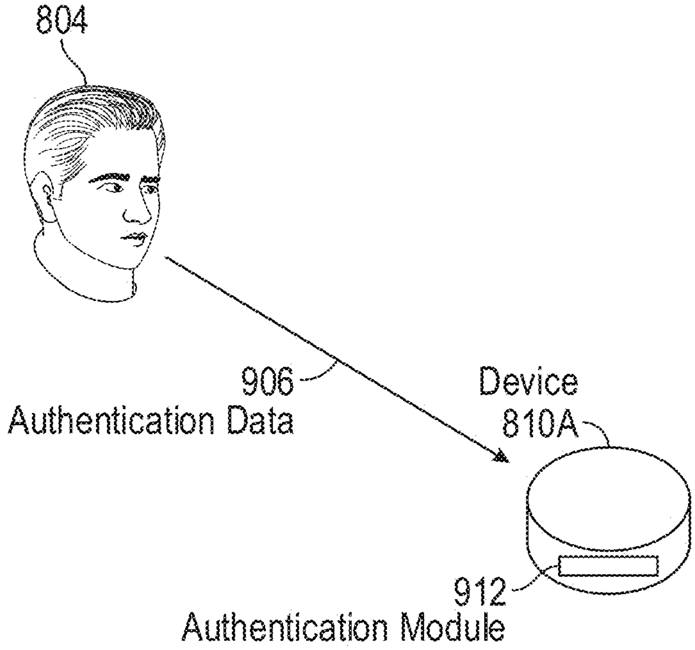
FIGS. 9A-9C illustrate functionalities of obtaining an identity of a user at a first electronic device, according to various examples.
Figure 9B:
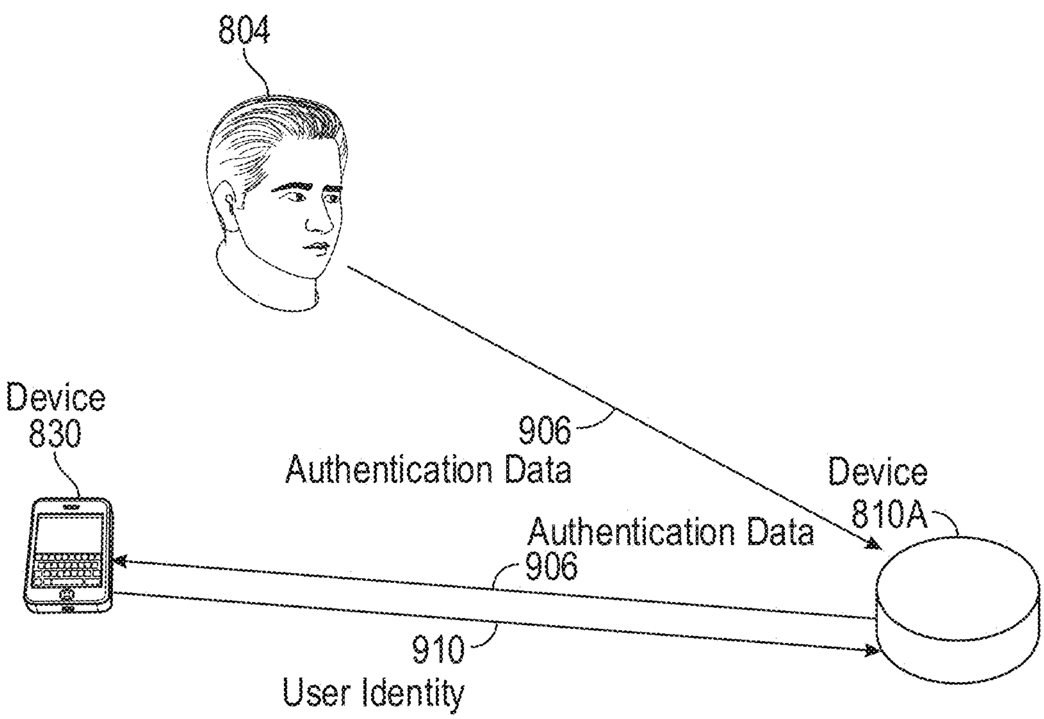
Figure 9C:
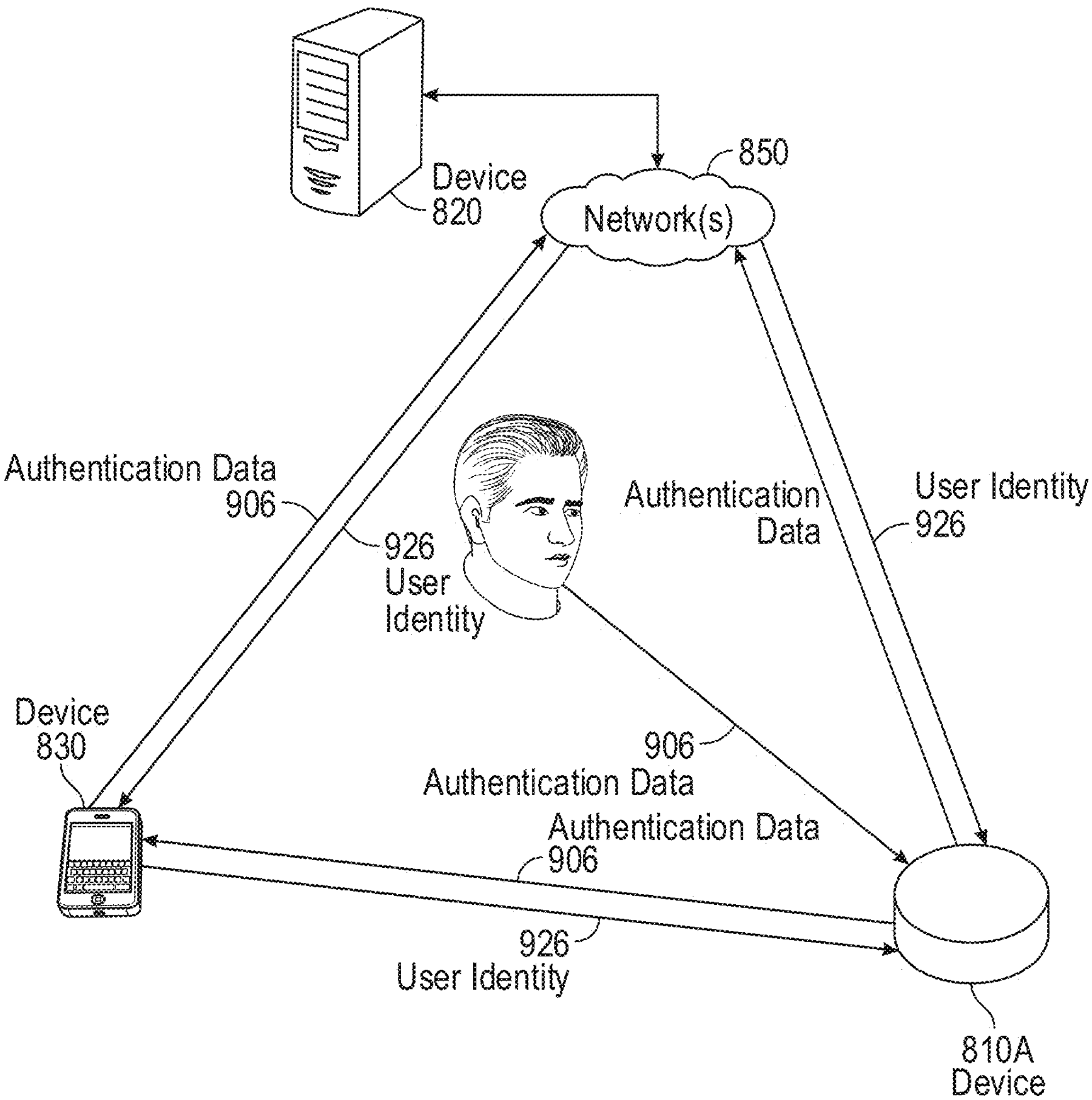

In some embodiments, after receiving the user's speech input, the digital assistant operating on device 810A can obtain an identity of user 804. As described, electronic device 810A can extend digital assistant services for multiple devices (e.g., devices 830 and 832) associated with one or more users (e.g., users 804 and 806 as shown in FIG. 8B). Thus, for providing extension of digital assistant services from a proper device associated with a particular user (e.g., user 804 or user 806), the digital assistant operating on electronic device 810A can obtain the identity of the user. FIGS. 9A-9C illustrate functionalities of obtaining an identity of user 804 at electronic device 810A, according to various examples. With references to FIGS. 8A and 9A-9C, in some examples, electronic device 810A can include an authentication module 912. Authentication module 912 can include one or more sensors such as voice biometric sensors, facial recognition systems, fingerprint readers, NFC sensors, etc. In some examples, as shown in FIG. 9A, authentication module 912 can obtain authentication data 906 associated with user 804. In some examples, authentication data 906 can include user's voice biometrics, and/or fingerprint, and/or user's facial recognition data. For example, user 804's voice biometrics may include the user's voice characteristics such as acoustic patterns or voiceprints. User 804's facial recognition data may include the user's facial characteristics that may uniquely identify the user, such as the relative position, size, and/or shape of the eyes, nose, cheekbones, jaw, etc.

In some examples, authentication data 906 can include sensing of another electronic device that identifies the user. For example, the digital assistant operating on device 810A may detect that user 804's wearable device (e.g., a smart watch) is disposed in the vicinity of device 810A, communicate with the wearable device via NFC (e.g., Bluetooth), and obtain authentication data 906 from the wearable device (e.g., having already been authenticated on the user's watch). As another example, the digital assistant operating on device 810A may detect that device 810A is physically in contact with the user's smartphone that identifies the user, communicate with the user's smartphone via NFC (e.g., Bluetooth), and obtain authentication data 906 from the user's smartphone. In some examples, authentication data 906 can include other credentials of the user, such as the user's fingerprints, passwords, or the like. It is appreciated that the digital assistant operating on electronic device 810A can obtain any authentication data associated with user 804 in any manner.

With reference to FIGS. 8A and 9A-9C, the digital assistant operating on device 810A can obtain a determination of the identity of the user 804 based on authentication data 906. As illustrated in FIG. 9B, in some embodiments, the digital assistant operating on electronic device 810A can provide the obtained authentication data 906 to electronic device 830 for authentication. For example, the digital assistant operating on device 810A can provide the user's voice biometrics data, the user's facial recognition data, the user's fingerprint data, device sensing data, and/or other credentials to electronic device 830. As described, electronic device 830 can be a device that is associated with user 804 (e.g., user 804's smartphone) and can thus store user identity information. Based on the received authentication data 906, device 830 can determine whether authentication data 906 include credentials that match with the stored user identity information (e.g., a password or a fingerprint). If authentication data 906 include credentials that match with user identity information, device 830 can send a determination of user identity 910 of user 804 to device 810A.

With reference to FIG. 9C, as described, the digital assistant operating on device 810A can provide authentication data 906 to device 830. In some embodiments, device 830 (e.g., a smartphone) may be incapable of obtaining the identity of user 804 and may thus forward authentication data 906 to electronic device 820. For example, device 830 may not store voice biometric information that can identify a user, and may thus be incapable of making a determination of user 804's identity. Device 830 may thus forward authentication data 906 to device 820. In some examples, device 820 may be disposed remotely from devices 810A and 830. For example, device 820 can be a server that is communicatively coupled to devices 810A and 830 via network(s) 850. Device 820 may store user identity information and may thus determine whether authentication data 906 include credentials that match with the stored identity information. If device 820 determines that authentication data 906 include credentials that match with user identity information of user 804, device 820 can send the determination of user identity 926 of user 804 to device 810A. In some examples, device 820 can send the determination of user identity 926 of user 804 directly to device 810A. In some examples, device 820 can send the determination of user identity 926 of user 804 to device 830, which then forward to device 810A.

In some examples, obtaining the identity of user 804 can be based on a speech input including predetermined content. As described above, based on a speech input including predetermined content (e.g., "Wake up, speaker" or "Hey, Speaker"), the digital assistant operating on device 810A can activate device 810A. The speech input including the predetermined content can also be used to determine user 804's voice biometrics, which may include the user's voice characteristics such as acoustic patterns or voiceprints. As a result, a speech input including a predetermined content (e.g., a speech input for activating device 810A) can be used for identifying user 804, in manners similar to those described above.

Figure 10A:
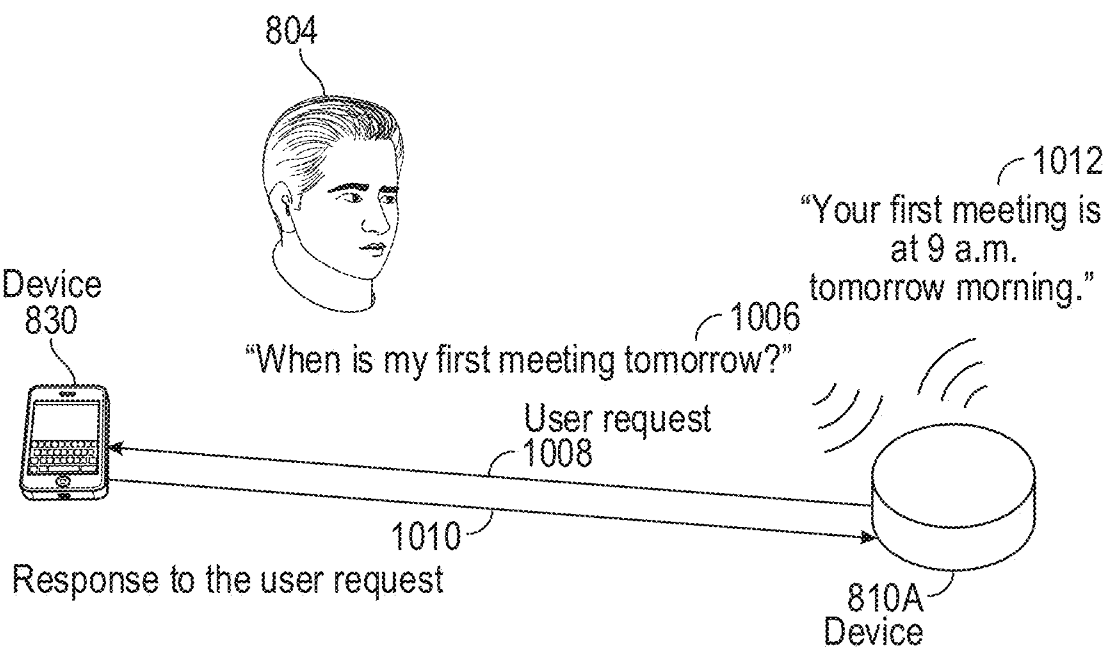
FIGS. 10A-10C illustrate functionalities of providing digital assistant services based on a user request for information, according to various examples.
Figure 10B:
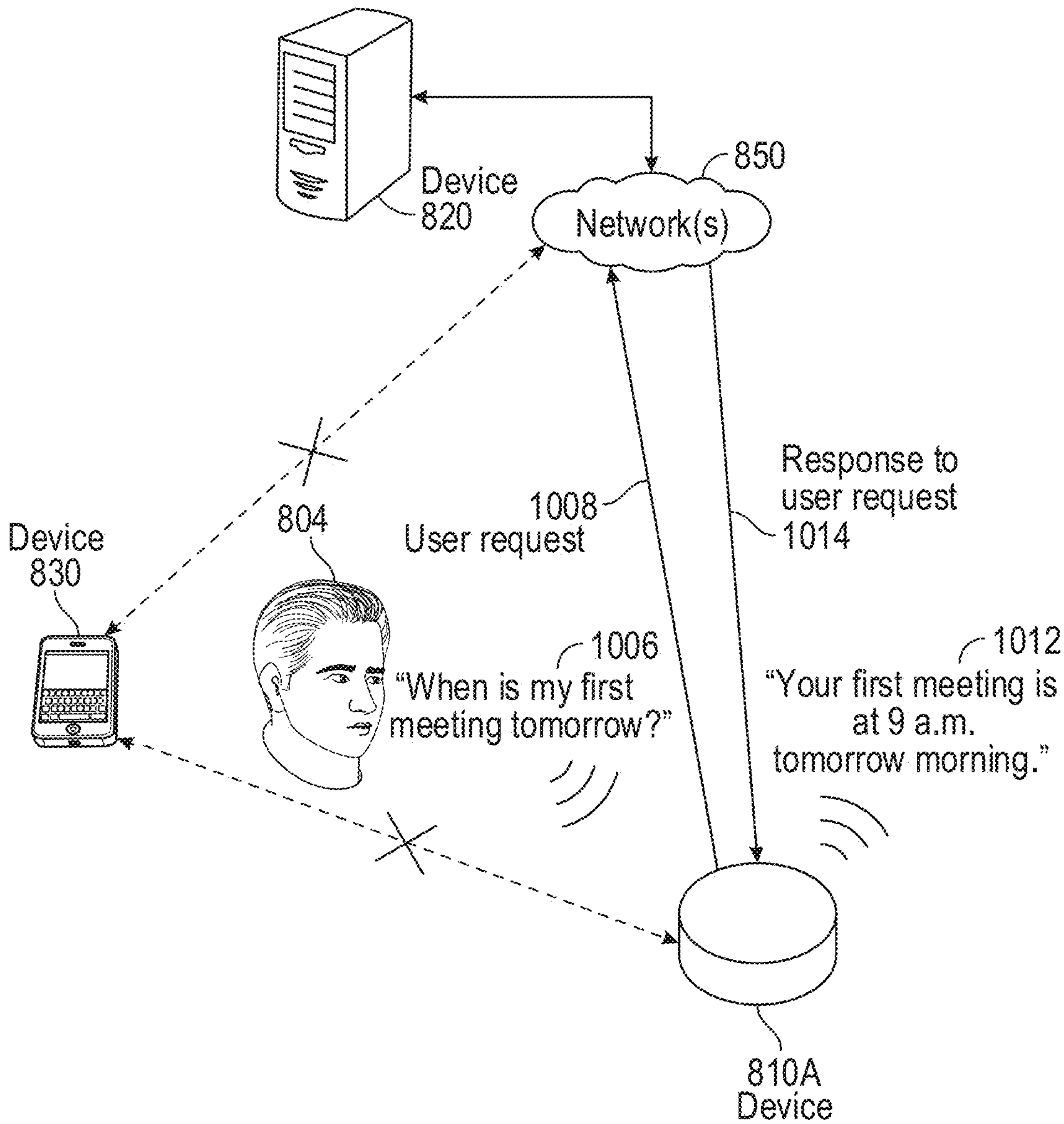
Figure 10C:
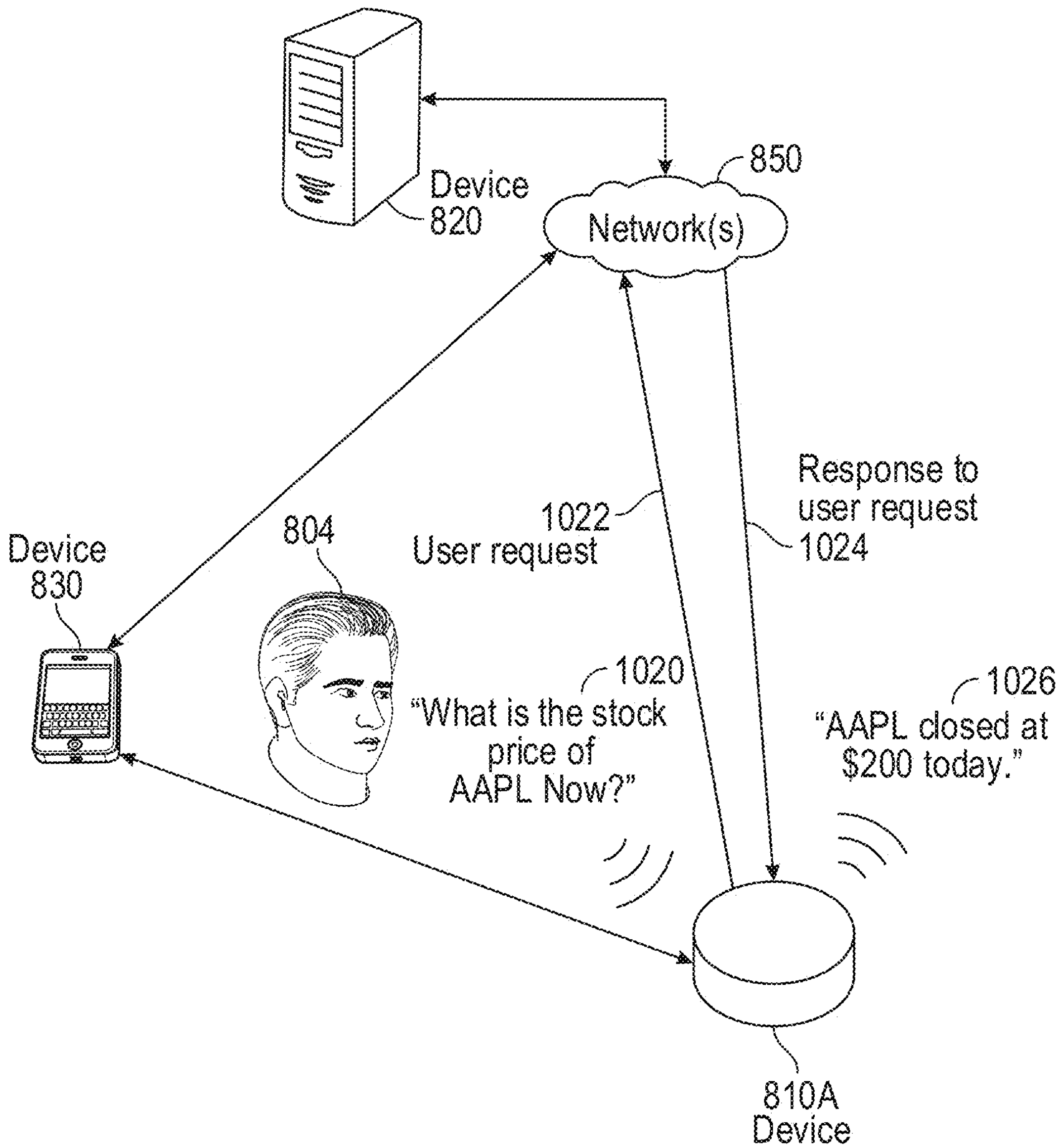

FIGS. 10A-10C illustrate functionalities of providing digital assistant services based on a user request for information, according to various examples. With reference to FIGS. 8A and 10A-10C, in accordance with the obtained user identity, the digital assistant operating on electronic device 810A can provide a representation of the user request 1008 to at least one of device 820 or device 830. As described above, in some examples, device 820 may be a server disposed remotely from devices 810A-C and 830. Device 830 may be a client device associated with user 804 (e.g., the user's smartphone) and may be disposed in the vicinity of devices 810A-C (e.g., in the same house or building).

In some embodiments, the digital assistant operating on device 810A can provide the representation of the user request 1008 to a device that is disposed in the vicinity of device 810A before providing the representation of the user request to a remote device. As illustrated in FIG. 10A, user 804 may provide a speech input 1006 such as "When is my first meeting tomorrow?" Thus, speech input 1006 includes a user request for information regarding, for example, user 804's first meeting time on the next day. In some embodiments, the digital assistant operating on device 810A can determine whether device 830 is communicatively coupled to device 810A. For example, the digital assistant operating on device 810A can detect whether device 830 is within the range of communication and whether a connection can be established via NFC such as Bluetooth or Wi-Fi connections. In accordance with a determination that device 830 is communicatively coupled to device 810A, the digital assistant operating on device 810A can provide representation of the user request 1008 to device 830. In some embodiments, device 830 is a device that is disposed in the vicinity of device 810A (e.g., the user's smartphone); and the digital assistant operating on device 810A may not further provide representation of the user request to a remote device such as device 820 shown in FIG. 8A. As a result, the user request is not transmitted remotely, and may stay within a device that is disposed in the vicinity of device 810A (e.g., the user's personal devices). By providing the representation of the user request 1008 only to device 830, which is disposed in the vicinity of device 810A, a response from device 830 may be obtained in a fast and efficient manner without having to consume time for communication with a remote device. As a result, the speed of responding to a user request at device 810A may be improved. Moreover, a user request (e.g., the user requested included in speech input 1006) may include a request for sensitive or confidential user-specific information (e.g., the user's calendar information). As a result, for privacy concerns, it may be desired not to send the representation of the user request 1008 to a remote device, such as a cloud server.

As illustrated in FIG. 10A, in some example, device 830 receives the representation of user request 1008 from device 810A and determines whether it is capable of providing a response to the user request. For example, as described, the user request may include a request for information of user 804's first meeting time on the next day. Device 830 may determine that it stores user 804's calendar information is stored in device 830 and thus determine it is capable of providing the response to the user request. Accordingly, device 830 can send the response 1010 to the user request to device 810A. The response 1010 may include, for example, user 804's first meeting time on the next day. The digital assistant operating on device 810A receives the response 1010 to the user request from device 830, and can provide a representation of the response 1010 to user 804. As shown in FIG. 10A, the digital assistant operating on device 810A can provide a speech output 1012 such as "Your first meeting is at 9 a.m. tomorrow morning."

As described, the digital assistant operating on device 810A can determine whether device 830 is communicatively coupled to device 810A. For example, the digital assistant operating on device 810A can detect whether device 830 is within the range of communication and whether a connection between the two devices can be established via Bluetooth or Wi-Fi connections. With reference to FIG. 10B, in some embodiments, the digital assistant operating on device 810A can determine that device 830 is not communicatively coupled to device 810A For example, the digital assistant operating on device 810A may not be capable of detecting device 830 because device 830 is beyond the range of communication, or because a connection cannot be established between the two devices. In accordance with a determination that the device 830 is not communicatively coupled to device 810A, the digital assistant operating on device 810A can provide the representation of the user request 1008 to device 820. As described above, device 820 can be a remote device such as a server. In some examples, the digital assistant operating on device 810A can provide the representation of the user request 1008 to device 820 via network(s) 850.

In some embodiments, as shown in FIG. 10B, device 820 receives the representation of user request 1008 from device 810A and determines whether it is capable of providing the response to the user request. For example, as described, the user request may include a request for information of user 804's first meeting time on the next day. Device 820 may determine that it stores, or has access to, user 804's calendar information (e.g., stored in user 804's cloud account) and thus determine it is capable of providing the response to the user request. Accordingly, device 820 can send a response 1014 to the user request to device 810A. The response 1014 to the user request may include, for example, the user's first meeting time on the next day. Device 810A receives the response 1014 to the user request from device 820, and can provide a representation of response 1014 to user 804. As shown in FIG. 10B, the digital assistant operating on device 810A can provide a speech output 1012 such as "Your first meeting is at 9 a.m. tomorrow morning." In some examples, after providing response to user 804, device 810A can continue to monitor subsequent speech inputs.

With reference to FIG. 10C, in some embodiments, user 804 may provide a speech input 1020 such as "What is the stock price of AAPL today?" This type of speech input represents a user request for non-user-specific information. Non-user-specific information is not specific to a particular user and may be general information such as weather information, stock price information, sports game information, etc. In some embodiments, as shown in FIG. 10C, the digital assistant operating on device 810A can provide the representation of user request 1022 for non-user-specific information to device 820 and not to device 830. As described, device 820 may be a server that is disposed remotely from device 810A, and device 830 may be the user's smartphone that is disposed in the vicinity of device 810A. In some embodiments, non-user-specific information (e.g., weather, stock price, game scores, etc.) may not be available and/or updated at device 830 (e.g., the user's smartphone). Thus, device 810A can determine that it is more appropriate and efficient to obtain the non-user-specific information from a remote device (e.g., a server), rather than a device that is disposed in the vicinity of device 810A (e.g., a user's personal device). As such, the digital assistant operating on device 810A can provide the representation of user request 1022 for non-user-specific information to device 820 (e.g., a server) via network(s) 850.

As shown in FIG. 10C, device 820 receives the representation of user request 1022 from device 810A and determines that it is capable of providing the response to the user request. For example, as described, the user request may include a request for stock price information of AAPL. Device 820 may determine that it is capable of obtaining the information from a relevant data source (e.g., a finance website) and thus capable of providing the response to the user request. Accordingly, device 820 can send a response 1024 to the user request to device 810A. Response 1024 to the user request may include, for example, the current stock price of AAPL. The digital assistant operating on device 810A receives response 1024 from device 820, and can provide a representation of response 1024 to user 804. As shown in FIG. 10C, the digital assistant operating on device 810A can provide a speech output 1026 such as "AAPL closed at $200 today."

Figure 11A:
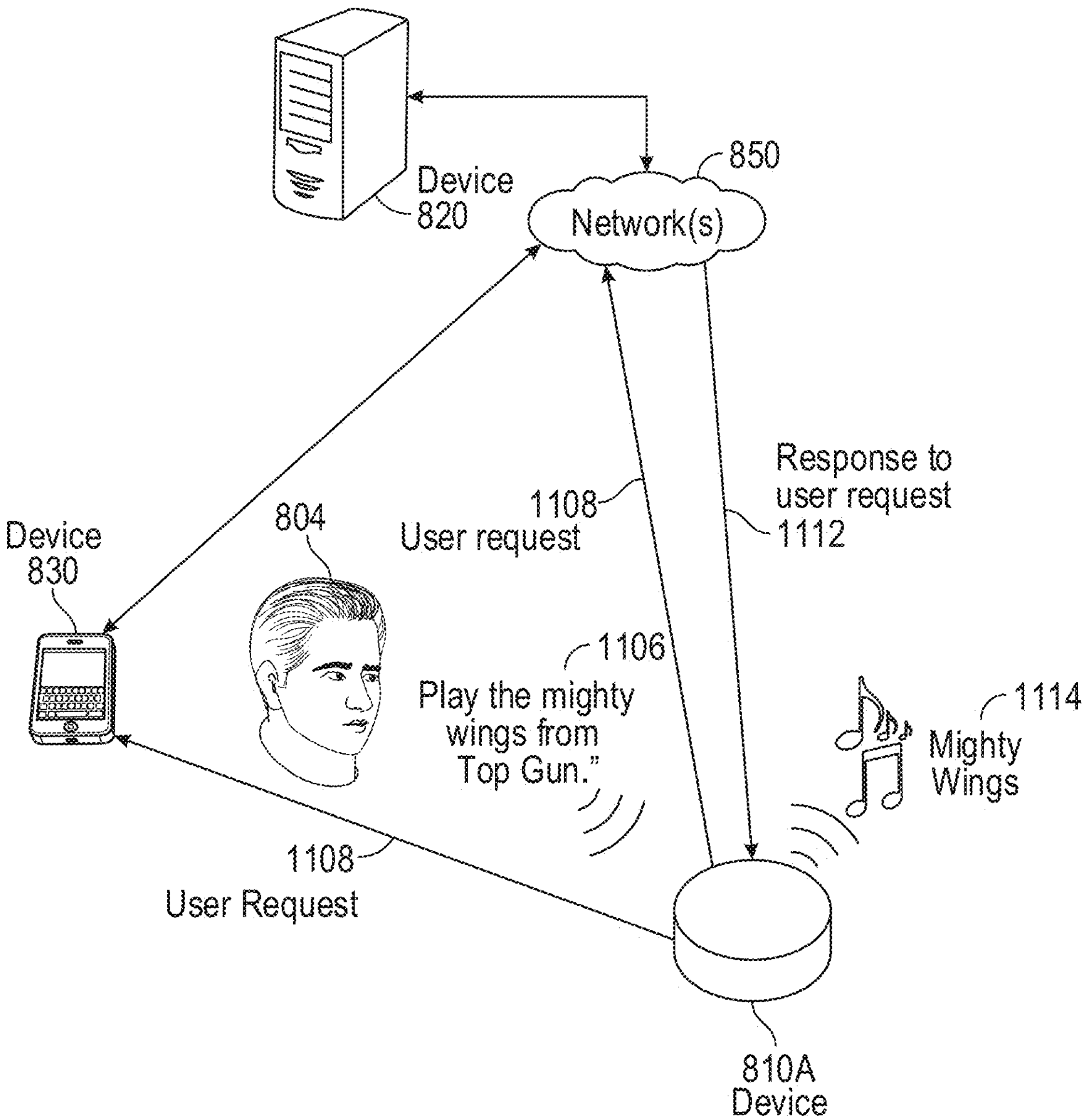
FIGS. 11A-11D illustrate functionalities of providing digital assistant services based on a user request for performing a task, according to various examples.
Figure 11B:
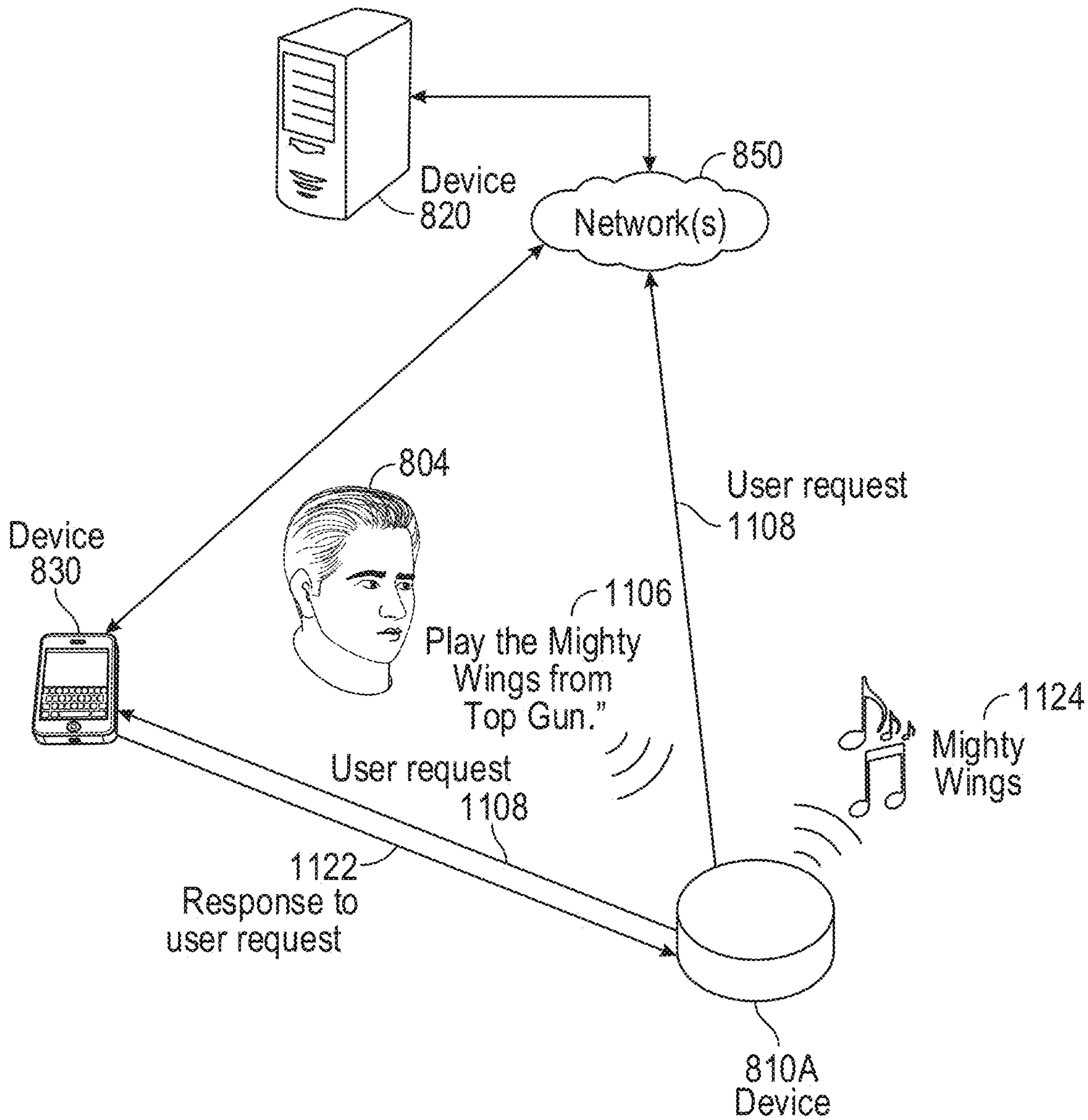

FIGS. 11A-11D illustrate functionalities of providing digital assistant services based on a user request for performing a task, according to various examples. With reference to FIGS. 11A and 11B, in some embodiments, user 804 may provide a speech input 1106 representing a user request for performing a task. For example, speech input 1106 may include "Play the Mighty Wings from Top Gun." Speech input 1106 thus represents a request to perform a task of playing a particular piece of music. In some examples, the digital assistant operating on device 810A may be incapable of (e.g., due to lack of sufficient information) determining whether a response to a user request can be provided by device 830 (e.g., a device disposed in the vicinity of device 810A such as the user 804's personal smartphone) or device 820 (e.g., a remote server). In the above example, device 810A may not have sufficient information to determine whether the user 804's smartphone or a server stores the song "Mighty Wings." Accordingly, the digital assistant operating on device 810A can provide the representation of user request 1108 to both device 830 and device 820.

As illustrated in FIG. 11A, device 820 and device 830 both receive the representation of the user request 1108 (e.g., a user request to perform a task). One or both of device 820 and device 830 can determine whether the respective device is capable of providing the response to the user request 1108. For example, device 830 can determine whether it stores the song Might Wings and if so, determine that it is capable of providing the response. Device 820 can make a similar determination. In some examples, the determinations can be made separately and independently on device 820 and device 830. For example, both devices 820 and 830 may determine whether they store the song "Mighty Wings;" and communicate the result of determination to the other device. In some examples, one of device 820 or device 830 can make the determination first and then send an indication to the other device. For example, device 830 may determine whether the song "Mighty Wings" is stored in device 830, and send an indication of the determination to device 820. If device 830 determines that it stores the song "Mighty Wings," it can send a corresponding indication to device 820 so that device 820 does not make any further determination. If device 830 determines that it does not have the song "Mighty Wings," it may send a corresponding indication to device 820 so that device 820 can then determine whether it stores, or has access to, the requested song. Similarly, device 820 may make a determination first and then send an indication to device 830. In some embodiments, the digital assistant operating on device 810A can cause one or both devices 820 and 830 to determine whether the respective device is capable of providing the response the user request. For example, the representation of the user request 1108 that is sent to devices 820 and 830 may include an explicit or implicit request for one or both devices 820 and 830 to determine whether one or both devices are capable of providing the requested response.

As shown in FIG. 11A, in Some examples, device 820 (e.g., a server) may determine that it is capable of providing the response to the user request; and device 830 (e.g., the user's smartphone) may determine that it is incapable of providing the response to the user request. For example, device 820 may determine that it stores, or have access to, the requested song "Mighty Wings" and device 830 may determine that it does not store the song. Accordingly, device 820 can provide a response 1112 to the user request to device 810A. For example, device 820 can stream the song "Mighty Wings" to device 810A. Device 810A receives response 1112 from device 820 and provides a representation of response 1112 to user 804. For example, the digital assistant operating on device 810A receives the streaming of the song "Mighty Wings" and provides audio outputs 1114 of the song.

With reference to FIG. 11B, in some examples, device 830 (e.g., the user's smartphone) may determine that it is capable of providing the response to the user request; and device 820 (e.g., the server) may determine that it is incapable of providing the response to the user request. For example, device 830 may determine that it stores the song "Mighty Wings" and device 820 may determine that it does not store the song, or does not have access, to the requested song without requiring a further user interaction (e.g., asking the user to purchase the song). Accordingly, device 830 can provide a response 1112 to the user request to device 810A. For example, device 830 can stream the song "Mighty Wings" to device 810A. The digital assistant operating on device 810A receives response 1122 from device 830 and provides a representation of response 1122 to user 804. For example, device 810A receives the streaming of the song "Mighty Wings" and provides audio outputs 1124 of the song.

With reference to FIGS. 11A and 11B, in some examples, both device 830 (e.g., the user's smartphone) and device 820 (e.g., a server) may determine that the respective device is capable of providing the response to the user request. For example, device 830 may determine that it stores the song "Mighty Wings;" and device 820 may determine that it also stores the requested song (e.g., in the user's cloud account) or has access to the song without requiring further user interaction (e.g., without requiring the user to purchase the song). Accordingly, either device 820 or device 830 is capable of providing a response to the user request to device 810A. In some examples, the selection of a device from multiple devices for providing the response can be based on a predetermined condition. For example, the predetermine condition may include a pre-configured policy (e.g., device 830 is the default device to provide response if more than one device are capable of providing responses), a condition of connection bandwidth (e.g., the device that has a higher bandwidth of connection is the device to provide response), a condition of user's preferences (e.g., in order to save cellular data usage, the user prefers to use a device that is connected to device 810A via Wi-Fi for providing responses), or the like. Based on the predetermine condition, one of device 820 and device 830 can stream the song "Mighty Wings" to device 810A. The digital assistant operating on device 810A receives the response to the user request and provides a representation of the response to the user. For example, device 810A receives the streaming of the song "Mighty Wings" and provides audio outputs of the song.

Figure 11C:
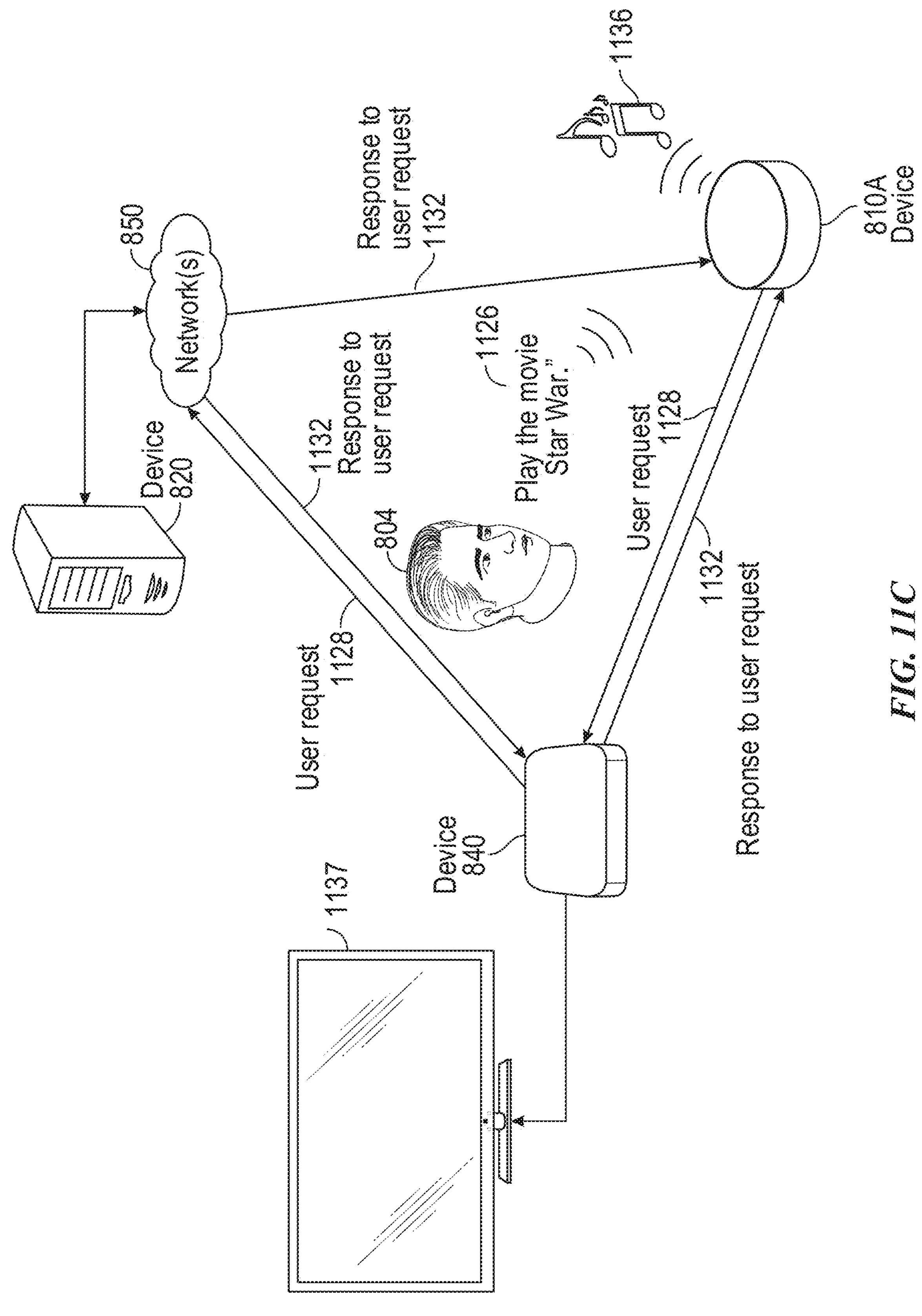

With reference to FIG. 11C, in some embodiments, user 804 may provide a speech input 1126 representing a user request for performing a task. Speech input 1126 may include, for example, "Play the movie Star Wars." The digital assistant operating on device 810A receives speech input 1126. In some examples, based on speech input 1126, device 810A can provide a representation of a user request 1128 to a device that is disposed in the vicinity of device 810A (e.g., device 840) and not to a remote device (e.g., device 820 such as a server). The digital assistant operating on device 810A may not provide the representation of user request 1128 to a remote device for a number of reasons. For example, the digital assistant operating on device 810A may determine that the information is likely to be available at a device that is disposed in the vicinity of device 810A (e.g., device 840 such as a TV set-top box); that there is no or poor connection to a remote device; that the bandwidth to a remote device is limited or inferior; that a predetermined configuration requires providing representations of user requests to a device that is the vicinity of device 810A (e.g., a device connected to device 810A via Wi-Fi); or the like. As described above, device 840 may be a TV set-top box that is disposed in the vicinity of device 810A, and device 820 may be a server disposed remotely. In some examples, the digital assistant operating on device 810A can be configured to always provide the representation of a user request to a device that is disposed in the vicinity of device 810A (e.g., device 840). In some examples, the digital assistant operating on device 810A can be configured to provide the representation of a user request to a device that is disposed in the vicinity of device 810A (e.g., device 840) or a remote device (e.g., device 820) based on the type and/or content of the user request. As described above, in some examples, if the user request is a request for user-specific information, the digital assistant operating on device 810A can provide the representation of the user request to a device that is disposed in the vicinity of device 810A (e.g., the user's smartphone); and if the user request is a request for non-user-specific information, device 810A can provide the representation of the user request to a remote device (e.g., the server).

As shown in FIG. 11C, device 840 receives the representation of the user request 1128, which may cause device 840 to determine whether it is capable of providing a response to the user request. For example, device 840 may determine that it stores the movie Star Wars and thus is capable of providing the response to device 810A. As other examples, device 840 may determine it stores data including user's personal calendar, contacts, photos, media items, or the like, and thus is capable of providing a response for a user request for information or task performance using these stored data. In accordance with a determination that device 840 is capable of providing the response to the user request, device 840 can provide a response 1134 to device 810A. For example, device 840 can stream the movie "Star Wars" to device 810A. The digital assistant operating on device 810A receives response 1134 from device 810A, and provides a representation of response 1134 to the user. For example, the digital assistant operating on device 810A can provide audio outputs 1136 (e.g., play the movie "Star Wars") using its display and speakers. In some examples, device 840 can provide at least a portion of the response to device 810A while provide other portions of the response to one or more other devices. For example, device 840 can provide the audio portion of the movie "Star Wars" to device 810A while provide the video portion of the movie to a device 1137 (e.g., a TV).

With reference to FIG. 11C, as described, device 840 receives the representation of the user request 1128, which may cause device 840 to determine whether it is capable of providing the response to the user request. In some examples, device 840 may determine that it is incapable of providing the response to the user request. For example, device 840 may determine that it does not store the movie "Star Wars" and thus cannot provide the response. As other examples, device 840 may determine that the user request is for information that is not stored in device 840 (e.g., stock information, web searching request, etc.), and thus determine it cannot provide the response.

As shown in FIG. 11C, in Accordance with a determination that the device 840 is incapable of providing a response to the user request, device 840 can forward a representation of user request 1128 to device 820 via network(s) 850. As described, device 820 can be a server. Based on the representation of user request 1128, device 820 can then determine whether it is capable of providing a response. For example, device 820 may determine whether it stored a requested movie, or whether a requested movie is accessible from user 804's cloud account or from a web source (e.g., a media website). If device 820 determines that it stores the requested movie or that the requested movie is accessible, device 820 determines that it is capable of providing the response. In some examples, device 820 can provide a response 1132 to device 840, which can then forward to device 810A and optionally device 1137 (e.g., a TV). In some examples, device 820 can provide response 1132 directly to device 810A and optionally device 1137. For example, device 820 can send the audio portion of the movie Star Wars to device 810A, while sending the video portion of the movie Star Wars to device 1137 (via device 840). The digital assistant operating on device 810A, and optionally device 1137, receives response 1132, and provides a representation of response 1132 to the user. For example, the digital assistant operating on device 810A, and optionally device 1137, can provide output 1136 based on the received response 1132 (e.g., play the movie "Star Wars").

Using the example illustrated in FIG. 11C, instead of providing speech input 1126, user 804 may provide a speech input such as "Play the movie Star Wars on my TV and set up another screen on my computer." Similar to those described above, the digital assistant operating on device 810A can provide a representation of the user request to device 840, and receive a response to the user request from device 840 or device 820, based on a determination whether device 840 (e.g., a TV set-top box disposed in the vicinity of device 810A) or device 820 (e.g., a server) is capable of providing the response. In some embodiments, the user request may indicate that the response to the user request is to be provided to multiple devices. Thus, device 840 and/or device 820 can provide the response accordingly. For example, the digital assistant operating on device 810A can receive a portion of the response (e.g., audio portion of a movie); device 1137 can receive another portion of the response (e.g., the video portion of a movie); and another device (e.g., the user's computer) can receive a duplicate copy of the response (e.g., a copy of both the audio and video portions of the movie). In some examples, user 804 may want to watch a movie using a device such as his or her computer or tablet, but not using device 810A. User 804 may provide a speech input such as "Play the movie Star Wars on my computer" or "Play the movie Star Wars on my tablet." The speech input may be provided as an initial input to start the task performance (e.g., start to play the movie Star Wars). The speech input may also be provided as a subsequent input while a task is being performed (e.g., while device 840 is streaming the movie to device 810A and/or device 1137). Similar to those described above, device 810A can provide a representation of the user request to device 840 and/or device 820. The representation of the user request may indicate a response is to be provided to the user's computer or tablet (not shown in FIG. 11C). The user's computer or tablet can thus receive a response to the user request from device 840 or device 820, based on a determination whether device 840 (e.g., a TV set-top box disposed in the vicinity of device 810A) or device 820 (e.g., a server) is capable of providing the response.

Figure 11D:
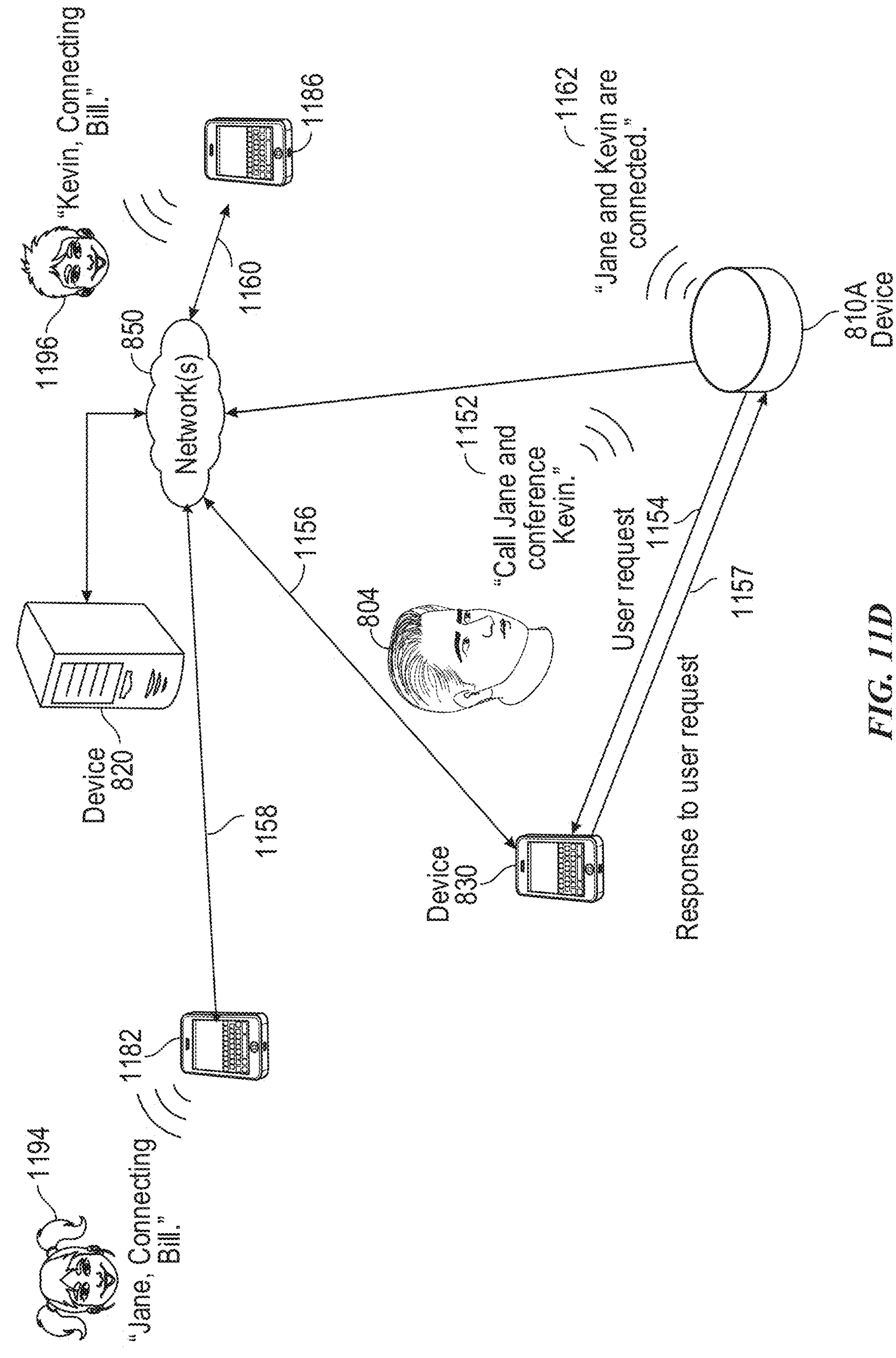

With reference to FIG. 11D, in some embodiments, user 804 may provide a speech input 1152 such as "Call Jane and conference Kevin." The digital assistant operating on device 810A receives speech input 1152 and can provide a representation of a user request 1154 to device 830 (e.g., the user's smartphone). User request 1154 can include a request to perform a task at device 830 (e.g., calling Jane and conferencing Kevin). Device 830 receives the representation of user request 1154, and determines that it is capable of performing the task. As described above in connection with FIGS. 1-7C, and similarly in other examples, a natural language processing module of the digital assistant operating on device 830 (and/or device 810A) can identify an actionable intent based on the user request and generate a structure query to represent the identified actionable intent. For example, based on speech input 1152, device 830 can thus determine if the actionable intent is "making phone calls." In some examples, the digital assistant can actively elicit and obtain information needed to fully infer the user intent (e.g., by disambiguating words, elicit further clarification inputs from the user, and/or use context information such as the user's contact list). A structured query for "making phone calls" may include parameters such as {callees}, {telephone numbers}, and the like. Next, a task flow processing module of the digital assistant can receive the structured query and perform the actions required to provide a response to the user request. Accordingly, device 830 can perform the task according to user request 1154 (e.g., call user 1194's device 1182 and conference in user 1196's device 1186). Based on the performance of the task, device 830 can also provide a response 1157 to device 810A. For example, the digital assistant operating on device 810A can receive response 1157 from device 830, indicating that the conference with user 1194 (e.g., Jane) and user 1196 (e.g., Kevin) has been established. Accordingly, the digital assistant operating on device 810A can provide an audio output 1162 such as "Jane and Kevin are connected."

Figure 12A:
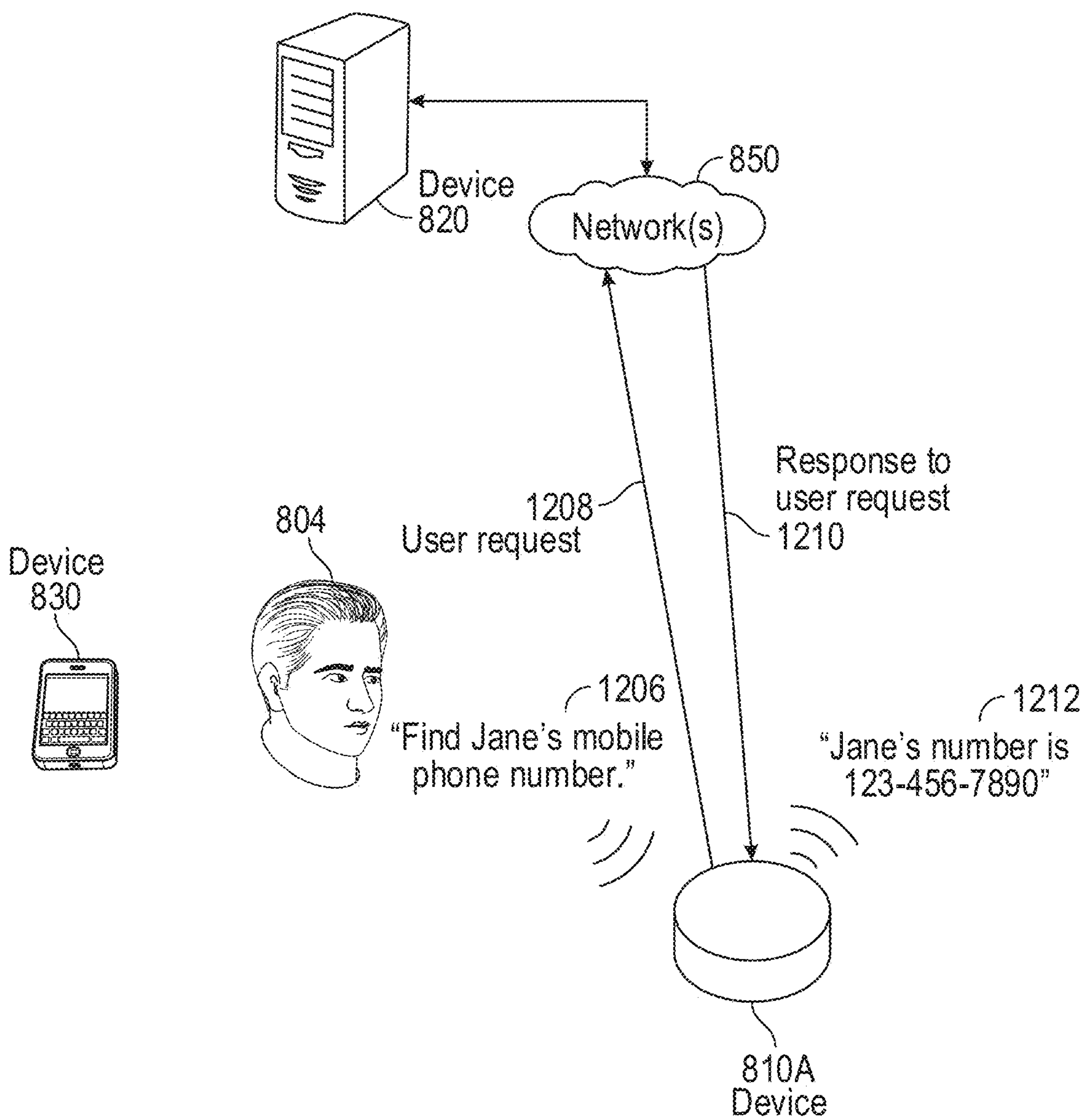
FIGS. 12A-12C illustrate functionalities of providing digital assistant services based on a user request for information, according to various examples.
Figure 12B:
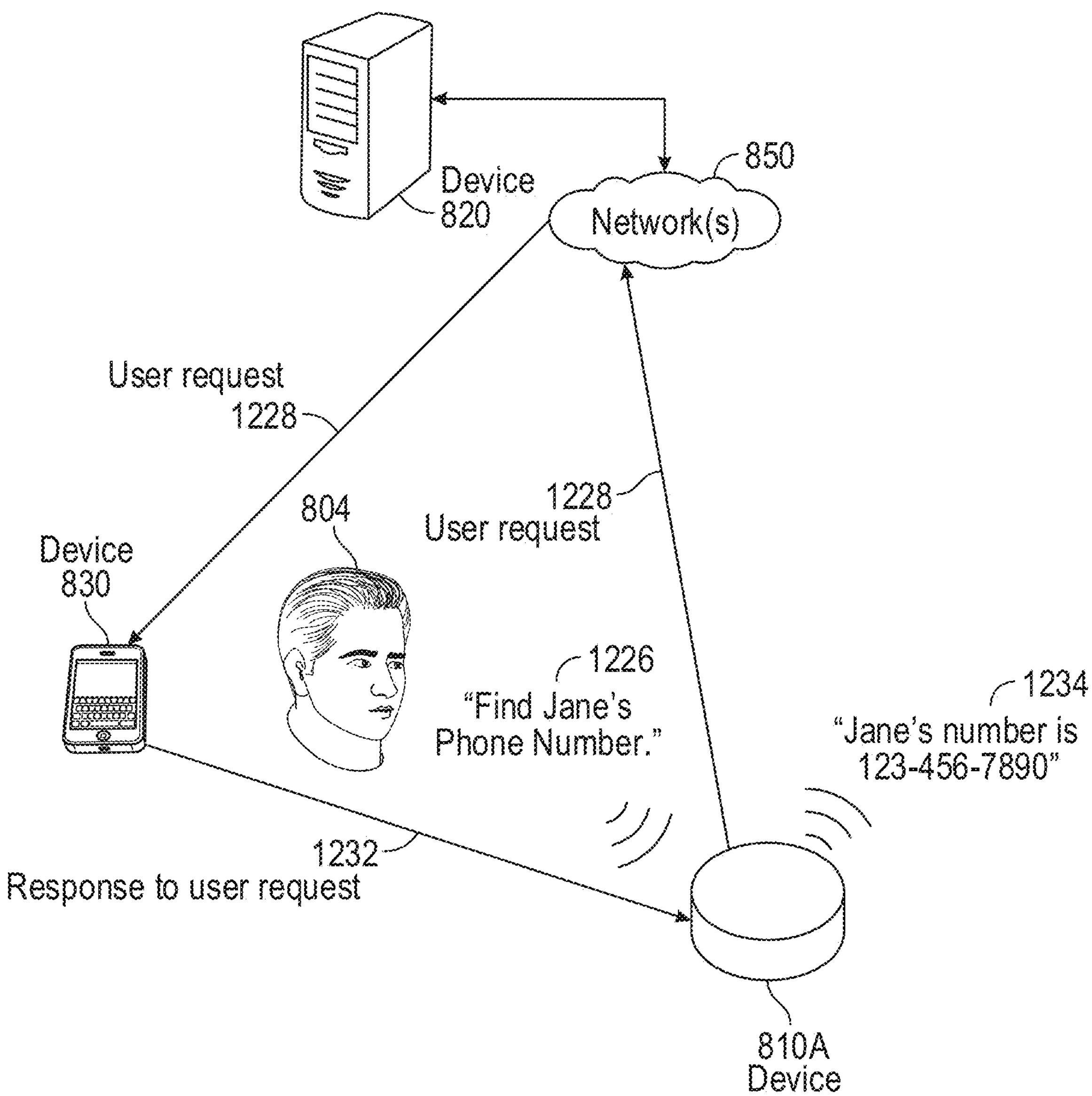
Figure 12C:
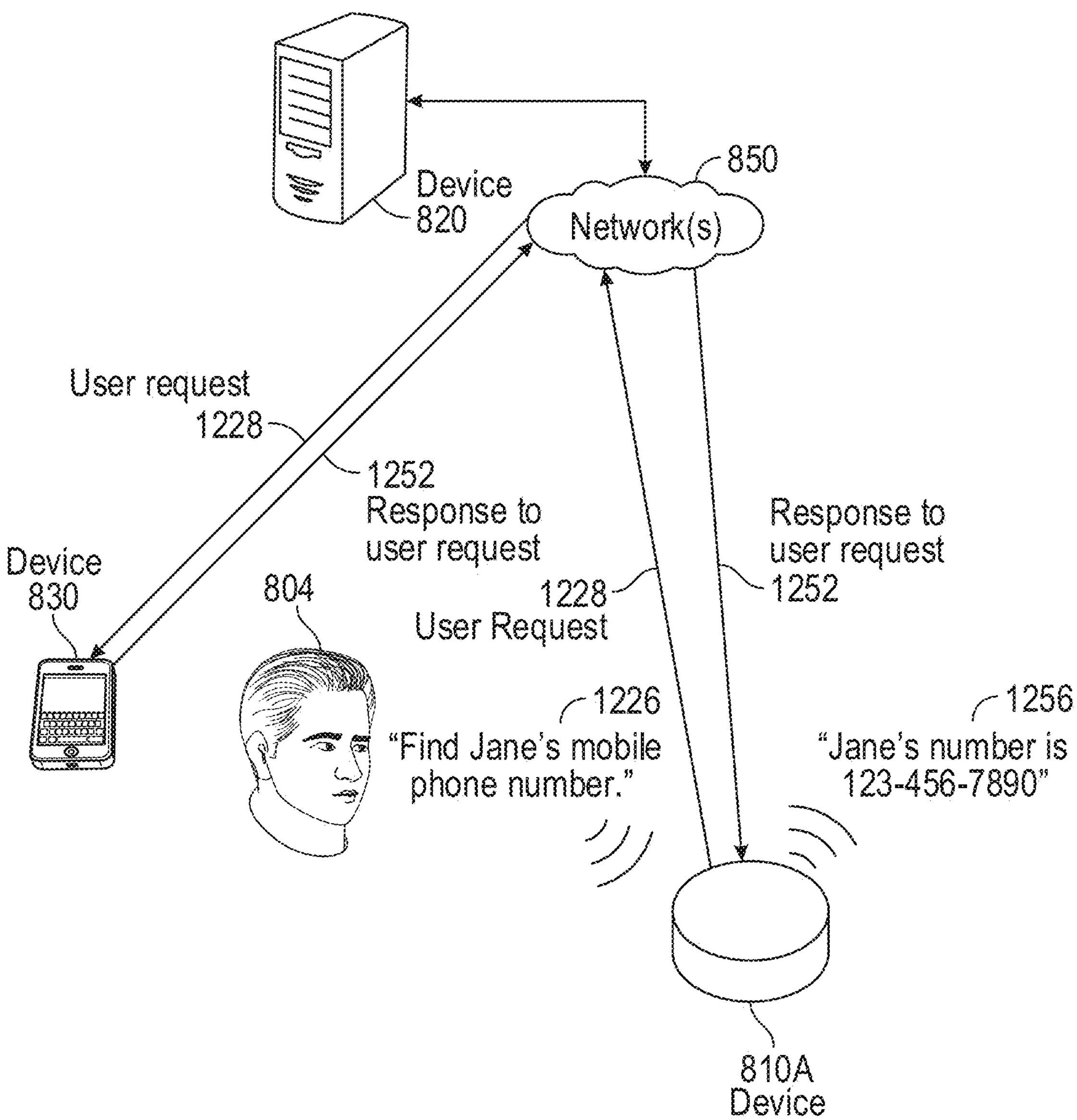

FIGS. 12A-12C illustrate functionalities of providing digital assistant services based on a user request for information, according to various examples. With reference to FIG. 12A, user 804 may provide a speech input 1206 such as "Find Jane's mobile phone number." Speech input 1206 thus represents a user request for a telephone number. The digital assistant operating on device 810A receives speech input 1206, and provides a representation of a user request 1208 to a remote device (e.g., device 820 such as a server) via network(s) 850, and not to a device that is disposed in the vicinity of device 810A (e.g. device 830 such as the user's smartphone). The digital assistant operating on device 810A may not provide the representation of user request 1208 to a device that is disposed in the vicinity of device 810A for a number of reasons. For example, the digital assistant operating on device 810A may determine that the information is unlikely to be available at a device that is disposed in the vicinity of device 810A (e.g., device 830); that there is no or poor connection to a device that is in the vicinity of device 810A (e.g., device 830 is out of communication range with device 810A); that the bandwidth to a device that is disposed in the vicinity of device 810A is limited or inferior; that a predetermined configuration requires providing representations of user requests to a remote device; or the like.

In some embodiments, device 820 receives the representation of user request 1208, which may cause device 820 to determine whether it is capable of providing the response to the user request. For example, device 820 may determine that the user 804's cloud account stores the requested telephone number and thus is capable of providing a response to the user request. In accordance with a determination that device 820 is capable of providing a response to the user request, device 820 can provide response 1210 to device 810A. For example, device 820 can provide Jane's telephone number to device 810A. The digital assistant operating on device 810A receives response 1210 from device 820, and provides a representation of response 1210 to user 804. For example, the digital assistant operating on device 810A can provide an audio output 1212 such as "Jane's number is 123-456-7890."

With reference to FIG. 12B, similar to FIG. 12A, after device 810A receives a speech input 1226 such as "Find Jane's phone number," it can provide a representation of a user request 1228 to device 820 via network(s) 850. In some embodiments, device 820 receives the representation of user request 1228, which may cause device 820 to determine whether it is capable of providing a response to user request 1228. For example, device 820 may determine that the user 804's cloud account does not store Jane's telephone number and thus is incapable of providing a response to the user request. In accordance with a determination that device 820 is incapable of providing the response to the user request, device 820 can forward the representation of user request 1228 to device 830. Device 830 can be a device disposed in the vicinity of device 810A and can be a device associated with user 804 (e.g., user 804's personal device such as a smartphone). Similar to those described above, device 830 can determine whether it is capable of providing a response to the user request (e.g., whether it stores Jane's telephone number), and provides response 1232 to device 810A in accordance with the determination. For example, in accordance with a determination that device 830 is capable of providing Jane's telephone number, device 830 can provide Jane's telephone number to device 810A. The digital assistant operating on device 810A receives the response 1232 from device 830, and provides a representation of response 1232 to the user. For example, the digital assistant operating on device 810A can provide an audio output 1234 such as "Jane's number is 123-456-7890." In some examples, the digital assistant operating on device 810A can receive the response directly from device 830. In some embodiments, device 830 can provide a response to device 820, which then forward the response to device 810A, as described below.

With reference to FIG. 12C and continuing the above example described in connection with FIG. 12B, the digital assistant operating on device 810A can receive a response 1252 indirectly from device 830. For example, device 830 can provide a response 1252 (e.g. Jane's telephone number) to device 820 (e.g., a server), which can then forward response 1252 to device 810A. The digital assistant operating on device 810A receives response 1252 from device 820, and provides a representation of response 1252 to user 804. For example, the digital assistant operating on device 810A can provide an audio output 1256 such as "Jane's number is 123-456-7890."

Figure 13A:
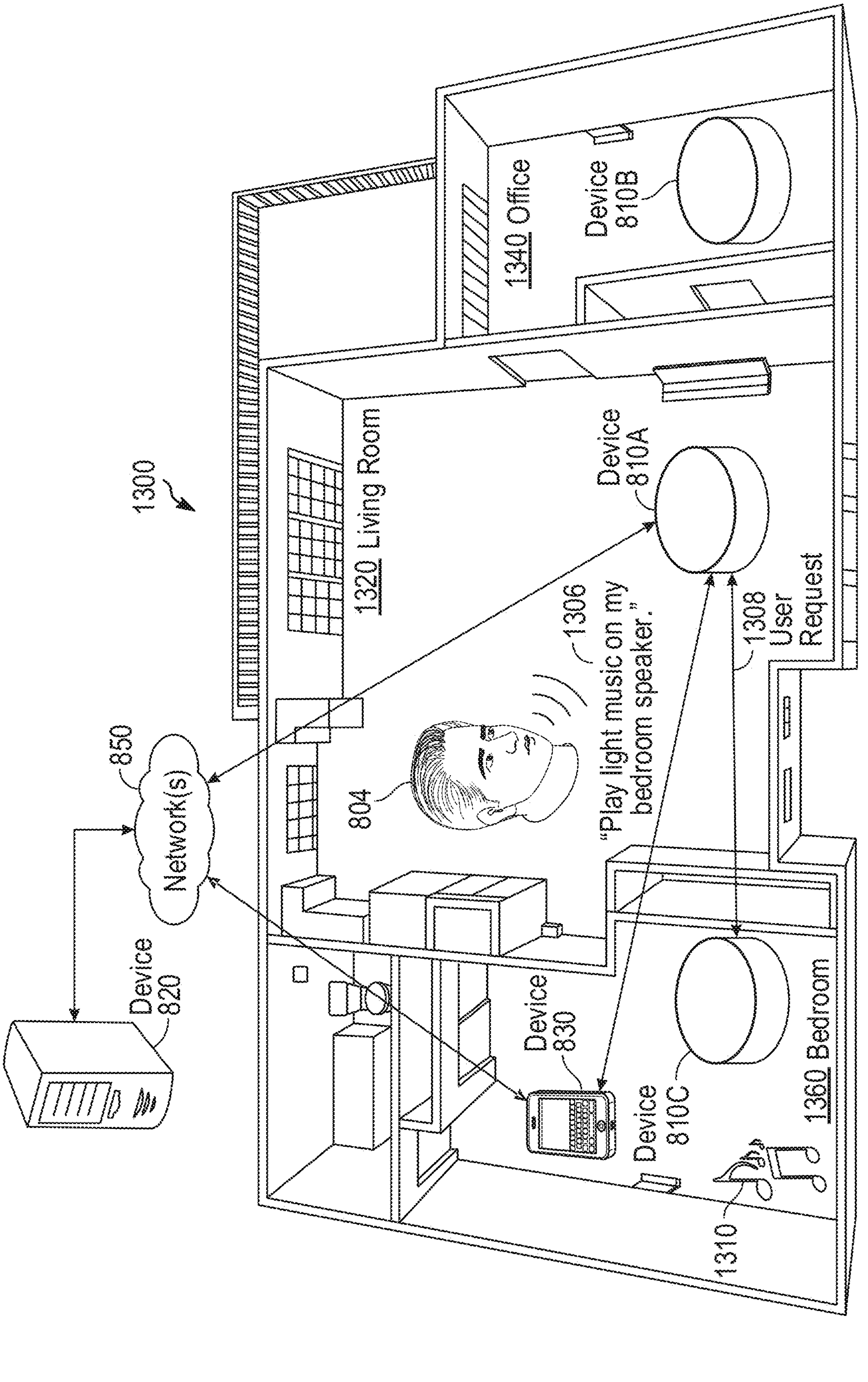
FIGS. 13A-13B illustrate functionalities of providing digital assistant services at a first electronic device or additional electronic devices, according to various examples.
Figure 13B:
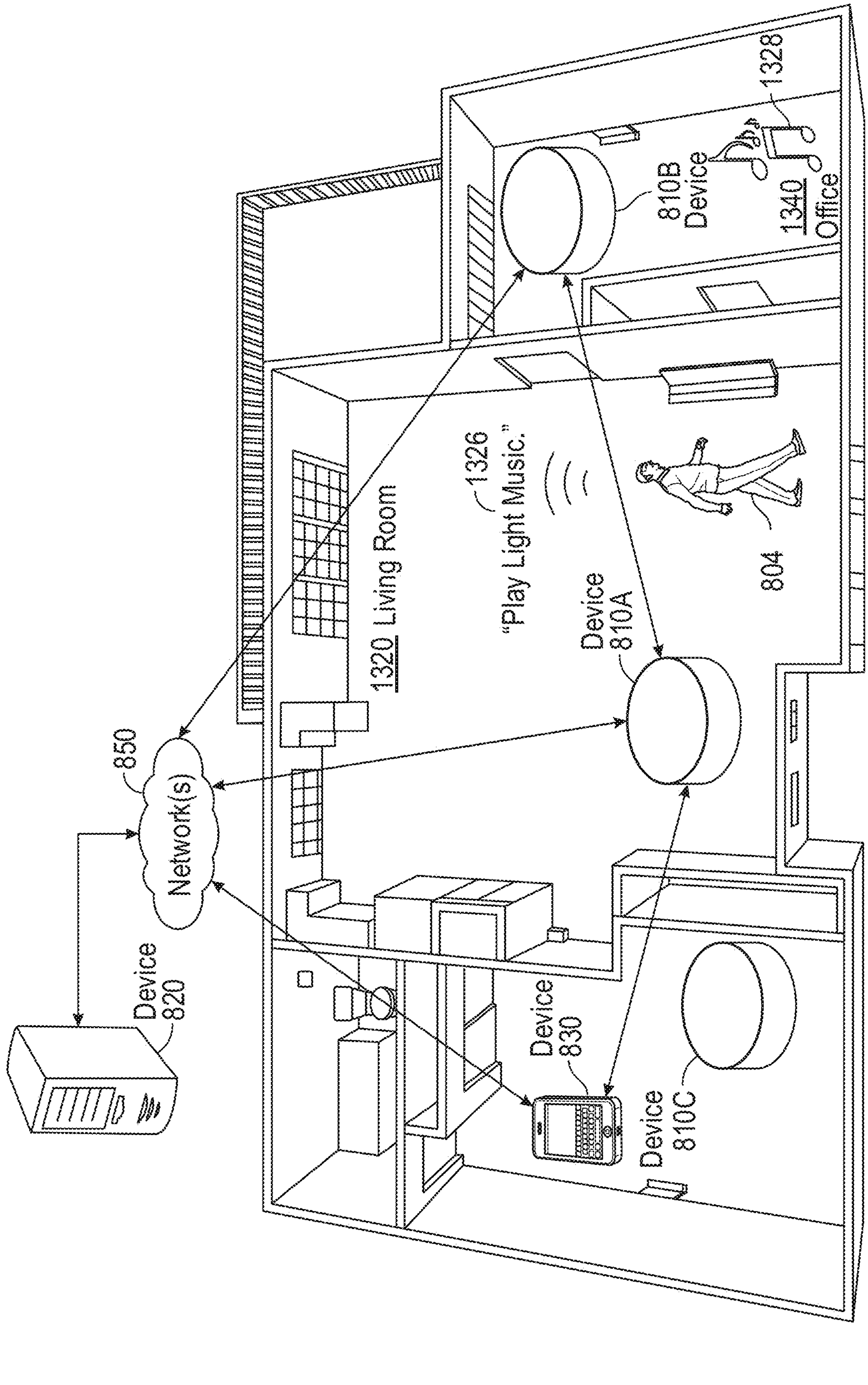

FIGS. 13A-13B illustrate functionalities of providing digital assistant services at a first electronic device or additional electronic devices, according to various examples. With reference to FIG. 13A, as described above, a plurality of devices 810A-C can be service-extension devices for extending digital assistant services from one device to another. For example, as shown in FIG. 13A, devices 810A-C can be disposed in the vicinity of device 830 (e.g., user 804's smartphone device) to extend digital assistant services provided by device 830. In some examples, disposing a plurality of devices 810A-C in the vicinity of device 830 may include disposing devices 810A-C within a predetermined boundary or distance of device 830. For example, devices 810A-C may be disposed in the same house or building as device 830. As shown in FIG. 13A, in some embodiments, devices 810A-C may be disposed in a manner for extending digital assistant services to different portions of an area 1300. As shown in FIG. 13A, area 1300 may include, for example, a living room 1320, an office 1340, and a bedroom 1360. In some examples, device 810A can be disposed in living room 1320, device 810B can be disposed in office 1340; and device 810C can be disposed in bedroom 1360. As described above, devices 810A-C can be communicatively coupled to each other and to other devices (e.g., devices 820 and 830).

As shown in FIG. 13A, user 804 may be located within living room 1302, in which device 810A is disposed. User 804 may want to go to bed with some light music, and thus provide a speech input 1306 such as "Play light music on my bedroom speaker" to device 810A. The digital assistant operating on device 810A receives speech input 1306 representing a user request. Similar to those described above, device 810A can provide a representation of the user request to at least one of device 830 (e.g., the user's smartphone disposed in the vicinity of device 810A) or device 820 (e.g., a remoted disposed server). At least one of device 820 or device 830 determines whether the respective device is capable of providing a response to the user request, and provides the response to device 810A. The digital assistant operating on device 810A can then provide a representation of the response to user 804 (e.g., an audio output).

In some embodiments, prior to provide a representation of the response to user 804, the digital assistant operating on device 810A can determine whether the representation of the response is to be provided by device 810A or another device. For example, speech input 1306 may include "Play light music on my bedroom speaker." Accordingly, the digital assistant operating on device 810A can determine that the user intent is not to play the music on device 810A, but rather on device 810C disposed within bedroom 1360. The determination can be made using, for example, natural language processing described above. In accordance with a determination that the representation of the response is not to be provided by device 810A, device 810A can forward the response to, or cause the response to be provided to, device 810C disposed in bedroom 1360. Device 810C can thus provide an audio output 1310 playing the light music user requested. In other examples, in accordance with a determination that the representation of the response is to be provided by device 810A, device 810A can itself provide the representation of response to the user 804. As described above, multiple devices 810A-C can be disposed in area 1400. In some examples, a digital assistant (the digital assistant operating on device 810A, 810B, 810C, device 830, etc.) can determine the location of each device 810A-C (e.g., based on an initial configuration). The details of the location determination, as an illustrative example, are described in co-pending U.S. Patent Application No. 62/507,202, entitled "WHOLE HOME AUDIO CONTROL INTERFACE," filed on May 16, 2017, the content of which is hereby incorporated by reference in its entirety, and included in the Appendix.

As described above, prior to provide a representation of the response to user 804, the digital assistant operating on device 810A can determine whether a representation of the response is to be provided by device 810A or another device. In some examples, such determination can be based on the user request represented by the user's speech input (e.g., "Play light music on my bedroom speaker"). In some examples, such determination can be based on at least one of detecting a location of the user or tracking the user's movement. With reference to FIG. 13B, user 804 may be located within living room 1302, in which device 810A is disposed. User 804 may want to go to office 1340 and having some light music, and thus provide a speech input 1326 such as "Play light music" to device 810A. Speech input 1326 does not indicate on which device 810A-C user would like the music to be played. The digital assistant operating on device 810A receives speech input 1326 representing a user request. Similar to those described above, device 810A can provide a representation of the user request to at least one of device 830 (e.g., the user's smartphone disposed in the vicinity of device 810A) or device 820 (e.g., a remoted disposed server). At least one of device 820 or device 830 determines whether the respective device is capable of providing a response to the user request, and provides the response to device 810A.

Prior to provide a representation of the response to user 804, device 810A can determine whether the representation of the response (e.g., an audio output) is to be provided by device 810A or another device. In some examples, device 810A can make such determination based on at least one of detecting of user 804's location or tracking user 804's movement. For example, device 810A may detect that user 804 is located in living room 1320 but is moving toward office 1340. Device 810A can detect location and/or movement using, for example, one or more sensors such as motion sensors, positioning systems, cameras, etc. In accordance with a determination that user 804 is moving toward office 1340, the digital assistant operating on device 810A can determine that the user intent is not to play the music on device 810A, but rather on device 810B disposed within office 1340, or that the music playback should be started on device 810A, but continued on device 810B disposed in office 1340 (and optionally discontinued on device 810A). In accordance with a determination that the representation of the response is not to be provided by device 810A, device 810A can forward the response, or cause the response to be provided, to device 810B disposed in office 1340. Device 810B can thus provide an audio output 1328 playing the light music user requested.

In other examples, in accordance with a determination that the representation of the response is to be provided by device 810A (e.g., user 804 is located in living room 1320 and not moving), device 810A can itself provide the representation of response to the user 804. It is appreciated that the digital assistant operating on device 810A can determine whether the response is to be provided device 810A or another device based on any context information, such as the user's preferences (e.g., user 804 prefers to listen to music before bedtime), past devices used for providing responses, device attributes and capabilities (e.g., device 810A may provide better sound than device 810B), etc.

Figure 14:
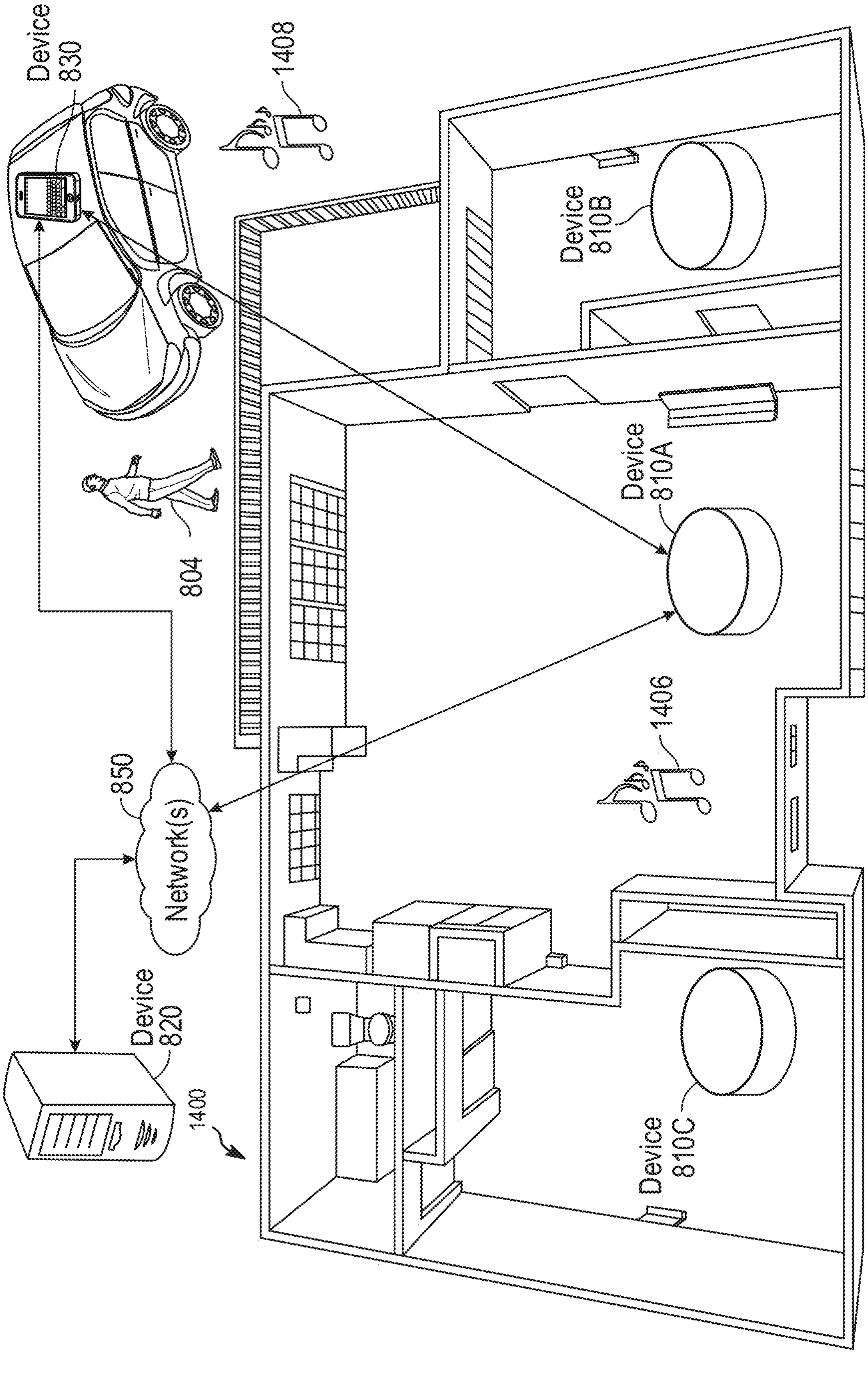
FIG. 14 illustrates functionalities of providing continuity of digital assistant services between different electronic devices, according to various examples.

FIG. 14 illustrates functionalities of providing continuity of digital assistant services between different electronic devices, according to various examples. As illustrated in FIG. 14, the digital assistant operating on device 810A may be providing a response 1406 to user 804 (e.g., playing music). While device 810A is in the process of providing response 1406, user 804 may move out of area 1400, in which device 810A is disposed. For example, user 804 may need to leave his or her house and go to work. In some embodiments, the digital assistant operating on device 810A can determine whether the response 1406 is to be continually provided a different electronic device. As an example, while device 810A is providing response 1406, user 804 may provide a speech input such as "Continue to play the music on my smartphone." Device 810A receives this speech input and can determine that the user intent is to continue to play the music on device 830 (e.g., the user's smartphone). Such determination can be made using natural language processing techniques described above. Based on the determined user intent, device 810A can determine that response 1406 should be to continue to provide the music at a different device.

In some embodiments, user 804 can also provide the speech input such as "Continue to play the music on my smartphone" to device 830, instead to device 810A. Based on the speech input and context information (e.g., device 810A is currently providing audio outputs), device 830 can determine the user intent is to continually perform a task that is being performed at device 810A. For example, device 830 can communicate with device 810A (and other devices communicatively coupled to device 830) to determine the status information of device 810A. The status information of device 810A may indicate that it is currently playing music. Accordingly, device 830 may determine that the user intent is to continually play the music that is being currently played on device 810A. Based on the determination, device 830 can communicate with device 810A for continually performing the task that is being currently performing by device 810A. For example, device 830 can obtain the content and/or metadata (e.g., time stamps associated with the currently playing music), continually play the music by device 830, and cause device 810A to stop playing.

As another example illustrated in FIG. 14, while the digital assistant operating on device 810A is providing response 1406, device 810A can perform at least one of detecting a location of the user or tracking the user's movement. Device 810A can detect location and/or movement using, for example, one or more sensors such as motion sensors, positioning systems, cameras, etc. As an example, device 810A can continuously or periodically track the user 804's current location and/or movement. In some examples, device 810A can detect whether the user 804's location variation with respect to device 810A satisfies a predetermined condition. For example, device 810A can detect the user 804 has moved out of a predetermined boundary of area 1400 (e.g., a house). As a result, device 810A can determine that response 1406 should be continually provided at a different device.

As another example, while device 810A is in the process of providing response 1406, it can detect the movement of a device associated with user 804 (e.g., device 830 such as the user's smartphone). For example, device 810A can determine that the communication signal strength of device 830 reduced over a short duration of time, indicating that device 830 likely moves out of the boundary of area 1400. As a result, device 810A can determine that response 1406 should be continually provided at a different device (e.g., device 830).

In some embodiments, in accordance with a determination that response 1406 is to be continually provided at a different electronic device, device 810A can cause response 1406 to be continually provided by one or more different electronic devices. For example, device 810A can transmit the remaining content (e.g., the rest of the response 1406) for providing response 1406 and/or metadata associated with providing the response 1406 (e.g., the timestamp of the current playing media that was streamed from device 820 or device 830) to device 830 (e.g., the user's smartphone). In some examples, device 810A can also send a notification to another device (e.g., device 820), from which the content of response 1406 is obtained. The notification may indicate or request that the response 1406 is to be continually provided at another device and thus the content of response 1406 should be provided to that device. Based on the received remaining content and/or metadata, device 830 can continue to provide response 1406 to user 804. More details of continually providing digital assistant services on a different device are described in co-pending U.S. patent application Ser. No. 15/271,766, entitled "INTELLIGENT DIGITAL ASSISTANT IN A MULTI-TASKING ENVIRONMENT," filed Sep. 21, 2016, the content of which is hereby incorporated by reference in its entirety, and included in the Appendix.

In the above description in connection with FIGS. 8A-8B, 9A-9C, 10A-10C, 11A-11D, 12A-12C, 13A-13B, and 14, device 820 can be a remote device such as a server. In some embodiments, a device can be disposed in the vicinity of devices 810A-C, operating as a proxy device for device 820. As one example and with reference back to FIG. 8A, device 840 (e.g., a TV set-top box) can operate as a proxy device for device 820 (e.g., a remote server). A proxy device can operate as an intermediary for requests from client devices (e.g., device 810A) seeking resources from other device (e.g., servers). As a proxy, device 840 can operate to process requests from a plurality of home automation devices (e.g., a smart thermostat, a smart door, a smart light switch, etc.). For example, based on user's speech inputs (e.g., speech input received via device 810A), a smart thermostat may be required to perform a task of adjusting temperature and/or humidity levels. The smart thermostat may thus communicate with device 840 to request current temperature and humidity data from various sensors. Device 840 can thus operate as a proxy to relay the request to appropriate devices and/or sensors and provide the data to the smart thermostat.

5. Exemplary Functions of a Digital Assistant Providing Digital Assistant Services Based on Notifications of Events.

FIGS. 2A-2B, 4, 6A-6B, and 15A-15G illustrate functionalities of providing digital assistant services by a digital assistant operating on an electronic device. In some examples, the digital assistant (e.g., digital assistant system 700) is implemented by a user device according to various examples. In some examples, the user device, a server (e.g., server 108, device 820), or a combination thereof, may implement a digital assistant system (e.g., digital assistant system 700). The user device can be implemented using, for example, device 200, 400, 600, 810A-C, 820, and/or 830. In some examples, the user device is a device having audio outputting capabilities and network connectivity, a smartphone, a laptop computer, a desktop computer, or a tablet computer.

Figure 15A:
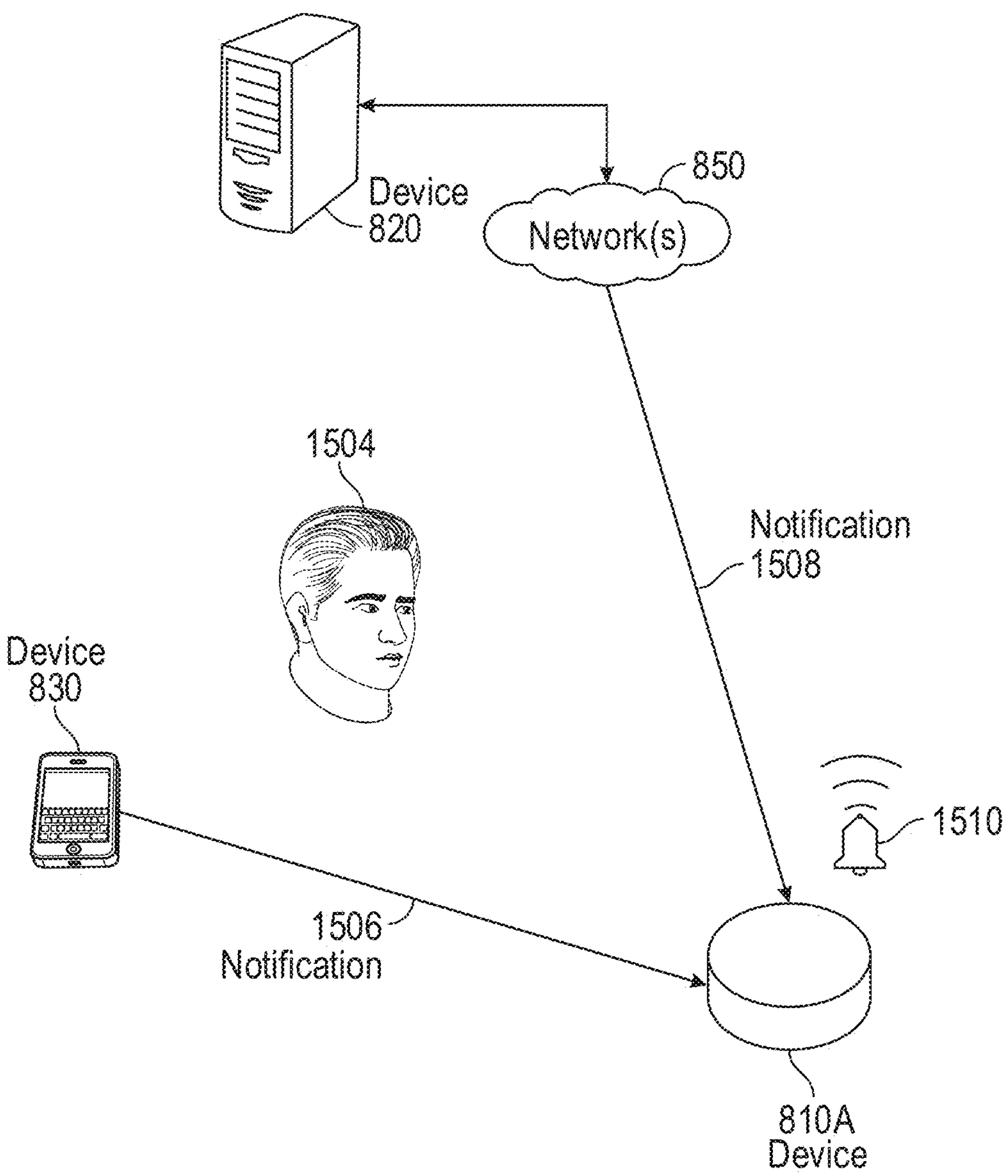
FIGS. 15A-15G illustrate functionalities of providing digital assistant services based on a notification of an event, according to various examples.

FIGS. 15A-15G illustrate functionalities of providing digital assistant services based on notifications of events, according to various examples. As illustrated in FIG. 15A, device 810A can receive a notification 1506 and/or 1508 of one or more events associated with user 1504. As described above, device 810A (and similarly other devices 810B-C) can include one or more audio input and output devices (e.g., a microphone and one or more speakers), one or more network communication interfaces, and optionally one or more indicators (e.g., lights) for providing device operational indications. In some examples, as shown in FIG. 15A, device 810A may receive notification 1506 from device 830 (e.g., the user's smartphone) and/or notification 1508 from device 820 (e.g., a remote server).

In some examples, a notification of an event can include a representation of at least one of an incoming call, a reminder, a message, a voicemail, a news alert, or the like. For example, a digital assistant operating on device 830 may receive a calendar reminder from a calendar application, and may forward a representation of the calendar reminder to device 810A. As shown in FIG. 15A, in response to receiving the notification 1506 and/or 1508, the digital assistant operating on device 810A can output one or more indications 1510 of notification 1506 and/or 1508. In some examples, an indication 1510 can be an audio indication (e.g., a beep, a tone, etc.), a visual indication (e.g., flashing lights, displayed messages, etc.), or a combination of audio and visual indications. While FIG. 15A illustrates that indication 1510 is provided by device 810A, indication 1510 can also be provided by other devices, such as device 830 and/or devices 810B-C (not shown in FIG. 15A). As described, device 830 can be, for example, the user's smartphone, smart watch, tablet, etc.; and devices 810B-C can be similar type of devices as device 810A and are disposed in the vicinity of device 810A (e.g., in the same house). Thus, an indication of a notification can be provided to user 1504 by any device at any location. Providing indications by multiple devices disposed at various locations can improve the likelihood of capturing user 1504's attention regarding the notifications. In some examples, a notification is only provided by one device (e.g., device 810A) in order to minimize the disturbance to user 1504.

Figure 15B:
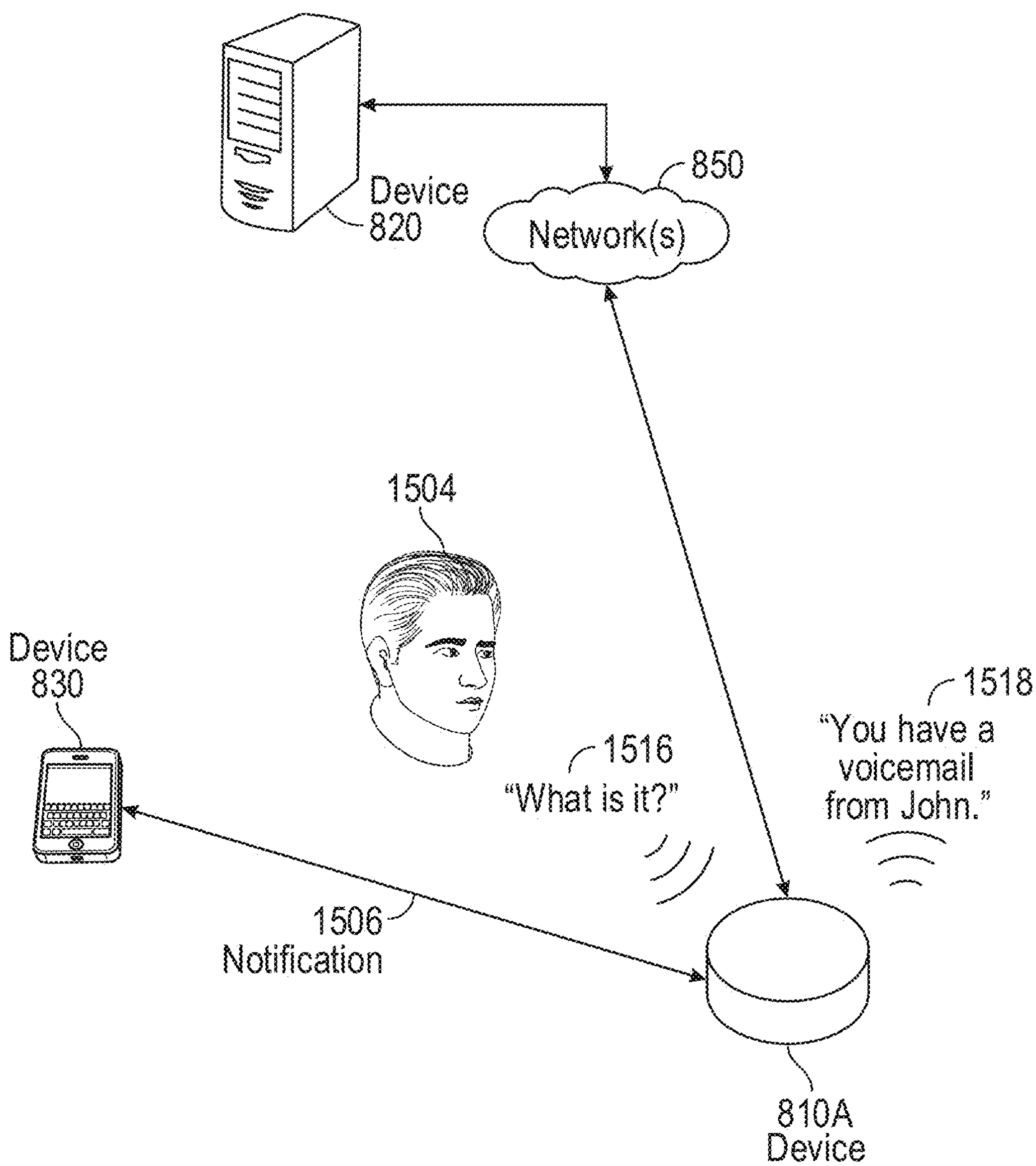

As illustrated in FIG. 15B and continuing the above example, user 1504 receives indication 1510 and may provide a speech input 1516 inquiring about indication 1510. For example, speech input 1516 can include "What is it?" In some examples, the digital assistant operating on device 810A receives speech input 1516 and can output a response 1518 in accordance with the notification of the event. For example, as shown in FIG. 15B, if the notification of the event includes a representation of a voice message from John, the digital assistant operating on device 810A can output a response 1518 such as "You have a voicemail from John." If the notification of the event includes a representation of a calendar reminder, the digital assistant operating on device 810A can output a response 1518 such as "You have an upcoming event on your calendar." If the notification of the event includes a representation of an incoming call from John, the digital assistant operating on device 810A can output a response 1518 such as "You have an incoming call from John."

Figure 15C:
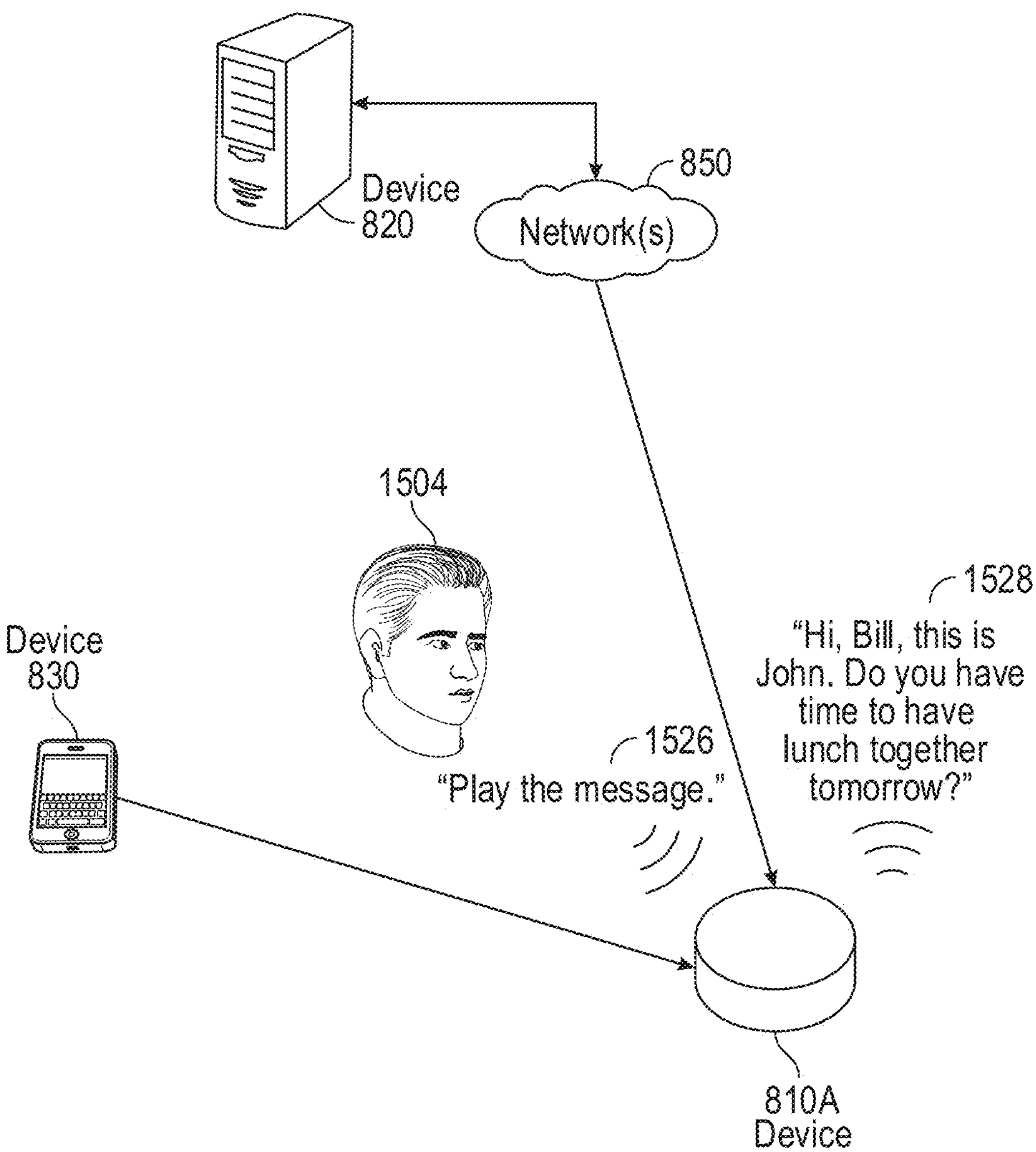

As illustrated in FIG. 15C and continuing the above example, after outputting response 1518 in accordance with the notification of the event, the digital assistant operating on device 810A can continue to monitor user inputs by, for example, listening for user utterances during or after response 1518. For example, the digital assistant operating on device 810A may receive a subsequent speech input 1526. Speech input 1526 may include, for example, "Play the message," "What is the event?", or "Take the call from John."

In some examples, as shown in FIG. 15C, the digital assistant operating on device 810A receives speech input 1526 and can determine the user intent based on speech input 1526. For example, the digital assistant operating on device 810A can determine that the user intent is to play the voicemail from John, listen to the upcoming calendar event, or take the call from John. Accordingly, the digital assistant operating on device 810A can provide the notification to user 1504 in accordance with the determined user intent. For example, the digital assistant operating on device 810A can provide an audio output 1528 corresponding to the voicemail from John (e.g., "Hi, Bill, this is John. Do you have time to have lunch together tomorrow?").

Figure 15D:
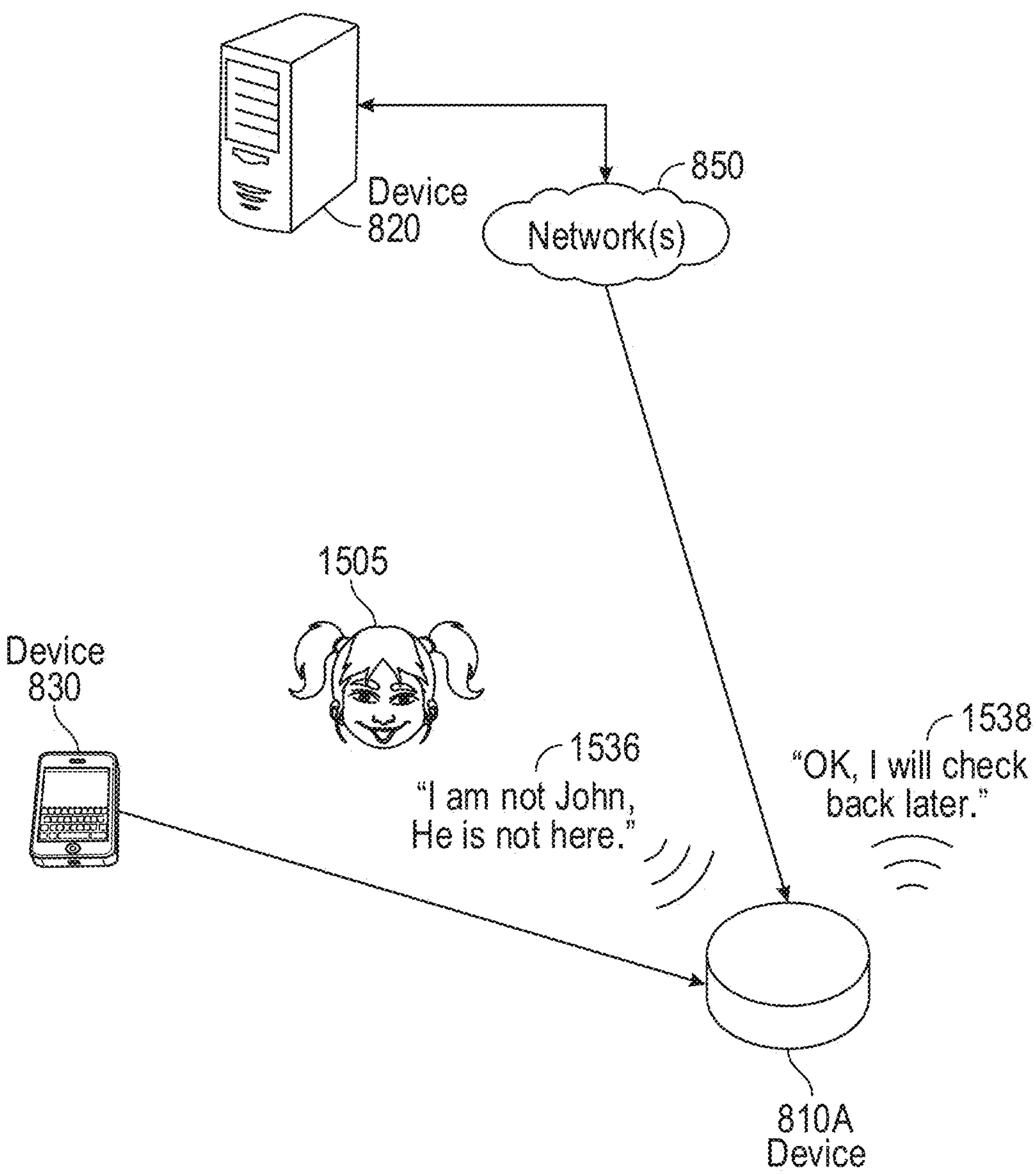

In some embodiments, the digital assistant operating on device 810A can determine whether the notification is to be provided at device 810A in according with one or more speech inputs. As described above, in some examples, device 810A can be shared among multiple users. Therefore, a notification of an event that device 810A receives may or may be for a particular user (e.g., user 1504). As illustrated in FIG. 15D and continuing the above example where device 810A outputs a response in accordance with the notification of the event (e.g., "Bill, you have a voicemail from John"), device 810A may receive a subsequent speech input 1536 from user 1505, which is a user that is different from the intended user for providing the notification of the event. Speech input 1536 may include, for example, "I am not Bill. He is not here."

In some examples, the digital assistant operating on device 810A can obtain an identity of the user who provides one or more speech inputs and determine whether the notification is to be provided to the user who provides the one or more speech inputs. As shown in FIG. 15D, for example, based on speech input 1536 (e.g., "I am not Bill. He is not here"), the digital assistant operating on device 810A can determine that user 1505 is not the user to which the notification is intended to be provided (e.g., "not Bill"). Accordingly, the digital assistant operating on device 810A can determine that the notification should not be provided to user 1505.

Figure 15E:
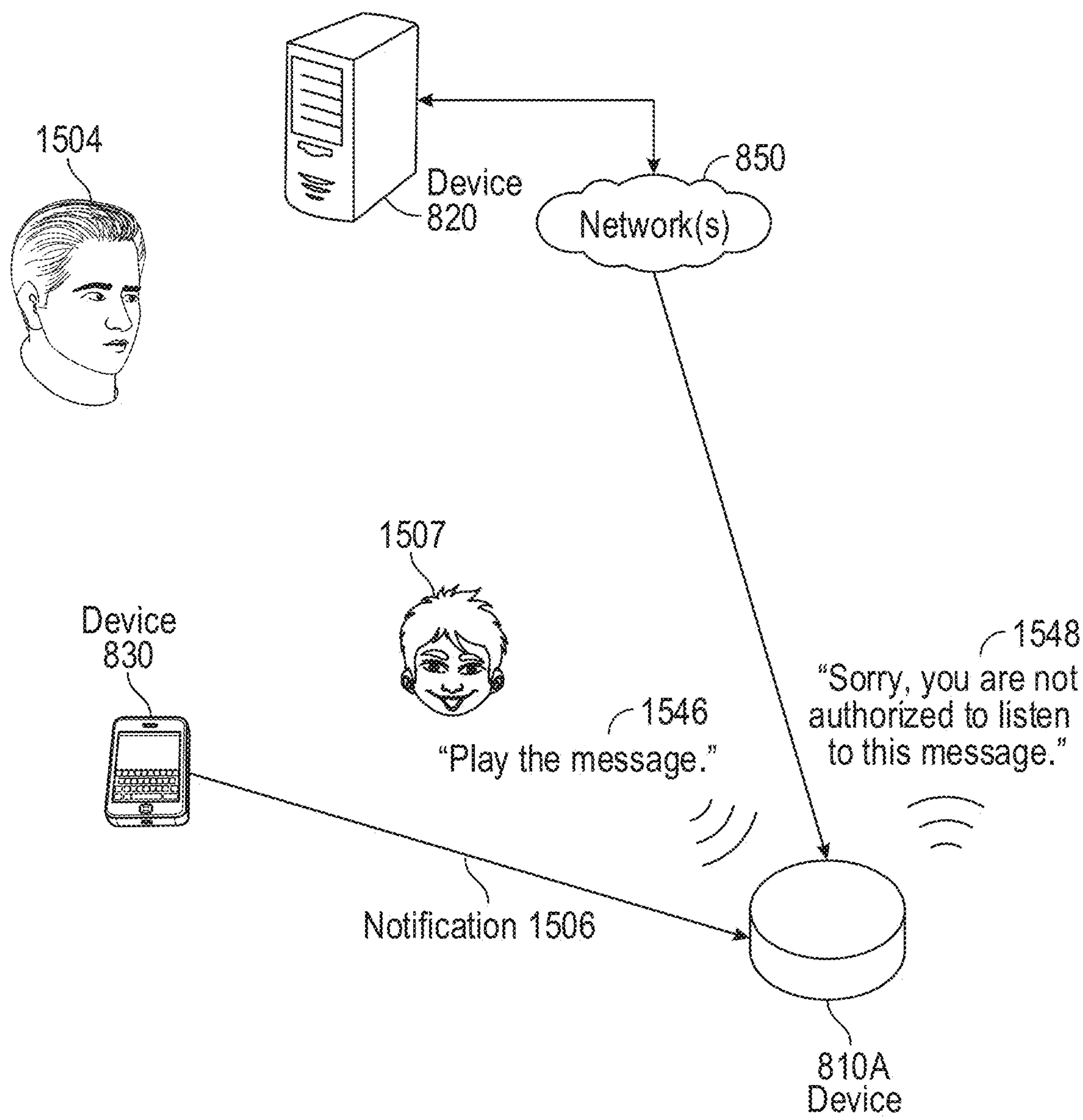

In some examples, to obtain the identity of the user who provides one or more speech inputs, the digital assistant operating on device 810A can obtain authentication data associated with the user. As illustrated in FIG. 15E and continuing the above example where device 810A outputs a response in accordance with the notification of the event (e.g., "Bill, you have a voicemail from John"), the digital assistant operating on device 810A may receive a subsequent speech input 1546 from user 1507, which is a user that is different from the intended user for providing the notification of the event. User 1507 may be, for example, a guest in user 1504's (e.g., Bill) house. User 1507 may decide to listen to Bill's message and thus speech input 1546 may include, for example, "Play the message." In some examples, the digital assistant operating on device 810A can obtain authentication data associated with user 1507. Similar to those described above, the authentication data can include user 1507's voice biometrics, user 1507's facial recognition data, sensing of another device that identifies the user 1507 (e.g., the user's smart watch), and other credentials of the user 1507 (e.g. fingerprints, passwords, etc.). Based on the authentication data, the digital assistant operating on device 810A can obtain a determination of the identity of user 1507. For example, the digital assistant operating on device 810A can authenticate user 1507 based on the authentication data. As another example, the digital assistant operating on device 810A can provide the authentication data to at least one of device 830 (e.g., Bill's smartphone) or device 820 (e.g., a server) for authentication. Device 830 and/or device 820 receive the authentication data and can perform authentication to obtain identity of user 1507 (e.g., matching voice biometrics, fingerprints, passwords, etc.). The digital assistant operating on device 810A can thus receive user 1507's identity from at least one of device 830 or device 820.

In some examples, the digital assistant operating on device 810A can determine, based on the identity of the user and based on the received notification, whether the notification should be provided to the user who provides at least one of the one or more speech inputs. For example, as shown in FIG. 15E, based on the identity of user 1507 (e.g., a guest in user 1504's house) and notification 1506 (e.g., a representation of a voicemail for Bill), the digital assistant operating on device 810A may determine that notification 1506 should not be provided to user 1507 because the identity of user 1507 does not match with the user for which the notification is intended (e.g., user 1507 is not Bill or authorized. Accordingly, the digital assistant operating on device 810A can provide an audio output 1548 informing user 1507 that he or she is not authorized to receive the notification (e.g., "Sorry, you are not authorized to listen to this message"). On the other hand, the digital assistant operating on device 810A may determine that notification 1506 should be provided to user 1507 because the identity of user 1507 matches with the user for which the notification is intended (e.g., user 1507 is Bill) or authorized. For example, user 1507 may be user 1504's family member and is authorized to receive notifications for user 1504. Accordingly, device 810A can provide an audio output including the content of the notification 1506.

Figure 15F:
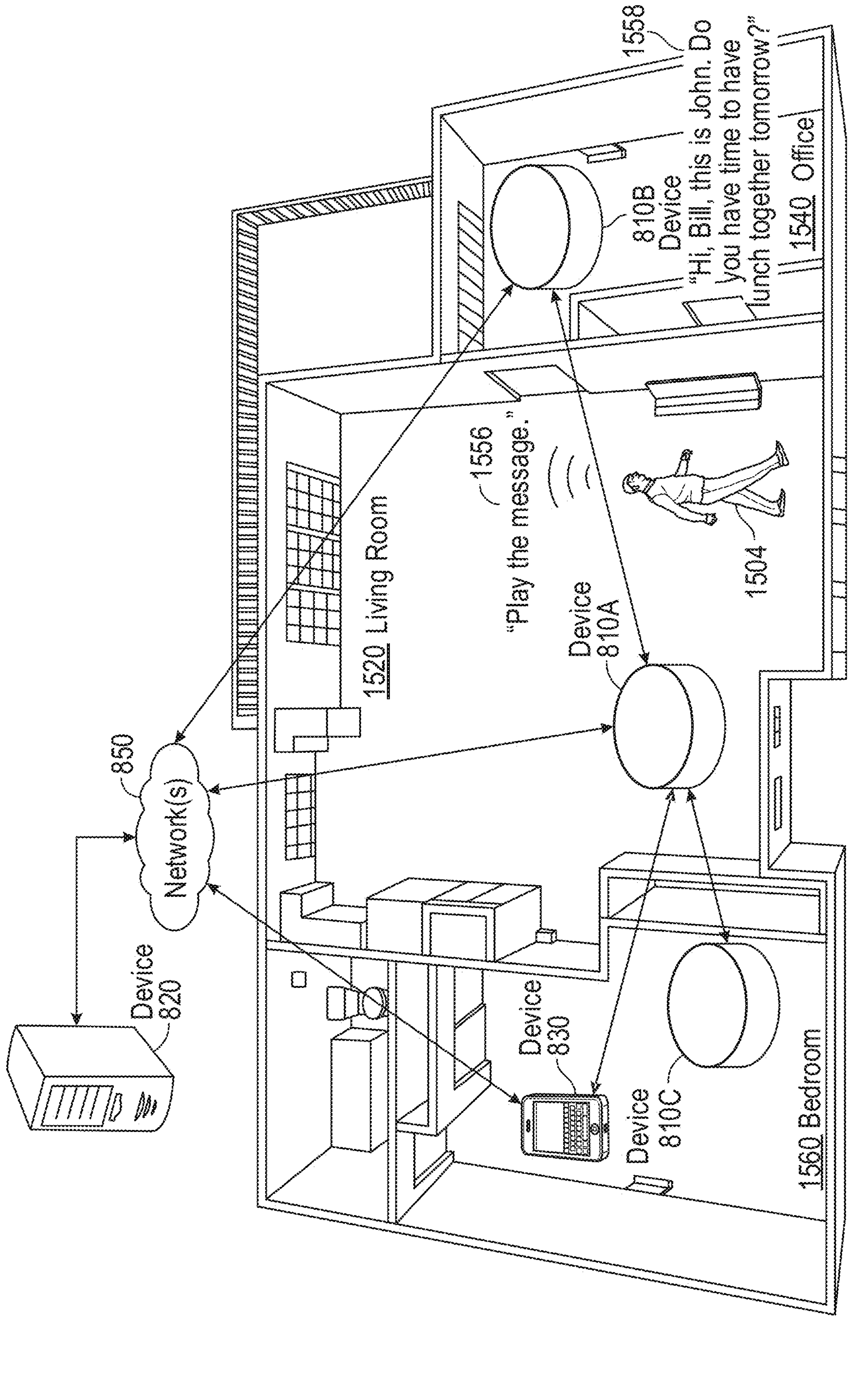

In some examples, in accordance with a determination that the notification is to be provided to the user who provides at least one of the one or more speech inputs, the digital assistant operating on device 810A can further determine whether the notification is to be provided at device 810A. As illustrated in FIG. 15F, based on a speech input 1556 (e.g., "Play the message"), device 810A can obtain the identity of user 1504 and determine that user 1504 is authorized to receive the notification. Thus, the digital assistant operation on device 810A can determine that the notification should be provided to user 1504. In some examples, the digital assistant operation on device 810A can further determine whether the notification is to be provided at device 810A. As shown in FIG. 15A, one or more devices may be disposed in the vicinity of user 1504. For example, device 810A may be disposed in living room 1520; device 810B may be disposed in office 1540; and device 810C may be disposed in bedroom 1560. In some examples, device 810A may or may not be the optimum device for providing notifications to user 1504. For example, user 1504 may be moving away from device 810A (e.g., moving toward office 1540). As another example, there may be other users (e.g., guests) near device 810A disposed in living room 1520, and thus user 1504 may not want to receive notifications from device 810A for privacy concerns.

Similar to those described above, in some examples, a determination of whether the notification is to be provided at device 810A can be based on the user request represented by the user's speech input (e.g., "Play the message on my office speaker"). In some examples, such determination can be based on at least one of detecting a location of the user or tracking the user's movement. For example, user 1504 may want to go to office 1540 to receive the notification (e.g., listen to a voicemail, pick up a phone call, etc.). The digital assistant operating on device 810A may detect that user 804 is located in living room 1520 but is moving toward office 1540. The digital assistant operating on device 810A can detect location and/or movement using, for example, one or more sensors such as motion sensors, positioning systems, cameras, signal strength measurements to the various devices, etc. Based on the detection of user movement, the digital assistant operating on device 810A can determine that the notification should be provided by device 810B disposed in office 1540, instead of device 810A disposed in living room 1520. In other examples, the digital assistant operating on device 810A may detect that user 804 is not moving and remains in living room 1520. Accordingly, device 810A can determine that the notification should be provided by device 810A disposed in living room 1520.

Figure 15G:
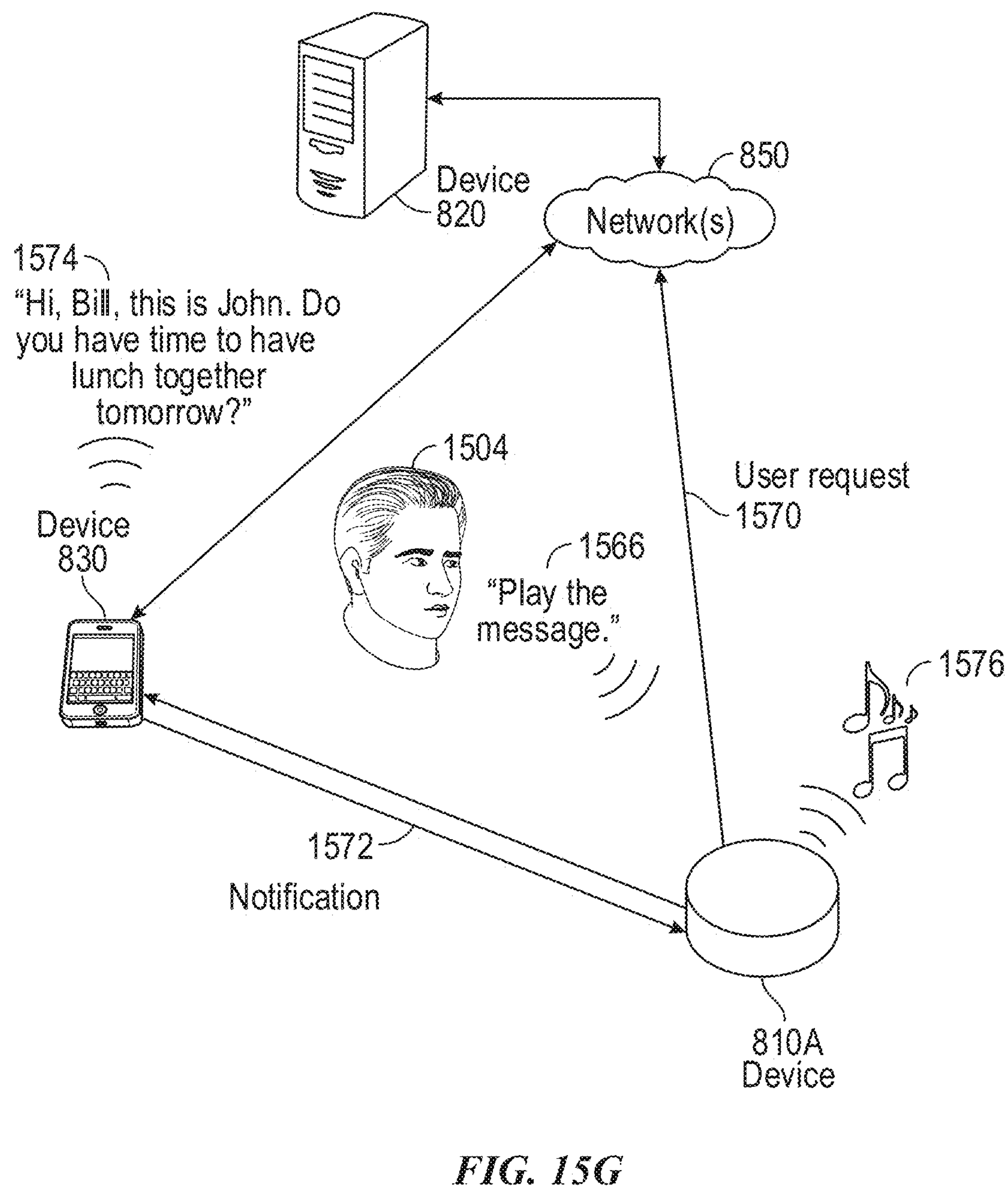

FIG. 15G illustrates another example in which device 810A may determine that the notification should be provided by another device. As shown in FIG. 15G, while receiving notification 1572 (e.g., a representation of a voicemail from John), device 810A may be providing audio outputs 1576 (e.g., playing a media item). Thus, the digital assistant operating on device 810A may determine that notification 1572 should not be provided at device 810A to avoid interruption of providing audio output 1576. Accordingly, the digital assistant operating on device 810A can determine an additional device for providing notification 1572. In some examples, such determination is based on context information. For instance, based on information that device 810A is currently providing audio output 1576 and based on detection of device 830, device 810A can determine that the notification 1572 can be provided at device 830. In some examples, device 810A can provide an output (e.g., audio and/or visual output) confirming with user 1504 that notification 1572 should be provided at another device. It is appreciated that the digital assistant operating on device 810A can determine whether the notification is to be provided at device 810A or at another device based on any context information, such as the user's preferences (e.g., user 1504 prefers to listen voicemail from a colleague on device 810B in office 1540), past devices used for providing notifications, device attributes and capabilities (e.g., device 810B may provide better sound than device 810A), etc.

In some embodiments, in accordance with a determination that a notification is to be provided at device 810A, the digital assistant operating on device 810A can provide the notification at device 810A. For example, as illustrated in the above examples, digital assistant operating on device 810A can provide audio outputs including the notification (e.g., output voicemails, phone calls, calendar reminders, etc.). In accordance with a determination that a notification is to be provided at a device different from device 810A, the digital assistant operating on device 810A can cause the notification to be provided at the another device. For example, the digital assistant operating on device 810A can forward the notification to device 830, or send a request to device 830 for providing the notification at device 830. Based on the notification or request, device 830 can provide audio outputs 1574 including the content of the notification (e.g., output voicemails, phone calls, calendar reminders, etc.).

6. Process for Providing Digital Assistant Services Based on User Inputs.

FIGS. 16A-16I illustrates process 1600 for operating a digital assistant for providing digital assistant services based on user inputs, according to various examples. Process 1600 is performed, for example, using one or more electronic devices implementing a digital assistant. In some examples, process 1600 is performed using a client-server system (e.g., system 100), and the blocks of process 1600 are divided up in any manner between the server (e.g., DA server 106) and a client device. In other examples, the blocks of process 1600 are divided up between the server and multiple client devices (e.g., a mobile phone and a smart watch). Thus, while portions of process 1600 are described herein as being performed by particular devices of a client-server system, it will be appreciated that process 1600 is not so limited. In other examples, process 1600 is performed using only a client device (e.g., user device 104, electronic device 810A, device 830, or device 840) or only multiple client devices. In process 1600, some blocks are, optionally, combined, the order of some blocks is, optionally, changed, and some blocks are, optionally, omitted. In some examples, additional steps may be performed in combination with the process 1600.

Figure 16A:
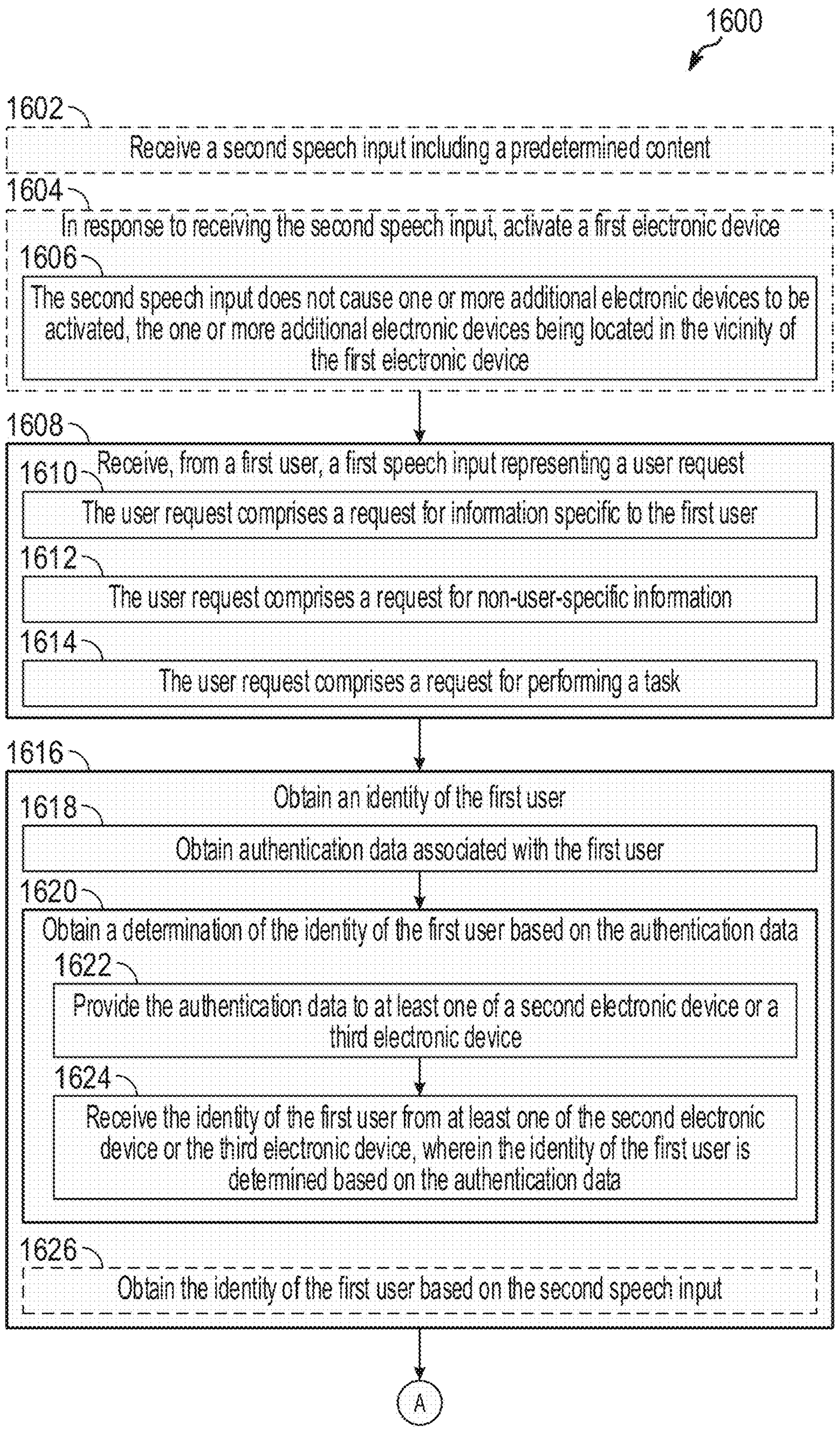
FIGS. 16A-16I illustrate a process for providing a digital assistant service at a first electronic device based on a user input, according to various examples.

With reference to FIG. 16A, at block 1602, a second speech input including a predetermined content (e.g., "Wake up, speaker" or "Hey, Speaker") is received. At block 1604, in response to receiving the second speech input, a first electronic device is activated. The first electronic device can be a service-extension device (e.g., device 810A as shown in FIGS. 8A-15G). At block 1606, in some examples, the second speech input does not cause one or more additional electronic devices to be activated. The one or more additional electronic devices may be disposed in the vicinity of the first electronic device. For example, the volume or sound pressure associated with the speech input can be detected and recorded by both of the first electronic device and an additional electronic device. Based on the comparison of the sound pressure detected at the two devices, the user's position relative to the two devices can be determined. For example, it may be determined that the user is physically closer to the first electronic device than to other device. As a result, the first electronic device may be activated while the other device may not be activated.

At block 1608, a first speech input representing a user request is received from a first user. At block 1610, the user request comprises a request for information specific to the first user (e.g., the first user's calendar, contacts, etc.). At block 1612, the user request comprises a request for non-user-specific information (e.g., weather information, stock prices, sports game information, etc.) At block 1614, the user request comprises a request for performing a task (e.g., play music, establish a conference, etc.).

At block 1616, an identity of the first user is the obtained. At block 1618, authentication data associated with the first user is obtained. The authentication data may include, for example, user's voice biometrics, user's facial recognition data, sensing of another electronic device that identifies the user, other credentials of the user, such as the user's fingerprints, passwords, or the like. At block 1620, a determination of the identity of the first user is obtained based on the authentication data. At block 1622, to obtain the identity of the first user, the authentication data are provided to at least one of a second electronic device (e.g., a remote server) or the third electronic device (e.g., user's smartphone). At block 1624, the identity of the first user is received from at least one of the second electronic device or the third electronic device. The identity of the first user is determined based on the authentication data. At block 1626, the identity of the first user is obtained based on the second speech input (e.g., "Wake up, speaker" or "Hey, speaker"). As described above, the second speech input may be associated with the user's voice biometrics and can be used for determination of the user's identity.

Figure 16B:
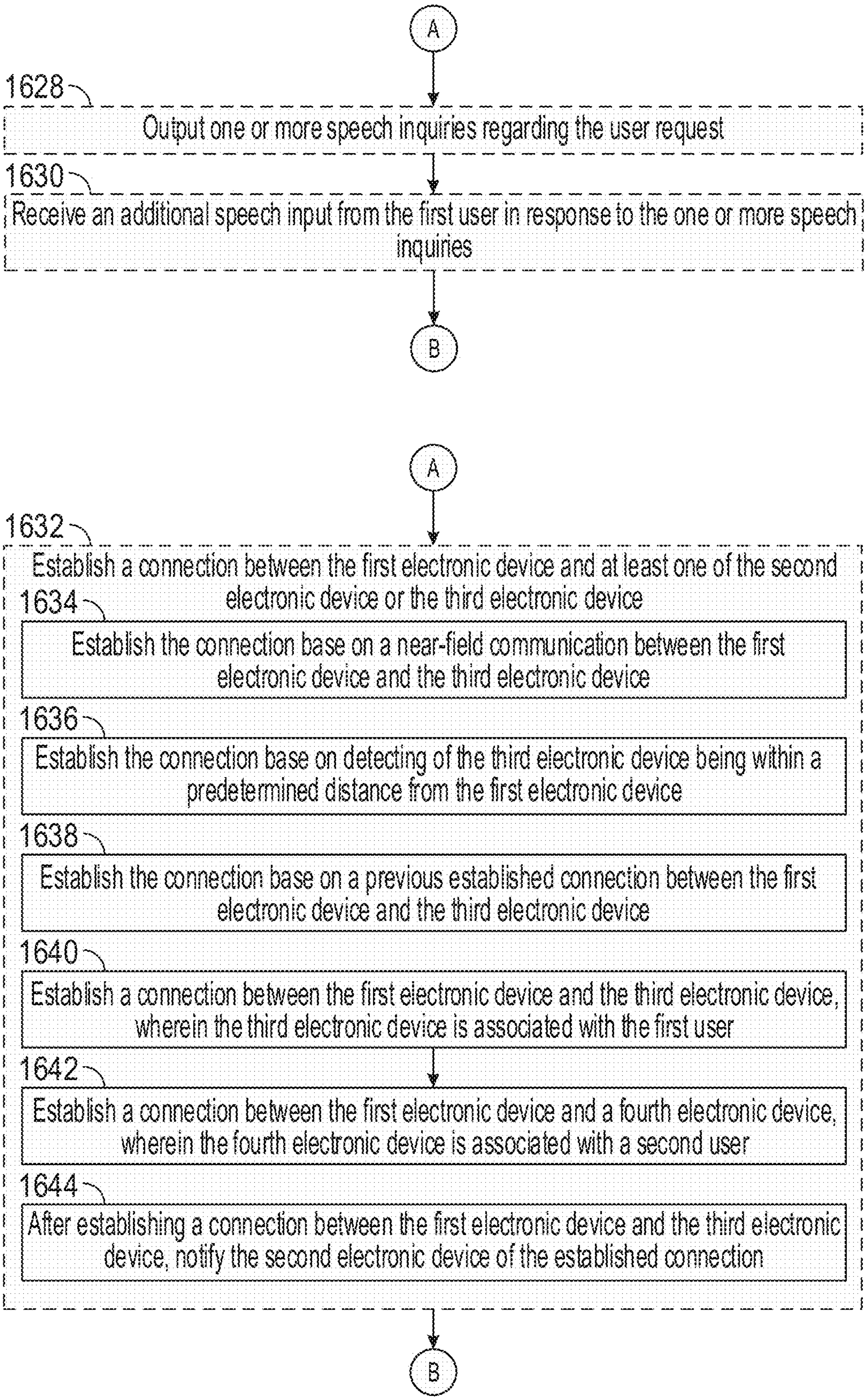

With reference to FIG. 16B, at block 1628, one or more speech inquiries regarding the user request represented by the first speech input is outputted. The speech inquiries may be used to clarify the first speech input with the first user (e.g., "What's that?" or "I did not quite get that"). At block 1630, an additional speech input is received from the first user in response to the one or more speech inquiries. For example, the first user may repeat or rephrase the first speech input).

At block 1632, a connection is established between the first electronic device (e.g., a server-extension device) and at least one of the second electronic device (e.g., a remote server) or the third electronic device (e.g., a device disposed in the vicinity of the first electronic device). At block 1634, establishing a connection is based on a near-field communication between the first electronic device and the third electronic device. At block 1636, establishing a connection is based on detecting of the third electronic device being within a predetermined distance from the first electronic device. At block 1638, establishing a connection is based on a previous established connection between the first electronic device and the third electronic device. For example, the connected can be established based a log file indicating that the first electronic device and the third electronic device have been connected in the past before. The log file may also indicate connection parameters used in the previous connection.

As described above, a server-extension device can be shared by multiple users and thus connect to multiple devices associated with one or more users. At block 1640, a connection is established between the first electronic device (e.g., a service-extension device) and the third electronic device (e.g., a client device of the first user). The third electronic device is associated with the first user. At block 1642, a connection is established between the first electronic device and a fourth electronic device (e.g., a tablet device of the second user). The fourth electronic device is associated with a second user. At block 1644, in some examples, after establishing a connection between the first electronic device and the third electronic device, the second electronic device is notified of the established connection. For example, after a connection is established between a server-extension device (e.g., device 810A shown in FIGS. 8A-8B) and a smartphone device, a server can be notified of the established connection.

Figure 16C:
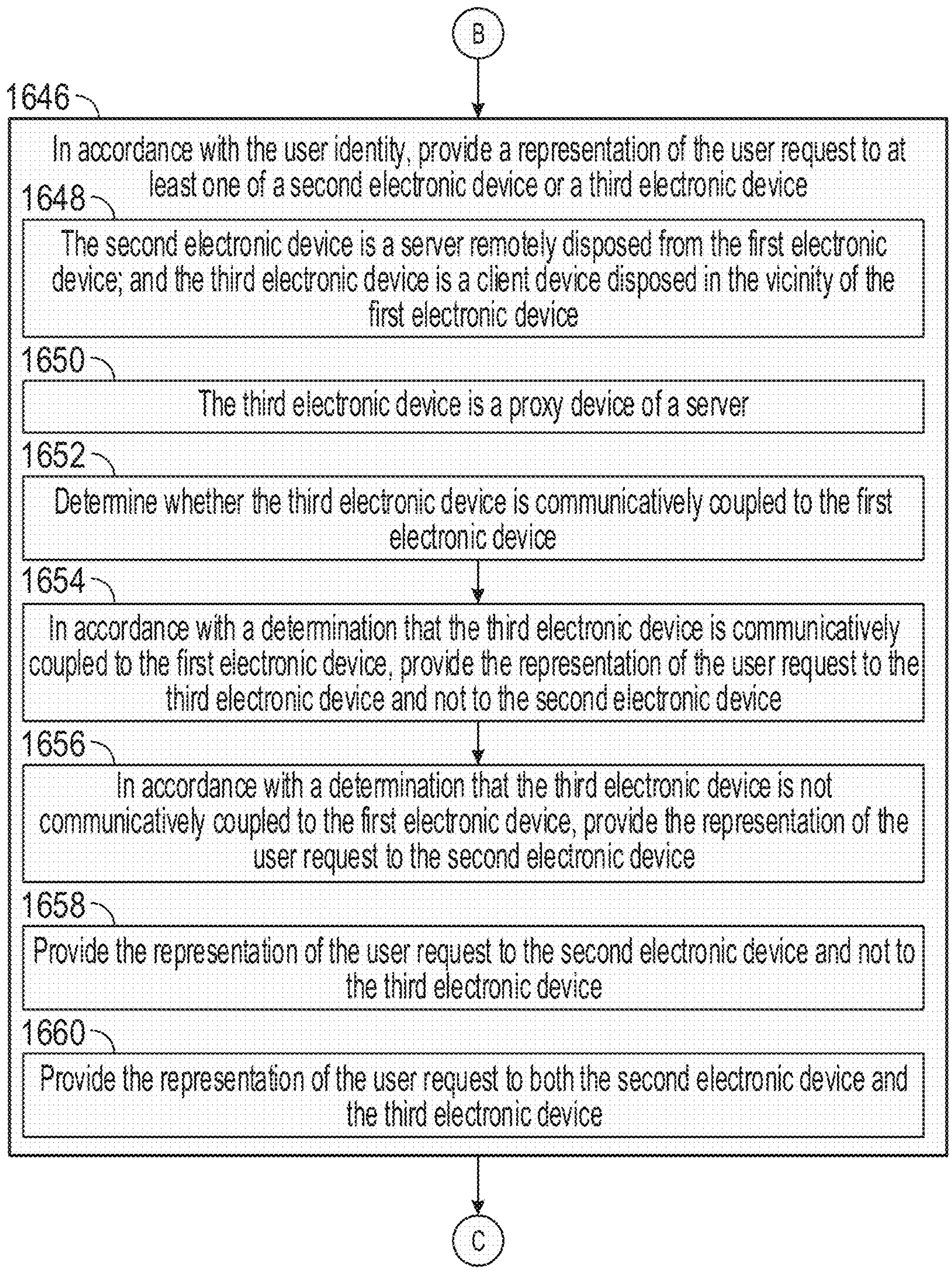
Figure 16D:
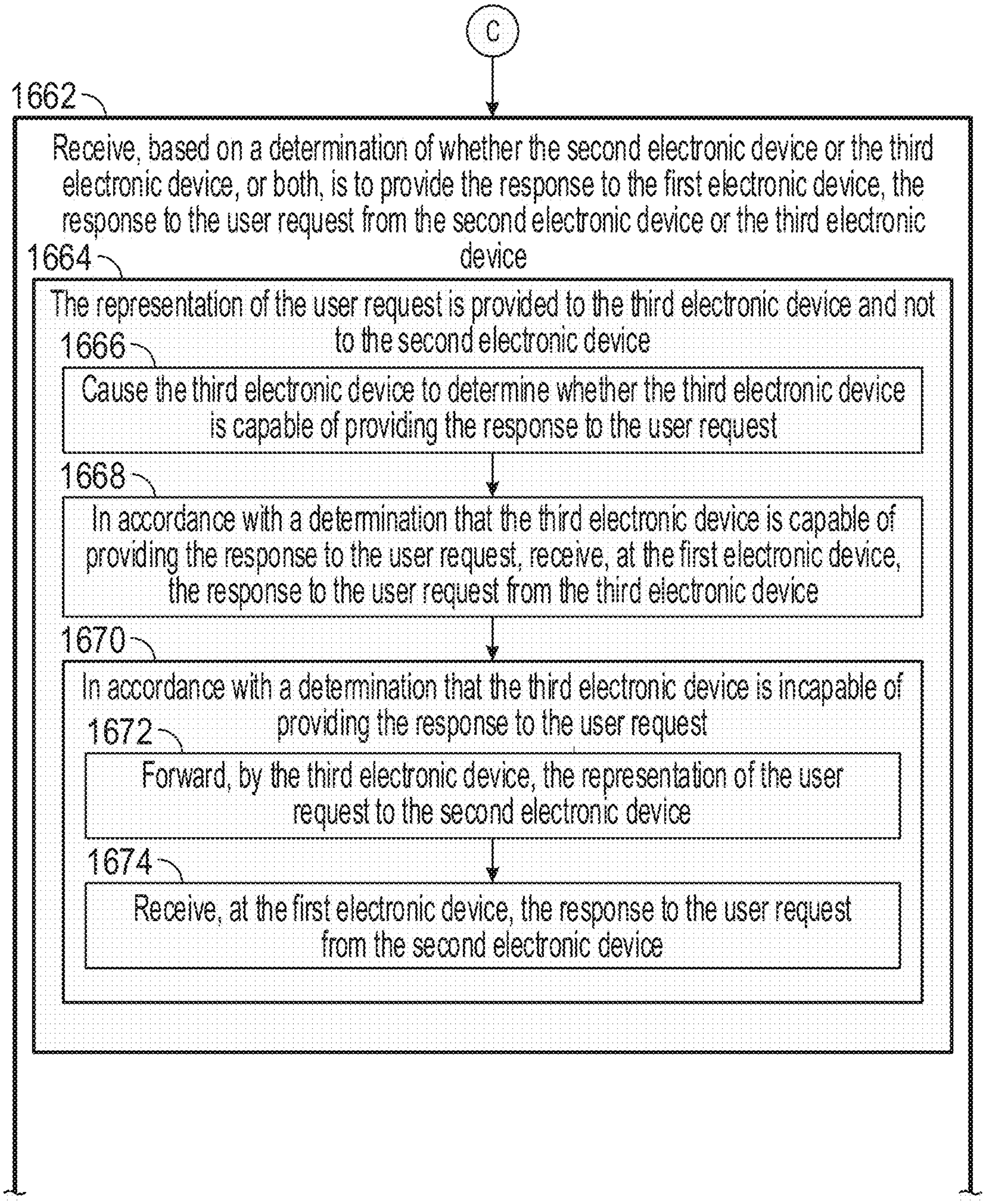

With reference to FIG. 16C, as described above, an identity of the first user is obtained. At block 1646, in accordance with the user identity, a representation of the user request is provided to at least one of a second electronic device or a third electronic device. At block 1648, the second electronic device is a server remotely disposed from the first electronic device; and the third electronic device is a client device disposed in the vicinity of the first electronic device. At block 1650, the third electronic device is a proxy device of a server. For example, a client device (e.g., device 840 shown in FIG. 8A) can operate as a proxy device for a server (e.g., device 820 shown in FIG. 8A) to process requests from other devices (e.g., home automation devices such as am intelligent thermostat).

At block 1652, in some examples, to provide the representation of the user request to at least one of the second electronic device or the third electronic device, it is determined whether the third electronic device (e.g., a client device disposed in the vicinity of the first electronic device) is communicatively coupled to the first electronic device (e.g., a service-extension device). At block 1654, in accordance with a determination that the third electronic device is communicatively coupled to the first electronic device, the representation of the user request is provided to the third electronic device and not to the second electronic device. At block 1656, in accordance with a determination that the third electronic device is not communicatively coupled to the first electronic device, the representation of the user request is provided to the second electronic device.

At block 1658, in some examples, the representation of the user request is provided to the second electronic device (e.g., a remote server) and not to the third electronic device (e.g., a client device disposed in the vicinity of the first electronic device). At block 1660, in some examples, the representation of the user request is provided to both the second electronic device and the third electronic device.

As described above, the second electronic device and/or the third electronic device receives the representation of the user request and can determine whether one or both is to provide a response to the first electronic device. With reference to FIG. 16C, at block 1662, based on a determination of whether the second electronic device or the third electronic device, or both, is to provide a response to the first electronic device, the response to the user request is received from the second electronic device or the third electronic device.

At block 1664, as described above, in some examples, the representation of the user request is provided to the third electronic device and not to the second electronic device. At block 1666, for receiving the response to the user request, it is caused the third electronic device (e.g., a client device) to determine whether the third electronic device is capable of providing the response to the user request. At block 1668, in accordance with a determination that the third electronic device is capable of providing the response to the user request, it is received, at the first electronic device, the response to the user request from the third electronic device. At block 1670, a determination is made that the third electronic device is incapable of providing the response to the user request. At block 1672, in accordance with such a determination, the representation of the user request is forwarded by the third electronic device to the second electronic device. At block 1674, the response to the user request is received at the first electronic device from the second electronic device.

Figure 16E:
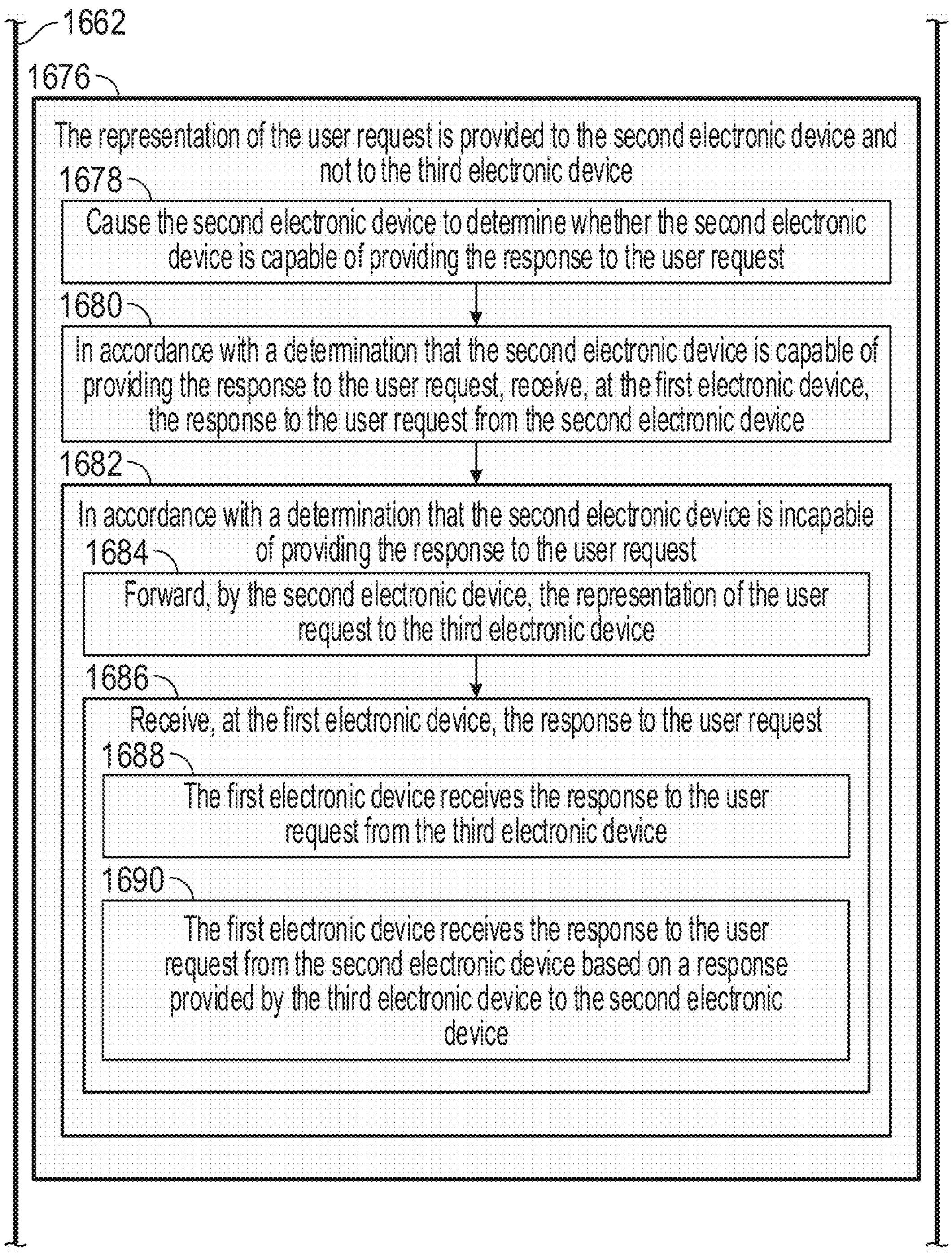

With reference to FIG. 16E, as described above, in some examples, at block 1676, the representation of the user request is provided to the second electronic device (e.g., a remote server) and not to the third electronic device (e.g., a client device). At block 1678, for receiving a response to the user request at the first electronic device, it is caused the second electronic device to determine whether the second electronic device is capable of providing the response to the user request. At block 1680, in accordance with a determination that the second electronic device is capable of providing the response to the user request, the response to the user request is received at the first electronic device from the second electronic device. At block 1682, it is determined that the second electronic device is incapable of providing the response to the user request.

At block 1684, in accordance with such a determination, the representation of the user request is forwarded by the second electronic device to the third electronic device. The third electronic device (e.g., a client device) can thus provide a response based on the user request. At block 1686, the response to the user request is received at the first electronic device. At block 1688, the first electronic device receives the response to the user request from the third electronic device. At block 1690, the first electronic device receives the response to the user request from the second electronic device (e.g., a remote server) based on a response provided by the third electronic device to the second electronic device. For example, a client device can forward the response to the remote server, which provides the response to the first electronic device (e.g., a server-extension device).

Figure 16F:
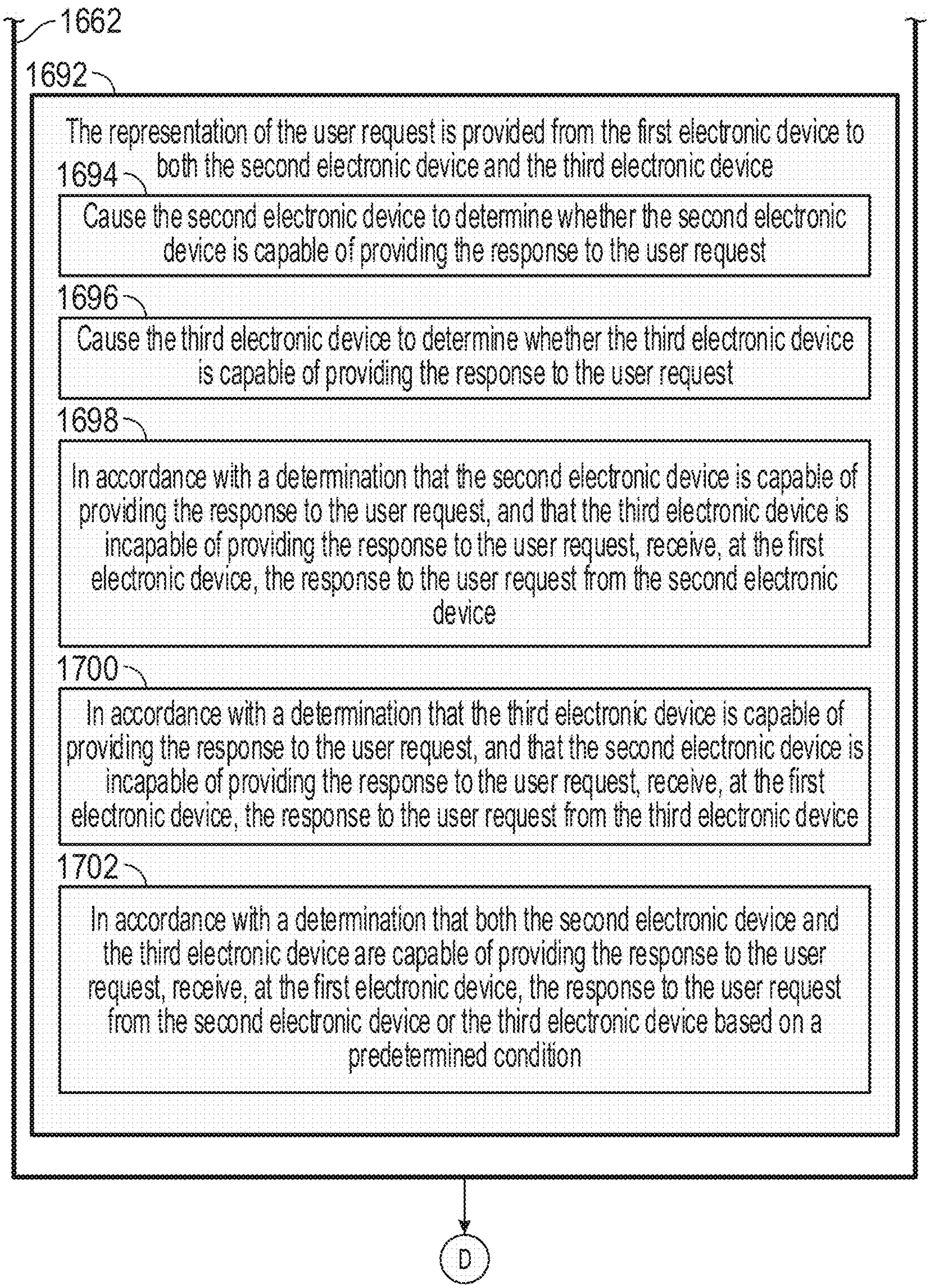

With reference to FIG. 16F, as described, in some examples, at block 1692, the representation of the user request is provided from the first electronic device to both the second electronic device and the third electronic device. At block 1694, for receiving the response to the user request, it is caused the second electronic device (e.g., a remote server) to determine whether the second electronic device is capable of providing the response to the user request. At block 1696, for receiving the response to the user request, it is caused the third electronic device (e.g., a client device disposed in the vicinity of the first electronic device) to determine whether the third electronic device is capable of providing the response to the user request. One or both of the determinations in block 1694 and block 1696 can be performed.

At block 1698, in accordance with a determination that the second electronic device is capable of providing the response to the user request, and that the third electronic device is incapable of providing the response to the user request, the response to the user request is received at the first electronic device from the second electronic device. At block 1700, in accordance with a determination that the third electronic device is capable of providing the response to the user request, and that the second electronic device is incapable of providing the response to the user request, the response to the user request is received at the first electronic device from the third electronic device. At block 1702, in accordance with a determination that both the second electronic device and the third electronic device are capable of providing the response to the user request, the response to the user request is received at the first electronic device from the second electronic device or the third electronic device based on a predetermined condition. The predetermined condition can be, for example, a pre-configured policy (e.g., the third electronic device is the default device to provide a response), user preferences, bandwidth conditions of the connections to the second and third electronic devices, etc.

Figure 16G:
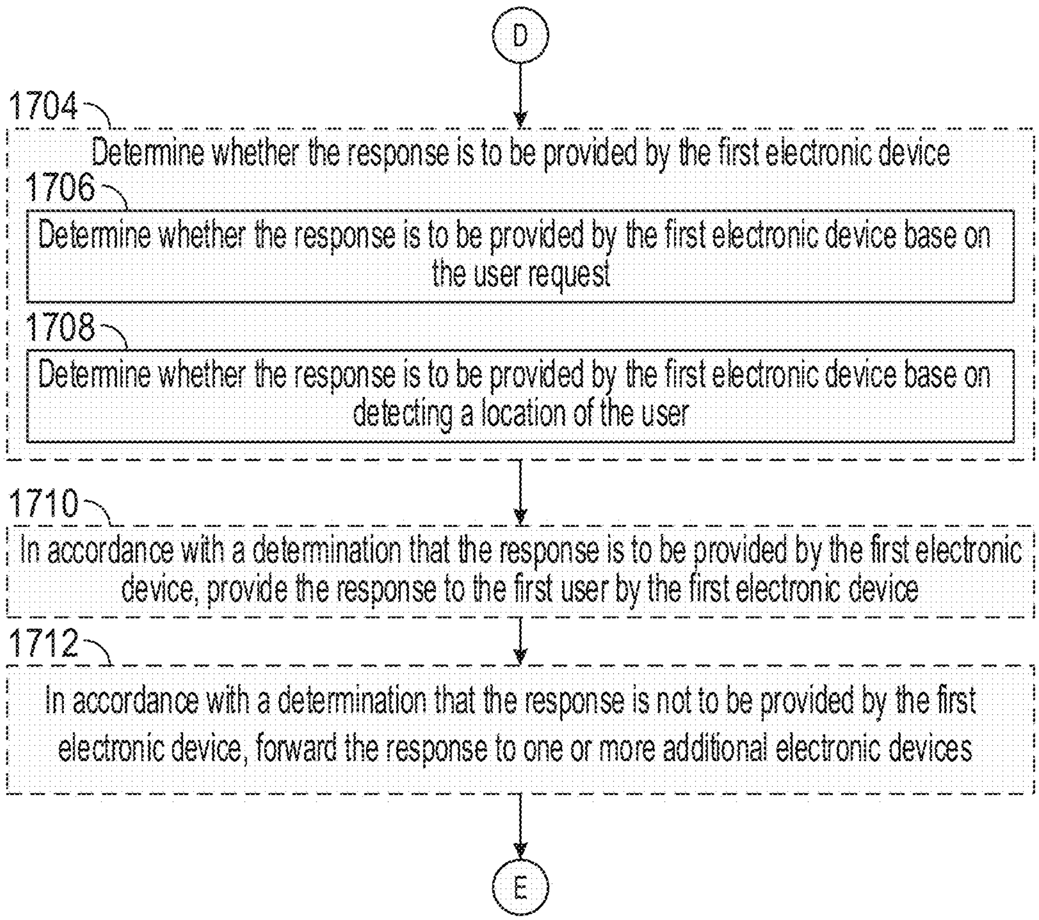

With reference to FIG. 16G, at block 1704, it is determining whether the representation of the response is to be provided by the first electronic device (e.g., a service-extension device). At block 1706, the determination of whether the response is to be provided by the first electronic device is based on the user request (e.g., the user's speech input indicates that the response is to be provided at a different electronic device). At block 1708, the determination of whether the response is to be provided by the first electronic device is based on at least one of detecting a location of the user or tracking the user's movement. For example, if it is detected that the user is moving away from the first electronic device toward another device, the response may not be provided by the first electronic device.

At block 1710, in accordance with a determination that the representation of the response is to be provided by the first electronic device, the representation of the response is provided to the first user by the first electronic device. At block 1712, in accordance with a determination that the representation of the response is not to be provided by the first electronic device, the response to is forwarded to one or more additional electronic devices, which can provide the response to the first user.

Figure 16H:
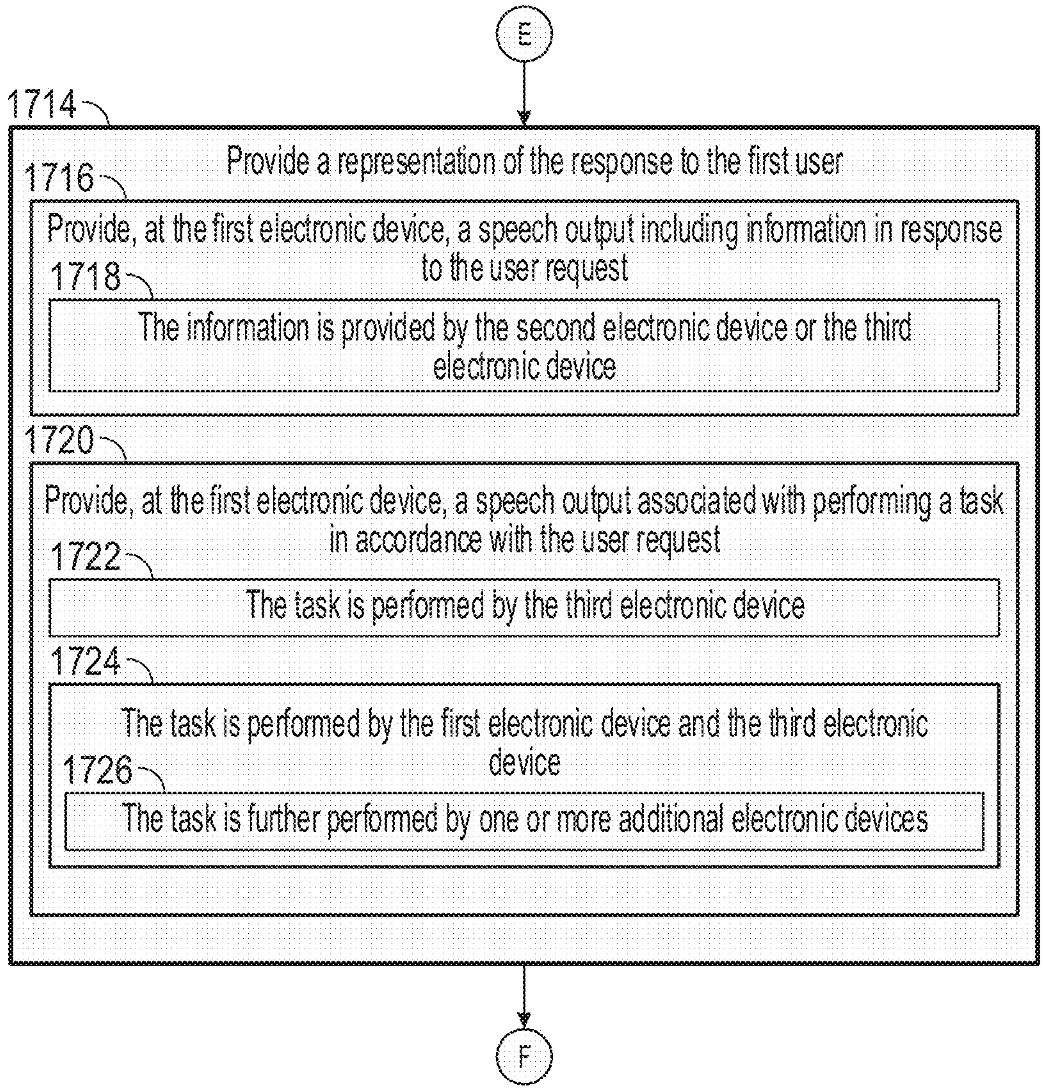
Figure 16I:
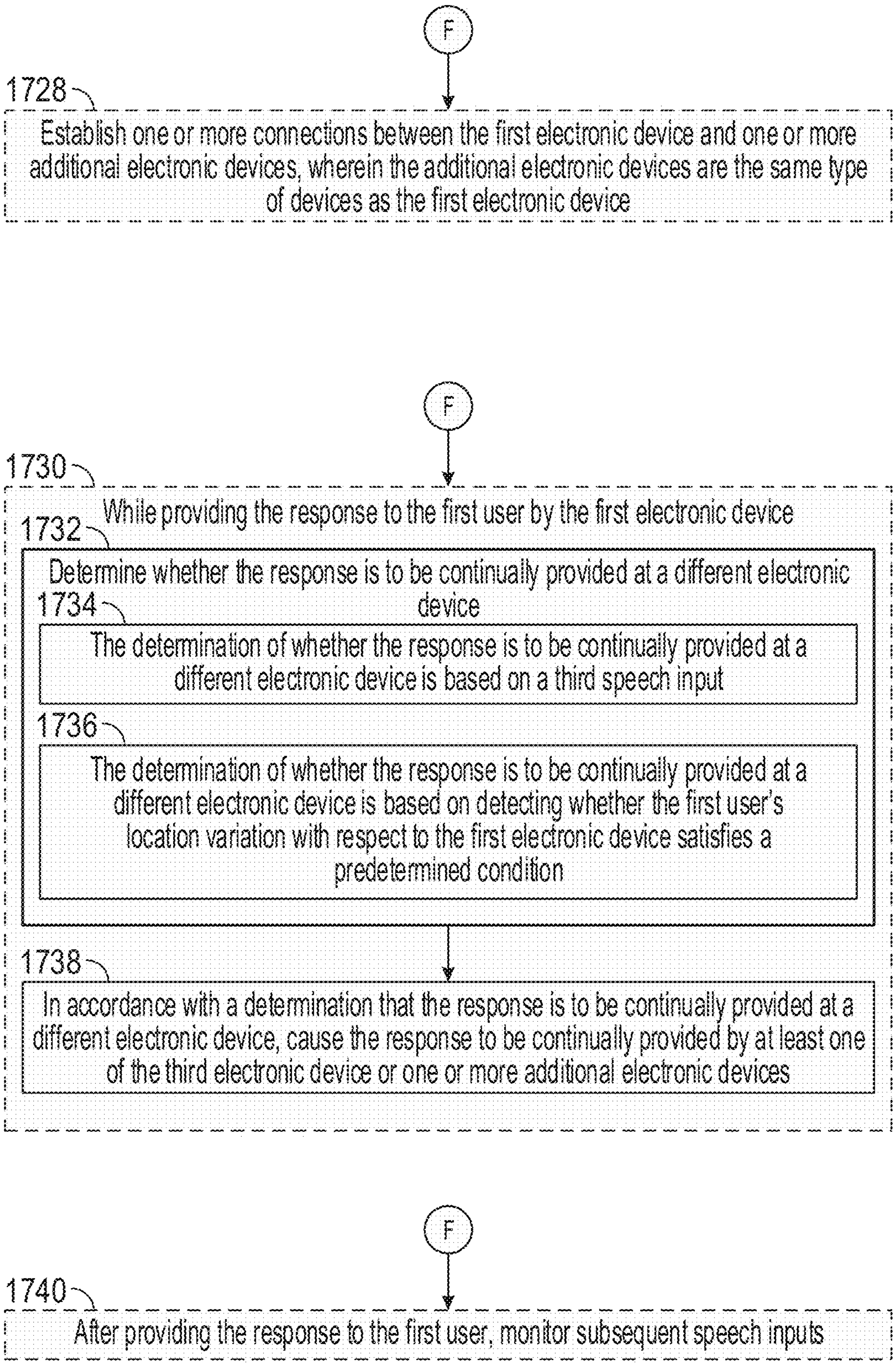

With reference to FIG. 16H, at block 1714, a representation of the response is provided to the first user. At block 1716, to provide the representation of the response, a speech output including information in response to the user request is provided at the first electronic device. At block 1718, the information is provided by the second electronic device or the third electronic device to the first electronic device.

At block 1720, to provide the representation of the response, a speech output associated with performing a task in accordance with the user request is provided at the first electronic device. At block 1722, in some examples, the task is performed by the third electronic device (e.g., a client device such as the first user's smartphone). At block 1724, in some examples, the task is performed by the first electronic device and the third electronic device. For example, the first electronic device may output an audio portion of a response, while the third electronic device (e.g., a TV set-top box connected to a TV screen) may output a video portion of the response. At block 1726, the task is further performed by one or more additional electronic devices. For example, in addition to providing a response (e.g., playing a movie) at a service-extension device and a client device such as a TV set-top box, the response may be further provided at an additional device such as a laptop computer.

At block 1728, in some examples, one or more connections are established between the first electronic device and one or more additional electronic devices. The additional electronic devices are the same type of devices as the first electronic device. For example, connections can be established among multiple service-extension devices (e.g., devices 810A-C as shown in FIGS. 8A-8B).

At block 1730, the response is being provided to the first user by the first electronic device. At block 1732, while providing the response to the first user by the first electronic device, it is determined whether the response is to be continually provided at a different electronic device (e.g., a client device such as the user's smartphone). At block 1734, the determination of whether the response is to be continually provided at a different electronic device is based on a third speech input (e.g., a speech input from the first user such as "Continue to play the song on my phone"). At block 1736, the determination of whether the response is to be continually provided at a different electronic device is based on detecting whether the first user's location variation with respect to the first electronic device satisfies a predetermined condition. For example, it can be determined whether the first user has moved out of a predetermined boundary such that the response should be continually provided at a device different from the first electronic device.

At block 1738, in accordance with a determination that the response is to be continually provided at a different electronic device, the response is caused to be continually provided by at least one of the third electronic device or one or more additional electronic devices.

At block 1740, after providing the response to the first user, subsequent speech inputs are monitored.

7. Process for Providing Digital Assistant Services Based on Notifications of Events.

FIGS. 17A-17D illustrates process 1800 for operating a digital assistant for providing digital assistant services based on notifications of events, according to various examples. Process 1800 is performed, for example, using one or more electronic devices implementing a digital assistant. In some examples, process 1800 is performed using a client-server system (e.g., system 100), and the blocks of process 1800 are divided up in any manner between the server (e.g., DA server 106) and a client device. In other examples, the blocks of process 1800 are divided up between the server and multiple client devices (e.g., a mobile phone and a smart watch). Thus, while portions of process 1800 are described herein as being performed by particular devices of a client-server system, it will be appreciated that process 1800 is not so limited. In other examples, process 1800 is performed using only a client device (e.g., user device 104, devices 810A-C) or only multiple client devices. In process 1800, some blocks are, optionally, combined, the order of some blocks is, optionally, changed, and some blocks are, optionally, omitted. In some examples, additional steps may be performed in combination with the process 1800.

Figure 17A:
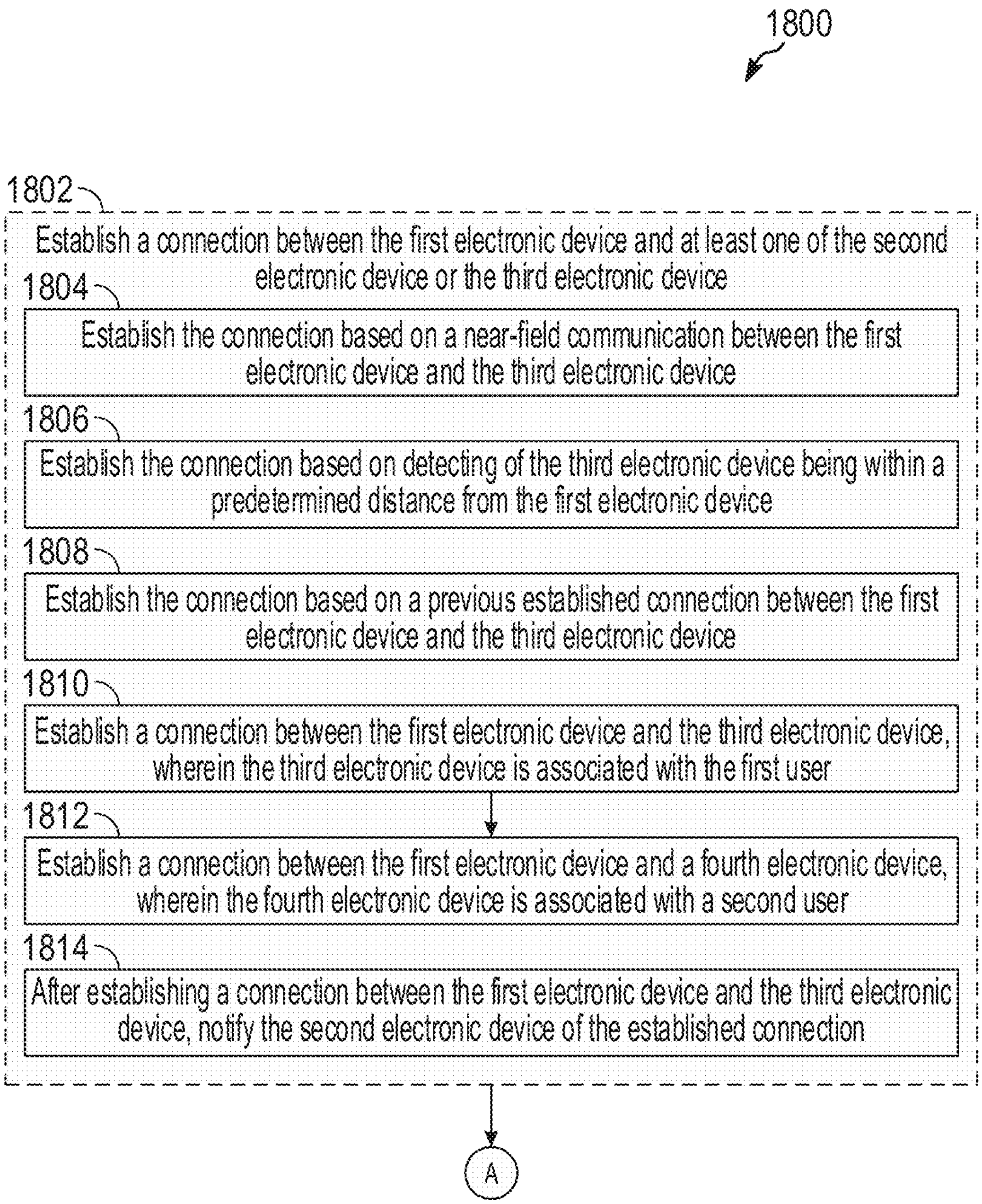
FIGS. 17A-17D illustrate a process for providing digital assistant services based on a notification of an event, according to various examples.

With reference to FIG. 17A, at block 1802, prior to receiving a notification of an event, a connection is established between a first electronic device (e.g., a service-extension device) and at least one of a second electronic device (e.g., a server) or a third electronic device (e.g., a client device disposed in the vicinity of the first electronic device). At block 1804, establishing the connection is based on a near-field communication between the first electronic device and the third electronic device. At block 1806, establishing the connection is based on detecting of the third electronic device being within a predetermined distance from the first electronic device. At block 1808, establishing the connection is based on a previous established connection between the first electronic device and the third electronic device.

As described above, the first electronic device (e.g., a service-extension device) can be shared by multiple users. At block 1810, a connection between the first electronic device and the third electronic device is established; and the third electronic device is associated with the first user. At block 1812, a connection between the first electronic device and a fourth electronic device is established; and the fourth electronic device is associated with a second user. At block 1814, after establishing a connection between the first electronic device and the third electronic device, the second electronic device (e.g., a remote server) is notified of the established connection.

Figure 17B:
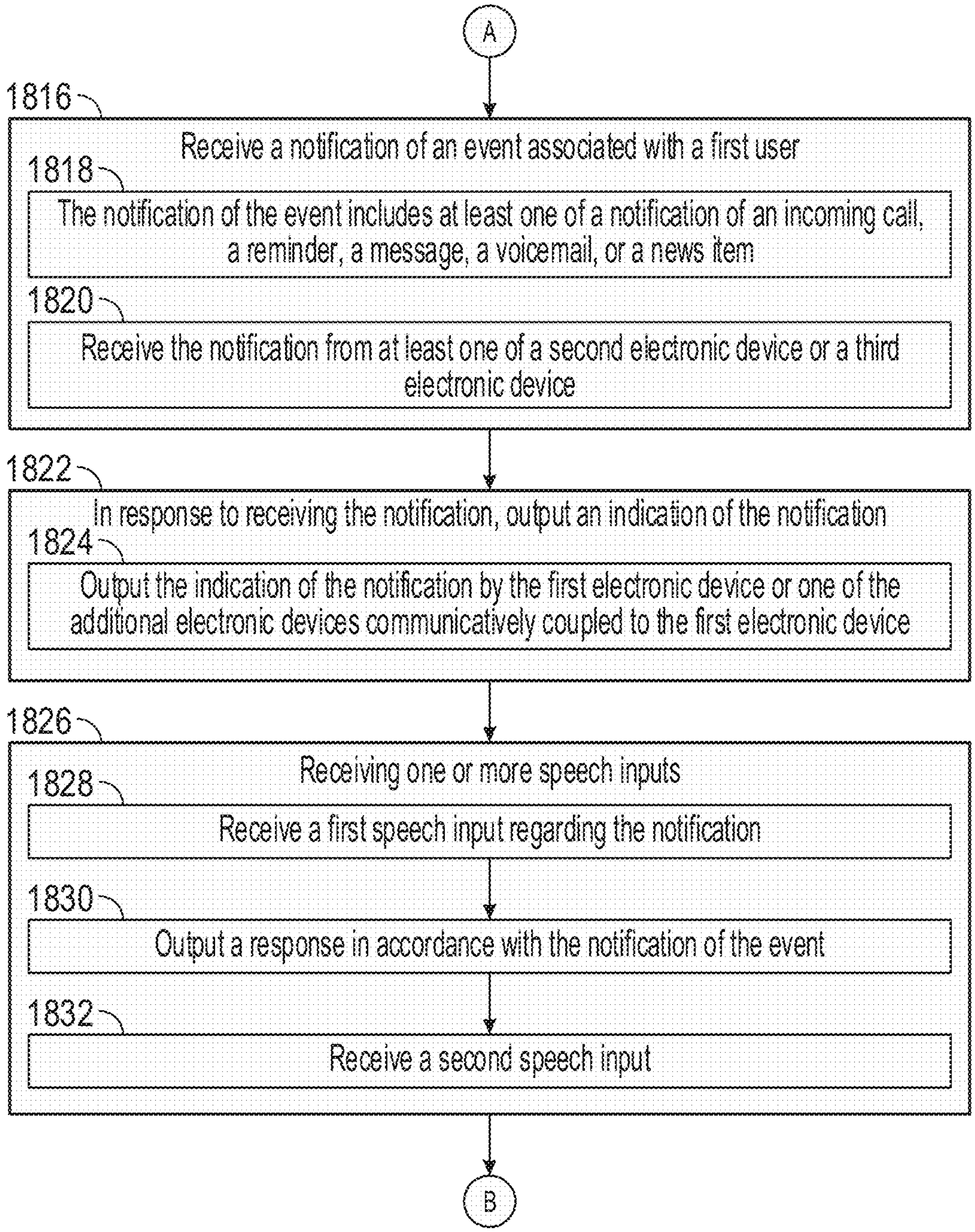

With reference to FIG. 17B, at block 1816, a notification of an event associated with a first user is received. At block 1818, the notification of the event includes a representation of at least one of an incoming call, a reminder, a message, a voicemail, or a news alert. At block 1820, the notification is received from at least one of a second electronic device (e.g., a remote server) or a third electronic device (e.g., a client device disposed in the vicinity of the first electronic device).

At block 1822, in response to receiving the notification, an indication of the notification is outputted. An indication can be, for example, a beep, an alert, a ringtone, etc. At block 1824, the indication of the notification is outputted by the first electronic device or one of the additional electronic devices communicatively coupled to the first electronic device. For example, a client device such as user's smartphone can output the indication of the notification; and another service-extension device can output the indication of the notification.

At block 1826, one or more speech inputs are received. At block 1828, for example, a first speech input is received regarding the notification (e.g., the user may provide a first speech input inquiring about the indication of the even notification such as "What is it?"). At block 1830, a response is outputted in accordance with the notification of the event. For example, a speech output may be provided such as "You have a voicemail from John." At block 1832, a second speech input is received. For example, the user may say "Play the voicemail."

Figure 17C:
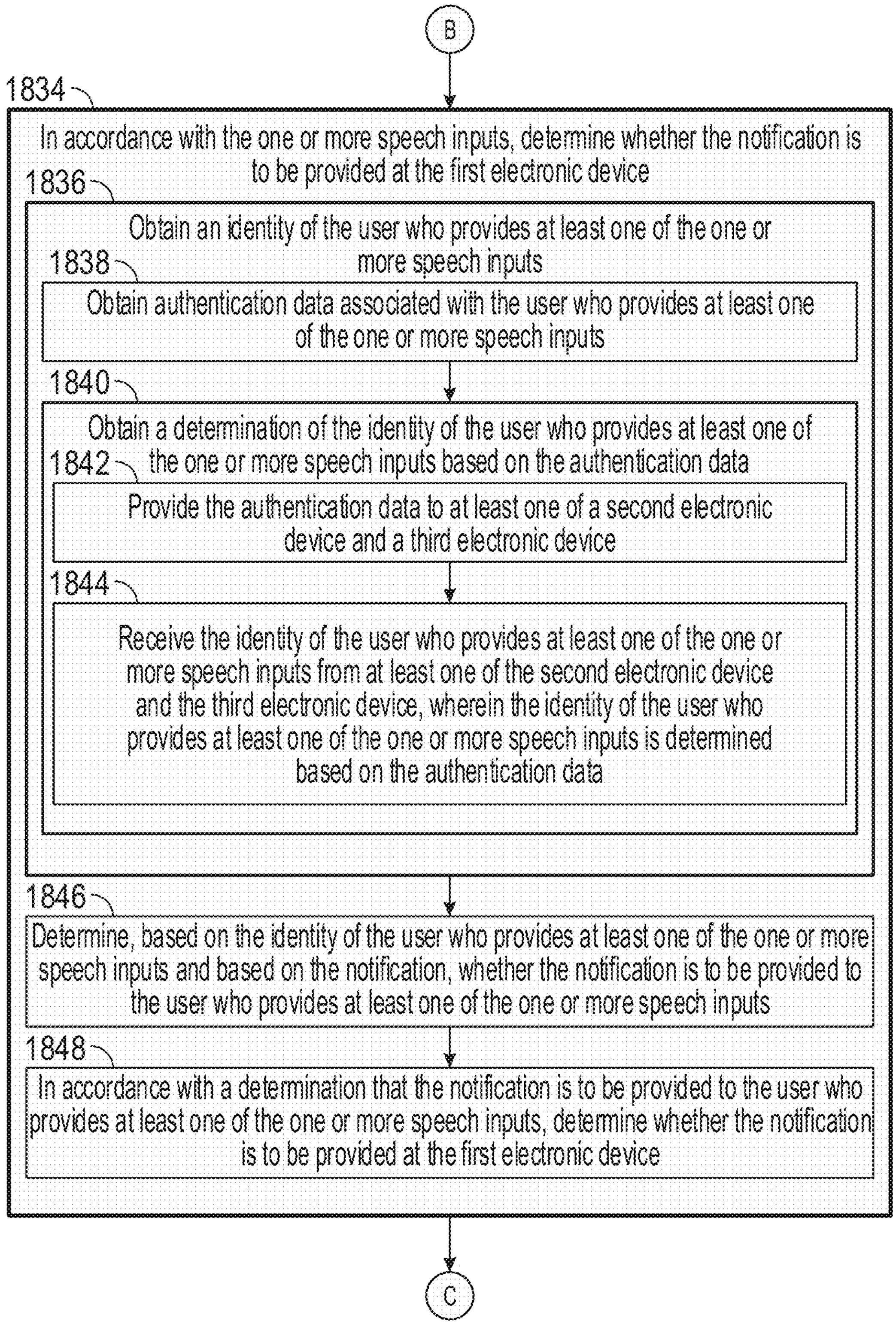

With reference to FIG. 17C, at block 1834, in accordance with the one or more speech inputs, it is determined whether the notification is to be provided at the first electronic device. At block 1836, to determine whether the notification is to be provided at the first electronic device, it is obtained an identity of the user who provides at least one of the one or more speech inputs. At block 1838, to obtain the identity of the user, it is obtained authentication data associated with the user who provides at least one of the one or more speech inputs. The authentication data can include, for example, the user's biometrics, fingerprints, facial recognition data, passwords, etc. At block 1840, it is obtained a determination of the identity of the user who provides at least one of the one or more speech inputs based on the authentication data.

At block 1842, to obtain the determination of the identity of the user who provides at least one of the one or more speech inputs, the authentication data is provided to at least one of a second electronic device and a third electronic device. At block 1844, it is received the identity of the user who provides at least one of the one or more speech inputs from at least one of the second electronic device and the third electronic device. The identity of the user who provides at least one of the one or more speech inputs is determined based on the authentication data.

At block 1846, it is determined, based on the identity of the user who provides at least one of the one or more speech inputs and based on the notification, whether the notification is to be provided to the user who provides at least one of the one or more speech inputs. At block 1848, in accordance with a determination that the notification is to be provided to the user who provides at least one of the one or more speech inputs, it is determined whether the notification is to be provided at the first electronic device.

Figure 17D:
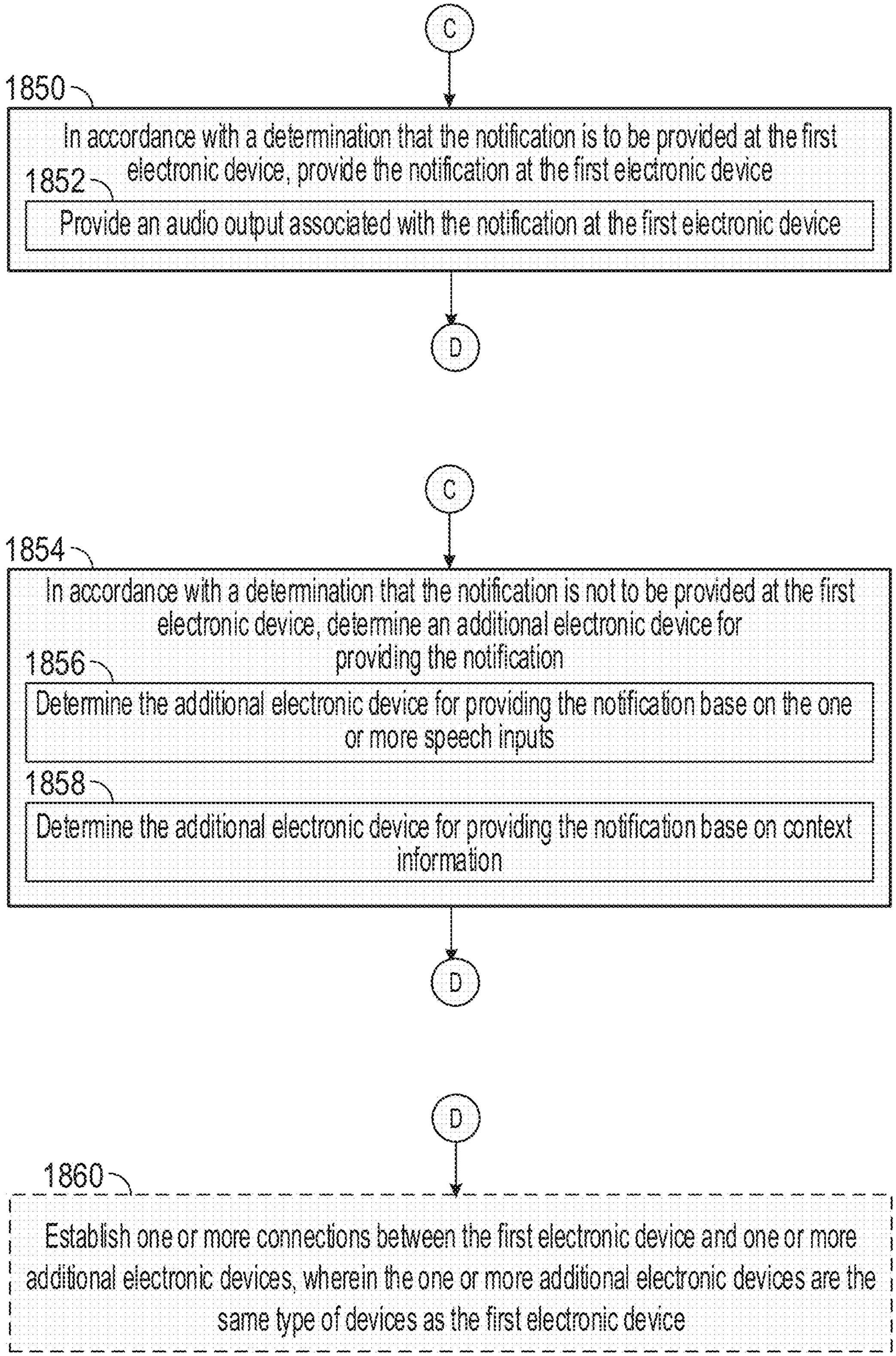

With reference to FIG. 17D, at block 1850, in accordance with a determination that the notification is to be provided at the first electronic device, the notification is provided at the first electronic device. At block 1852, to provide the notification at the first electronic device, an audio output is provided associated with the notification at the first electronic device.

At block 1854, in accordance with a determination that the notification is not to be provided at the first electronic device, an additional electronic device for providing the notification is determined. At block 1856, determining the additional electronic device for providing the notification is based on the one or more speech inputs. At block 1858, determining the additional electronic device for providing the notification is based on context information.

The operations described above with reference to FIGS. 16A-16I and 17A-17D are optionally implemented by components depicted in FIGS. 1-4, 6A-6B, and 7A-7C. For example, the operations of process 1600 and 1800 may be implemented by digital assistant system 700. It would be clear to a person having ordinary skill in the art how other processes are implemented based on the components depicted in FIGS. 1-4, 6A-6B, and 7A-7C.

8. Exemplary Functions of Providing Digital Assistant Services Using Multiple Devices.

As described above, digital assistant services can be provided by one or more devices. Due to device capability limitations, certain devices may be incapable of, or not optimum for, providing certain digital assistant services. For example, a smartwatch typically has a small screen size and thus is not optimum for playing video. As another example, unlike a smartphone, a TV set-top box may be incapable of providing speech outputs for text messages.

FIGS. 18A-18E illustrate functionalities for providing digital assistant services based on capabilities of multiple electronic devices, according to various examples. In some examples, the digital assistant (e.g., digital assistant system 700) is implemented by a user device according to various examples. In some examples, the user device, a server (e.g., server 108, device 820), or a combination thereof, may implement a digital assistant system (e.g., digital assistant system 700). The user device can be implemented using, for example, device 200, 400, 600, 820, 830, 840, 1880, and/or 1882. In some examples, the user device is a device having audio outputting capabilities and network connectivity; a smart watch, smartphone, a laptop computer, a desktop computer, or a tablet computer.

Figure 18A:
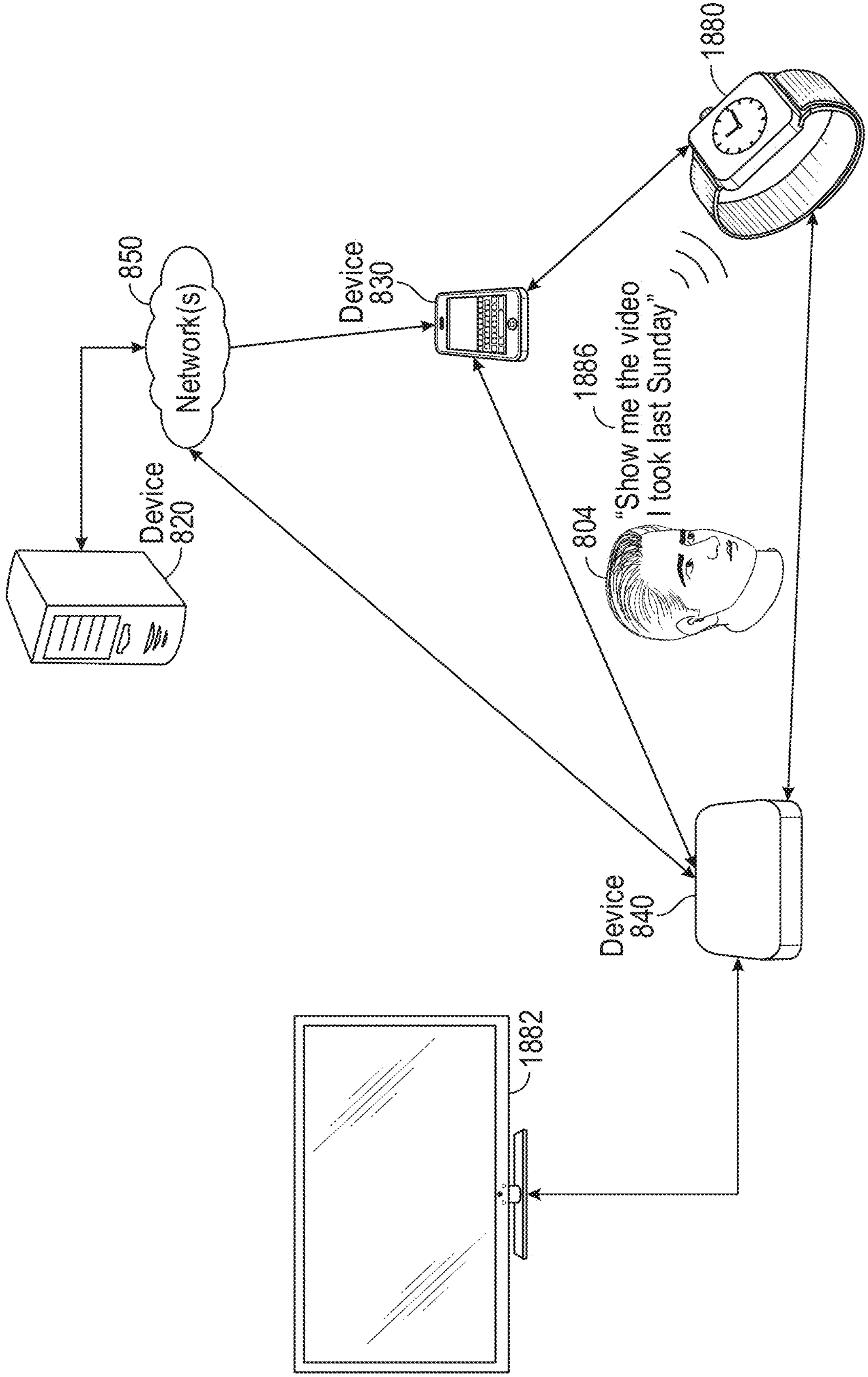
FIGS. 18A-18E illustrate functionalities for providing digital assistant services based on capabilities of multiple electronic devices, according to various examples.

As illustrated in FIG. 18A, user 804 may provide a speech input 1886 such as "Show me the video I took last Sunday." Speech input 1886 can represent a user request (e.g., a request for information or a request for performing a task). In some examples, the digital assistant operating on device 1880 receives speech input 1886 from user 804. Device 1880 can be, for example, a client device (e.g., a wearable device such as smart watch). Device 1880 can also be a device similar to device 810A described above, which can include one or more audio input and output devices (e.g., a microphone and one or more speakers) and one or more network communication interfaces. Device 1880 may or may not be capable of, or optimum for, responding to the user request (e.g., providing the requested information or performing the requested tasks). For example, device 1880 may not have a display or may have a small-sized display that is not optimum to play video.

In some embodiments, the digital assistant operating on device 1880 can obtain capability data associated with one or more electronic devices capable of being communicatively coupled to device 1880. For example, as shown in FIG. 18A, the digital assistant operating on device 1880 can determine that device 820 (e.g., a remote server), device 830 (e.g., a client device such as the user's smartphone), device 840 (a TV set-top box) are communicatively coupled to device 1880. The determination can be made, for example, via Bluetooth pairing, Wi-Fi connection, etc., similar to as described above with respect to device 810A. Based on the determination that devices 820, 830, and 840 are communicatively coupled, the digital assistant operating on device 1880 can obtain capability data associated with these devices. In some examples, some devices are client devices disposed in the vicinity of device 1880 and some devices are disposed remotely from device 1880. For example, device 1880, device 830, and device 840 are client devices disposed within a predetermined boundary (e.g., a house, a building, a car, etc.); and device 820 is a server disposed remotely.

In some examples, capability data can include device capabilities associated with electronic devices capable of being communicatively coupled to device 1880. Device capabilities can include one or more physical capabilities and/or informational capabilities. Physical capabilities of a device can include the device's physical attributes such as whether the device has a display, the size of the display, the number of speakers, network capabilities, or the like. Informational capabilities of a device can include data that the device is capable of providing. For example, device 830 may store media items (e.g., videos and photos) that user 804 took, and is thus capable of providing the stored media items to other devices communicatively connected to device 830.

In some examples, prior to obtaining the capability data, the digital assistant operating on device 1880 can be configured to establish communication with other electronic devices (e.g., devices 820, 830, and/or 840). In some examples, the communication can be established via a direct communication connection, such as Bluetooth, near-field communication (NFC), BTLE (Bluetooth Low Energy), or the like, or via a wired or wireless network, such as a local Wi-Fi network. For example, the digital assistant operating on device 1880 can detect device 830 via Bluetooth discovery, and communicatively coupled to devices 830 via Bluetooth connection. As another example, the digital assistant operating on device 1880 can detect a Wi-Fi network and couple to device 840 via the Wi-Fi network. As another example, the digital assistant operating on device 1880 can detect a near field communication when the device 830 (e.g., a client device such as the user's smartphone) is in close proximity with, or physically in touch with, device 1880. For instance, to pair up device 1880 and device 830, user 804 may tap device 1880 with device 830, thereby establishing near-field communication between the two devices. As another example, the digital assistant operating on device 1880 may detect that device 830 (e.g., a client device such as the user's smartphone) is within a predetermined distance (e.g., within a range of Bluetooth communication) and establish a connection with device 830. For instance, as user 804 approaches device 1880 with device 830, the digital assistant operating on device 1880 detects that device 830 is within communication range, and thus connects device 1880 with device 830. As another example, the digital assistant operating on device 1880 may establish a connection with device 830 based on one or more previous established connections between the two devices. For instance, the digital assistant operating on device 1880 can store a log file including the devices that it connected in the past, and optionally connection parameters. Thus, based on the log file, the digital assistant operating on device 1880 can determine, for example, that it has connected to device 830 before. Based on such determination, the digital assistant operating on device 1880 can establish the connection with device 830 again.

In some examples, prior to obtaining the capability data, the digital assistant operating on device 1880 can inquire user 804 regarding accessing one or more devices capable of being communicatively coupled to device 1880. For example, the digital assistant operating on device 1880 may provide a speech output such as "Do I have your permission to access your phone and TV?" In some examples, user 804 may respond with a speech input either permitting the access or denying the access. In response to receiving the speech input, the digital assistant operating on device 1880 can determine whether it is authorized to access the devices communicatively coupled to device 1880. For example, if user 804's speech input is "OK," the digital assistant operating on device 1880 can determine that it is authorized to access devices 830 and 840. If user 804's speech input is "No," the digital assistant operating on device 1880 can determine that it is not authorized to access devices 830 and 840. If user 804's speech input is "Yes for my phone, No for my TV" (e.g., user 8044 may be watching another video by using device 840 and device 1882 (e.g., a TV display), and does not wish to disturb the video playing on device 1882), the digital assistant operating on device 1880 can determine that it is authorized to access device 830 but not device 840 for playing the video on device 1882.

Figure 18B:
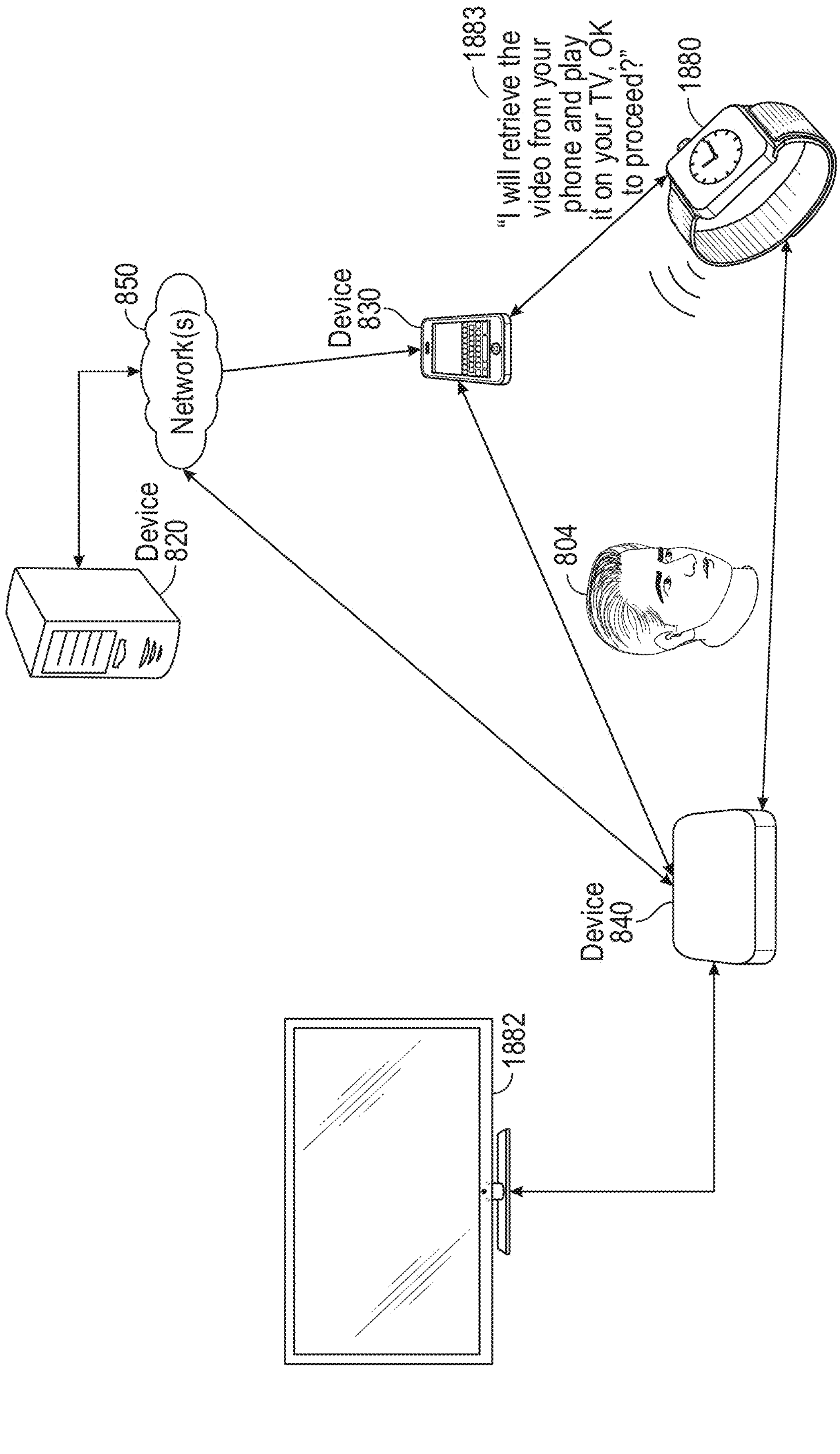

With reference to FIGS. 18A and 18B, in some embodiments, in accordance with the capability data, the digital assistant operating on device 1880 can identify, from the one or more electronic devices capable of being communicatively coupled to the device, a device for providing at least a portion of a response to the user request. In some examples, the digital assistant operating on device 1880 can obtain one or more steps for responding to the user request based on speech input 1886. The one or more steps for responding to the user request can include steps for providing requested information and/or steps for performing a requested task. For example, based on speech input 1886 such as "Show me the video I took last Sunday," device 1880 can determine the user request is to find the video user 804 took last Sunday and play it. The determination can be made using natural language processing techniques described above.

According to the determined user request, the digital assistant operating on device 1880 can determine one or more steps required for responding to the user request. For example, the digital assistant operating on device 1880 can determine that step #1 for playing a video user 804 took last Sunday is to find the particular video that user 804 took last Sunday; and step #2 is to play the particular video. In some embodiments, the determination of the one or more steps can be made on another device (e.g., device 820 such as a remote server) and provided to device 1880. In some embodiments, the determination of the one or more steps can be made using both device 820 and device 1880. For example, a digital assistant can operate on device 1880 in the front end to interface with user 804 and operate on device 820 in the back end to process the user input. In some embodiments, the one or more steps for responding to the user request can form at least a portion of an execution plan. An execution plan may include the steps for responding to the user request and the device for perform each of the steps.

In some embodiments, the digital assistant operating on device 1880 can identify one or more devices for performing the steps for responding to the user request based on capability data associated with one or more electronic devices capable of being communicatively coupled to device 1880. Continuing the above example, the digital assistant operating on device 1880 can identify a device for performing step #1 of finding a particular video that user 804 took last Sunday; and identify a device for performing step #2 of playing the particular video. As shown in FIG. 18B, the digital assistant operating on device 1880 may determine that, among the devices communicatively connected to device 1880 (e.g., devices 820, 830, and 840), the capability data of device 830 (e.g., a client device such as the user's smartphone) indicate that device 830 has the capability of finding the particular video user 804 took last Sunday. For example, user 804 took a video last Sunday using device 830, and therefore the informational capability data of device 830 may indicate that a file stored in device 830 has a format of a video and a time stamp of last Sunday. Accordingly, the digital assistant operating on device 1880 can identify device 830 for performing step #1 of finding the particular video user 804 intended.

As another example, the digital assistant operating on device 1880 may determine that, among devices 820, 830, and 840, the capability data of device 840 (e.g., a TV set-top box) indicate that device 840 is an optimum device for performing step #2 of playing videos. For example, device capability data of devices 830 and 840 may both indicate that the devices are capable of playing videos. Device capability data of device 840 may further indicate that one or more device attributes (e.g., display size/resolution/number of speakers) of a device 1882 (e.g., a TV screen), on which device 840 can play the video, are superior than the device attributes of device 830. For example, the display size of device 1882 is bigger than the display size of device 830. As a result, the digital assistant operating on device 1880 can identify device 840, instead of device 830, for performing step #2 of playing the video.

In some embodiments, as shown in FIG. 18B, based on the determination of the devices for performing the steps for responding to the user request, the digital assistant operating on device 1880 can provide a speech output to user 804 seeking confirmation or permission to access the devices identified for responding to the user request. For example, as shown in FIG. 18B, the digital assistant operating on device 1880 can provide a speech output 1883 such as "I will retrieve the video from your phone and play it on your TV, OK to proceed?" With reference to FIG. 18C, in some examples, device 1880 may receive subsequent speech input 1885 from user 804. In response to receiving speech input 1885, the digital assistant operating on device 1880 can determine whether at least a portion of the response is to be provided by one or more devices communicatively coupled to device 1880. For example, if speech input 1885 includes "OK," the digital assistant operating on device 1880 can determine that the video should be retrieved from device 830 and played on device 1882 (e.g., a TV display) using device 840 (e.g., a TV set-top box). If speech input 1885 includes "No, play the video on my phone," the digital assistant operating on device 1880 can determine that the video should be retrieved from device 830, but played on device 830 rather than device 1882. It is appreciated that, in some examples, providing speech output 1883 seeking confirmation/permission and receiving subsequence user input 1885 are optional.

In some embodiments, prior to providing a speech output for confirming or requesting permission to user the devices identified for responding to the user request, the digital assistant can annotate one or more steps for responding to the user request, and providing the speech output based on the annotation. Using the above example, the digital assistant operation on device 1880 can determine whether performing a particular step would require altering a state of a device. For instance, for performing step #2 of playing video on device 1882 (e.g., a TV display), a state of device 840 may be altered (e.g., changing from a state of power off to power on, switching from the current playing video to the video user requested, etc.). As a result, the digital assistant operating on device 1880 can annotate step #2 as a step that requires altering state of the identified device.

As another example, for performing step #1 of finding the video user 804 took on last Sunday, the digital assistant operating on device 1880 may determine that performing step #1 would not require altering the state of device 830. As a result, the digital assistant operating on device 1880 may not annotate step #1 as a step that requires altering state of the identified device. In some examples, based on the annotation, the digital assistant operating on device 1880 can then provide a speech output seeking confirmation or permission to use the devices identified for responding to the user request. Using the above example, because step #2 of playing video is a state-altering step for the identified device 840, the digital assistant operating on device 1880 can provide a speech output seeking permission to access device 840. The speech output may include, for example, "I will play the video on your TV, OK to proceed?" And because step #1 of finding a video is a not state-altering step for the identified device 830, the digital assistant operating on device 1880 may not provide a speech output seeking permission to access device 830.

Figure 18C:
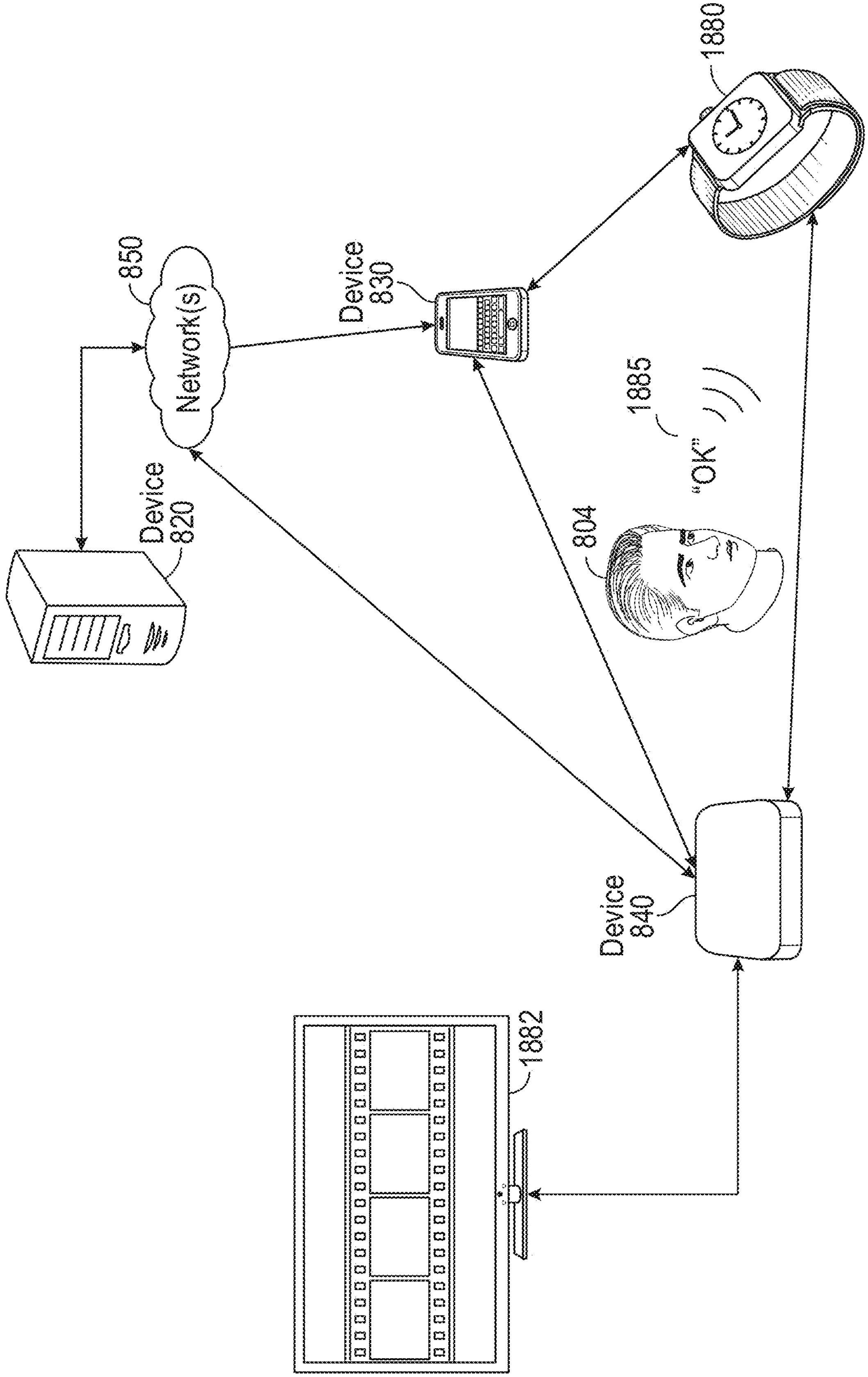

With reference to FIG. 18C, in some embodiments, the digital assistant operating on device 1880 can cause one or more identified devices to provide at least a portion of a response to the user request. For example, the digital assistant operating on device 1880 can request device 830 to search and find the video user 804 took last Sunday and transmit the video to device 840. It can further request device 840 to play the video on device 1882 (e.g., a TV).

Figure 18D:
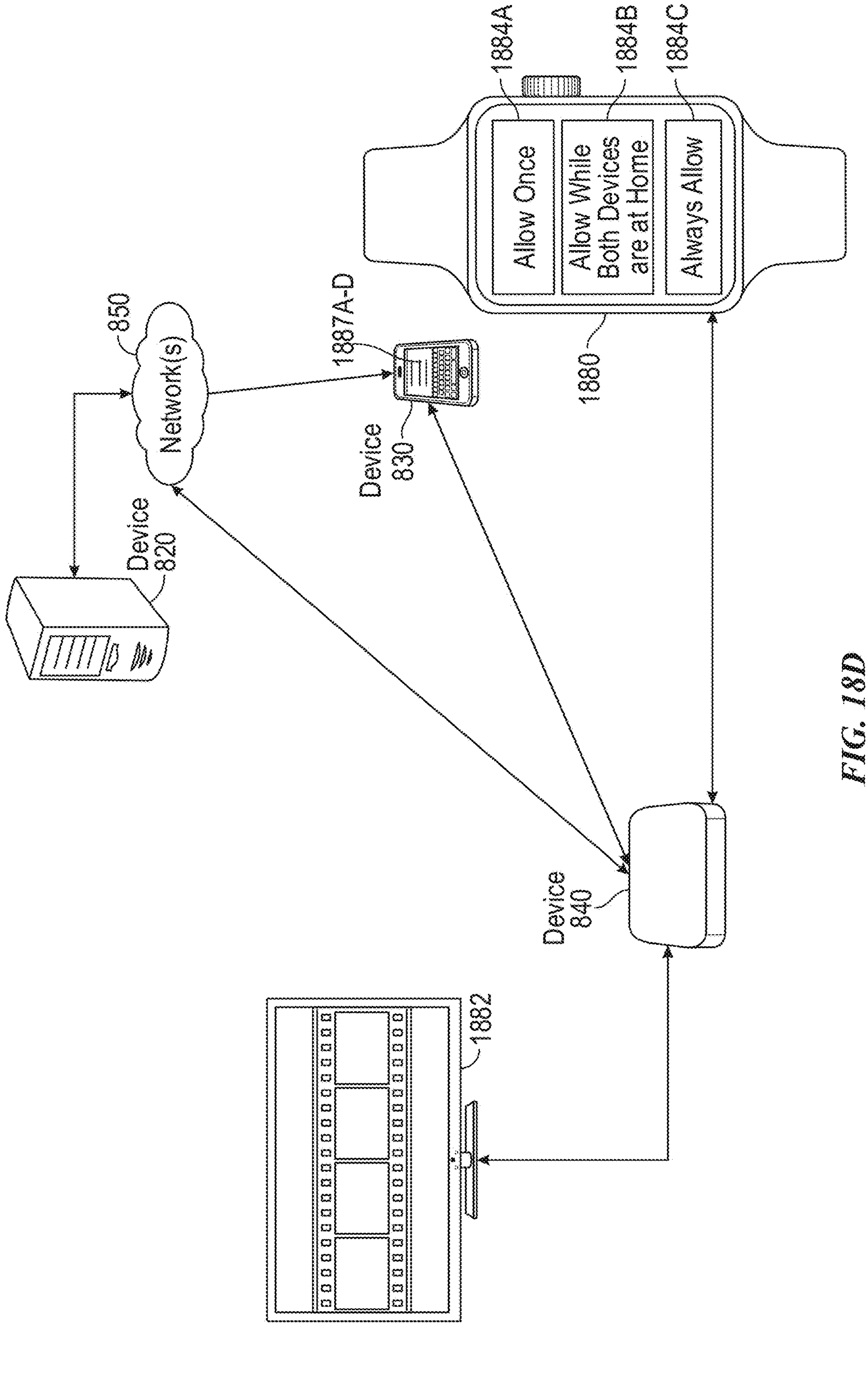

As described above, in some examples, prior to obtaining the capability data, the digital assistant operating on device 1880 can seek confirmation or permission to access one or more electronic devices being capable of communicatively coupled to device 1880. For example, the digital assistant operating on device 1880 may provide a speech output such as "Do I have your permission to access your phone?" With reference to FIG. 18D, in some embodiments, the digital assistant operating on device 1880 can provide one or more duration options for accessing the devices being capable of communicatively coupled to device 1880. For example, as illustrated in FIG. 18D, the digital assistant operating on device 1880 can display options 1884A-C on device 1880. Option 1884A may include "Allow Once," indicating that the access to device 830 from device 1880 is permitted only this time. Option 1884B may include "Allow while both devices are at home," indicating that the access to device 830 from device 1880 is permitted while both devices are within a predetermined boundary (e.g., within or nearby a house). Option 1884C may include "Always allow," indicating the access to device 830 from device 1880 is always permitted. In some examples, the digital assistant may also provide an option 1884D (not shown), which may include "Not allow," indicating that access to device 830 from device 1880 is denied. In some embodiments, similar duration options 1887A-D can be displayed on device 830, thereby enabling the user of device 830 (e.g. a user that may or may not be the same as the user of device 1880) to control the access of device 830.

In some embodiments, the digital assistant operating on device 1880 can receive a selection of a duration option from user 804 and access the devices capable of being communicatively coupled to device 1880 based on the selected duration option. For example, if the selection is option 1884A such as "Allow once," the digital assistant operating on device 1880 may only access device 830 to find the video the user requested for this time.

Figure 18E:
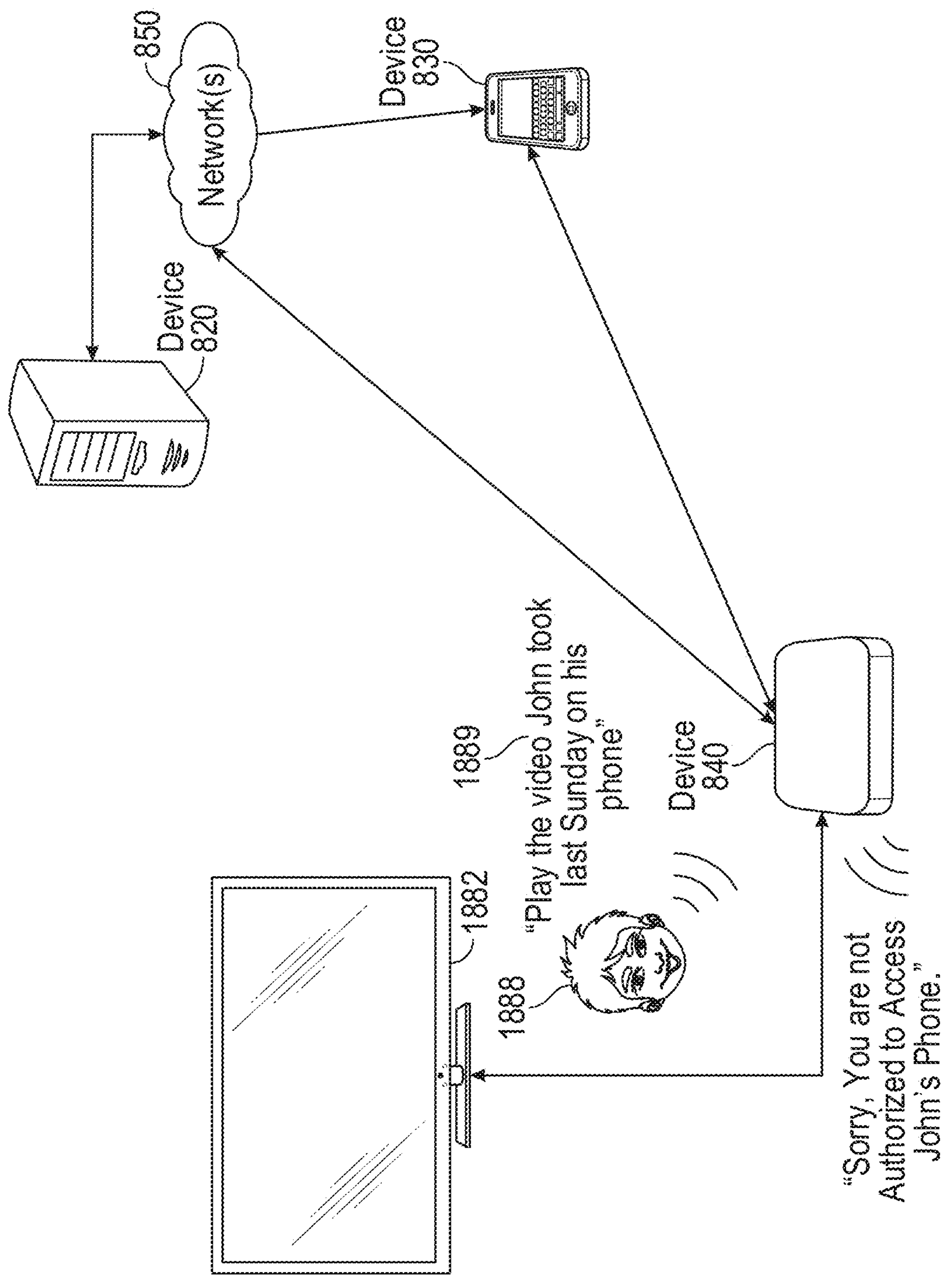

As described above, in some embodiments, a digital assistant can cause one or more identified devices to provide at least a portion of a response to the user request. In some embodiments, prior to causing the identified devices to provide a response, the digital assistant can obtain an identity of the user and determine whether the user is authorized to receive at least a portion of the response. As illustrated in FIG. 18E, for example, device 840 may be a device (e.g., a TV set-top box) that is shared between multiple users and thus user 1888 may be a user that is authorized to access device 840. Device 830 may be a client device such as a smartphone of another user (e.g., user 804). User 1888 may not be authorized to access device 830. In some examples, user 1888 may provide a speech input 1889 such as "Play the video Bill Took last Sunday on his phone." The digital assistant operating on device 840 may identify, based on the capability data of devices communicatively coupled to device 840, device 830 for providing at least a portion of a response to the user request. In some embodiments, before accessing device 830 to perform a step for responding to the user request, the digital assistant operating on device 840 can obtain the identity of user 1888. In some examples, obtaining the identity of user 1888 can be based on a voice profile. A voice profile may include voice biometrics, such as the user's voice characteristics (e.g., acoustic patterns, voiceprints, the user's accent, or the like). A voice profile can be associated with a particular user and uniquely identifies the user. For example, a voice profile of user 1888 can include voice characteristics of user 1888 and thus uniquely identify user 1888. In some examples, a voice profile can also assistant the natural language processing described above to more accurately determine the user intent. For example, the speech-to-text conversion process may be more accurately performed using a voice profile that includes the user's accent data.

With reference to FIG. 18E, the digital assistant operating on device 840 can compare the voice characteristics in speech input 1889 with one or more voice profiles of one or more authorized users of device 830. Based on the comparison, the digital assistant operating on device 840 may determine that voice characteristics in speech input 1889 does not match any of the voice profile for authorized user of device 830. As a result, the digital assistant operating on device 840 can determine that user 1888 is not authorized to access device 830, and thus not authorized to access the video stored in device 830.

9. Process for Providing Digital Assistant Services Using Multiple Devices.

FIGS. 19A-19D illustrates process 1900 for operating a digital assistant for providing digital assistant services based on notifications of events, according to various examples. Process 1900 is performed, for example, using one or more electronic devices implementing a digital assistant. In some examples, process 1900 is performed using a client-server system (e.g., system 100), and the blocks of process 1900 are divided up in any manner between the server (e.g., DA server 106) and a client device. In other examples, the blocks of process 1900 are divided up between the server and multiple client devices (e.g., a mobile phone and a smart watch). Thus, while portions of process 1900 are described herein as being performed by particular devices of a client-server system, it will be appreciated that process 1900 is not so limited. In other examples, process 1900 is performed using only a client device (e.g., user device 104, device 1880) or only multiple client devices. In process 1900, some blocks are, optionally, combined, the order of some blocks is, optionally, changed, and some blocks are, optionally, omitted. In some examples, additional steps may be performed in combination with the process 1900.

Figure 19A:
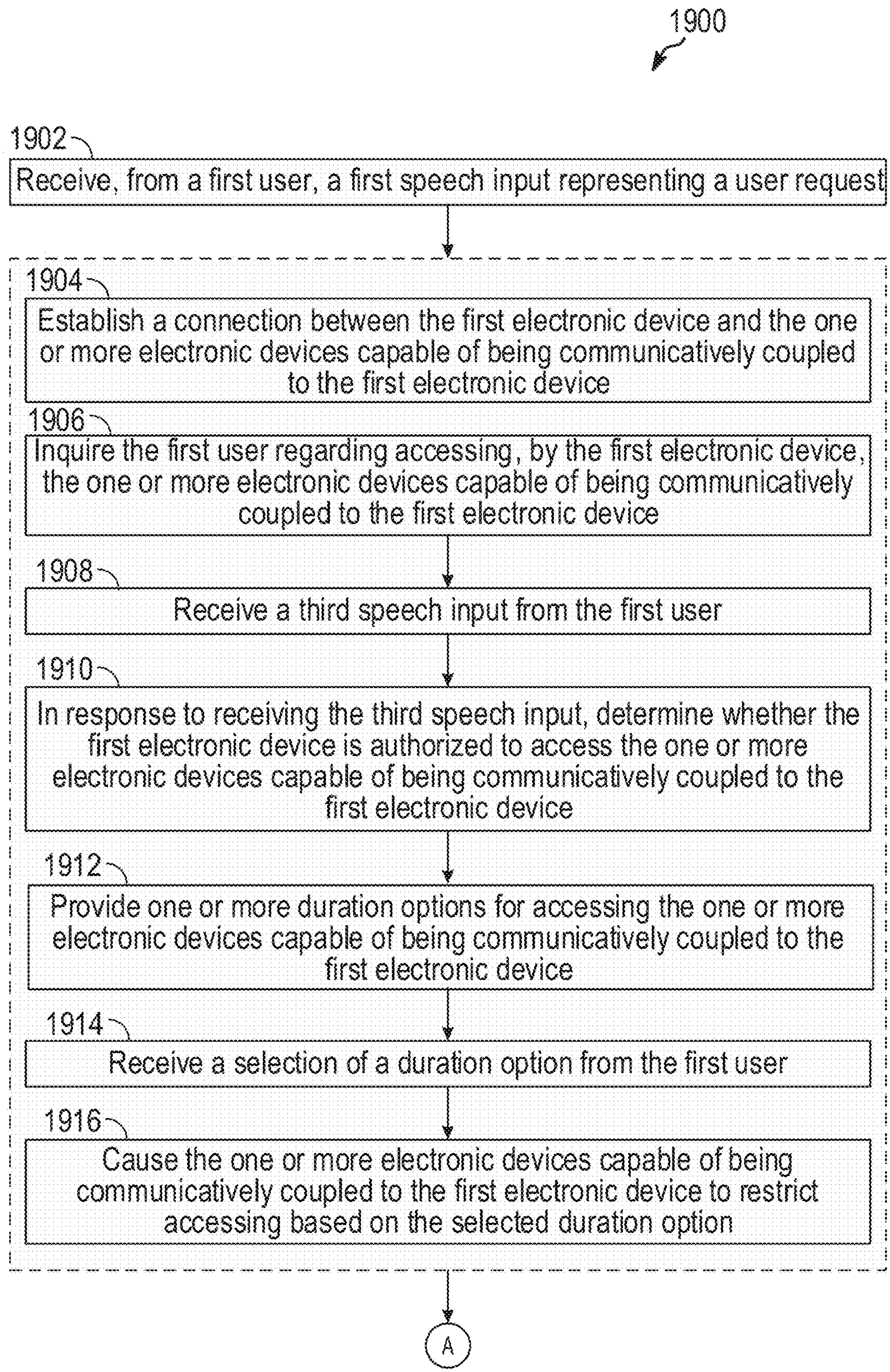
FIGS. 19A-19D illustrate a process for providing digital assistant services based on capabilities of multiple electronic devices, according to various examples.

With reference to FIG. 19A, at block 1902, a first speech input representing a user request is received from a first user. At block 1904, prior to obtaining capability data associated with the one or more electronic devices capable of being communicatively coupled to the first electronic device, a connection is established between the first electronic device and the one or more electronic devices capable of bang communicatively coupled to the first electronic device. In some examples, the first electronic device and the electronic devices capable of being communicatively coupled to the first electronic device are disposed within a predetermined boundary (e.g., a house). In some examples, establishing the connection is based on a near-field communication between the first electronic device and the one or more electronic devices capable of being communicatively coupled to the first electronic device. In some examples, establishing the connection is based on detecting of the one or more electronic devices capable of being communicatively coupled to the first electronic device being within a predetermined distance from the first electronic device. In some examples, establishing the connection is based on one or more previous established connections between the first electronic device and the one or more electronic devices capable of being communicatively coupled to the first electronic device.

At block 1906, prior to obtaining capability data associated with the one or more electronic devices capable of being communicatively coupled to the first electronic device, the first user is inquired regarding accessing, by the first electronic device, the one or more electronic devices capable of being communicatively coupled to the first electronic device. At block 1908, a third speech input is received from the first user. The third speech input may indicate whether the first electronic device is authorized to access other devices. At block 1910, in response to receiving the third speech input, it is determined whether the first electronic device is authorized to access the one or more electronic devices capable of being communicatively coupled to the first electronic device.

At block 1912, it is provided one or more duration options for accessing the one or more electronic devices capable of being communicatively coupled to the first electronic device. The duration options may include, for example, allow once, allow while both devices are at home, always allow, not allow. At block 1914, a selection of a duration option is received from the first user. At block 1916, the one or more electronic devices capable of being communicatively coupled to the first electronic device are accessed based on the selected duration option.

Figure 19B:
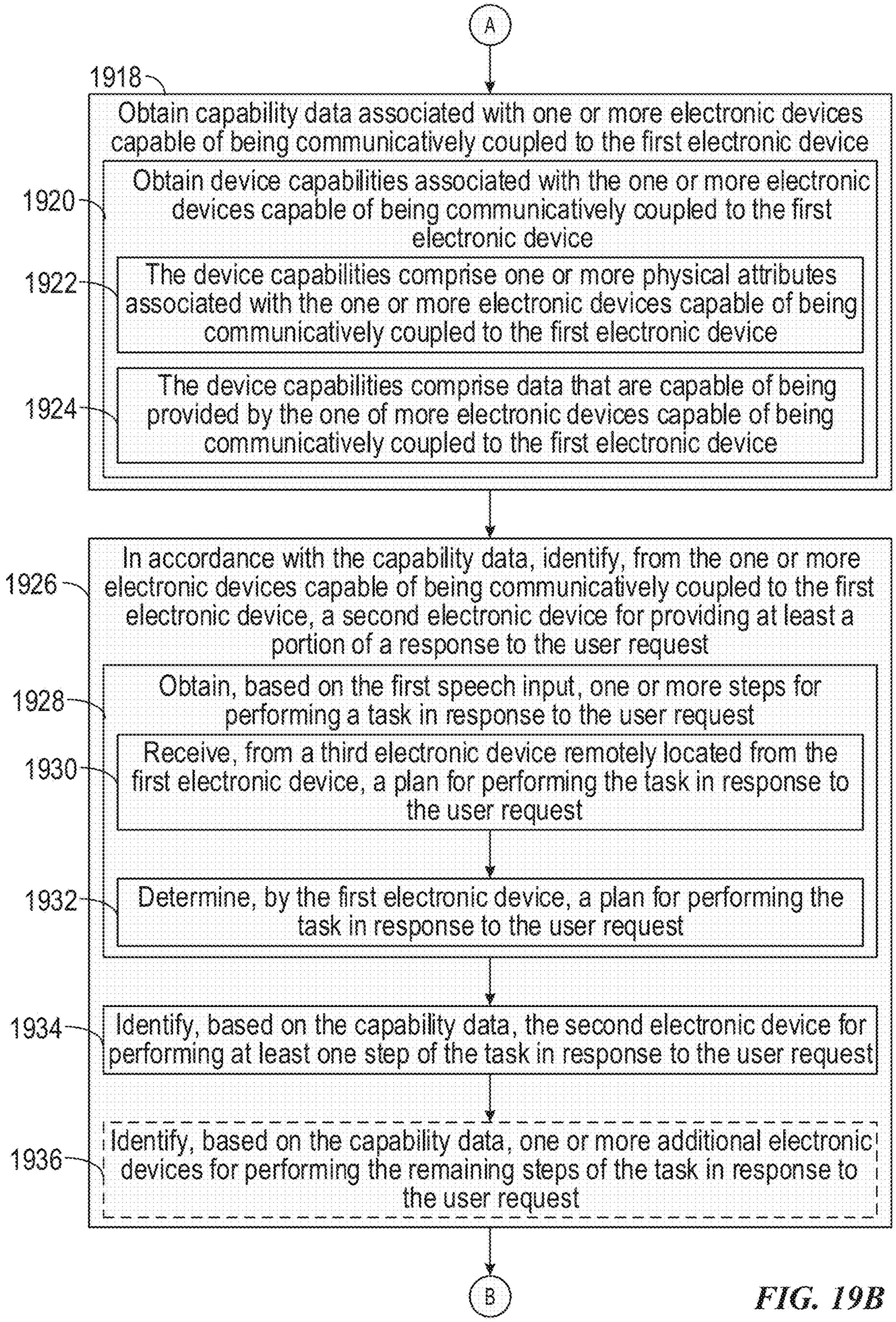

With reference to FIG. 19B, at block 1918, it is obtained capability data associated with one or more electronic devices capable of being communicatively coupled to the first electronic device. At block 1920, to obtain capability data, it is obtained device capabilities associated with the one or more electronic devices capable of being communicatively coupled to the first electronic device. At block 1922, the device capabilities include one or more physical attributes associated with the one or more electronic devices capable of being communicatively coupled to the first electronic device. At block 1924, the device capabilities include data that are capable of being provided by the one of more electronic devices capable of being communicatively coupled to the first electronic device.

At block 1926, in accordance with the capability data, it is identified, from the one or more electronic devices capable of being communicatively coupled to the first electronic device, a second electronic device for providing at least a portion of a response to the user request. At block 1928, to identify the second electronic device, one or more steps for responding to the user request are obtained based on the first speech input. In some examples, at block 1930, to obtain the one or more steps, a plan for responding to the user request is received from a third electronic device (e.g., a server) remotely located from the first electronic device. In some examples, at block 1932, a plan for responding to the user request is determined by the first electronic device (e.g., a client device such as a wearable device), wherein the plan comprising one or more steps for responding to the user request.

At block 1934, it is identified, based on the capability data, the second electronic device (e.g., device 840 such as a TV set-top box) for performing at least one step for responding to the user request. At block 1936, it is identified, based on the capability data, one or more additional electronic devices for performing the remaining steps for responding the user request.

Figure 19C:
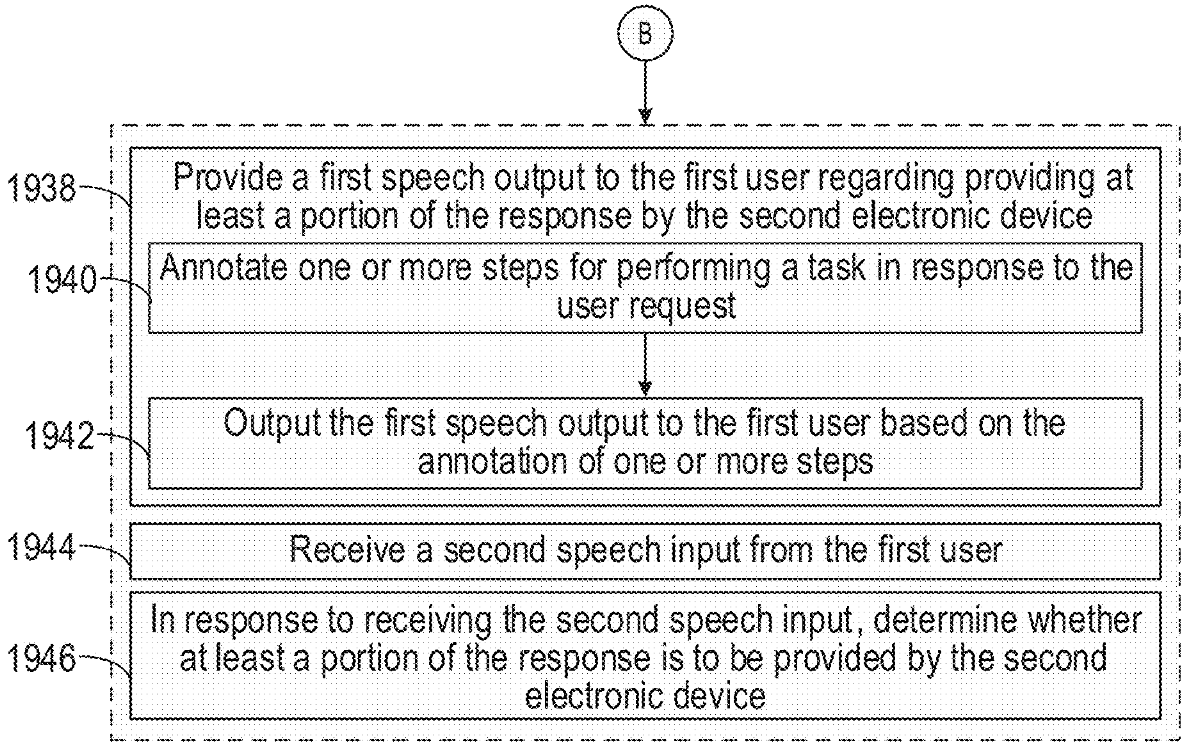
Figure 19C:
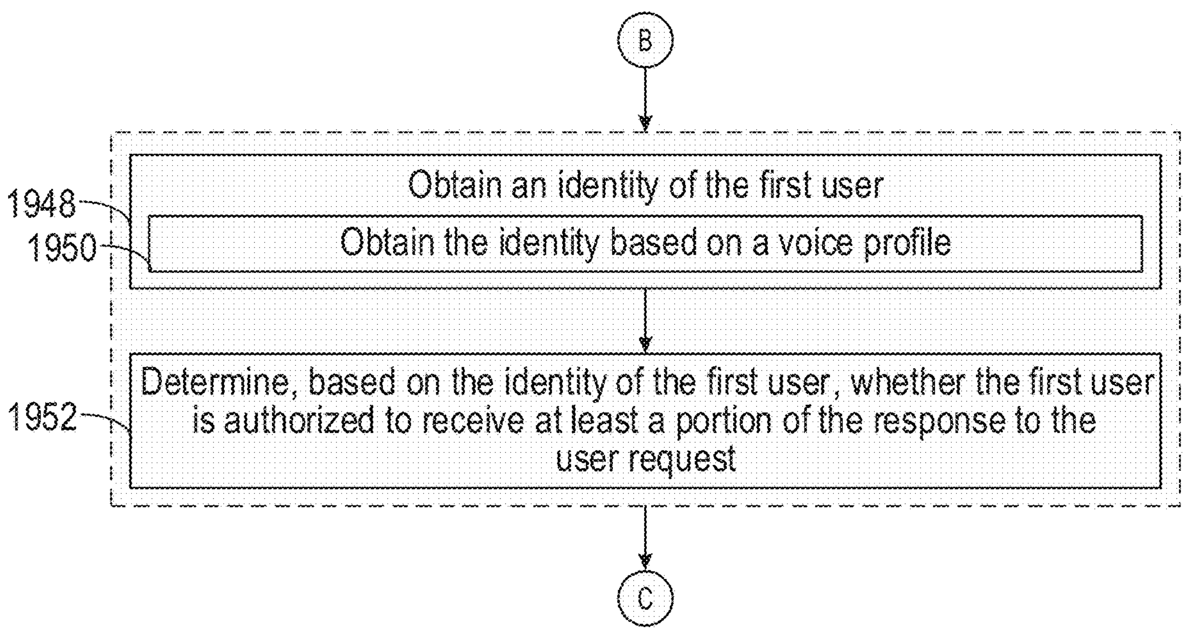

With reference to FIG. 19C, at block 1938, a first speech output is provided to the first user regarding providing at least a portion of the response by the second electronic device. For example, the first speech output may be a speech out requesting authorization to access the second electronic device. At block 1940, for providing the first speech output, one or more steps for responding to the user request are annotated. For example, some steps may be annotated as state-altering steps and thus may require authorization; and some steps may not be annotated and thus may not require authorization. At block 1942, the first speech output is provided to the first user based on the annotation of one or more steps.

At block 1944, a second speech input is received from the first user. The second speech input may indicate whether the first user authorizes accessing certain devices. At block 1946, in response to receiving the second speech input, it is determined whether at least a portion of the response is to be provided by the second electronic device.

At block 1948, in some examples, prior to causing the second electronic device to provide at least a portion of the response to the first user, an identity of the first user is obtained. At block 1950, the identity is obtained based on a voice profile. At block 1952, it is determined, based on the identity of the first user, whether the first user is authorized to receive at least a portion of the response to the user request.

Figure 19D:
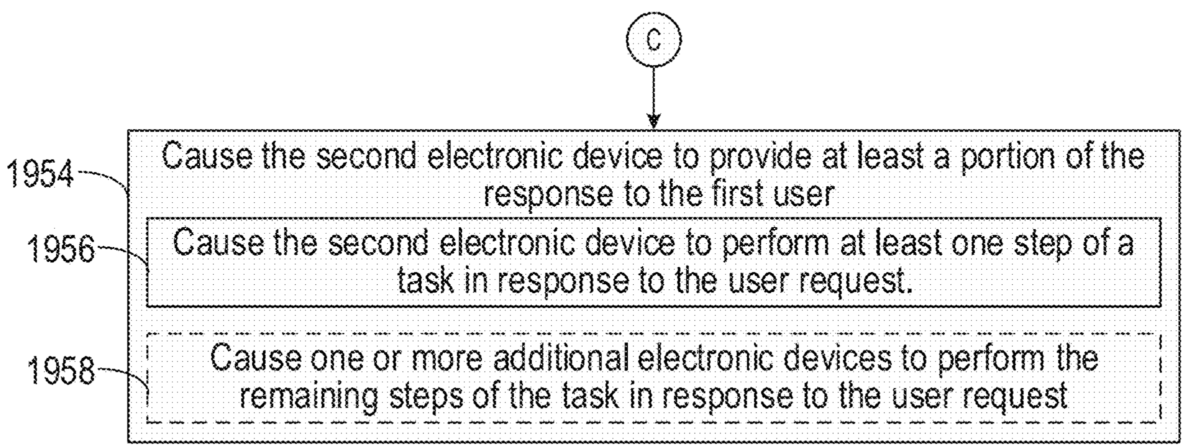

With reference to FIG. 19D, at block 1954, the second electronic device is caused to provide at least a portion of the response to the user request. At block 1956, the second electronic device is caused to perform at least one step for responding to the user request. At block 1958, one or more additional electronic devices are caused to perform the remaining steps for responding to the user request.

The operations described above with reference to FIGS. 19A-19D are optionally implemented by components depicted in FIGS. 1-4, 6A-6B, and 7A-7C. For example, the operations of process 1900 may be implemented by digital assistant system 700. It would be clear to a person having ordinary skill in the art how other processes are implemented based on the components depicted in FIGS. 1-4, 6A-6B, and 7A-7C.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to obtain a user's identity. As described above, data for authenticating a user may include voice biometrics, facial recognition data, fingerprints, etc. The present disclosure contemplates that in some instances, this gathered data may include personal information data that uniquely identifies or can be used to contact or locate a specific person. As described above, informational capabilities of client devices may be obtained. The informational capabilities of client devices may include personal information data. Such personal information data can include personal identification data, demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A method for providing a digital assistant service, comprising:

at a first electronic device with one or more processors and memory, the first electronic device being configured to extend speech-based digital assistant services to a plurality of users based on identities of the plurality of users, wherein the speech-based digital assistant services are provided by one or more electronic devices different from the first electronic device:

receiving a notification of an event associated with a first user;

in response to receiving the notification:

outputting an indication of the notification at the first electronic device, wherein the indication of the notification includes outputting audio; and causing a second electronic device communicatively coupled to the first electronic device to output the indication of the notification;

receiving one or more speech inputs;

in accordance with the one or more speech inputs:

obtaining an identity of the user who provides at least one of the one or more speech inputs, wherein obtaining the identity of the user includes obtaining authentication data, and wherein the authentication data includes facial recognition data;

determining, based on the identity of the user who provides at least one of the one or more speech inputs and based on the notification, whether the notification is to be provided to the user who provides at least one of the one or more speech inputs; and in accordance with a determination that the notification is to be provided to the user who provides at least one of the one or more speech inputs, determining whether the notification is to be provided at the first electronic device or another electronic device; and in accordance with a determination that the notification is to be provided at the first electronic device, providing the notification at the first electronic device; and in accordance with a determination that the notification is not to be provided at the first electronic device, determining an additional electronic device for providing the notification, wherein determining the additional electronic device for providing the notification is based on the one or more speech inputs.

2. The method of claim 1, wherein the notification of the event includes a representation of at least one of an incoming call, a reminder, a message, a voicemail, or a news alert.

3. The method of claim 1, wherein receiving the notification of the event comprises:

receiving the notification from at least one of a second electronic device or a third electronic device.

4. The method of claim 1, wherein receiving the one or more speech inputs comprises:

receiving a first speech input regarding the notification;

outputting a response in accordance with the notification of the event; and receiving a second speech input.

5. The method of claim 1, wherein obtaining the identity of the user who provides at least one of the one or more speech inputs comprises:

obtaining authentication data associated with the user who provides at least one of the one or more speech inputs; and obtaining a determination of the identity of the user who provides at least one of the one or more speech inputs based on the authentication data.

6. The method of claim 5, wherein obtaining the determination of the identity of the user who provides at least one of the one or more speech inputs comprises:

providing the authentication data to at least one of a second electronic device and a third electronic device; and receiving the identity of the user who provides at least one of the one or more speech inputs from at least one of the second electronic device and the third electronic device, wherein the identity of the user who provides at least one of the one or more speech inputs is determined based on the authentication data.

7. The method of claim 1, wherein providing the notification at the first electronic device comprises:

providing an audio output associated with the notification at the first electronic device.

8. The method of claim 1, wherein determining the additional electronic device for providing the notification is based on context information.

9. The method of claim 1, further comprising, prior to receiving the notification, establishing a connection between the first electronic device and at least one of a second electronic device or a third electronic device.

10. The method of claim 9, wherein establishing the connection is based on a near-field communication between the first electronic device and the third electronic device.

11. The method of claim 9, wherein establishing the connection is based on detecting of the third electronic device being within a predetermined distance from the first electronic device.

12. The method of claim 9, wherein establishing the connection is based on a previous established connection between the first electronic device and the third electronic device.

13. The method of claim 9, further comprising:

establishing a connection between the first electronic device and the third electronic device, wherein the third electronic device is associated with the first user; and establishing a connection between the first electronic device and a fourth electronic device, wherein the fourth electronic device is associated with a second user.

14. The method of claim 13, further comprising: after establishing the connection between the first electronic device and the third electronic device, notifying the second electronic device of the established connection.

15. The method of claim 1, further comprising, establishing one or more connections between the first electronic device and one or more additional electronic devices, wherein the one or more additional electronic devices are the same type of devices as the first electronic device.

16. The method of claim 1, wherein determining whether the notification is to be provided at the first electronic device or another electronic device is based on at least one of a detected location of the user or tracking the user's movement.

17. The method of claim 1, wherein determining whether the notification is to be provided at the first electronic device or another electronic device is based on context information, wherein the context information includes information indicating whether the first electronic device is currently providing output.

18. The method of claim 1, wherein determining whether the notification is to be provided at the first electronic device or another electronic device is based on a detected location of an additional user.

19. The method of claim 1, wherein determining whether the notification is to be provided at the first electronic device or another electronic device is based on context information, wherein the context information includes at least one past electronic device used for providing notifications.

20. The method of claim 1, wherein determining whether the notification is to be provided at the first electronic device or another electronic device is based on context information, wherein the context information includes at least one user preference.

21. A non-transitory computer-readable storage medium storing one or more programs, the one or more programs comprising instructions, which when executed by one or more processors of a first electronic device, cause the first electronic device to:

receive a notification of an event associated with a first user;

in response to receiving the notification:

output an indication of the notification at the first electronic device, wherein the indication of the notification includes outputting audio; and cause a second electronic device communicatively coupled to the first electronic device to output the indication of the notification;

receive one or more speech inputs;

in accordance with the one or more speech inputs:

obtain an identity of the user who provides at least one of the one or more speech inputs, wherein obtaining the identity of the user includes obtaining authentication data, and wherein the authentication data includes facial recognition data;

determine, based on the identity of the user who provides at least one of the one or more speech inputs and based on the notification, whether the notification is to be provided to the user who provides at least one of the one or more speech inputs; and in accordance with a determination that the notification is to be provided to the user who provides at least one of the one or more speech inputs, determine whether the notification is to be provided at the first electronic device or another electronic device; and in accordance with a determination that the notification is to be provided at the first electronic device, provide the notification at the first electronic device; and in accordance with a determination that the notification is not to be provided at the first electronic device, determine an additional electronic device for providing the notification, wherein determining the additional electronic device for providing the notification is based on the one or more speech inputs.

22. The non-transitory computer-readable storage medium of claim 21, wherein the notification of the event includes a representation of at least one of an incoming call, a reminder, a message, a voicemail, or a news alert.

23. The non-transitory computer-readable storage medium of claim 21, wherein receiving the one or more speech inputs comprises:

receiving a first speech input regarding the notification;

outputting a response in accordance with the notification of the event; and receiving a second speech input.

24. The non-transitory computer-readable storage medium of claim 21, wherein obtaining the identity of the user who provides at least one of the one or more speech inputs comprises:

obtaining authentication data associated with the user who provides at least one of the one or more speech inputs; and obtaining a determination of the identity of the user who provides at least one of the one or more speech inputs based on the authentication data.

25. The non-transitory computer-readable storage medium of claim 24, wherein obtaining the determination of the identity of the user who provides at least one of the one or more speech inputs comprises:

providing the authentication data to at least one of a second electronic device and a third electronic device; and receiving the identity of the user who provides at least one of the one or more speech inputs from at least one of the second electronic device and the third electronic device, wherein the identity of the user who provides at least one of the one or more speech inputs is determined based on the authentication data.

26. The non-transitory computer-readable storage medium of claim 21, wherein determining the additional electronic device for providing the notification is based on context information.

27. The non-transitory computer-readable storage medium of claim 21, wherein the one or more programs further comprise instructions, which when executed by the one or more processors, cause the electronic device to:

prior to receiving the notification, establish a connection between the first electronic device and at least one of a second electronic device or a third electronic device.

28. The non-transitory computer-readable storage medium of claim 27, wherein establishing the connection is based on a near-field communication between the first electronic device and the third electronic device.

29. The non-transitory computer-readable storage medium of claim 27, wherein establishing the connection is based on detecting of the third electronic device being within a predetermined distance from the first electronic device.

30. The non-transitory computer-readable storage medium of claim 27, wherein the one or more programs further comprise instructions, which when executed by the one or more processors, cause the electronic device to:

establish a connection between the first electronic device and the third electronic device, wherein the third electronic device is associated with the first user; and establish a connection between the first electronic device and a fourth electronic device, wherein the fourth electronic device is associated with a second user.

31. The non-transitory computer-readable storage medium of claim 21, wherein determining whether the notification is to be provided at the first electronic device or another electronic device is based on at least one of a detected location of the user or tracking the user's movement.

32. The non-transitory computer-readable storage medium of claim 21, wherein determining whether the notification is to be provided at the first electronic device or another electronic device is based on context information, wherein the context information includes information indicating whether the first electronic device is currently providing output.

33. The non-transitory computer-readable storage medium of claim 21, wherein determining whether the notification is to be provided at the first electronic device or another electronic device is based on a detected location of an additional user.

34. The non-transitory computer-readable storage medium of claim 21, wherein determining whether the notification is to be provided at the first electronic device or another electronic device is based on context information, wherein the context information includes at least one past electronic device used for providing notifications.

35. The non-transitory computer-readable storage medium of claim 21, wherein determining whether the notification is to be provided at the first electronic device or another electronic device is based on context information, wherein the context information includes at least one user preference.

36. A first electronic device, comprising:

one or more processors;

memory; and one or more programs stored in memory, the one or more programs including instructions for:

receiving a notification of an event associated with a first user;

in response to receiving the notification:

outputting an indication of the notification at the first electronic device, wherein the indication of the notification includes outputting audio; and causing a second electronic device communicatively coupled to the first electronic device to output the indication of the notification;

receiving one or more speech inputs;

in accordance with the one or more speech inputs:

obtaining an identity of the user who provides at least one of the one or more speech inputs, wherein obtaining the identity of the user includes obtaining authentication data, and wherein the authentication data includes facial recognition data;

determining, based on the identity of the user who provides at least one of the one or more speech inputs and based on the notification, whether the notification is to be provided to the user who provides at least one of the one or more speech inputs; and in accordance with a determination that the notification is to be provided to the user who provides at least one of the one or more speech inputs, determining whether the notification is to be provided at the first electronic device or another electronic device; and in accordance with a determination that the notification is to be provided at the first electronic device, providing the notification at the first electronic device; and in accordance with a determination that the notification is not to be provided at the first electronic device, determining an additional electronic device for providing the notification, wherein determining the additional electronic device for providing the notification is based on the one or more speech inputs.

37. The first electronic device of claim 36, wherein receiving the one or more speech inputs comprises:

receiving a first speech input regarding the notification;

outputting a response in accordance with the notification of the event; and receiving a second speech input.

38. The first electronic device of claim 36, wherein obtaining the identity of the user who provides at least one of the one or more speech inputs comprises:

obtaining authentication data associated with the user who provides at least one of the one or more speech inputs; and obtaining a determination of the identity of the user who provides at least one of the one or more speech inputs based on the authentication data.

39. The first electronic device of claim 38, wherein obtaining the determination of the identity of the user who provides at least one of the one or more speech inputs comprises:

providing the authentication data to at least one of a second electronic device and a third electronic device; and receiving the identity of the user who provides at least one of the one or more speech inputs from at least one of the second electronic device and the third electronic device, wherein the identity of the user who provides at least one of the one or more speech inputs is determined based on the authentication data.

40. The first electronic device of claim 36, wherein the notification of the event includes a representation of at least one of an incoming call, a reminder, a message, a voicemail, or a news alert.

41. The first electronic device of claim 36, wherein determining the additional electronic device for providing the notification is based on context information.

42. The first electronic device of claim 36, wherein the one or more programs further include instructions for:

prior to receiving the notification, establishing a connection between the first electronic device and at least one of a second electronic device or a third electronic device.

43. The first electronic device of claim 42, wherein establishing the connection is based on a near-field communication between the first electronic device and the third electronic device.

44. The first electronic device of claim 42, wherein establishing the connection is based on detecting of the third electronic device being within a predetermined distance from the first electronic device.

45. The first electronic device of claim 42, wherein the one or more programs further include instructions for:

establishing a connection between the first electronic device and the third electronic device, wherein the third electronic device is associated with the first user; and establishing a connection between the first electronic device and a fourth electronic device, wherein the fourth electronic device is associated with a second user.

46. The first electronic device of claim 36, wherein determining whether the notification is to be provided at the first electronic device or another electronic device is based on at least one of a detected location of the user or tracking the user's movement.

47. The first electronic device of claim 36, wherein determining whether the notification is to be provided at the first electronic device or another electronic device is based on context information, wherein the context information includes information indicating whether the first electronic device is currently providing output.

48. The first electronic device of claim 36, wherein determining whether the notification is to be provided at the first electronic device or another electronic device is based on a detected location of an additional user.

49. The first electronic device of claim 36, wherein determining whether the notification is to be provided at the first electronic device or another electronic device is based on context information, wherein the context information includes at least one past electronic device used for providing notifications.

50. The first electronic device of claim 36, wherein determining whether the notification is to be provided at the first electronic device or another electronic device is based on context information, wherein the context information includes at least one user preference.

* * * * *